US010856256B2

(12) United States Patent
Vaidya et al.

(10) Patent No.: US 10,856,256 B2
(45) Date of Patent: Dec. 1, 2020

(54) PAGING RELATED METHODS AND APPARATUS

(71) Applicant: Charter Communications Operating, LLC, St. Louis, MO (US)

(72) Inventors: Maulik Vaidya, Palmdale, CA (US); Curt Wong, Bellevue, WA (US); Yildirim Sahin, Englewood, CO (US); Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/584,763

(22) Filed: Sep. 26, 2019

(65) Prior Publication Data

US 2020/0100210 A1 Mar. 26, 2020

Related U.S. Application Data

(63) Continuation-in-part of application No. 16/517,654, filed on Jul. 21, 2019, and a continuation-in-part of
(Continued)

(51) Int. Cl.
*H04W 68/02* (2009.01)
*H04W 84/04* (2009.01)

(52) U.S. Cl.
CPC .......... *H04W 68/02* (2013.01); *H04W 84/045* (2013.01)

(58) Field of Classification Search
CPC ......... H04W 48/18; H04W 4/40; H04W 4/24; H04W 48/16; H04W 84/005;
(Continued)

(56) References Cited

U.S. PATENT DOCUMENTS

| 2010/0034160 A1* | 2/2010 | Prakash | H04W 68/02 370/329 |
| 2013/0176885 A1* | 7/2013 | Lee | H04W 36/00835 370/252 |

(Continued)

OTHER PUBLICATIONS

Considerations on NR-U Paging in Unlicensed Spectrum, 3GPP TSG-RAN WG2, Meeting #103bis Chengdu, China, R2-1814127, pp. 1-5, Oct. 8-12, 2018.
(Continued)

*Primary Examiner* — Nathan S Taylor
(74) *Attorney, Agent, or Firm* — Straub & Straub; Michael P. Straub; Stephen T. Straub

(57) ABSTRACT

A base station generates, e.g., based on current UE and current system information, a UE specific paging priority list for an idle or inactive mode UE identifying a set of (small cell base) stations which are to be used to subsequently page the UE. The base station communicates the paging priority list to the UE in a radio resource control release message. In some embodiments, the release message further conveys information indicating a maximum paging monitoring duration and/or a maximum number of paging cells to be monitored. The UE receives the release message and transitions into idle or inactive mode. The UE uses the communicated information to perform efficient paging, identifying which small cells are potential sources of a paging signal, and determine how long to monitor for a paging signal.

18 Claims, 53 Drawing Sheets

Related U.S. Application Data application No. 16/270,513, filed on Feb. 7, 2019, now Pat. No. 10,694,495.

(60) Provisional application No. 62/753,642, filed on Oct. 31, 2018, provisional application No. 62/737,014, filed on Sep. 26, 2018.

(58) Field of Classification Search
CPC .......... H04W 12/001; H04W 28/0215; H04W 28/06; H04W 36/0009; H04W 36/08; H04W 40/02; H04W 40/20; H04W 48/02; H04W 48/06; H04W 4/00; H04W 4/10; H04W 52/12; H04W 52/143; H04W 52/225; H04W 52/241; H04W 52/346; H04W 72/0406; H04W 72/042; H04W 72/0493; H04W 76/45; H04W 80/02; H04W 84/12; H04W 88/06; H04W 8/06; H04W 8/08; H04W 8/26; H04W 92/18; H04L 12/1489; G06F 21/45; G06F 3/017; G06F 3/167; G06F 9/542
USPC .......................................... 455/458; 370/329
See application file for complete search history.

(56) References Cited

U.S. PATENT DOCUMENTS

| | | | | |
|---|---|---|---|---|
| 2013/0303165 | A1* | 11/2013 | Hole | H04W 36/0055 |
| | | | | 455/435.2 |
| 2013/0322277 | A1 | 12/2013 | Vanganuru et al. | |
| 2014/0016614 | A1* | 1/2014 | Velev | H04W 36/14 |
| | | | | 370/331 |
| 2014/0106790 | A1 | 4/2014 | Kakinada et al. | |
| 2015/0031382 | A1 | 1/2015 | Damnjanovic et al. | |
| 2015/0271827 | A1* | 9/2015 | Hamalainen | H04W 24/08 |
| | | | | 455/452.2 |
| 2015/0282248 | A1* | 10/2015 | Lee | H04W 72/10 |
| | | | | 370/329 |
| 2015/0365931 | A1 | 12/2015 | Ng et al. | |
| 2016/0007170 | A1 | 1/2016 | Vaidya et al. | |
| 2016/0007316 | A1* | 1/2016 | Vaidya | H04W 64/003 |
| | | | | 370/312 |
| 2016/0100442 | A1 | 4/2016 | Xu et al. | |
| 2016/0233989 | A1 | 8/2016 | Belghoul et al. | |
| 2016/0234841 | A1 | 8/2016 | Pao et al. | |
| 2016/0286523 | A1 | 9/2016 | Yu | |
| 2017/0230933 | A1 | 8/2017 | Radulescu et al. | |
| 2018/0007657 | A1 | 1/2018 | Damnjanovic et al. | |
| 2018/0167839 | A1* | 6/2018 | Jung | H04W 28/08 |
| 2018/0206214 | A1 | 7/2018 | Bendlin et al. | |
| 2018/0270894 | A1 | 9/2018 | Park et al. | |
| 2018/0270895 | A1 | 9/2018 | Park et al. | |
| 2019/0349825 | A1* | 11/2019 | Tseng | H04W 36/08 |
| 2020/0100210 | A1* | 3/2020 | Vaidya | H04W 68/06 |

OTHER PUBLICATIONS

3rd Generation Partnership Project; Technical Specification Group Radio Access Network; NR; NR and NG-RAN Overall Description; Stage 2 (Release 15), 3GPP TS 38.300 V15.6.0, Jun. 2019.

3rd Generation Partnership Project; Technical Specification Group Radio Access Network; NR; Radio Resource Control (RRC) protocol specification (Release 15), 3GPP TS 38.331 V15.6.0, Jun. 2019.

Notification of Transmittal of the International Search Report and the Written Opinion of the International Searching Authority along with International Search Report and Written Opinion of the International Searching Authority from PCT/US2019/053037 dated Oct. 25, 2019, pp. 1-14.

* cited by examiner

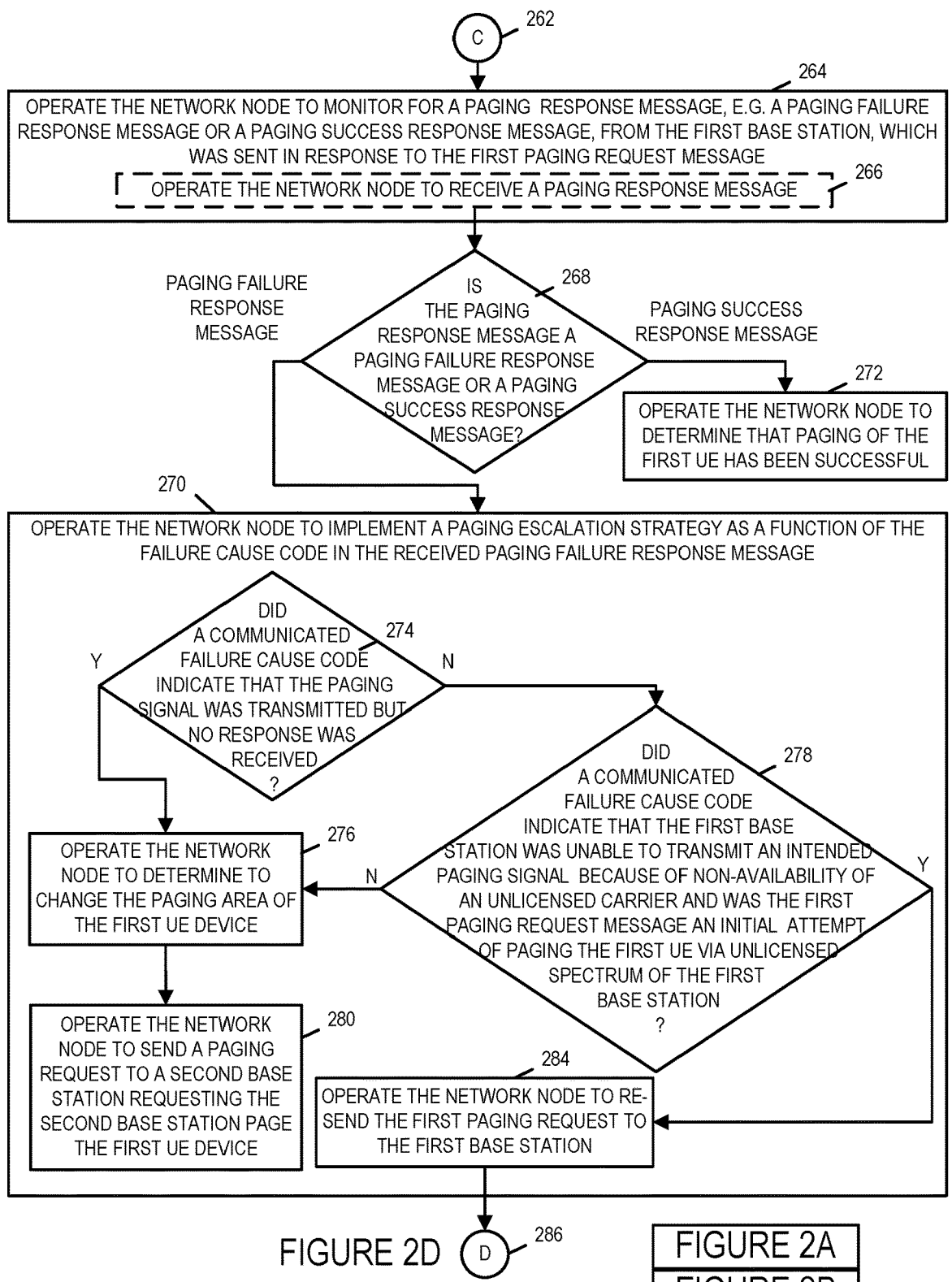

| FIGURE 4A | FIGURE 4B | FIGURE 4C |

| FIGURE 14A | FIGURE 14B |

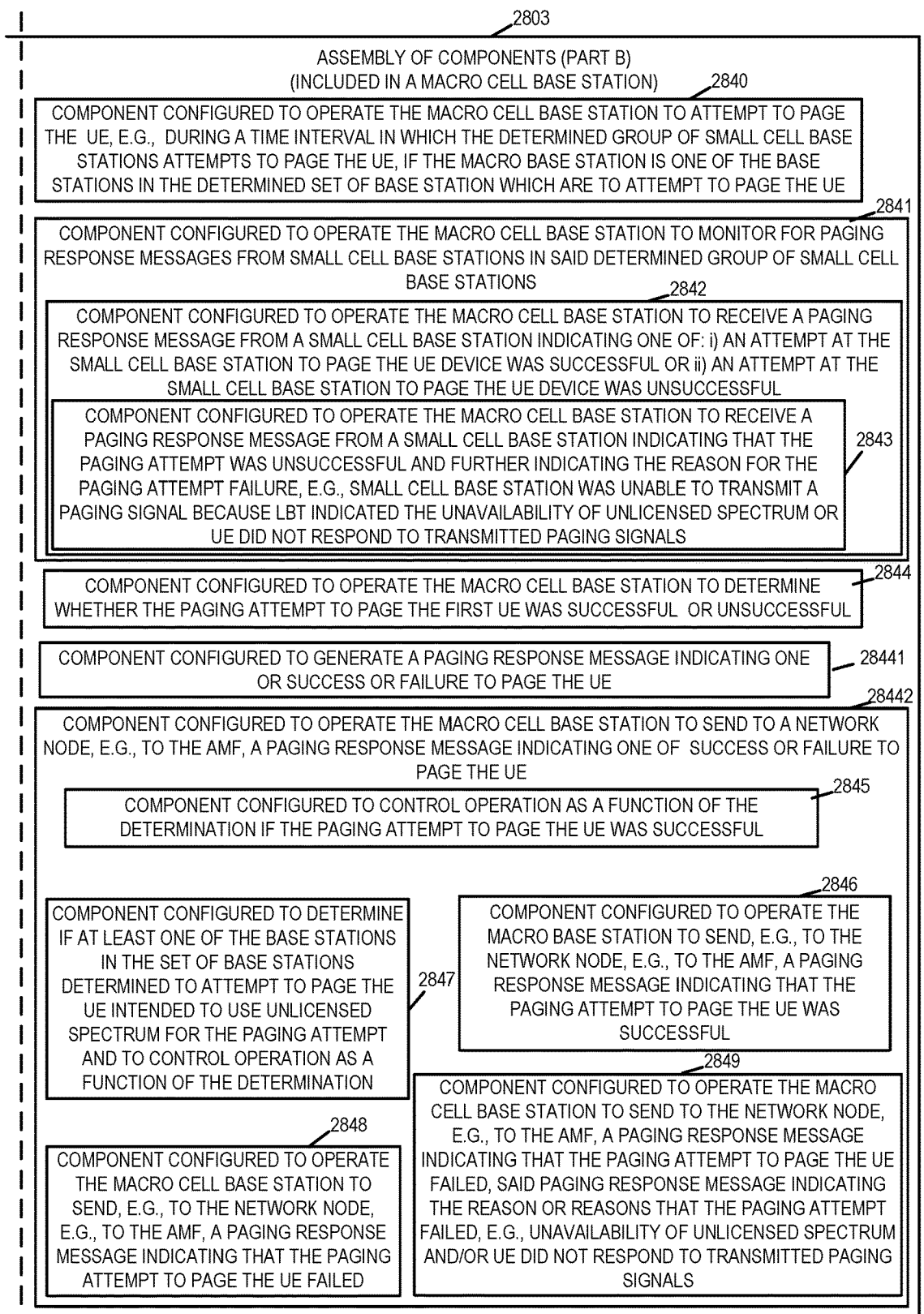

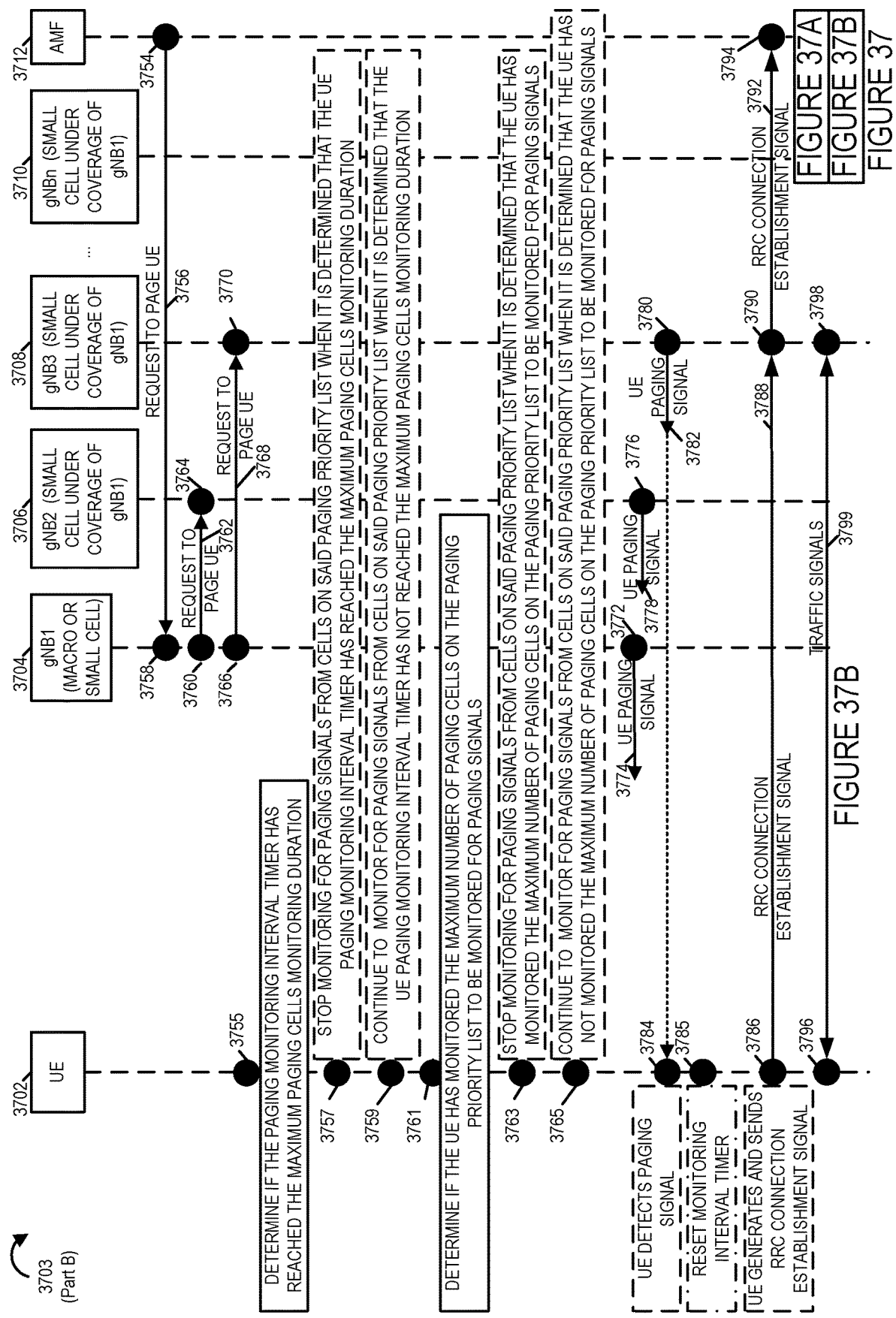

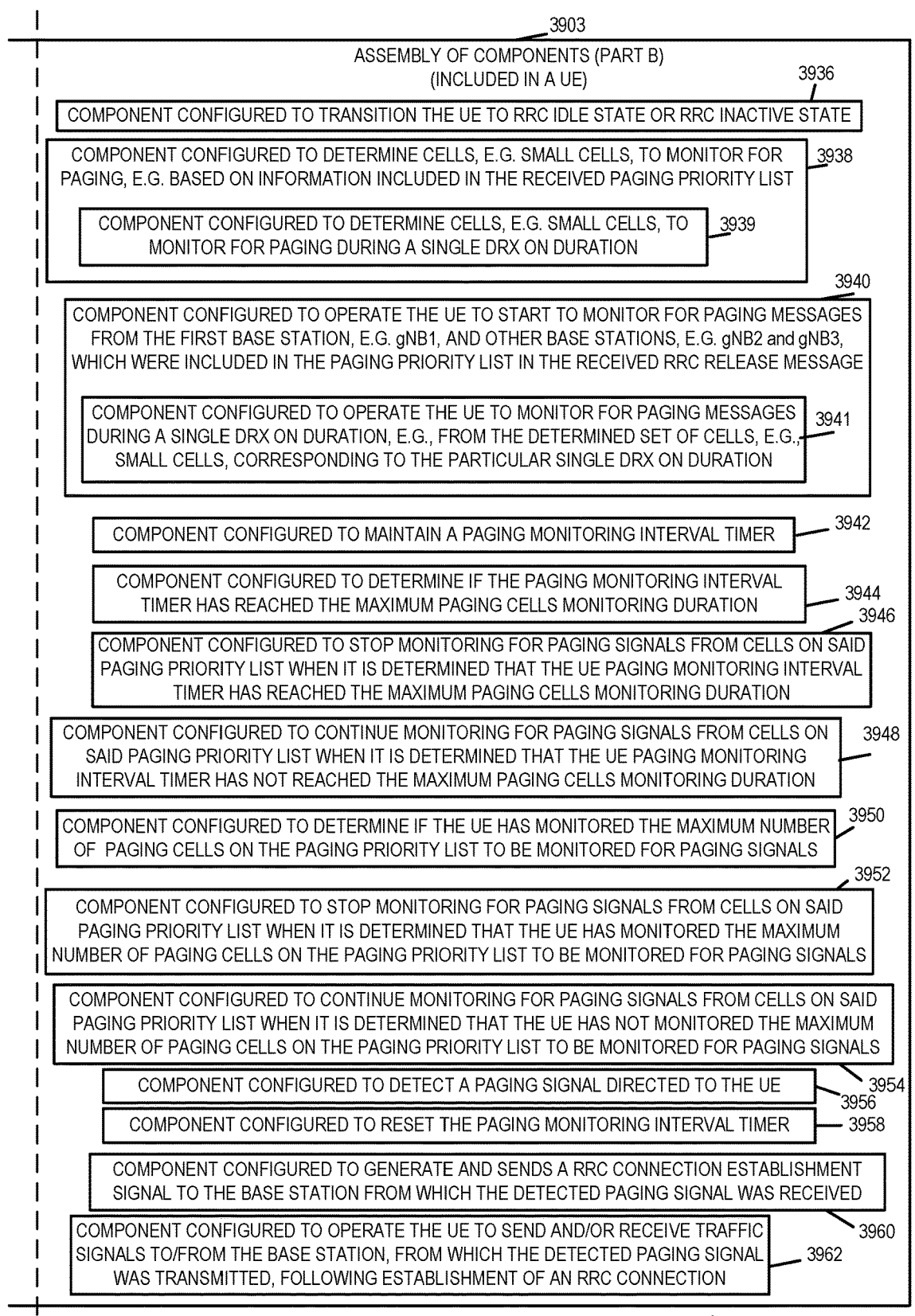

PAGING RELATED METHODS AND APPARATUS

RELATED APPLICATIONS

The present application is a continuation-in-part of U.S. patent application Ser. No. 16/517,654 filed on Jul. 21, 2019 and a continuation-in-part of U.S. patent application Ser. No. 16/270,513 filed on Feb. 7, 2019 and claims the benefit of U.S. Provisional Application Ser. No. 62/737,014 filed Sep. 26, 2018 and U.S. Provisional Application Ser. No. 62/753,642 filed Oct. 31, 2018 which are hereby expressly incorporated by reference in their entirety and this application is related to U.S. Provisional Patent Application Ser. No. 62/906,478 filed Sep. 26, 2019 and which has the same title and inventors as the present application and which is also hereby expressly incorporated by reference in its entirety.

FIELD

The present application relates to communications methods and apparatus, and more particularly, to paging related methods and apparatus in a communications system including macro and small cell base stations.

BACKGROUND

Wireless communications systems have been increasing the use of small cell base stations to augment the wireless coverage area, e.g., to provide coverage in dead zones within a macro cell base station's coverage area and/or to expand the coverage area beyond the outermost regions of the macro cell coverage, e.g., to fill in gaps between adjacent macro cells. Such a densification implies the number of small cells in a wireless communications system can be, and sometimes is, much larger, than the number of macro cells in the communications system. As the total number of small cells to manage with regard to paging (a given UE) becomes large, it becomes inefficient for the core network node, to try to individually manage and directly communicate with each small cell base station with regard to, for a given UE, sending paging requests and receiving paging responses.

As the number of small cells in a wireless communications system increases, the potential sources for a paging signal directed to a particular UE also increases. Paging a UE requires the use of limited resources, e.g., limited air link resources to convey the paging signals directed to the UE, and limited UE battery resources to operate the UE to monitor to detect the paging signals. As the number of small cell base stations employed to page a particular UE increases, the UE may need to expend more battery power to monitor to detect for a paging signal from each of the possible sources, e.g. as the UE may need to remain powered on for a longer time interval to search for a paging signal or may need to operate using a plurality of different alternative possible frequencies.

Based on the above discussion there is a need for new methods and apparatus for supporting efficient paging and particularly paging in communications systems including many small cell base stations.

SUMMARY

Methods and apparatus for efficient paging in a communications system, e.g., a communications system including macro cell base stations and a plurality of small cell base stations, are described. Various embodiments are directed to efficient paging in which UE specific paging priority lists are generated, updated, and/or maintained.

A first base station, e.g., a macro cell gNB, decides to transition a particular user equipment (UE), e.g., UE1, operating in an RRC active state to an RRC INACTIVE or RRC_IDLE state. The first base station generates, e.g., based on current UE and current system information, a UE specific paging priority list for the particular UE identifying a set of small cell base stations, which are to be used to subsequently page the UE in an efficient manner. The identified set of small cell base stations may include new radio (NR) technology small cell base stations and/or EUTRA technology small cell base stations, e.g. depending upon the capabilities of the UE and the location of the UE. The first base station communicates the paging priority list to the UE in a radio resource control (RRC) release message. In some embodiments, the release message further conveys information indicating a maximum paging monitoring duration and/or a maximum number of paging cells to be monitored. The UE receives the release message, recovers the paging related communicated information, and transitions into IDLE or INACTIVE state. Subsequently, the UE uses the recovered communicated information to perform efficient paging, identifying which small cells are potential sources of a paging signal directed to the UE, and determining how long to monitor for a paging signal, thus limiting the amount of power expended by the UE to perform efficient paging operations.

Different UEs, located at substantially the same location, may be, and sometimes sent different paging priority lists, in different radio resource release messages, communicated from the same base station to the different UEs at substantially the same time. The same UE, located at substantially the same location, may be, and sometimes is, sent different paging priority lists, in different radio resources release messages, communicated from the same base station to the same UE at different time. Thus a set of paging related information, communicated in a radio resource release message to a particular UE is tailored to be highly relevant to facilitate efficient paging by the particular UE given the current condition of the UE and the overall current status of the system in the general area in which the particular UE is currently located.

Different embodiments may include and support different features and devices. Accordingly, while various features and/or devices are discussed they are not necessary for all embodiments.

An exemplary communications method, in accordance with some embodiments, comprises: making a decision at a first base to instruct a first UE to release radio resources; generating, at the first base station, a first radio resource release message said first radio resource release message including a first paging priority list including a first list of base stations which are to be monitored for paging signals by the first UE; and transmitting, from the first base station, the first radio resource release message to the first UE. The first UE uses the paging priority list and additional information communicated in the radio resource release message to perform efficient paging.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 2D is a fourth part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.

FIG. 2 comprises the combination of FIG. 2A, FIG. 2B, FIG. 2C and FIG. 2D.

FIG. 28B is a second part of a drawing of an exemplary assembly of components which may be included in a macro cell base station in accordance with an exemplary embodiment.

FIG. 28, comprising the combination of FIG. 28A and FIG. 28B.

FIG. 37B is second part of an exemplary signaling diagram, illustrating an exemplary method, in accordance with an exemplary embodiment.

FIG. 37 comprises the combination of FIG. 37A and FIG. 37B.

DETAILED DESCRIPTION

Figure 1:
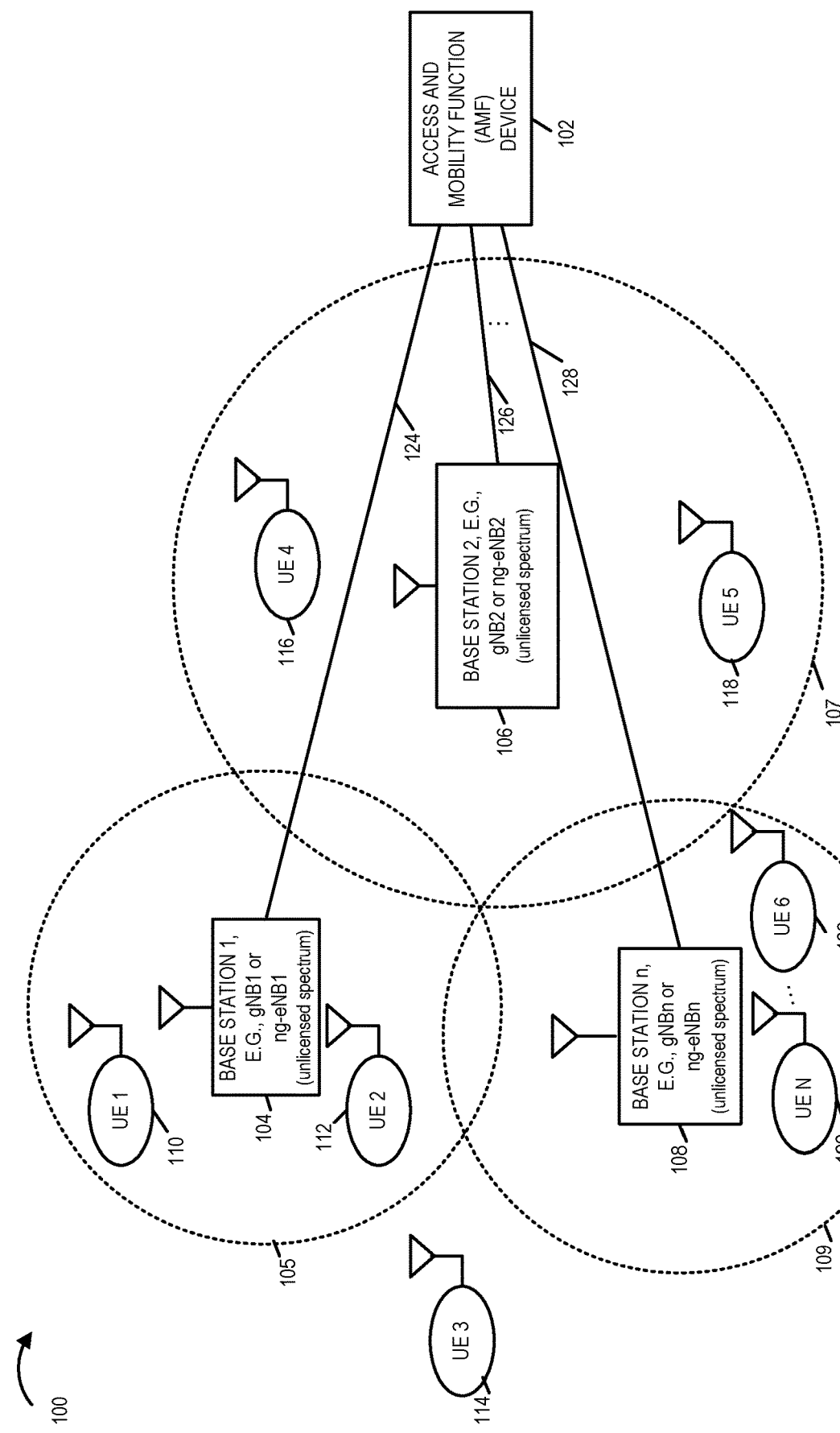
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes an access and mobility function (AMF) device 102, a plurality of base stations (base station 1 104, e.g., gNB 1 or ng-eNB 1, base station 2 106, e.g., gNB 2 or ng-eNB 2, . . . , base station n 108, e.g., gNBn or ng-eNBn), and a plurality of user equipment (UE) devices (UE 1 110, UE 2 112, UE 3 114, UE 4 116, UE 5 118, UE 6 120, . . . , UE N 122). Each of the base stations (base station 1 104, base station 2 106, . . . , base station n 108) has a corresponding wireless coverage area (105, 107, . . . , 109), respectively. AMF 102 is coupled to base station 1 104 via communications connection 124. AMF 102 is coupled to base station 2 106 via communications connection 126. AMF 102 is coupled to base station n 108 via communications connection 128. The base stations (104, 106, . . . , 108) can, and sometimes do, use unlicensed spectrum, e.g. unlicensed spectrum using a first unlicensed carrier. In some embodiments, at least some of the base stations (104, 106, . . . , 108) support communications over multiple different unlicensed spectrums. In some embodiments, at least some different base stations (104, 106, . . . , 108) use different unlicensed spectrum. In some embodiments, at least some of the base stations (104, 106, ..., 108) use licensed spectrum. In some embodiments, at least some of the base stations (104, 106, ..., 108) use licensed and unlicensed spectrum.

At least some of the UE devices (110, 112, 114, 116, 118, 120, ..., 122) are mobile devices which may move throughout the communications system 100. In the drawing of FIG. 1, UE 1 110 and UE 2 112 are shown to be currently within the wireless coverage area 105 of base station 1 104. UE 3 114 is shown to be currently outside the coverage areas (105, 107, 109) of the base stations. UE 4 116 and UE 5 118 are shown to be currently within the wireless coverage area 107 of base station 2 106. UE 6 120 and UE N 122 are shown to be currently within the wireless coverage area 109 of base station 3 108.

Due to pending downlink data (in UPF buffer) destined for a UE in IDLE mode (5GMM_IDLE), the AMF 102 generates and sends a paging request for paging that particular UE to one or more of the base stations (104, 106, ... 108). A base station (e.g., base station 104, 106, or 108), which receive the paging request from the AMF 102, determines if unlicensed spectrum intended to be used by the base station is currently available, and if the determination is that the unlicensed spectrum is available, the base station generates and transmits a paging signal to the UE in unlicensed spectrum. The UEs (110, 112, 114, 116, 118, 120, ... 122) monitor for and detect paging signals in unlicensed spectrum. If the paging attempt is unsuccessful, the base station generates and sends a paging response message to the AMF 102, e.g., a paging failure response message. In various embodiments, the paging failure response message includes a failure cause code indicating the reason for the paging failure, e.g., the base station was unable to transmit the paging request to the UE because the unlicensed spectrum was unavailable (e.g., due to listen before talk (LBT) performed by the base station not clearing) or the UE did not respond to a transmitted paging request which was transmitted by the base station in the unlicensed spectrum, e.g., because the UE was not in the coverage area of the base station or the UE was powered down. The AMF 102 receives the paging failure response message, recovers the failure cause code, and implements a paging escalation strategy as a function of the recovered failure cause code.

Figure 2A:
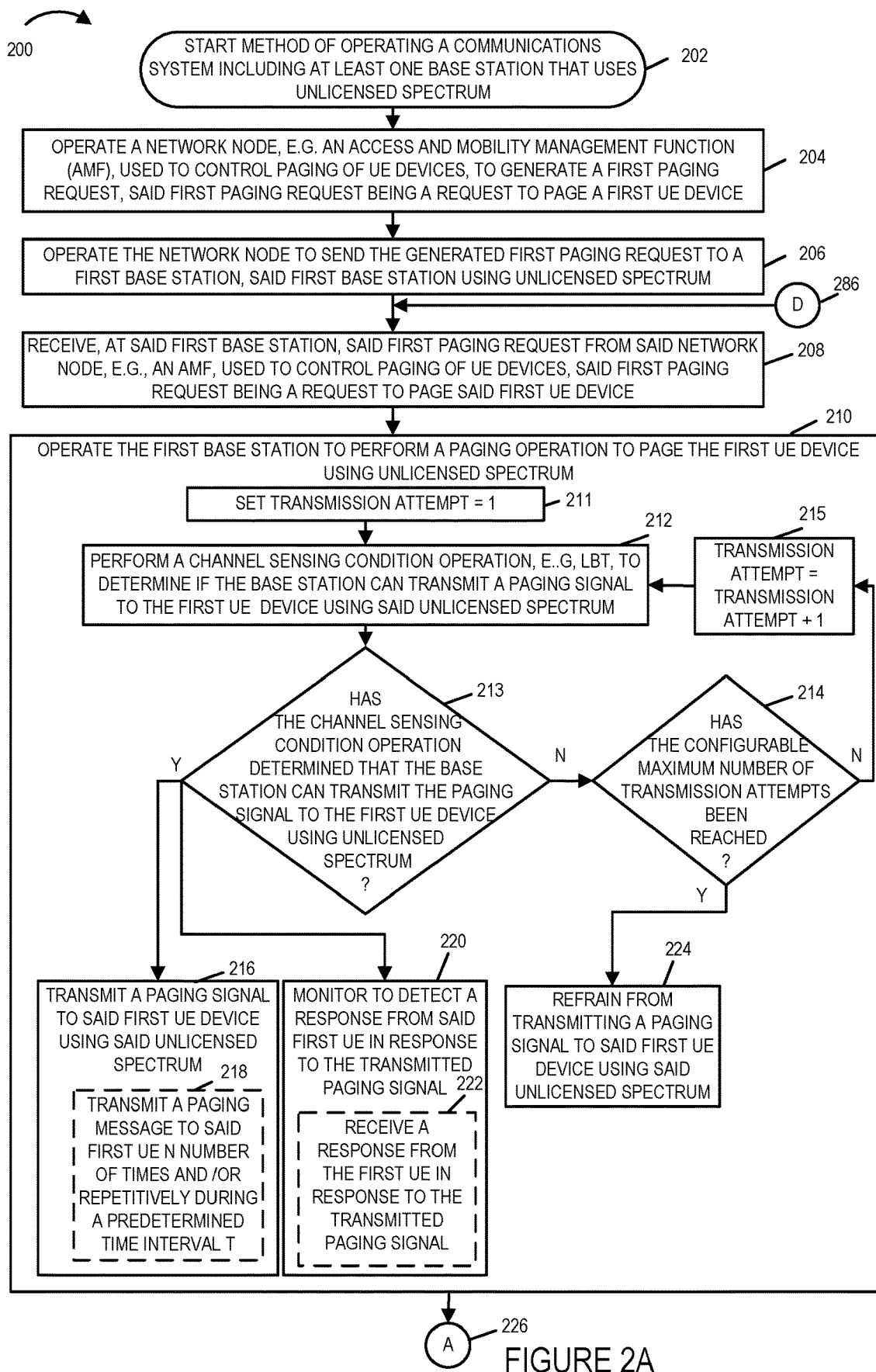
FIG. 2A is a first part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.
Figure 2B:
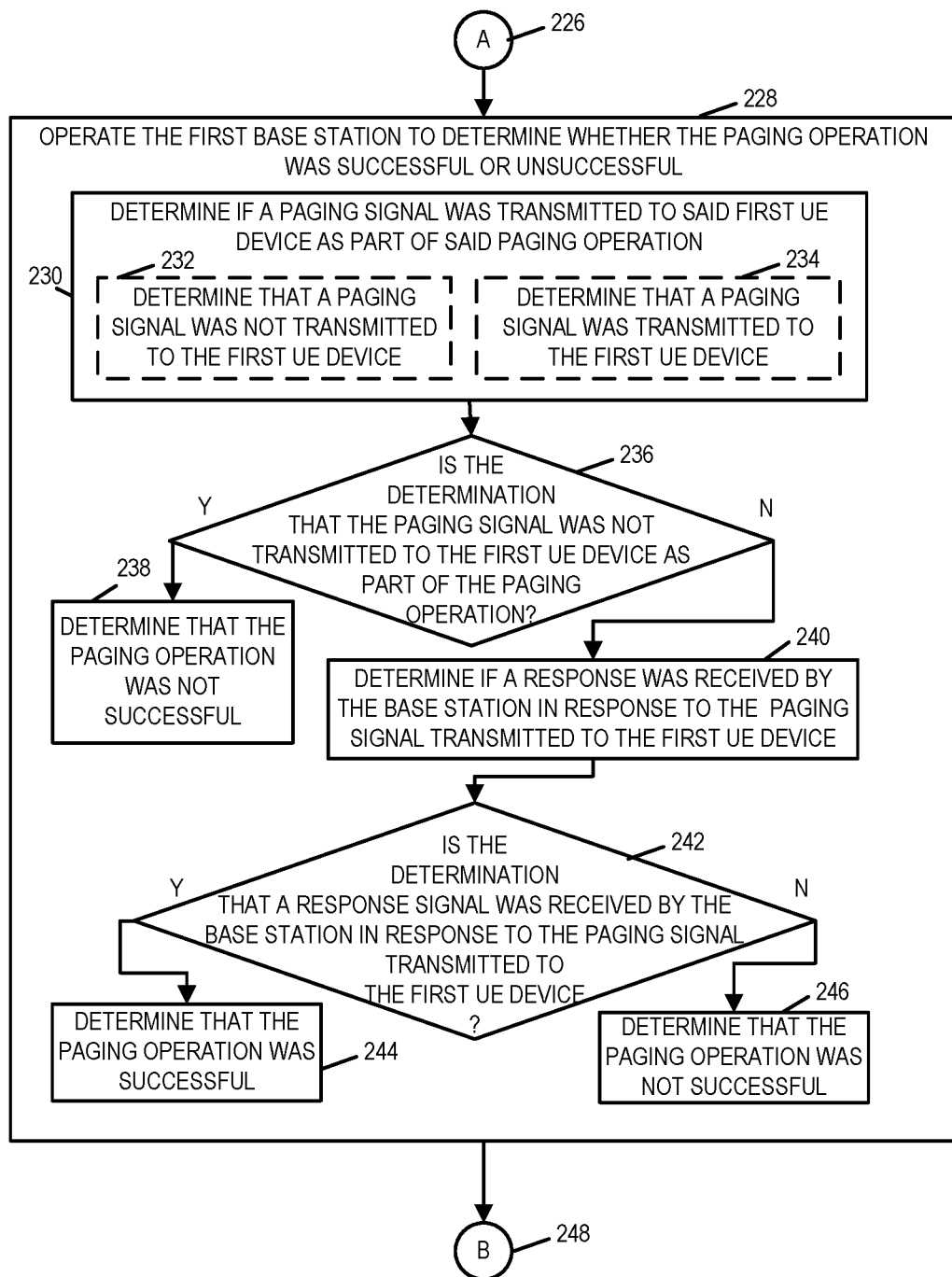
FIG. 2B is a second part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.
Figure 2C:
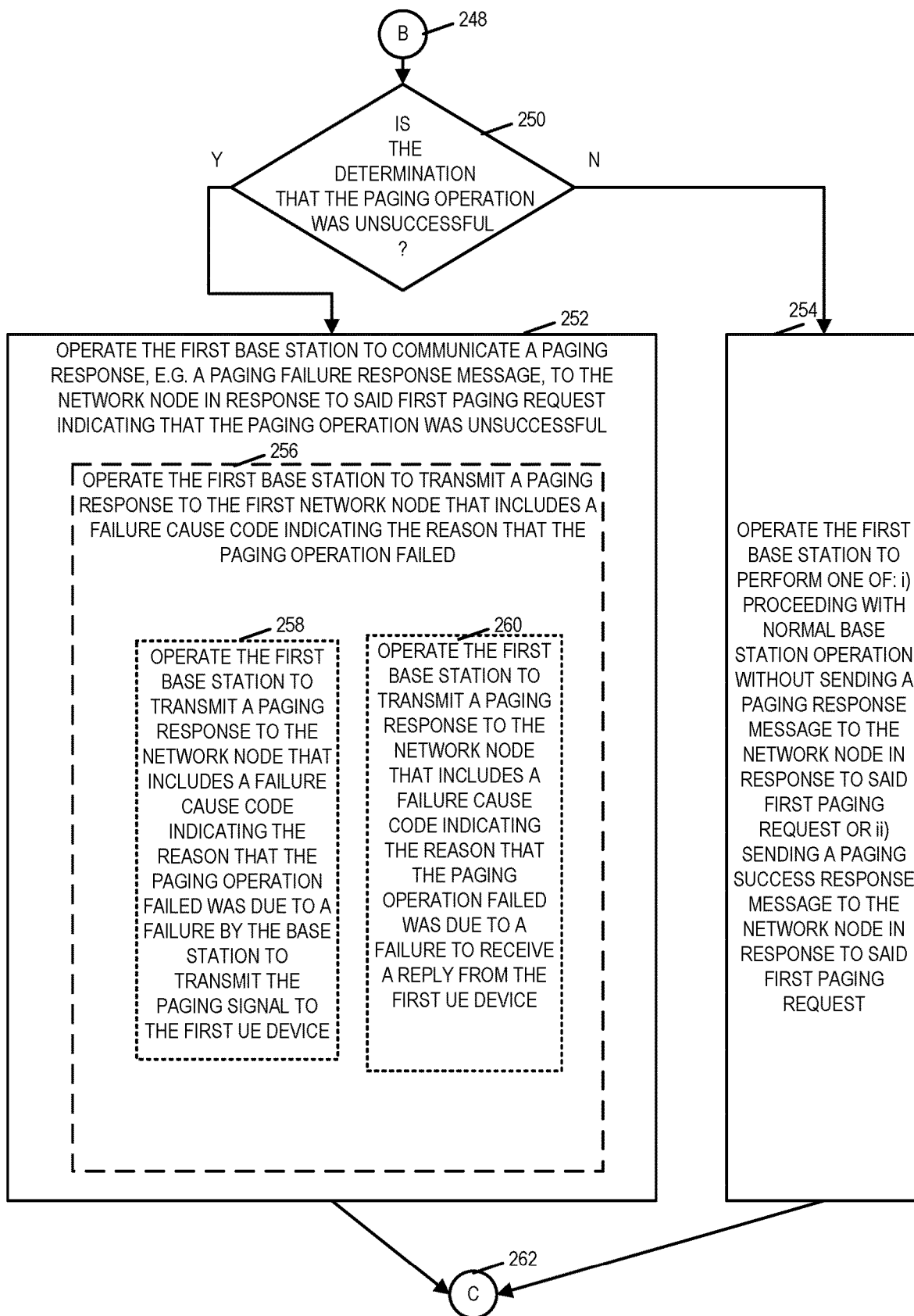
FIG. 2C is a third part of a flowchart of an exemplary method of operating a communications system including at least one base station, e.g., a gNB or ng-eNB, that uses at least some unlicensed spectrum and transmits paging signals in the unlicensed spectrum, in accordance with an exemplary embodiment.

FIG. 2, comprising the combination of FIG. 2A, FIG. 2B, FIG. 2C and FIG. 2D, is a flowchart 200 of an exemplary method of operating a communications system including at least one base station, e.g., a gNB or ng-eNB, that uses unlicensed spectrum in accordance with an exemplary embodiment. Operation starts in step 202, in which the communications system is powered on and initialized, and proceeds to step 204.

In step 204 a network node, e.g., an access and mobility management function (AMF), used to control paging of user equipment (UE) devices, generates a first paging request, said first paging request being a request to page a first UE device. Operation proceeds from step 204 to step 206. In step 206 the network node sends the generated first paging request to a first base station, e.g., a gNB or an ng-eNB, said first base station using unlicensed spectrum. Operation proceeds from step 206 to step 208.

In step 208, the first base station receives said first paging request from said network node, e.g., an AMF, used to control paging of UE devices, said first paging request being a request to page said first UE device. In some embodiments, the first paging request is a class 1 N2-AP Paging_U message. Operation proceeds from step 208 to step 210.

In step 210 the first base station performs a paging operation to page the first UE device using unlicensed spectrum. Step 210 includes steps 211, 212, 213, 214, 215, 216, 220 and 224.

In step 211, the first base station sets the value of the variable transmission attempt to 1. Operation proceeds from step 211 to step 212. In step 212 the first base station performs a channel sensing condition operation, e.g., a listen before talk (LBT) operation, to determine if the first base station can transmit a paging signal to the first UE device using said unlicensed spectrum. Operation proceeds from step 212 to step 213. In step 213, if the channel sensing condition operation has determined that the first base station can transmit the paging signal to the first UE device using the unlicensed spectrum, then operation proceeds from step 213 to step 216 and step 220. In step 216 the first base station transmits a paging signal to said first UE device using said unlicensed spectrum. In some embodiments, step 216 includes step 218, in which the first base station transmits a paging message to said first UE device N number of time and/or repetitively during a predetermined time interval T. In step 220 the first base station monitors to detect a response from said first UE device in response to the transmitted paging signal of step 216. Step 220 may, and sometimes does, include step 222, in which the first base station receives a response from the first UE device in response to the transmitted paging signal of step 216.

Alternatively, in step 213, if the channel sensing condition operation has determined that the first base station can not transmit the paging signal to the first UE device using the unlicensed spectrum, then operation proceeds from step 213 to step 214, in which the first base station determines if the configurable maximum number of transmission attempts has been reached. For example, the configurable maximum number of transmission attempts has been previously configured, e.g., set, to a predetermined integer, e.g., three. In step 214, the first base station compares the current value of the variable transmission attempt to the maximum number of transmission attempts, and controls operation as a function of the determination. If the current value of the transmission attempt does not equal the maximum number of transmission attempts, then operation proceeds from step 214 to step 215, in which the first base station increments the current value of the variable transmission attempt. Operation proceeds from step 215 to step 212, in which another iteration of the channel sensing condition operation, e.g., another iteration of LBT, is performed. Alternatively, in step 214, if the current value of the transmission attempt equals the maximum number of transmission attempts, then operation proceeds from step 214 to step 224. In step 224, the first base station is controlled to refrain from transmitting a paging signal to said first UE device using said unlicensed spectrum.

Operation proceeds from step 210, via connecting node A 226, to step 228, in which the first base station determines whether the paging operation was successful or unsuccessful. Step 228 includes steps 230, 236, 238, 240, 242, 244, and 246. In step 230 the first base station determines if a paging signal was transmitted to said first UE device as part of the paging operation. During some iterations of step 230, the first base station determines in step 232 that a paging signal was not transmitted to said first UE device as part of said paging operation. During some iterations of step 230, the first base station determines in step 234, that a paging signal was transmitted to said first UE device as part of said paging operation. Operation proceeds from step 230 to step 236. In step 236, if the determination is that the paging signal was not transmitted to the first UE device as part of the paging operation, then operation proceeds from step 236 to step 238 in which the first base station determines that the paging operation was not successful. However, in step 236 if the determination is that the paging signal was transmitted to the first UE device as part of the paging operation, then, operation proceeds from step 236 to step 240, in which the first base station determines if a response was received by the first base station in response to the paging signal transmitted to the first UE device. Operation proceeds from step 240 to step 242. In step 242, if the determination is that a response signal was received by the first base station in response to the paging signal transmitted to the first UE device, then operation proceeds from step 242 to step 244, in which the first base station determines that the paging operation was successful. However, in step 242, if the determination is that a response signal was not received by the first base station in response to the paging signal transmitted to the first UE device, then operation proceeds from step 242 to step 246, in which the first base station determines that the paging operation was not successful.

Operation proceeds from step 228, via connecting node B 248, to step 250. In step 250, if the determination is that the paging operation was unsuccessful, then operation proceeds from step 250 to step 252. In step 250, if the determination is that the paging operation was successful then operation proceeds from step 250 to step 254.

In step 252 the first base station communicates a paging response, e.g., a paging failure response message, to the network node in response to the first paging request, said paging response indicating that the paging operation was unsuccessful. In some embodiments, step 252 includes step 256.

In step 256 the first base station transmits a paging response, e.g., a paging response signal, to the first network node that includes a failure cause code indicating the reason that the paging operation failed. In some embodiments, the paging response signal is a N2-AP:PAGING_U RESPONSE message including a failure cause code. In some embodiments, step 256 includes step 258 and 260, and one of steps 258 and 260 is performed during an iteration of step 256.

In step 258 the first base station transmits a paging response to the first network node that includes a failure cause code indicating the reason that the paging operation failed was due to a failure by the first base station to transmit the paging signal to the first UE device, e.g., in response to step 238 determining that the paging operation was not successful. In step 260 the first base station transmits a paging response to the first network node that includes a failure cause code indicating the reason that the paging operation failed was due to a failure to receive a reply from the first UE device, e.g., in response to step 246 determining that the paging operation was not successful.

Returning to step 254, in step 254 the first base station performs one of: i) proceeding with normal operation without sending a paging response message to the network node in response to the said first paging request or ii) sending a paging success response message to the network node in response to the first paging request.

Operation proceeds from step 252, via connecting node C 262, to step 264. In some embodiments, e.g. an embodiment in which the first base station may, and sometimes does, send paging response success messages, operation proceed from step 254, via connecting node C 262, to step 264. In step 264 the network node monitors for a paging response message, e.g., a paging failure response message or a paging success response message, from the first base station, which was sent in response to the first paging request message. Step 264 may, and sometimes does, include step 266, in which the network node receives a paging response message. Operation proceeds from step 266 to step 268.

In step 268, the network node determines if the paging response message is a paging failure response message or a paging success response message. If the paging response message is a paging success response message, then operation proceeds from step 268 to step 272, in which the network node determines that the paging of the first UE device has been successful. However, if the paging response message is a paging failure response message, then operation proceeds from step 268, to step 270, in which the network node implements a paging escalation strategy as a function of the failure cause code in the received paging response message. Step 270 includes steps 274, 276, 278, 280 and 284. In step 274, if the communicated failure cause code indicates that the paging signal was transmitted but no response was received, then operation proceeds from step 274 to step 276; otherwise, operation proceeds from step 274 to step 278.

In step 276, the network node determines to change the paging area of the first UE device. Operation proceeds from step 276 to step 280, in which the network node sends a paging request message to a second base station requesting the second base station to page the first UE device. In various embodiments, the area covered by the second base station is one of: partially non-overlapping with the area covered by the first base station or ii) fully non-overlapping with the area covered by the first base station.

In step 278 the network node determines if the communicated failure cause code indicates that the first base station was unable to transmit an intended paging signal because of non-availability of unlicensed spectrum (non-availability of unlicensed carrier, e.g., the LBT did not clear), and the attempted failed paging attempt was an initial attempt of paging corresponding to the first paging request, e.g., a first attempt to page the first UE in unlicensed spectrum intended to be used by the first base station. If the determination is that the first base station was unable to transmit an intended paging signal to the first UE because of non-availability of unlicensed spectrum, and the attempted failed paging attempt was an initial attempt of paging corresponding to the first paging request, then operation proceeds from step 278 to step 284, in which the network node re-sends the first paging request to the first base station. Operation proceeds from step 284, via connecting node D 286, to step 208, in which the first base station receives the first paging request.

If the determination of step 278 is that the first base station was unable to transmit an intended paging signal because of non-availability of unlicensed spectrum, but the attempted failed paging attempt was not an initial attempt of paging corresponding to the first paging request, then operation proceeds from step 278 to step 276, in which the network node determines to change the first paging area of the first UE device. Operation proceeds from step 276 to step 280, in the network node sends a paging request to a second base station requesting the second base station to page the first UE device.

In some other embodiments, different approaches are used for expanding the paging coverage area based on received failure fault codes. For example in one embodiment, if the network node receives a failure fault code from a first base station indicating that the first base station successfully transmitted the paging request to the first UE but the first UE did not respond, then the network node refrains from sending additional paging requests to the first base station to page the first UE, but sends a paging request to a different base station. e.g., a second base station, requesting the second base station to page the first UE. However, if the network node receives a failure fault code from the first base station indicating that the first base station was unable to transmit the page because the unlicensed spectrum was unavailable (e.g., LBT did not clear), then the network node sends a paging request to both the first base station and the second base station requesting that the first UE be paged.

Figure 3:
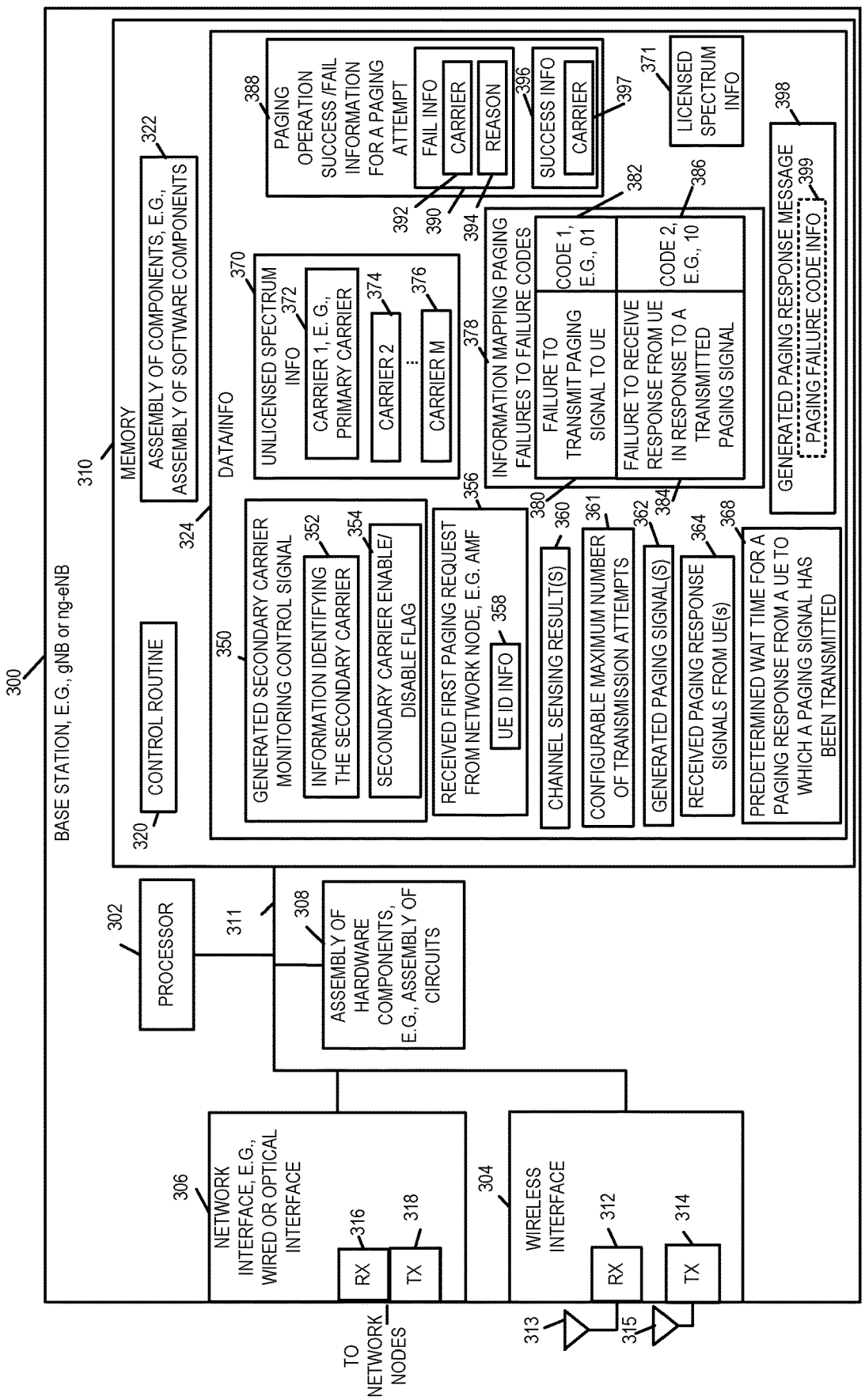
FIG. 3 is a drawing of an exemplary base station, e.g., a gNB or ng-eNB, in accordance with an exemplary embodiment.

FIG. 3 is a drawing of an exemplary base station 300, e.g., a gNB or ng-eNB, in accordance with an exemplary embodiment. In some embodiments, exemplary base station 300 of FIG. 3 implements steps of the exemplary method of flowchart 200 of FIG. 2. Base station 300 is, e.g., any of base stations (base station 1 104, base station 2 106, . . . , base station n 108) of FIG. 1 or any of the base stations (504, 506, 508, 510, 512, 514) of FIG. 5.

Base station 300 includes a processor 302, e.g., a CPU, wireless interface 304, a network interface 306, e.g., a wired or optical interface, an assembly of hardware components 308, e.g., an assembly of circuits, and memory 310 coupled together via a bus 311 over which the various elements may interchange data and information.

Network interface 306 includes a receiver 316 and a transmitter 318. Network interface 306 to coupled to network nodes, e.g., via a backhaul network and/or the Internet. Wireless interface 304 includes a wireless receiver 312 and a wireless transmitter 314. The base station 300 receives signals from network devices, e.g., an AMF, via network receiver 316. An exemplary received signal, which is received via receiver 316, is a first paging request signal, which was sent from a network node, e.g., an AMF, to control paging of UE devices, said first paging request being a request to page a first UE device, e.g., a request to page a first UE device using unlicensed spectrum. An exemplary signal transmitted via transmitter 318 is a paging response signal, e.g., a paging response failure message including a failure code cause indicator, or a paging success response message, said paging response signal being sent to a network node, e.g., an AMF, in response to a previously received paging request.

Wireless receiver 312 is coupled to a receive antenna 313 via which the base station 300 can receive wireless signals, e.g., wireless signals from UE devices. Wireless transmitter 314 is coupled to a transmit antenna 315 via which the base station 300 can transmit wireless signals to UE devices. Exemplary transmitted wireless signals include a unicast paging signal to a first UE device and a multicast or broadcast secondary carrier monitoring control signal to UE devices, said UE devices including said first UE device. Exemplary received wireless signals include a paging response signal from the first UE device.

Memory 310 includes a control routine 320, e.g., for controlling basic functions of the base station, an assembly of components 322, e.g., an assembly of software components, and data/information 324. Data/information 324 includes generated secondary carrier monitoring control signal 350 including information 352 identifying the secondary carrier, e.g., a secondary unlicensed spectrum carrier, and a secondary carrier enable/disable flag 354, e.g., a bit field in the message communicating whether the UEs should or should not monitor for paging signals using the secondary carrier. Data/information further includes unlicensed spectrum information 370 and licensed spectrum information 371. Unlicensed spectrum information 370 includes information corresponding to one or more portions of unlicensed spectrum, which may be, and sometimes are, used for transmitting paging signals to UE devices. Unlicensed spectrum information 370 includes carrier 1, e.g., a primary carrier, information, carrier 2 information 374, . . . , carrier M information 376. Data/information 324 further includes a predetermined wait time value 368 for a paging response from a UE to which a paging signal has been transmitted, which represented the time the base station 300 is to wait, e.g., after transmitting a paging signal, for a response, before declaring the paging attempt as a failure do to no response from the UE. Data/information 324 further includes information 378 mapping paging failures to failure codes. Information 378 includes a failure to transmit a paging signal to the UE 380 which maps to code 1 382, e.g., represented by bit pattern 01. Information 378 further includes a failure to receive a response from a UE to which a paging signal has been transmitted 384 which maps to code 2 386, e.g., represented by bit pattern 10.

Data/information 324 further includes a received first paging request 356 from a network node, e.g. a AMF node, channel sensing result(s) 360, configurable maximum number of transmission attempts 361, e.g., an integer value greater than or equal to one indicating the maximum number of attempts at LBT to be performed before giving up with an attempted paging signal transmission to the UE in unlicensed spectrum, generated paging signal(s) 362, received paging response signal(s) from UE(s) 364, paging operation success/failure information for a paging attempt 388, and a generated paging response message 398 to be sent to the network node which sent the first paging request. Received paging request from the network node 356 includes UE ID information 358 identifying the UE device which is to be paged by the base station. Paging operation success/fail information for a paging attempt 388 includes failure information 390 and/or success information 396. Failure information includes carrier information 392, e.g., information identifying which carrier(s) corresponded to the paging failure, and reason information 394, e.g., information identifying the reason for the paging failure on each of the carriers on which paging was attempted. Success information 395 includes carrier information 397 identifying the carrier on which the successful paging signal was transmitted. Generated paging response message 398, may, and sometimes, does include paging failure code information 399, e.g., a failure code identifying the reason for the paging failure. In some embodiments, in paging was attempted and failed on multiple carriers, the generated paging response message includes a failure code for each of the carriers on which the paging attempt failed. In some embodiments, if the paging attempt was successful the generated paging response message 398 includes information identifying the carrier used for the successful page.

Figure 4A:
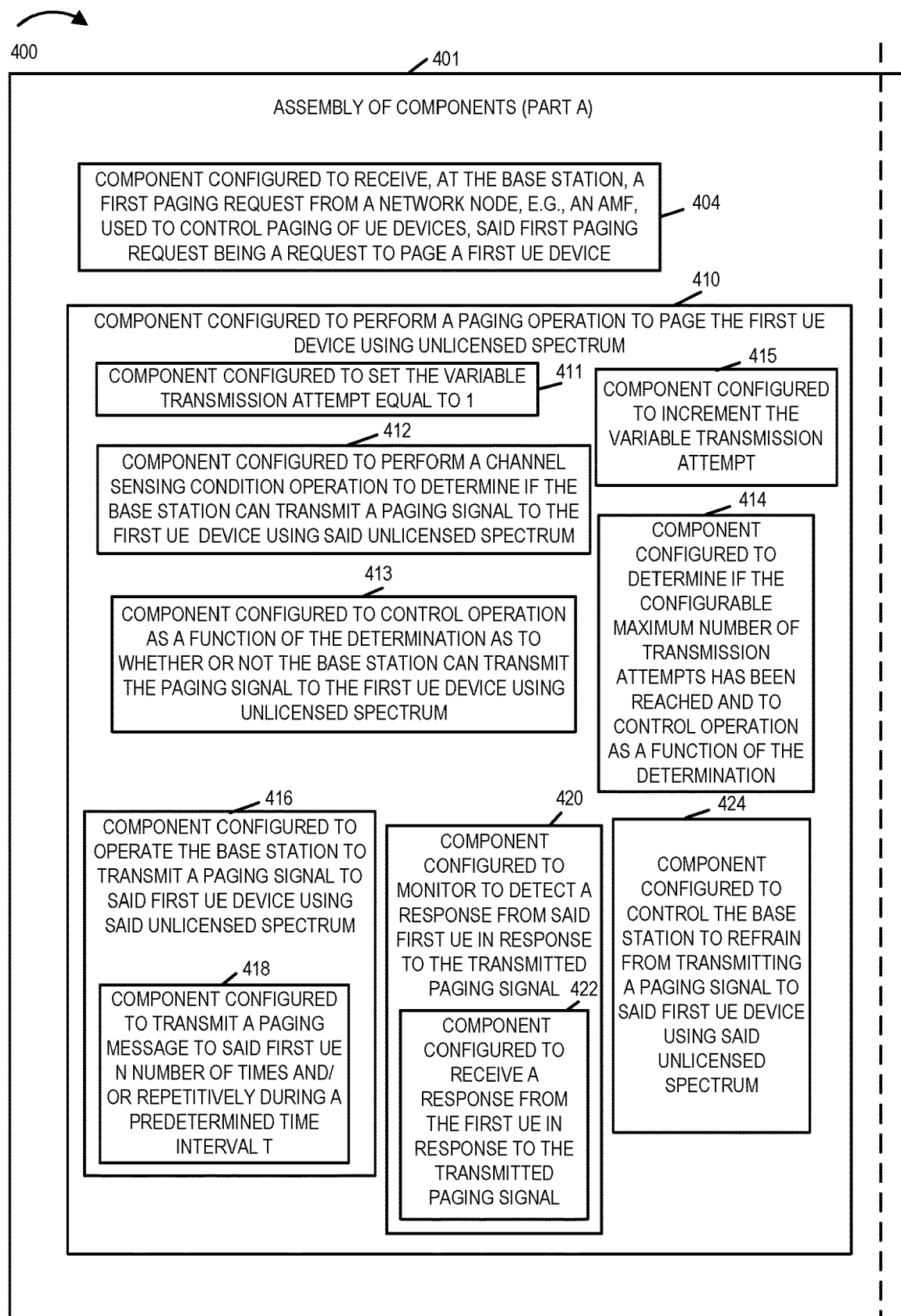
FIG. 4A is a first part of an exemplary assembly of components which may be included in a base station implemented in accordance with an exemplary embodiment.
Figure 4B:
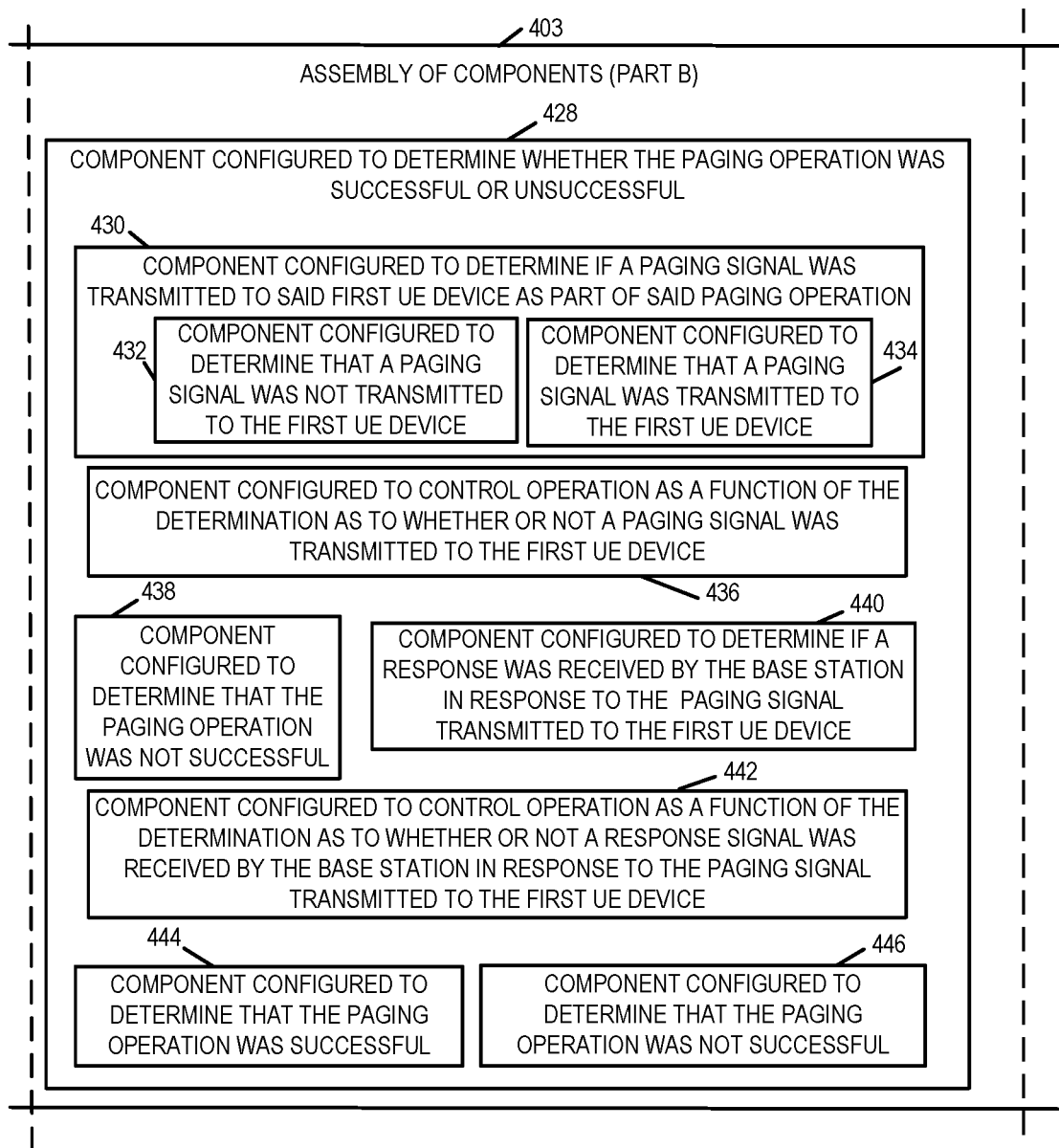
FIG. 4B is a second part of an exemplary assembly of components which may be included in a base station implemented in accordance with an exemplary embodiment.
Figures 4, 4C:
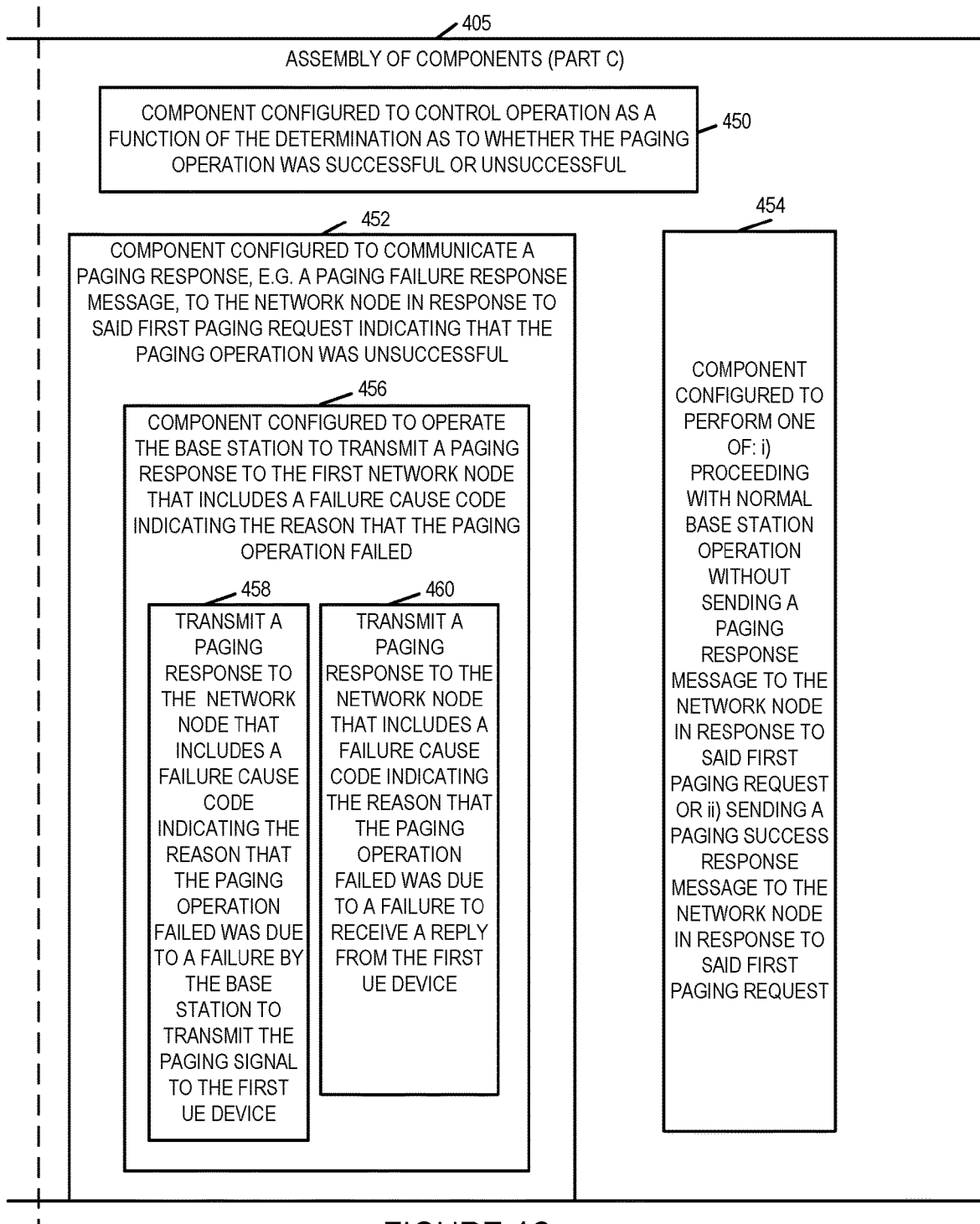
FIG. 4C is a third part of an exemplary assembly of components which may be included in a base station implemented in accordance with an exemplary embodiment.
FIG. 4 comprises the combination of FIG. 4A, FIG. 4B and FIG. 4C.

FIG. 4, comprising the combination of FIG. 4A, FIG. 4B and FIG. 4C, is a drawing of an exemplary assembly of components 400, comprising the combination of Part A 401, Part B 403 and Part C 405, in accordance with an exemplary embodiment. Exemplary assembly of components 400 which may be included in a base station, e.g., a gNB or an ng-eNB, such as the exemplary base station 300, e.g., a gNB or ng-eNB, of FIG. 3, and implement steps of an exemplary method, e.g., steps of the method of the flowchart 200 of FIG. 2.

Assembly of components 400 can be, and in some embodiments is, used in base station 300, e.g., a gNB or ng-eNB, of FIG. 3, base station 1 104 of FIG. 1, base station 2 106 of FIG. 1 and/or base station n 108 of FIG. 1. The components in the assembly of components 400 can, and in some embodiments are, implemented fully in hardware within the processor 302, e.g., as individual circuits. The components in the assembly of components 400 can, and in some embodiments are, implemented fully in hardware within the assembly of components 308, e.g., as individual circuits corresponding to the different components. In other embodiments some of the components are implemented, e.g., as circuits, within the processor 302 with other components being implemented, e.g., as circuits within assembly of components 308, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 310 of the base station 300, e.g., a gNB or ng-eNB, with the components controlling operation of the base station to implement the functions corresponding to the components when the components are executed by a processor, e.g., processor 302. In some such embodiments, the assembly of components 400 is included in the memory 310 as assembly of components 322. In still other embodiments, various components in assembly of components 400 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 400 is stored in the memory 310, the memory 310 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 4 control and/or configure the base station 300, or elements therein such as the processor 302, to perform the functions of corresponding steps illustrated and/or described in the method of one or more of the flowcharts, signaling diagrams and/or described with respect to any of the Figures. Thus the assembly of components 400 includes various components that perform functions of corresponding one or more described and/or illustrated steps of an exemplary method, e.g., steps of the method of flowchart 200 of FIG. 2 and/or described or shown with respect to any of the other figures.

Assembly of components 400 includes a component 404 configured to receive, at the base station, a first paging request form a network node, e.g., an AMF, used to control paging of UE devices, said first paging request being a request to page a first UE device, and a component 410 configured to perform a paging operation to page the first UE device using unlicensed spectrum Component 410 includes a component 411 configured to set the variable transmission attempt equal to 1; a component 412 configured to perform a channel sensing operation, e.g., a LBT operation, to determine if the base station can transmit a paging signal to the first UE device using said unlicensed spectrum, a component 413 configured to control operation as a function of the determination as to whether or not the base station can transmit the paging signal to the first UE device using the unlicensed spectrum, a component 414 configured to determine if the configurable maximum number of transmission attempts has been reached, e.g., compare the current value of the variable transmission attempt to the maximum number of transmission attempts, and to control operation as a function of the determination, a component 415 configured to increment the variable transmission attempt, a component 416 configured to operate the base station to transmit a paging signal to said first UE device using said unlicensed spectrum, when the determination is that the base station can transmit the paging signal to the first UE device using the unlicensed spectrum, a component 420 configured to monitor to detect a response from said first UE device in response to the transmitted paging signal, and a component 424 configured to control the base station to refrain from transmitting a paging signal to said first UE device using said unlicensed spectrum, when the determination is that the base station can not transmit the paging signal to the first UE device using the unlicensed spectrum, e.g. because of the channel sensing condition operation determined that the unlicensed spectrum is currently unavailable. Component 416 includes a component 418 configured to transmit a paging message to said first UE device N number of times and/or repetitively during a predetermined time interval T. Component 420 includes a component 422 configured to receive a response from the first UE device in response to the transmitted paging signal.

Assembly of components 400 further includes a component 428 configured to determine whether the paging operation was successful or unsuccessful. Component 428 includes a component 430 configured to determine if a paging signal was transmitted to the first UE device as part of said paging operation. Component 430 includes a component 432 configured to determine that a paging signal was not transmitted to the first UE device, and a component 434 configured to determine that a paging signal was transmitted to the first UE device, e.g., based on an indication that component 416 operated the base station to transmit a paging signal. Component 428 further includes a component 436 configured to control operation as a function of the determination as to whether or not a paging signal was transmitted to the first UE device, a component 438 configured to determine that the paging operation was not successful in response to a determination that a paging signal was not transmitted to the first UE device. In some embodiments, component 438 stores information indicating that the paging operation was not successful due to a failure to transmit a paging signal, e.g., due to unlicensed spectrum being currently unavailable. In some embodiments, the stored information is a failure cause code indicating the reason of the failure. Component 428 further includes a component 440 configured to determine if a response was received by the base station in response to the paging signal transmitted to the first UE device, e.g., under the control of component 416, a component 442 configured to control operation as a function of the determination as to whether or not a response signal was received by the base station in response to the paging signal transmitted to the first UE device, a component 444 configured to determine that the paging operation was successful, when the determination is that response signal was received by the base station in response to the paging signal transmitted to the first UE device, and a component 446 configured to determine that the paging operation was not successful in response to a determination that a response signal was not received by the base station in response to the paging signal transmitted, e.g. under the control of component 416, to the first UE device. In some embodiments, component 446 stores information indicating that the paging operation was not successful due to a failure to receive a paging response signal, e.g., the paging signal directed to the first UE device was transmitted by the base station, but the base station did not receive a response signal, e.g., because the first UE was not in the coverage area of the base station or the UE was powered off. In some embodiments, the stored information is a failure cause code indicating the reason of the paging operation failure is that the base station did not receive a paging response signal in response to a transmitted paging signal.

Assembly of components 400 further includes a component 450 configured to control operation as a function of the determination as to whether the paging operation was successful or unsuccessful, a component 452 configured to communicate a paging response, e.g., a paging response failure message, to the network node in response to said first paging request indicating that the paging operation was unsuccessful, in response to the base station determining that the paging operation was unsuccessful, and a component 454 configured to perform one of the following, in response to determining that the paging operation was unsuccessful, i) proceeding with normal base station operation without sending a paging response message to the network node in response to the first paging request or ii) sending a paging success response message to the network node in response to said first paging request.

Component 452 includes a component 456 configured to operate the base station to transmit a paging response to the first network node that includes a failure cause code indicating the reason that the paging operation failed.

Component 456 includes a component 458 configured to operate the base station, e.g., operate a transmitter in the base station, to transmit a paging response to the network node that includes a failure cause code indicating the reason that the paging operation failed was due to a failure by the base station to transmit the paging signal to the first UE device and a component 460 configured to operate the base station, e.g., operate a transmitter in the base station, to transmit a paging response to the network node that includes a failure cause code indicating the reason that the paging operation failed was due to a failure to receive a reply for the first UE device.

Figure 5:
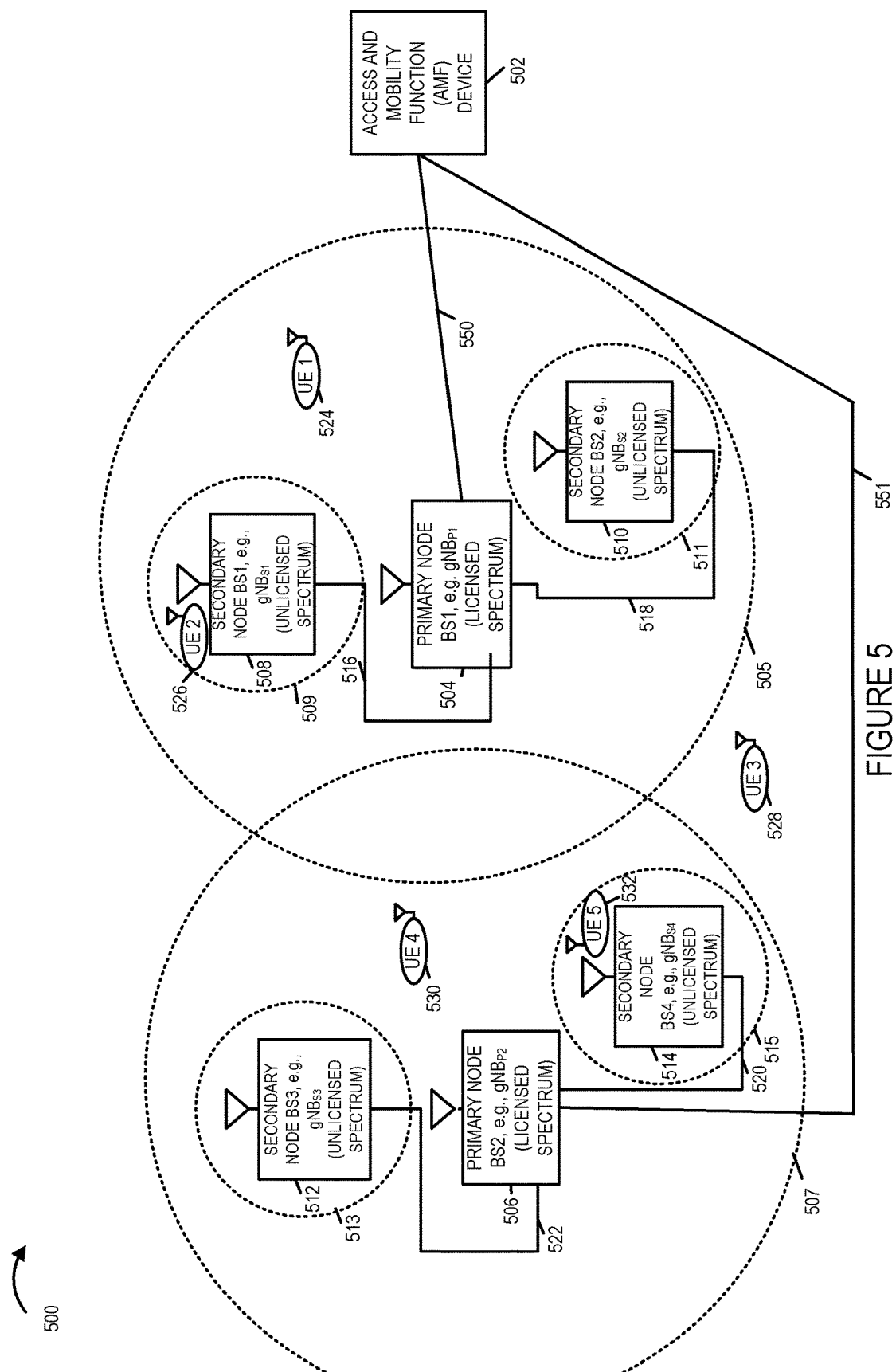
FIG. 5 is a drawing of an exemplary communications system using licensed and unlicensed spectrum in accordance with an exemplary embodiment.

FIG. 5 is a drawing of an exemplary communications system 500 using licensed and unlicensed spectrum in accordance with an exemplary embodiment. Communications system 500 includes an access and mobility function (AMF) device 502, primary node (PN) base station (BS) 1 504, e.g., gNBP1, primary node (PN) base station (BS) 2 506, e.g., gNBP2, secondary node (SN) base station (BS) 1 508, e.g., gNBS1, secondary node (SN) base station (BS) 2 510, e.g., gNBS2, secondary node (SN) base station (BS) 3 512, e.g., gNBS3, and secondary node (SN) base station (BS) 4 514, e.g., gNBS4, which are coupled together as shown in FIG. 5. Each base station (504, 506, 508, 510, 512, 514) has a corresponding wireless coverage area (505, 507, 509, 511, 513, 515). In this example, the PN base stations (504, 506) use licensed spectrum and a primary carrier, while the SN base stations (508, 510, 512, 514) use unlicensed spectrum and one or more secondary carriers. In this example, the SN base stations (508, 510, 512, 514) have been strategically deployed to fill in coverage gaps in the PN base stations (504, 506) coverage areas (505, 507), respectively. In some embodiments, the PN base stations (504, 506), may and sometimes do, use unlicensed spectrum.

AMF device 502 is coupled to PN BS 1 504 via communications link 550. AMF device 502 is coupled to PN BS 2 506 via communications link 551. PN BS 1 504 is coupled to SN BS 1 508 via communications link 516. PN BS 1 504 is coupled to SN BS 2 510 via communications link 518. PN BS 2 506 is coupled to SN BS 3 512 via communications link 522. PN BS 2 506 is coupled to SN BS 4 514 via communications link 520.

Exemplary communications system 500 further includes a plurality of user equipment (UE) devices (UE 1 524, UE 2 526, UE 3 528, UE 4 530, UE 5 532), which may move through the communications system. In FIG. 5, UE 1 524 is shown to be within an area which can be reached by a paging signal from PN BS 1 504; UE 2 526 is shown to be within an area which can be reached by a paging signal from SN BS 1 508; UE 3 528 is shown to be within an area which cannot be reached by a paging signal; UE 4 530 is shown to be within an area which can be reached by a paging signal from PN BS 2 506; and UE 5 532 is shown to be within an area which can be reached by a paging signal from SN BS 4 514.

Figure 6:
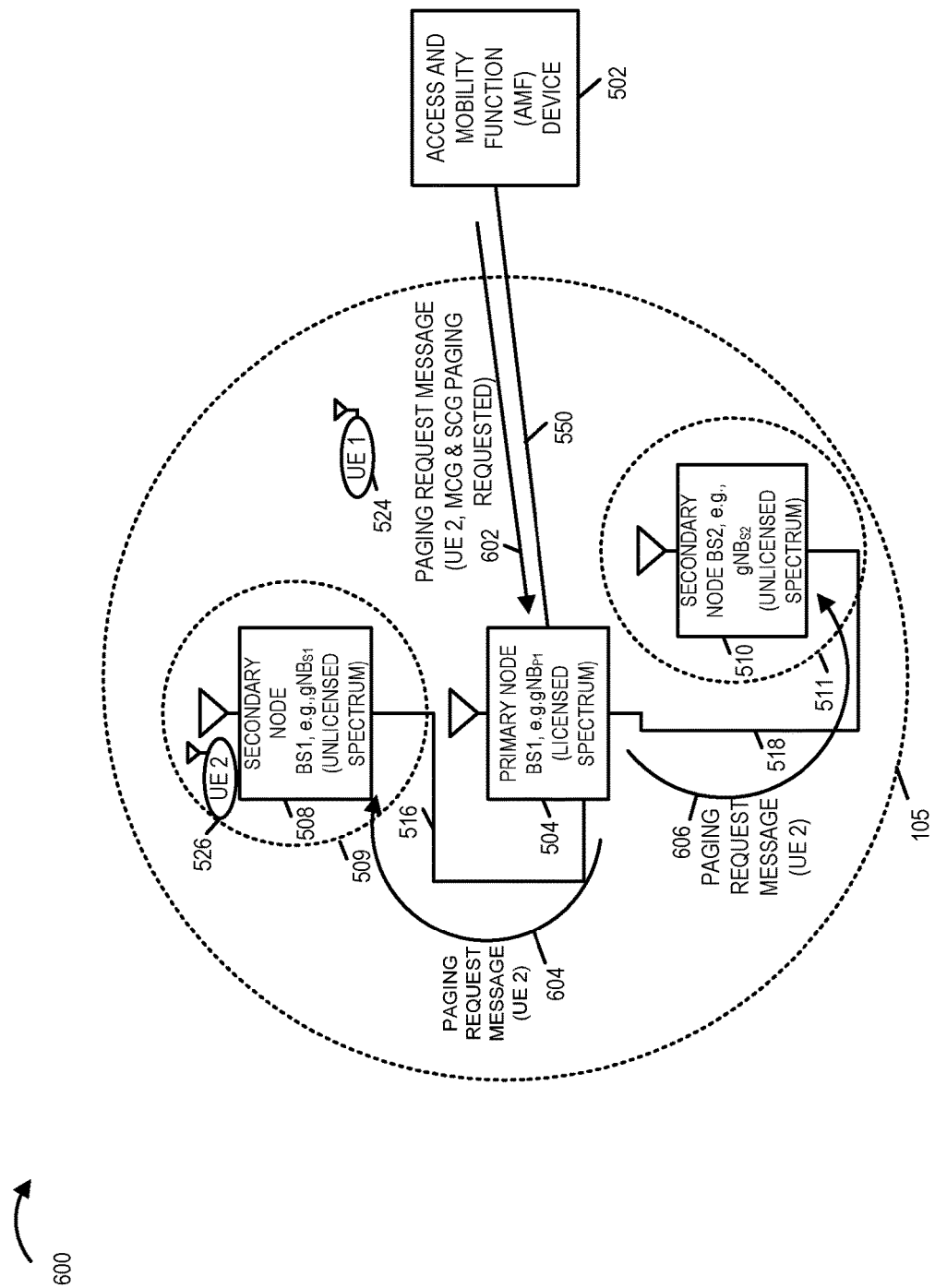
FIG. 6 illustrates an exemplary paging request for paging a user equipment (UE) device being communicated from an access and mobility function (AMF) to a primary node (PN) base station (e.g. a macro base station) and exemplary paging requests for paging the UE being communicated from the PN base station to secondary node (SN) base stations (e.g. a small cell base station) in accordance with an exemplary embodiment; and SN base station(s) are assumed to be under the coverage of a PN base station.
Figure 7:
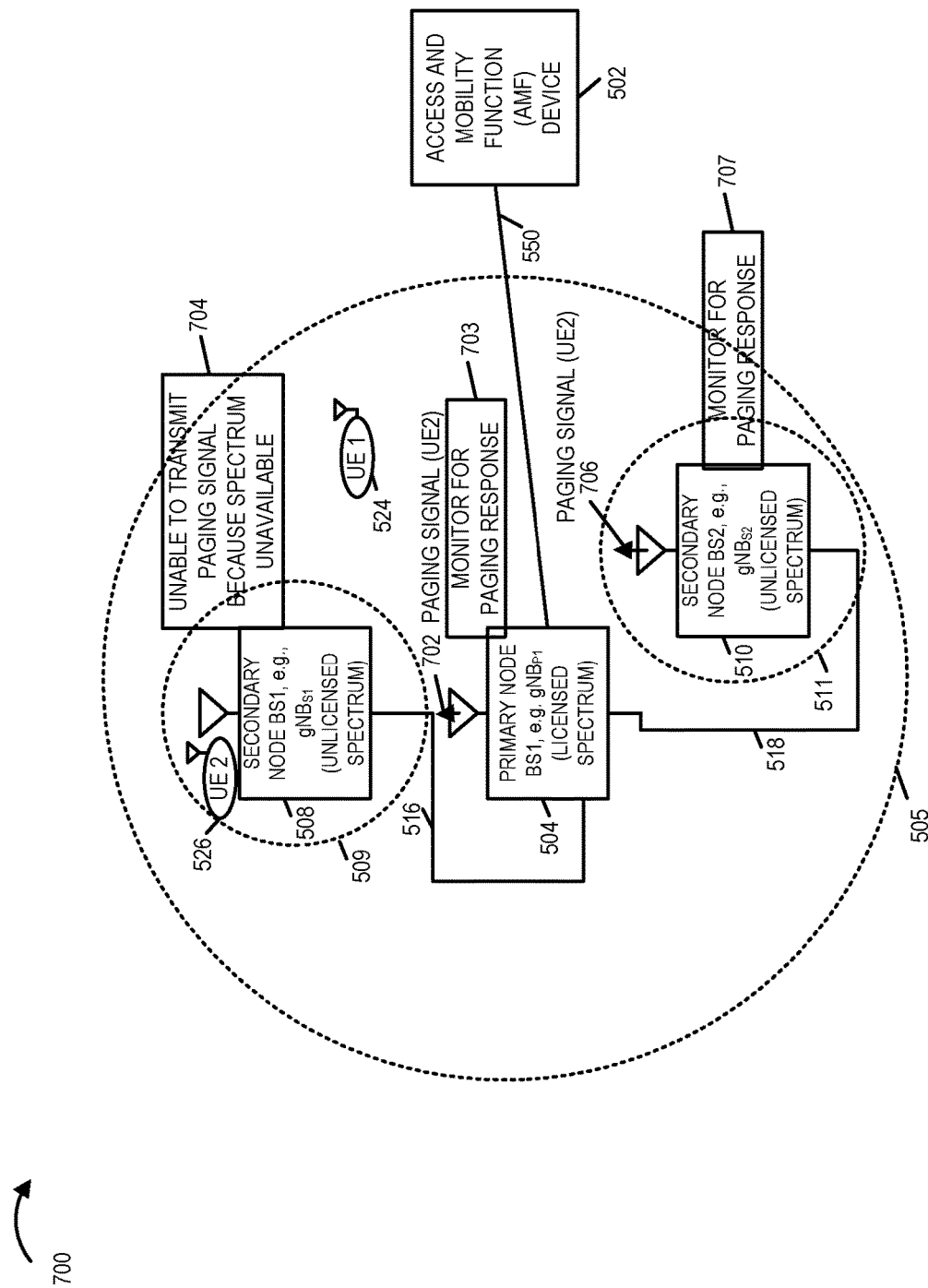
FIG. 7 illustrates exemplary paging attempts of the UE being performed at base stations concurrently using licensed and unlicensed spectrum.
Figure 8:
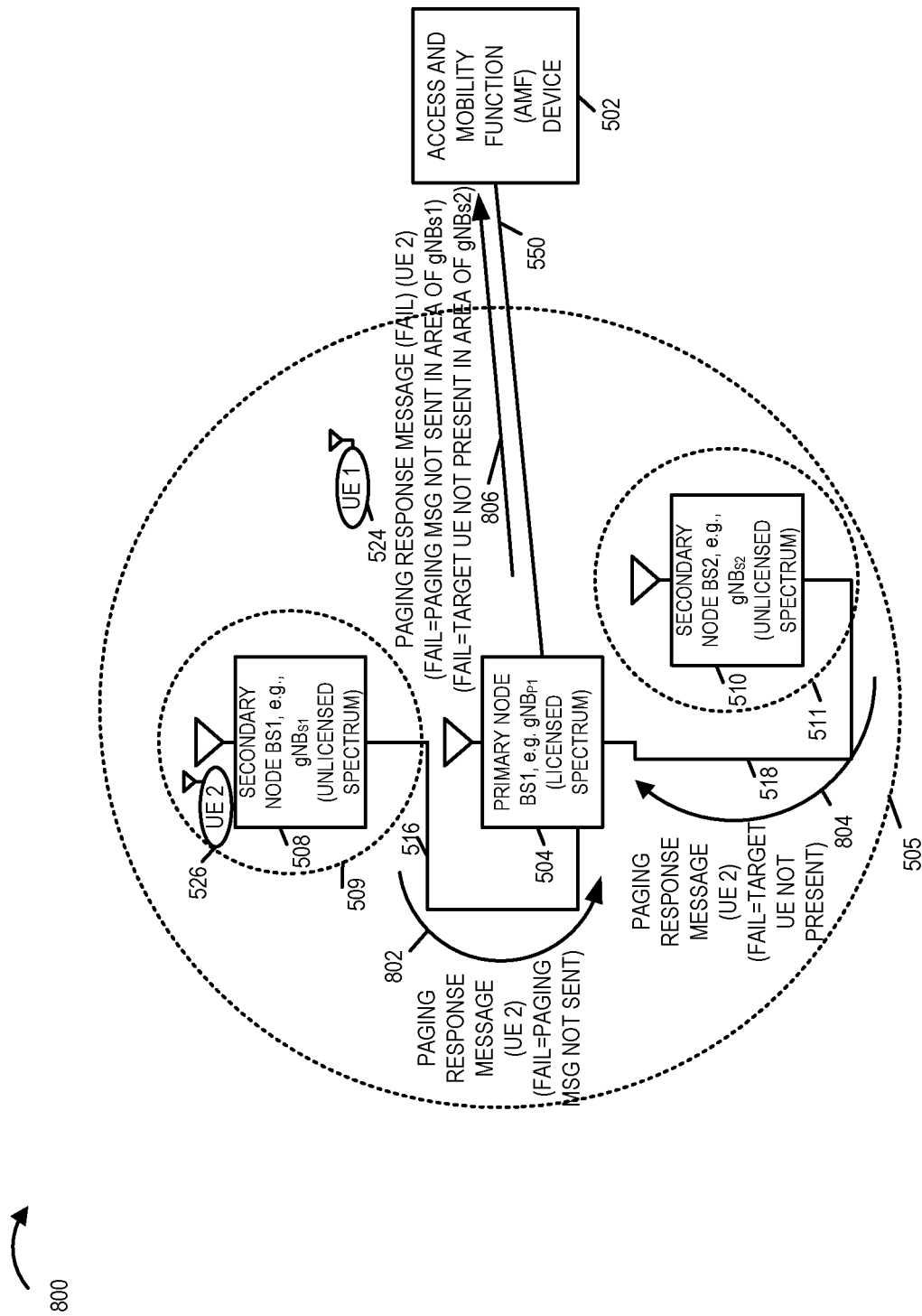
FIG. 8 illustrates exemplary paging response messages including fault code information being communicated from SN base stations to the PN base station, and from the PN base station to the AMF device, in accordance with an exemplary embodiment.

FIG. 6-8 illustrate an exemplary paging attempt in accordance with an exemplary embodiment corresponding to the system 500 of FIG. 5. In FIG. 6, AMF device 502 generates and sends a paging request message 602 to PN BS 1 504. The paging request message 602 includes information identifying that UE 2 is to paged, and further includes information communicating that the paging is to be performed for both the master carrier group and secondary carrier group base stations. In this example, PN BS 504 uses the master carrier which is a primary carrier using licensed spectrum, and the SN BSs 508, 510, use one or more secondary carriers using unlicensed spectrum.

PN BS 1 504 receives the paging request message 602, recovers the communicated information, determines that it is to page for UE 2 and that SN BSs 506 and 508 are also to page for UE 2, generates paging request messages 604, 606 including information identifying that UE 2 is the paging target, and sends paging request messages (604, 606) to SN BSs (508, 510), respectively, which receive the messages (604, 606) and recover the communicated information.

In drawing 700 of FIG. 7, PN BS 1 504 generates and transmits paging signal 702, which is paging UE2, using the primary carrier in licensed spectrum. PN BS 1 504 monitors for a paging response from UE 2 in response to the transmitted paging signal, as indicated by block 703. In some embodiments, the paging signal 702 may be transmitted a predetermined number of times or during a predetermined time interval, assuming no response is received.

In drawing 700 of FIG. 7, SN BS 1 508 attempts to transmit a paging signal using unlicensed spectrum. However, SN BS 1 508 is unable to transmit a paging signal to UE 2 because the unlicensed spectrum is currently unavailable, e.g., based on the results of a channel sensing operation which is performed, as indicated by block 704.

In drawing 700 of FIG. 7, SN BS 2 510 generates and transmits paging signal 706, which is paging UE2, using a secondary carrier in unlicensed spectrum. PN BS 2 504 monitors for a paging response from UE 2 in response to the transmitted paging signal, as indicated by block 707. In some embodiments, the paging signal 706 may be transmitted a predetermined number of times or during a predetermined time interval, assuming no response is received.

FIG. 8 includes drawing 800 which illustrates exemplary paging response messages (802, 804, 806) in accordance with an exemplary embodiment. SN BS 1 508 generates and sends paging response message 802 to PN BS 1 504, in response to paging request message 604. Paging response message 802 includes information communicating that the paging attempt to page UE 2 failed and the reason of the failure was that a paging message was not sent by SN BS 1 508, e.g., because the unlicensed spectrum was unavailable. SN BS 2 510 generates and sends paging response message 804 to PN BS 1 504, in response to paging request message 606. Paging response message 804 includes information communicating that the paging attempt to page UE 2 failed and the reason of the failure was that the target UE, which is UE 2, did not respond to the transmitted paging signal, i.e., the target UE was not present in the coverage area 511.

PN BS 1 504 receives the response messages (802, 804), recovers the communicated information, and generates a paging response message 806 based on the information in response messages 802, 804 and based on its own paging results for UE 2 in licensed spectrum, which also resulted in failure. Paging response message 806 includes information communicating that the paging attempt to page UE 2 failed and further includes information identifying the reason for failure in each of secondary coverage areas, which use unlicensed spectrum. Thus paging response message includes a failure code, corresponding to SN BS 1 508, indicating that a paging message was not sent in the area of SN BS 1 508 (e.g., because unlicensed spectrum was not available), and a failure code, corresponding to SN BS 2 510, indicating that the target UE, which is UE 2, was not present in the area of SN BS 2 (e.g., SN BS 2 510 transmitted a paging signal in unlicensed spectrum but received no response from UE 2).

MS BS 1 504 sends response message 806 to AMF device 502 in response to the paging request message 602. The AMF 502 receives message 806, recovers the communicated information, and uses the information to make future paging request decisions, e.g., the AMF 502 implements an efficient paging escalation strategy as a function of one or more received failure codes.

In some embodiments, a paging message is sent to the Primary node (PN) als primary gNB or ng-eNB and Secondary Nodes (SN) als secondary gNB or ng-eNB.

Some aspects and/or feature of an exemplary case 1: NR-U DC (new radio-unlicensed dual connectivity) operation will be discussed below. In some embodiment, if PN (gNB or ng-eNB) is allowed to instruct SN (gNB or ng-eNB) to page in addition to itself, then it does so. Therefore, PN and any selected SNs (by PN) will start paging the identified UE(s). This could, and sometimes does, include licensed and unlicensed carriers. In some embodiments, each SN node will attempt to re-transmit the page message N number of times and/or for T duration. Should no response be received from the UE and/or the paging message was not sent due to LBT not clearing for unlicensed carriers, involved SNs will send a novel paging response message, e.g., Xn-A:PAGING_U RESPONSE message to PN over Xn. Once PN has received Xn-AP:PAGING_U RESPONSE msg from some or all SNs, PN decides to send a paging responses message to AMF, e.g., N2-AP:PAGING_U RESPONSE to AMF, indicating appropriate cause code (UE not responding Or Message not sent due to non-availability of unlicensed channels).

The criteria for how the PN selects SNs to instruct to page is up to the particular implementation. It can, and sometimes does, depend on various things including: a) indicator from AMF as to whether paging via SN is allowed, and/or b) radio network planning data.

Some aspects and/or feature of an exemplary case 2: NR-U SA (new radio-unlicensed stand alone) operation will be discussed below. Case 2 is similar to case 1, except there is only PN; there are no SNs. Therefore no X2 signaling is required.

Figure 9:
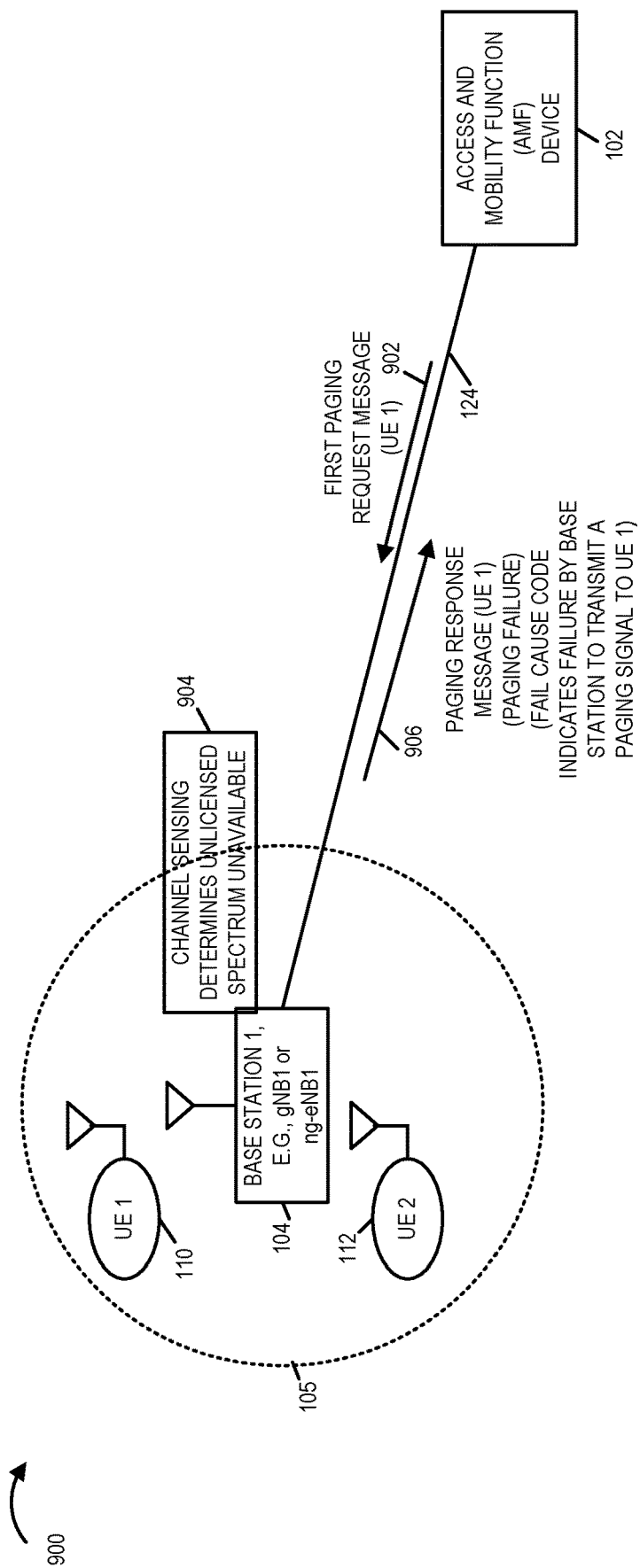
FIG. 9 illustrate an exemplary paging attempt in which the paging attempt fails due to unavailable unlicensed spectrum in accordance with an exemplary embodiment.

FIG. 9 is a drawing 900 which illustrate an exemplary paging attempt, corresponding to the system 100 of FIG. 1, in which the paging attempt fails due to unavailable unlicensed spectrum in accordance with an exemplary embodiment. AMF device 102 generates and sends first paging request message 902, which indicates that UE 1 110, is to be paged, to base station 1 104, which uses unlicensed spectrum. Base station 1 104 receives the paging request message 902 and attempts to page UE 1 110. As part of the paging attempt, BS 1 104 performs a channel sensing operation which determines that the unlicensed spectrum is unavailable for BS 104 to use at the present time, as indicated by box 904. Therefore BS 1 104 is unable to transmit a paging signal in the unlicensed spectrum to page UE 1 110. In some embodiments BS 1 104 repeats the channel sensing operation to see if the unlicensed spectrum has become available until a predetermined time interval expires, in which case the base station determines that the paging attempt is unsuccessful due to a failure by BS 1 104 to transmit a paging signal. Base station 1 104 generates and sends paging response message 906 to AMF device 102. The paging response message 906 indicates the paging attempt for UE 1 was a failure and the paging response message 906 includes a failure cause code indicating the failure is due to a failure by the base station to transmit a paging signal to UE 1. AMF device 102 receives paging response message 102 and recovers the communicated information. Thus the AMF 102 is aware the base station 104 was unable to transmit a paging signal, and may send another paging request at a later time.

Figure 10:
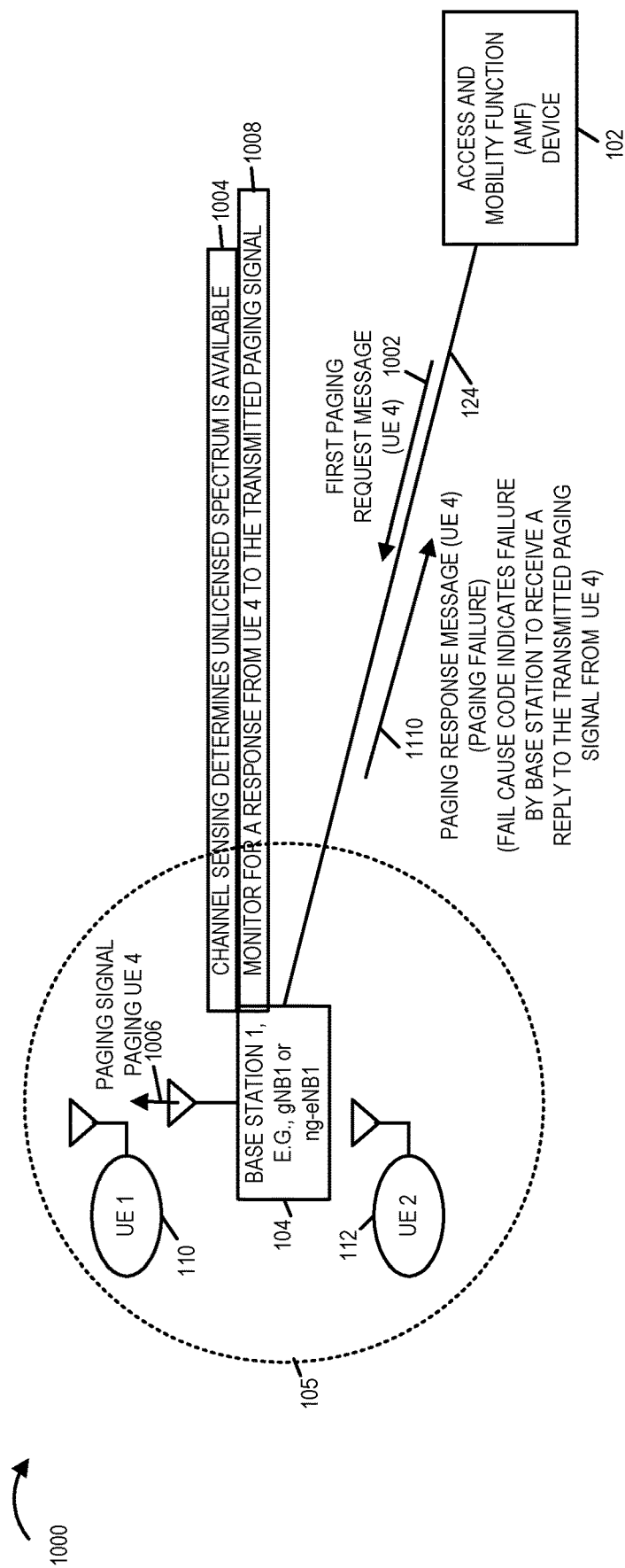
FIG. 10 illustrate an exemplary paging attempt in which the paging attempt fails due to no response from the UE device being paged in accordance with an exemplary embodiment.

FIG. 10 is a drawing 1000 which illustrate an exemplary paging attempt, corresponding to system 100 of FIG. 1, in which the paging attempt fails due to no response from the UE device being paged in accordance with an exemplary embodiment. AMF device 102 generates and sends first paging request message 1002, which indicates that UE 4 116, is to be paged, to base station 1 104, which uses unlicensed spectrum. Base station 1 104 receives the paging request message 1002 and attempts to page UE 4 116. As part of the paging attempt, BS 1 104 performs a channel sensing operation which determines that the unlicensed spectrum is available for BS 104 to use at the present time, as indicated by box 1004. Therefore BS 1 104 generates and transmits a paging signal 1006 in the unlicensed spectrum to page UE 4 116. Base station 1 104 monitors for a response from UE 4 to the transmitted paging signal 1008. In some embodiments BS 1 104 repetitively transmits the paging signal for a predetermined number of time or until a predetermined time interval expires, in which case the base station determines that the paging attempt is unsuccessful due to a failure to detect a response signal from UE 4 116. In the example of FIG. 10, UE 4 116 is not currently in the coverage area 105 of base station 1 104; therefore, UE 4 116 does not receive paging signal 1006 and does not send a response signal. Base station 1 104 generates and sends paging response message 1010 to AMF 102, in response to first paging request message 1002. Paging response message 1010 indicates that the paging attempt to page UE 4 was a failure and the paging response message 1010 includes a failure cause code indicating that the failure is a failure by the base station to receive a reply from the paging target UE, which is UE 4, to the transmitted paging signal 1006. AMF 102 receives paging response message 1108 and recovers the communicated information. The AMF 102 is now aware that the paging attempt failed due to UE 4 not being in the coverage area of BS 1 104, and the AMF can make an intelligent choice to send to a paging request for UE 4 to another area in which UE may be located since the region 105, corresponding to BS 1 104, has been eliminated.

Figure 11:
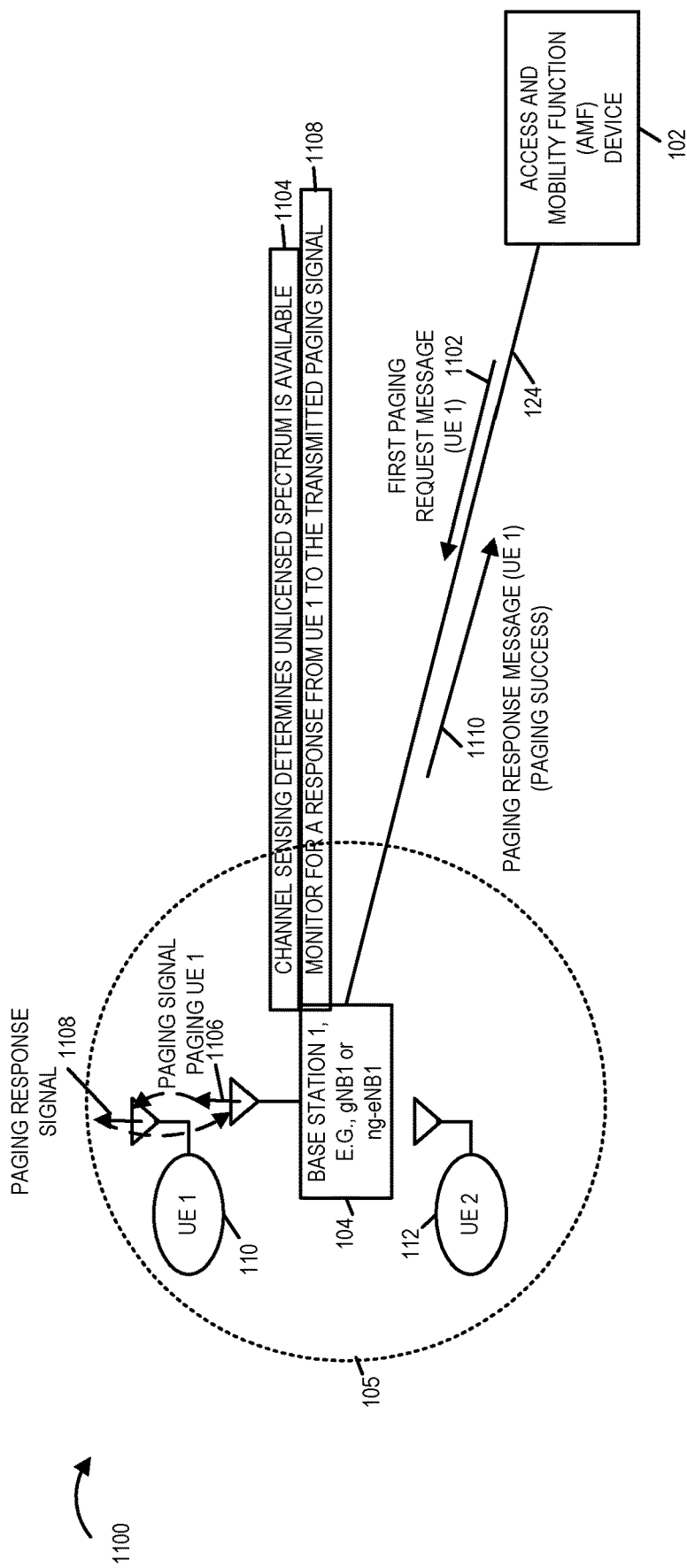
FIG. 11 illustrates an exemplary paging attempt in which the paging attempt is a success in accordance with an exemplary embodiment.

FIG. 11 is a drawing 1100 which illustrate an exemplary paging attempt, corresponding to the system 100 of FIG. 1, in which the paging attempt is a success in accordance with an exemplary embodiment. AMF device 102 generates and sends first paging request message 1102, which indicates that UE 1 110, is to be paged, to base station 1 104, which uses unlicensed spectrum. Base station 1 104 receives the paging request message 1102 and attempts to page UE 1 110. As part of the paging attempt, BS 1 104 performs a channel sensing operation which determines that the unlicensed spectrum is available for BS 104 to use at the present time, as indicated by box 1104. Therefore BS 1 104 generates and transmits a paging signal 1106 in the unlicensed spectrum to page UE 1 110. Base station 1 104 monitors for a response from UE 1 110 to the transmitted paging signal 1106. In the example of FIG. 11, UE 1 110 is currently in the coverage area 105 of base station 1 104; therefore, UE 1 110 does receive paging signal, and UE 1 110 generates and transmits paging response signal 1108 to base station 1 104. Base station 1 104 receives the paging response signal 1108. Base station 1 104 generates and sends paging response message 1110 to AMF 102, in response to first paging request message 1102. Paging response message 1110 indicates that the paging attempt to page UE 1 was a success. AMF 102 receives paging response message 1110 and recovers the communicated information.

Figure 12:
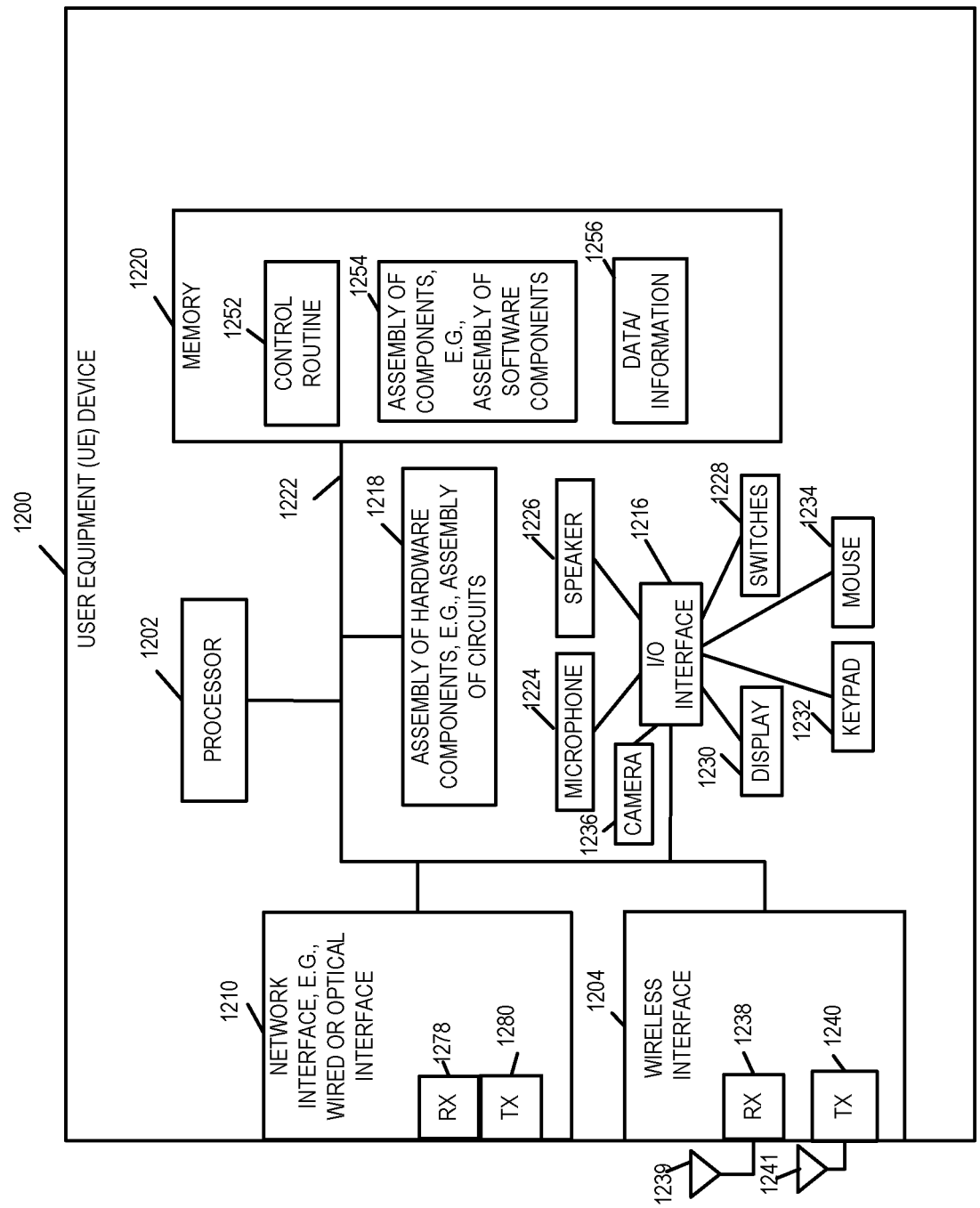
FIG. 12 is a drawing of an exemplary user equipment (UE) device implemented in accordance with an exemplary embodiment.

FIG. 12 is a drawing of an exemplary user equipment (UE) device 1200 implemented in accordance with an exemplary embodiment. UE device 1200 is, e.g. one of the UE devices (110, 112, 114, 116, 118, 120, 122) of system 100 of FIG. 1 or one of the UE devices (524, 526, 528, 530, 532) of system 500 of FIG. 5. UE device 1200 includes a processor 1202, a wireless interface 1204, a network interface 1210, an I/O interface 1216, an assembly of hardware components 1218, e.g., an assembly of circuits, and memory 1220 coupled together via a bus 1222 over which the various elements may interchange data and information. Wireless interface 1204 includes a wireless receiver 1238 coupled to receive antenna 1239, via which the UE may receive wireless signals, e.g., wireless downlink signals from a base station, e.g., a gNB. An exemplary signal received by receiver 1238 is a paging signal from a base station which was communicated over unlicensed spectrum. Wireless interface 1204 includes a wireless transmitter 1240 coupled to transmit antenna 1241, via which the UE may transmit wireless signals, e.g., wireless uplink signals to a base station, e.g., a gNB. An exemplary signal transmitted by transmitter 1240 is a paging response signal to a base station. Network interface 1210, e.g., a wired or optical interface 1210 includes a receiver 1278 and a transmitter 1280.

UE device 1200 further includes a microphone 1224, a speaker 1226, switches 1228, a mouse 1234, a keypad 1232, a display 1230 and a camera 1236 coupled to I/O interface 1216, via which the various input/output devices (1224, 1226, 1228, 1230, 1232, 1234, 1236) may communicate with the other elements (1202, 1204, 1210, 1218, 1220) of the UE device. Memory 1220 includes a control routine 1252, an assembly of components 1254, e.g., an assembly of software components, and data/information 1256.

Figure 13:
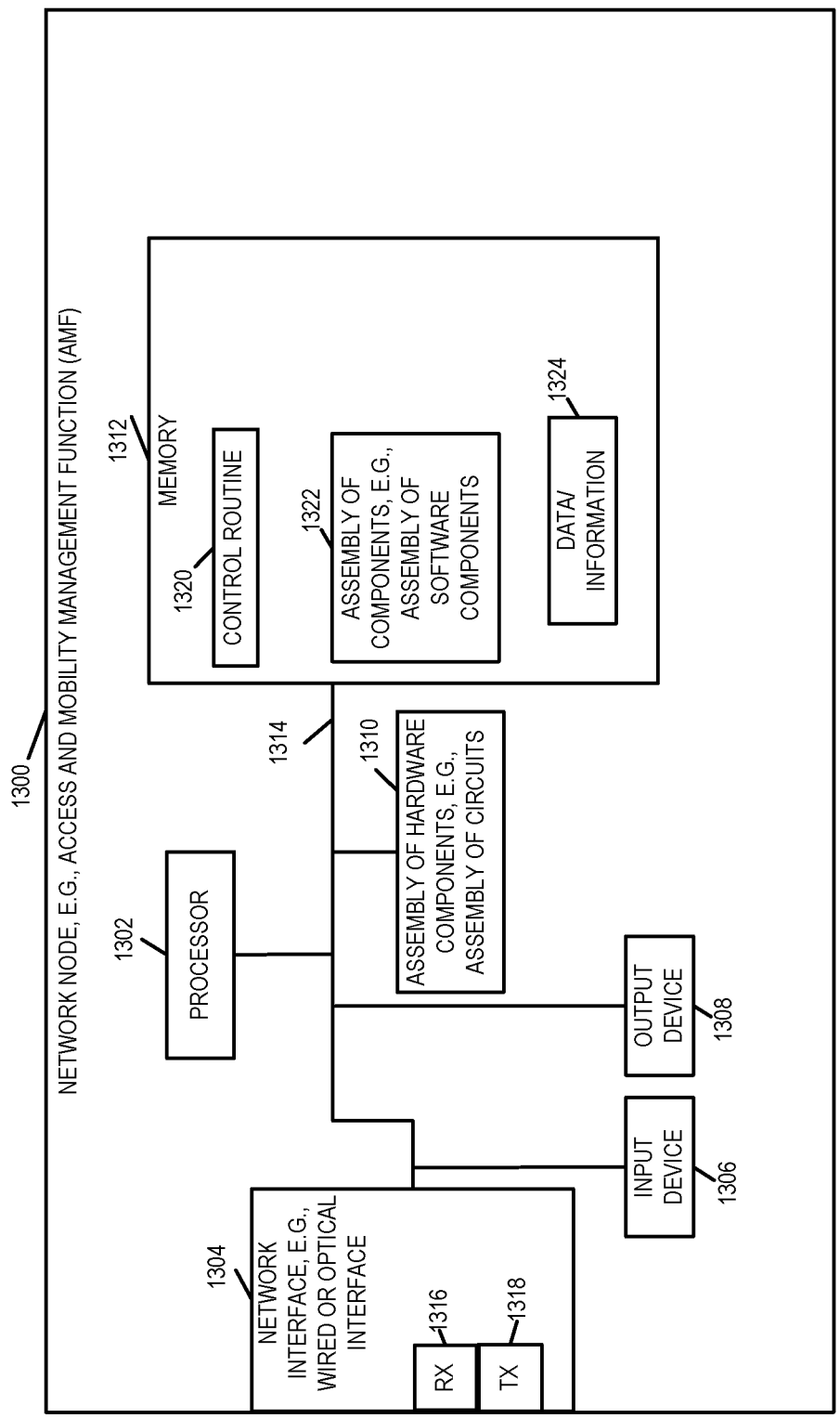
FIG. 13 is a drawing of an exemplary network node, e.g., an AMF, implemented in accordance with an exemplary embodiment.

FIG. 13 is a drawing of an exemplary network node 1300, e.g., an AMF, implemented in accordance with an exemplary embodiment. Exemplary network node 1300 is, e.g., AMF device 102 of system 100 of FIG. 1 or AMF device 502 of system 500 of FIG. 5. Network node 1300 includes a processor 1302, e.g., a CPU, a network interface 1304, an input device 1306, e.g., a keyboard, an output device 1308, e.g., a display, an assembly of hardware components 1310, e.g., an assembly of circuits, and memory 1312 coupled together via a bus 1314 over which the various elements may interchange data and information. Network interface 1304, e.g., a wired or optical interface, includes a receiver 1316 and a transmitter 1318, via which network node 00 may communicate with other devices, e.g., a base station, another core network element, etc., via a backhaul network. Memory 1312 includes a control routine 1320, an assembly of components 1322, e.g., an assembly of software components, and data/information 1324.

Figure 14A:
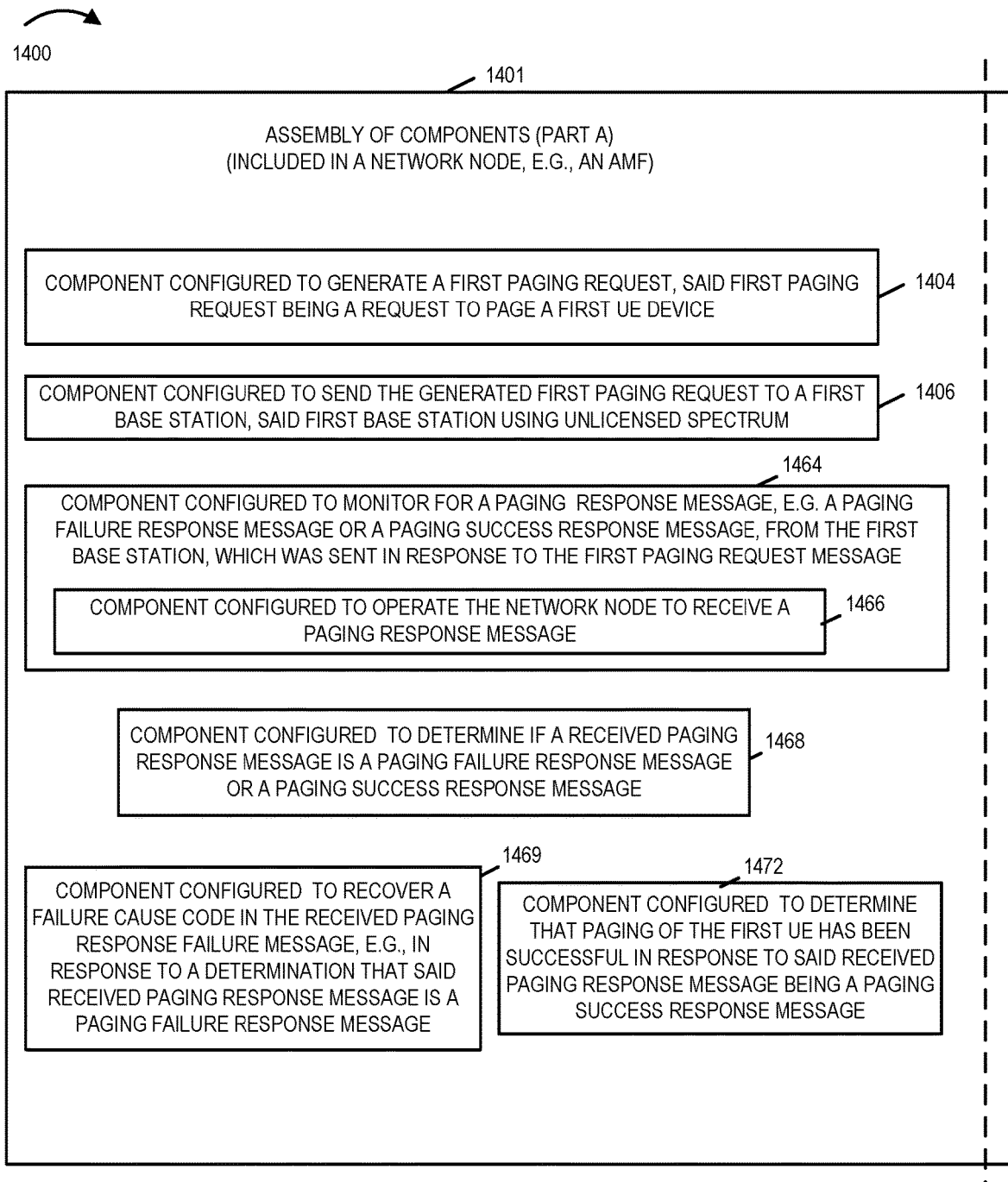
FIG. 14A is a first part of an exemplary assembly of components which may be included in a network node, e.g., an AMF, implemented in accordance with an exemplary embodiment.
Figures 14, 14B:
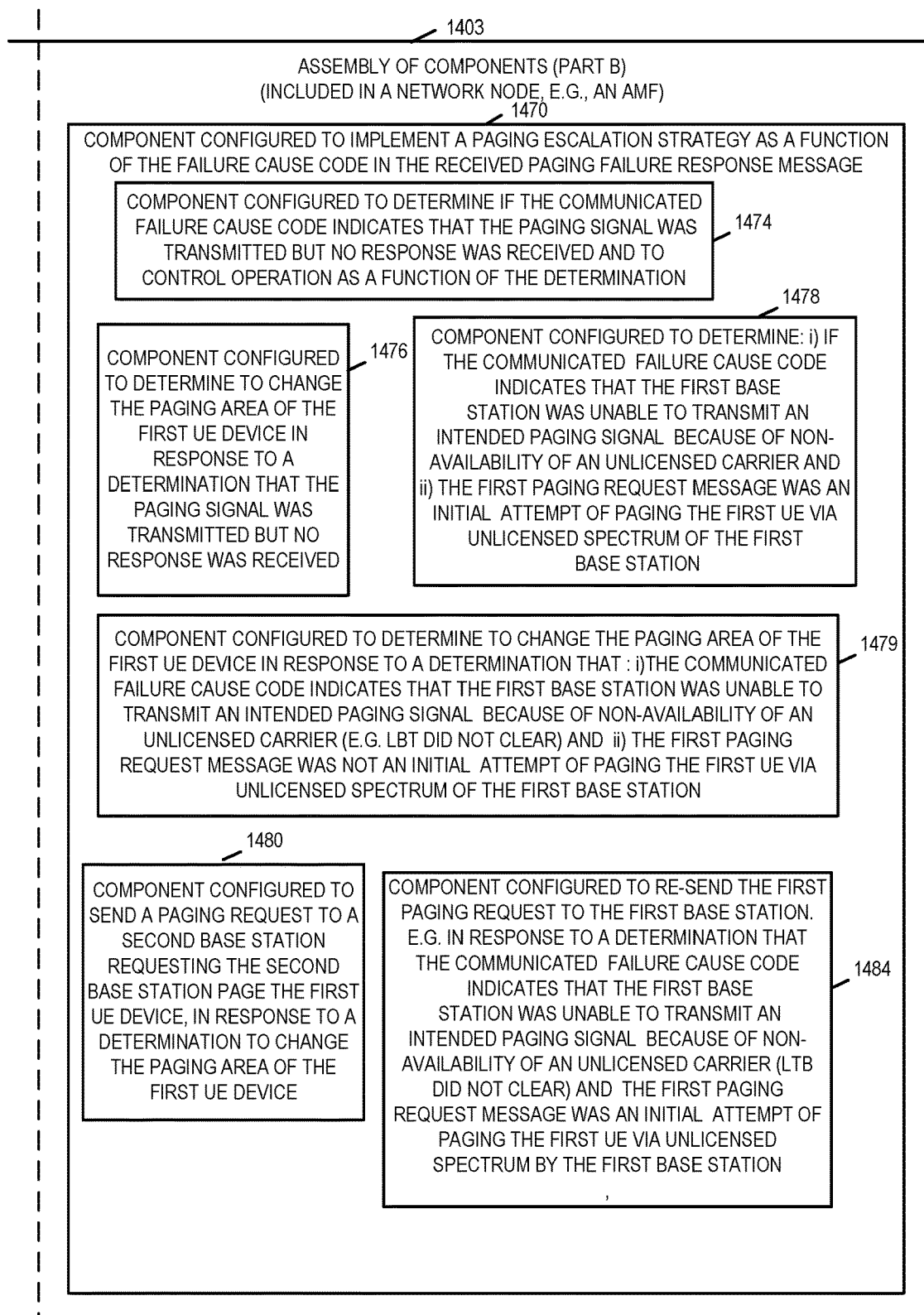
FIG. 14B is a second part of an exemplary assembly of components which may be included in a network node, e.g., an AMF, implemented in accordance with an exemplary embodiment.
FIG. 14 comprises the combination of FIG. 14A and FIG. 14B.

FIG. 14, comprising the combination of FIG. 14A and FIG. 14B, is a drawing of an exemplary assembly of components 1400, comprising Part A 1401 and Part B 1403, in accordance with an exemplary embodiment. Exemplary assembly of components 1400 may be, and sometimes is, included in an exemplary network node, e.g., network node 1300, e.g., an AMF, of FIG. 13, or network node 102, e.g., an AMF, of system 100 of FIG. 1 or AMF 502 of system 500 of FIG. 5, and implement steps of an exemplary method, e.g., steps of the method of the flowchart 200 of FIG. 2.

The components in the assembly of components 1400 can be, and in some embodiments are, implemented fully in hardware within the processor 1302, e.g., as individual circuits. The components in the assembly of components 1400 can, and in some embodiments are, implemented fully in hardware within the assembly of components 1310, e.g., as individual circuits corresponding to the different components. In other embodiments some of the components are implemented, e.g., as circuits, within the processor 1302 with other components being implemented, e.g., as circuits within assembly of components 1310, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the network node 1300, e.g., an AMF, with the components controlling operation of the network node to implement the functions corresponding to the components when the components are executed by a processor, e.g., processor 1302. In some such embodiments, the assembly of components 1400 is included in the memory 1312 as assembly of components 1322. In still other embodiments, various components in assembly of components 1400 are implemented as a combination of hardware and software, e.g., with another circuit external to the processor providing input to the processor 1302 which then under software control operates to perform a portion of a component's function. While processor 1302 is shown in the FIG. 13 embodiment as a single processor, e.g., computer, it should be appreciated that the processor 1302 may be implemented as one or more processors, e.g., computers.

When implemented in software the components include code, which when executed by the processor 1302, configure the processor 1302 to implement the function corresponding to the component. In embodiments where the assembly of components 1400 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the network node 1300, or elements therein such as the processor 1302, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., steps of the method of flowchart 200 of FIG. 2 and/or described or shown with respect to any of the other figures.

Assembly of components 1400 includes a component 1404 configured to generate a first paging request, said first paging request being a request to page a first UE device, a component 1406 configured to send the generated first paging request to a first base station using unlicensed spectrum, and a component 1464 configured to monitor for a paging response message, e.g., a paging failure response message or a paging success response message, from the first base station, which was sent to the network node in response to the first paging request message. Component 1464 includes a component 1466 configured to operate the network node to receive a paging response message.

Assembly of component 1400 further includes a component 1468 configured to determine if a received paging response message is a paging failure response message or a paging success response message, a component 1469 configured to recover a failure cause code communicated in the received paging response failure message, e.g., in response to a determination that the received paging response message is a paging failure response message, and a component 1472 configured to determine that the paging of the first UE has been successful in response to said received paging response message being a paging success response message.

Assembly of component 1400 further includes a component 1470 configured to implement a paging escalation strategy as a function of the failure cause code in the received paging failure response message. Component 1470 includes a component 1474 configured to determine if the communicated failure cause code indicates that the paging signal was transmitted but no response was received and to control operation as a function of the determination, a component 1476 configured to determine to change the paging area of the first UE device in response to a determination that the paging signal was transmitted, e.g., to the first UE device, but no response was received, e.g., from the first UE device, and a component 1478 configured to determine if: i) the communicated failure cause code indicates that the first base station was unable to transmit an intended paging signal because of non-availability of an unlicensed carrier and ii) the first paging request message was an initial attempt of paging the first UE via the unlicensed spectrum of the first base station. Assembly of components 1400 further includes a component 1479 configured to determine to change the paging area of the first UE device in response to a determination that: i) the communicated failure cause code indicates that the first base station was unable to transmit an intended paging signal because of non-availability of an unlicensed carrier and ii) the first paging request message was not an initial attempt of paging the first UE device via unlicensed spectrum of the first base station. Assembly of components 1400 further includes a component 1480 configured to send a paging request to a second base station requesting the second base station to page the first UE device, in response to a determination to change the paging area of the first UE device, and a component 1484 configured to re-send the first paging request to the first base station, e.g., in response to a determination that the communicated failure cause code indicates that the first base station was unable to transmit an intended paging signal because of non-availability of an unlicensed spectrum and ii) the first paging request message was an initial attempt of paging the first UE device via unlicensed spectrum of the first base station.

Various aspects and/or features are described below. Various aspects and/or features of paging in some embodiments of new radio (NR) will now be described. In some embodiments, Core network (CN)-based paging operations in NR are similar to Long Term Evolution (LTE). For RRC_IDLE UEs, Access and Mobility Management Function (AMF) informs NG-RAN node (either gNB or ng-eNB) to initiate paging for the UE identified via 5G-S-TMSI in certain cells/Tracking area (TA) via N2-AP: PAGIN message. NG-RAN node pages target UEs via RRC:PAGING message. If target UEs do not respond to the page in a certain time duration, then AMF can re-initiate paging. At this juncture, paging escalation strategies may be applied, e.g., previous page msg was restricted to few cells in one TA, but re-paging may involve increasing the paging area to e.g., all cells in that tracking area or all cells in multiple TAs, etc.

NR introduces RAN-based paging operations based on I-RNTI to accommodate reaching UEs in the new RRC_I-NACTIVE state. In case of DC operations in NR (EN-DC, NGEN-DC or MR-DC), paging operation is currently performed only on primary carrier (MCG) which uses licensed spectrum.

It is important to note that unlike most other RAN-CN messages, the N2-AP:PAGING message has no N2-AP response event. In accordance with a feature of some embodiments of the present invention, a response message is added, e.g., a base station such as gNB, transmits a response message to network node such as an AMF node, in response to a paging request message.

Various aspects and/or features of some embodiments of new radio unlicensed spectrum (NR-U) will now be described. NR in Unlicensed Spectrum (NR-U) SID which is being studied in 3GPP Rel-15/16 has the following 3 flavours: Carrier Aggregated (CA), Dual Connectivity (DC), and Standalone (SA). Carrier Aggregated (CA) is similar to LTE-LAA and applies to both LTE- and NR-primary carrier licensed spectrum. Dual Connectivity (DC) applies to both LTE- and NR-primary carrier in licensed spectrum. Standalone (SA) NR-U applies only to NR and no licensed carrier exists; present day may use WiFi.

Among other operations, the paging operation would need to be defined for NR-U SA. Note that paging mechanisms defied for NR will apply to NR-U CA and DC case with some modifications required. IPR on "porting" NR paging operations to NR-U SA are assumed to exist.

Various problems related to paging will now be described. A first issue will now be described. For NR-U, sending any messages over unlicensed medium comes with the uncertainty of not having access to the physical medium for transmission at the desired time of transmission. If NR-U SA paging operations use NR paging operations as the baseline, it would be safe to assume that if target UE(s) do not respond to the paging, then AMF will re-initiate paging but it will escalate to a wider area. But, AMF would not have the knowledge of whether target UE(s) are not responding to CN pages because: i) target UE(s) are not present in the area being paged or ii) paging message was not sent (access to medium was not gained).

A second issue will now be described. For NR-U DC operations, primary carrier (MSG) coverage (using FR1 or FR2) can be expected to cover unlicensed secondary carrier(s) (SGC) coverage area. However, that may not always be true for either hot-spot type deployment where unlicensed carriers are deployed to fill FR1 coverage gaps and/or for coverage extension. For non-overlapping coverage areas, if UE is not in the coverage area of the primary cell, but is in secondary carrier (on unlicensed spectrum), then paging will have to be unnecessarily escalated to multiple primary cells, e.g., more than 1 tracking area (TA) to get to the UE.

A solution to the first issue will now be described. In accordance with a feature of some embodiments of the present invention, a new Class 1 N2-AP:PAGING_U message with a corresponding N2-AP:PAGING_U RESPONSE message including a failure cause code is implemented. Thus, in accordance with a feature of some embodiments of the present invention, a base station, e.g., a gNB, generates and sends a paging response to the network node, e.g., an AMF node, indicating the reason for the paging failure. Thus the AMF is provided, in accordance with the present invention, will knowledge of why the target UEs which are being paged are not responding to the core network (CN) pages.

A solution to the second issue will now be described. In some embodiments implemented in accordance with the present invention, paging operations on (unlicensed) Secondary unlicensed carrier(s) are implemented. Some such embodiments are implemented to support the capability of exchanges between UE, NG-RAN, e.g., a gNB, and SGC, e.g., a AMF, to support paging over (unlicensed) Secondary carrier(s). In some embodiments, a new IE is implemented and used to enable/disable (unlicensed) Secondary carrier(s) paging during RRC_IDLE/RRC_INTERACTIVE->RRC_CONNECTED transitions. In some embodiments, a new IE is implemented and used in N2-AP:PAGING msg to control whether a given PAGING message goes on MCG or SCGs or both. In some embodiments, UE enhancements are implemented and used to automatically disable listening for pages on (unlicensed) Secondary carrier(s) if no pages are received in a certain time window.

First Numbered List of Exemplary Method Embodiments

Method Embodiment 1 A method of operating a communications system including at least one base station (e.g., gNB or ng-eNB) that uses unlicensed spectrum, the method comprising: receiving (208), at a first base station a first paging request from a network node, e.g., an (AMF), used to control paging of user equipment (UE) devices, said first paging request being a request to page a first UE device; operating (210) the first base station to perform a paging operation to page the first UE device using unlicensed spectrum; operating (228) the first base station to determine whether said paging operation was successful or unsuccessful; when it is determined that said paging operation was unsuccessful, operating (252) the first base station to communicate a paging response to the network node in response to said first paging request indicating that the paging operation was unsuccessful; and when it is determined that said paging operation was successful, operating (254) the first base station to perform one of: i) proceeding with normal base station operation without sending a paging response message to the network node in response to said first paging request or ii) sending a paging success response message to the first network node in response to said paging request.

Method Embodiment 2 The method of Method Embodiment 1, wherein operating (210) the first base station to perform a paging operation includes: operating (212) the first base station to perform a channel sensing condition to determine if the first base station can transmit a page to the first UE using said unlicensed spectrum; operating (216) the first base station to transmit a paging signal to said UE device using said unlicensed spectrum when said channel sensing condition determines that the first base station can transmit the page to the first UE device using said unlicensed spectrum; and operating (224) the first base station to refrain from transmitting the paging signal to said UE when said channel sensing condition determines that the first base station is not authorized (e.g., because the channel is busy) to transmit the page to the first UE using said unlicensed spectrum.

Method Embodiment 3 The method of Method Embodiment 1, wherein operating (228) the first base station to determine whether said paging operation was successful or unsuccessful includes: operating (230) the first base station to determining if a paging signal was transmitted to said first UE device as part of said paging operation; and operating (246) the first base station to determine that the paging operation was not successful when it is determined that paging signal was not transmitted to the first UE as part of said paging operation.

Method Embodiment 4 The method of Method Embodiment 3, wherein the method includes operating (234) the first base station to determine that paging signal was not transmitted to the first UE device as part of said paging operation; and wherein operating (252) the first base station to communicate a paging response to the network node in response to said first paging request indicating that the paging operation was unsuccessful includes operating (258) the first base station to transmit a paging response to the first network node that includes a failure cause code indicating that the reason the paging operation failed was due to a failure by the first base station to transmit the paging signal to the first UE device.

Method Embodiment 5 The method of Method Embodiment 1, wherein operating (228) the first base station to determine whether said paging operation was successful or unsuccessful includes: operating (240) the first base station to determine whether a response was received by the base station from the first UE device in response to a paging signal transmitted to the first UE device.

Method Embodiment 6 The method of Method Embodiment 4, wherein operating (228) the first base station to determine whether said paging operation was successful or unsuccessful includes: operating (246) the first base station to determine that the paging operation was successful based on a determination that a response was received by the base station from the first UE device in response to the paging signal transmitted to the first UE device.

Method Embodiment 7 The method of Method Embodiment 6, wherein operating (228) the first base station to determine whether said paging operation was successful or unsuccessful includes: operating (246) the first base station to determine that the paging operation was not successful based on a determination that a response was not received by the base station from the first UE device in response to the paging signal transmitted to the first UE device.

Method Embodiment 8 The method of Method Embodiment 7, wherein operating (252) the first base station to communicate the paging response to the network node in response to said first paging request indicating that the paging operation was unsuccessful includes operating (260) the first base station to transmit a paging response to the first network node that includes a failure cause code indicating that the reason the paging operation failed was due to a failure to receive a reply from the first UE device (e.g., in response to the transmitted paging signal).

Method Embodiment 9 The method of Method Embodiment 1, further comprising: operating (270) the network node to implement a paging escalation strategy as a function of a failure cause code in a received paging response message.

Method Embodiment 10 The method of Method Embodiment 9, wherein said paging operation was unsuccessful, wherein said paging response communicated a failure cause code indicating that the reason that the paging operation failed was due to a failure to receive a reply from the first UE device, and wherein operating (270) the network node to implement a paging escalation strategy as a function of a failure cause code in a received paging response message includes: operating (280) the network node to send a paging request to a second base station requesting the second base station to page the first UE device, in response to said communicated failure cause code indicating that the reason that the paging operation failed was due to a failure to receive a reply from the first UE device.

Method Embodiment 11 The method of Method Embodiment 9, wherein said paging operation was unsuccessful, wherein said paging response communicated a failure cause code indicating that the reason that the paging operation failed was due to a failure by the first base station to transmit the paging signal to the first UE device, and wherein said first paging request was an initial attempt; and wherein operating (270) the network node to implement a paging escalation strategy as a function of a failure cause code in a received paging response message includes operating the network node to re-send (284) the first paging request to the first base station, in response to said communicated failure cause code indicating that the reason that the paging operation failed was due to a failure by the first base station to transmit the paging signal to the first UE device (e.g., because of unavailability of unlicensed spectrum (LBT not clearing)) and said first paging request being an initial attempt.

First Numbered List of Exemplary System Embodiments

System Embodiment 1 A communications system (100) comprising: a first base station (e.g., gNB or ng-eNB) (104) that uses unlicensed spectrum, said first base station (104) including: a first processor (302) configured to: control the first base station to receive (208), at a first base station a first paging request from a network node (102), e.g., an (AMF), used to control paging of user equipment (UE) devices (110, 112, 114, 116, 118, 120, ..., 122), said first paging request being a request to page a first UE device (110); control the first base station to perform (210) a paging operation to page the first UE device using unlicensed spectrum; determine (228) whether said paging operation was successful or unsuccessful; control the first base station to communicate (252) a paging response to the network node in response to said first paging request indicating that the paging operation was unsuccessful, when it is determined that said paging operation was unsuccessful, and control the first base station to perform (254) one of: i) proceeding with normal base station operation without sending a paging response message to the network node in response to said first paging request or ii) sending a paging success response message to the first network node in response to said paging request, when it is determined that said paging operation was successful.

System Embodiment 2 The communications system of System Embodiment 1, wherein said first processor is configured to: operate (212) the first base station to perform a channel sensing condition to determine if the first base station can transmit a page to the first UE using said unlicensed spectrum; operate (216) the first base station to transmit a paging signal to said UE device using said unlicensed spectrum when said channel sensing condition determines that the first base station can transmit the page to the first UE device using said unlicensed spectrum; and operate (224) the first base station to refrain from transmitting the paging signal to said UE when said channel sensing condition determines that the first base station is not authorized (e.g., because the channel is busy) to transmit the page to the first UE using said unlicensed spectrum, as part of being configured to control (210) the first base station to perform a paging operation.

System Embodiment 3 The communications system of System Embodiment 1, wherein said first processor is configured to: operate (230) the first base station to determine if a paging signal was transmitted to said first UE device as part of said paging operation; and operate (246) the first base station to determine that the paging operation was not successful when it is determined that paging signal was not transmitted to the first UE as part of said paging operation, as part of being configured to determine whether said paging operation was successful or unsuccessful.

System Embodiment 4 The communications system of System Embodiment 3, wherein said first processor is configured to: operate (234) the first base station to determine that paging signal was not transmitted to the first UE device as part of said paging operation; and operate (258) the first base station to transmit a paging response to the first network node that includes a failure cause code indicating that the reason the paging operation failed was due to a failure by the first base station to transmit the paging signal to the first UE device, as part of being configured to operate (252) the first base station to communicate a paging response to the network node in response to said first paging request indicating that the paging operation was unsuccessful.

System Embodiment 5 The communications system of System Embodiment 1, wherein said first processor is configured to: operate (240) the first base station to determine whether a response was received by the base station from the first UE device in response to a paging signal transmitted to the first UE device, as part of being configured to operate (228) the first base station to determine whether said paging operation was successful or unsuccessful includes:

System Embodiment 6 The communications system of System Embodiment 4, wherein said first processor is configured to: operate (246) the first base station to determine that the paging operation was successful based on a determination that a response was received by the base station from the first UE device in response to the paging signal transmitted to the first UE device, as part of being configured to determine (228) whether said paging operation was successful or unsuccessful.

System Embodiment 7 The communications system of System Embodiment 6, wherein said first processor is configured to operate (246) the first base station to determine that the paging operation was not successful based on a determination that a response was not received by the base station from the first UE device in response to the paging signal transmitted to the first UE device, as part of being configured to determine (228) whether said paging operation was successful or unsuccessful.

System Embodiment 8 The communications system of System Embodiment 7, wherein said first processor is configured to: operate (260) the first base station to transmit a paging response to the first network node that includes a failure cause code indicating that the reason the paging operation failed was due to a failure to receive a reply from the first UE device (e.g., in response to the transmitted paging signal), as part of being configured to control (252) the first base station to communicate the paging response to the network node in response to said first paging request indicating that the paging operation was unsuccessful.

System Embodiment 9 The communications system (100) of System Embodiment 1, further comprising: said network node (102) including a second processor (1302); and wherein said second processor is configured to: operate (270) the network node to implement a paging escalation strategy as a function of a failure cause code in a received paging response message.

System Embodiment 10 The communications system of System Embodiment 9, wherein said paging operation was unsuccessful, wherein said paging response communicated a failure cause code indicating that the reason that the paging operation failed was due to a failure to receive a reply from the first UE device, and wherein said second processor is configured to operate (280) the network node to send a paging request to a second base station requesting the second base station to page the first UE device, in response to said communicated failure cause code indicating that the reason that the paging operation failed was due to a failure to receive a reply from the first UE device, as part of being configured to operate (270) the network node to implement a paging escalation strategy as a function of a failure cause code in a received paging response message includes:

System Embodiment 11 The communications system of System Embodiment 9, wherein said paging operation was unsuccessful, wherein said paging response communicated a failure cause code indicating that the reason that the paging operation failed was due to a failure by the first base station to transmit the paging signal to the first UE device, and wherein said first paging request was an initial attempt; and wherein said second processor is configured to operate the network node to re-send (284) the first paging request to the first base station, in response to said communicated failure cause code indicating that the reason that the paging operation failed was due to a failure by the first base station to transmit the paging signal to the first UE device (e.g., because of unavailability of unlicensed spectrum (LBT not clearing)) and said first paging request being an initial attempt, as part of being configured to operate (270) the network node to implement a paging escalation strategy as a function of a failure cause code in a received paging response message.

Number List of Exemplary Computer Readable Medium Embodiments

Computer Readable Medium Embodiment 1 A non-transitory computer readable medium (310) including computer executable instructions which when executed by a processor (302) control a first base station (104 or 300) that uses unlicensed spectrum to perform the steps of: receiving, at said first base station a first paging request from a network node, used to control paging of user equipment (UE) devices, said first paging request being a request to page a first UE device; operating the first base station to perform a paging operation to page the first UE device using unlicensed spectrum; operating the first base station to determine whether said paging operation was successful or unsuccessful; when it is determined that said paging operation was unsuccessful, operating the first base station to communicate a paging response to the network node in response to said first paging request indicating that the paging operation was unsuccessful; and when it is determined that said paging operation was successful, operating the first base station to perform one of: i) proceeding with normal base station operation without sending a paging response message to the network node in response to said first paging request or ii) sending a paging success response message to the first network node in response to said paging request.

Figure 15A:
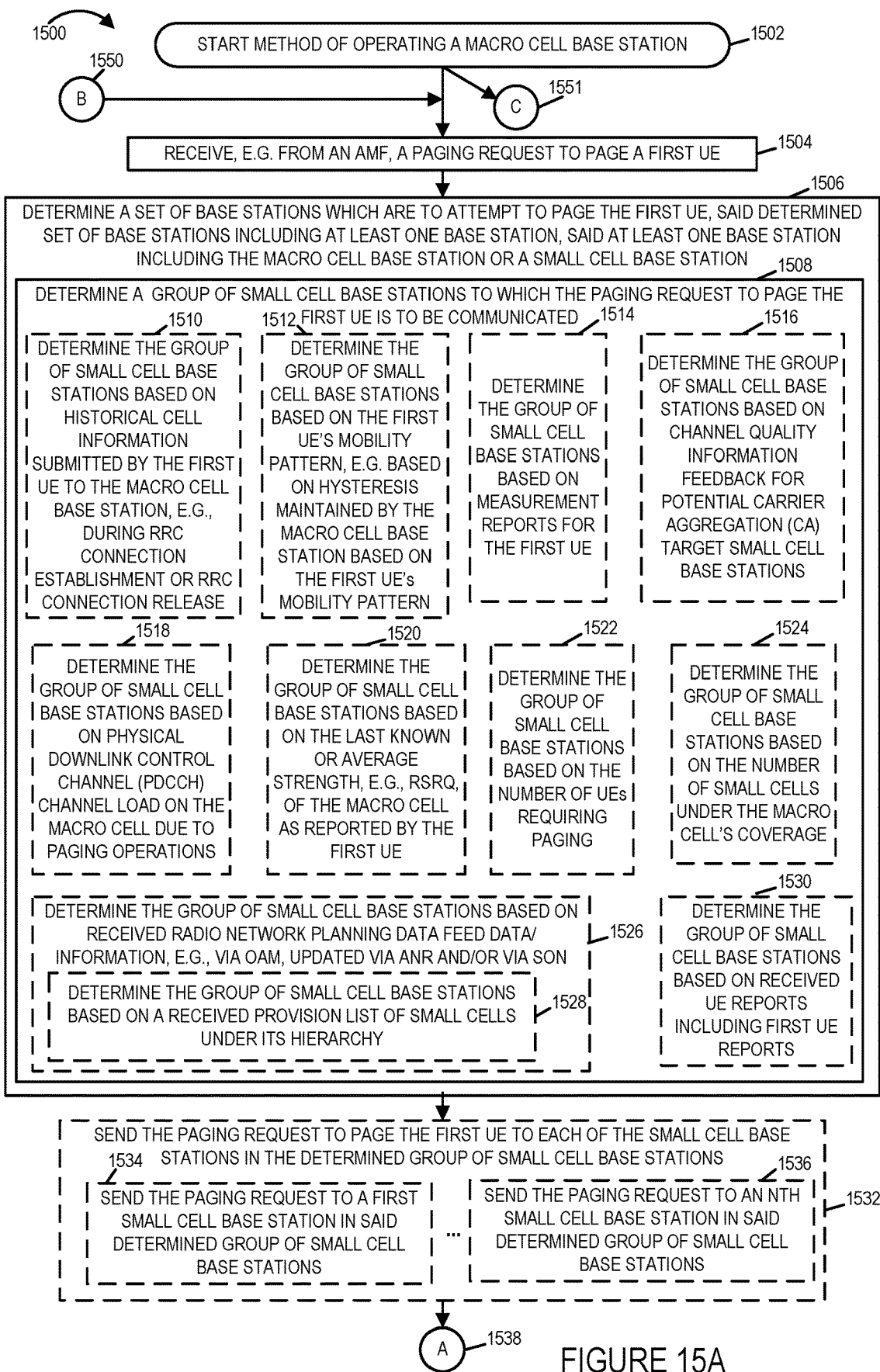
FIG. 15A is a first part of a flowchart of an exemplary method of operating a macro cell base station in accordance with an exemplary embodiment, said exemplary method including paging related operations.
Figure 15B:
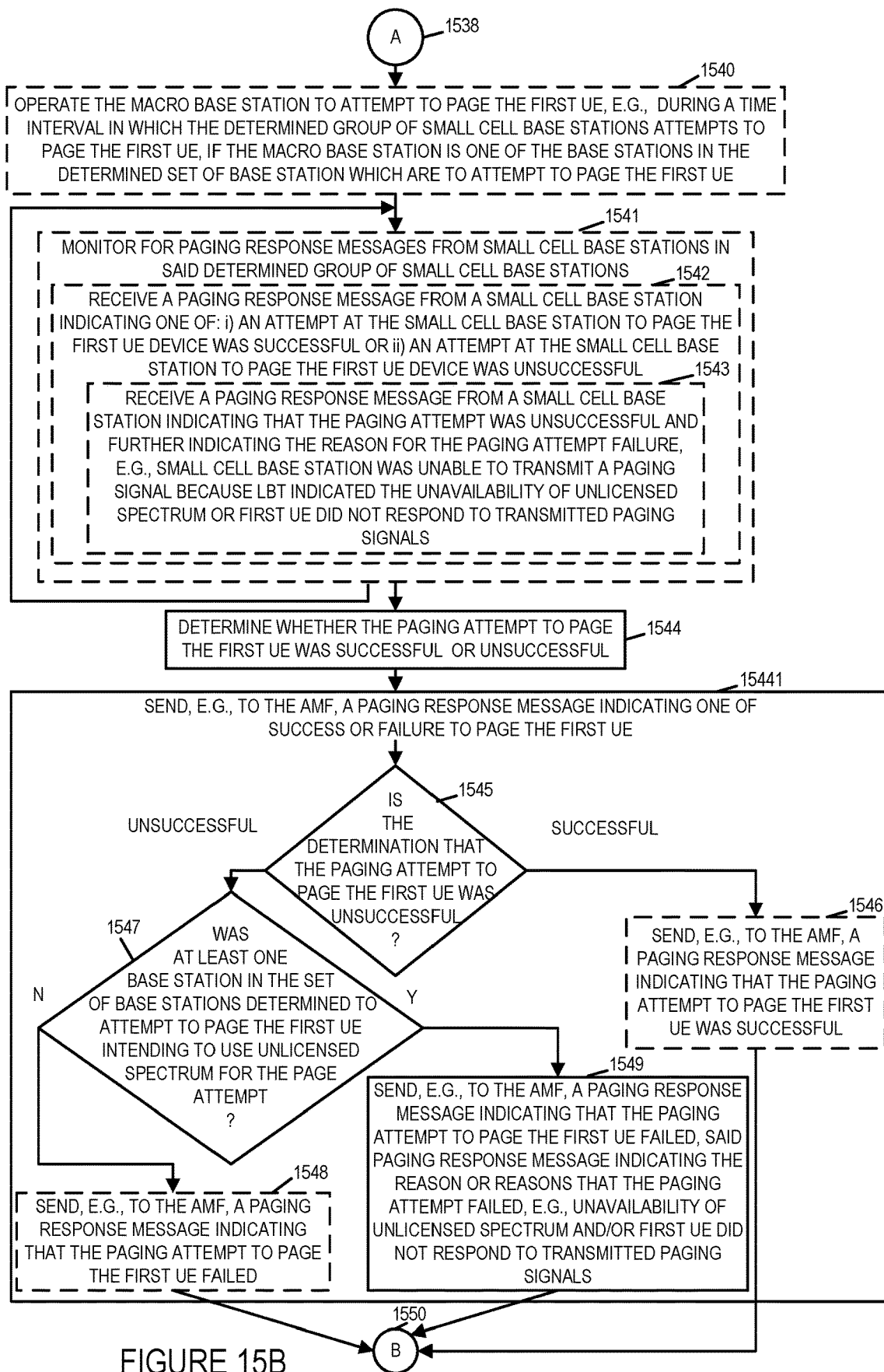
FIG. 15B is a second part of a flowchart of an exemplary method of operating a macro cell base station in accordance with an exemplary embodiment, said exemplary method including paging related operations.
Figure 15C:
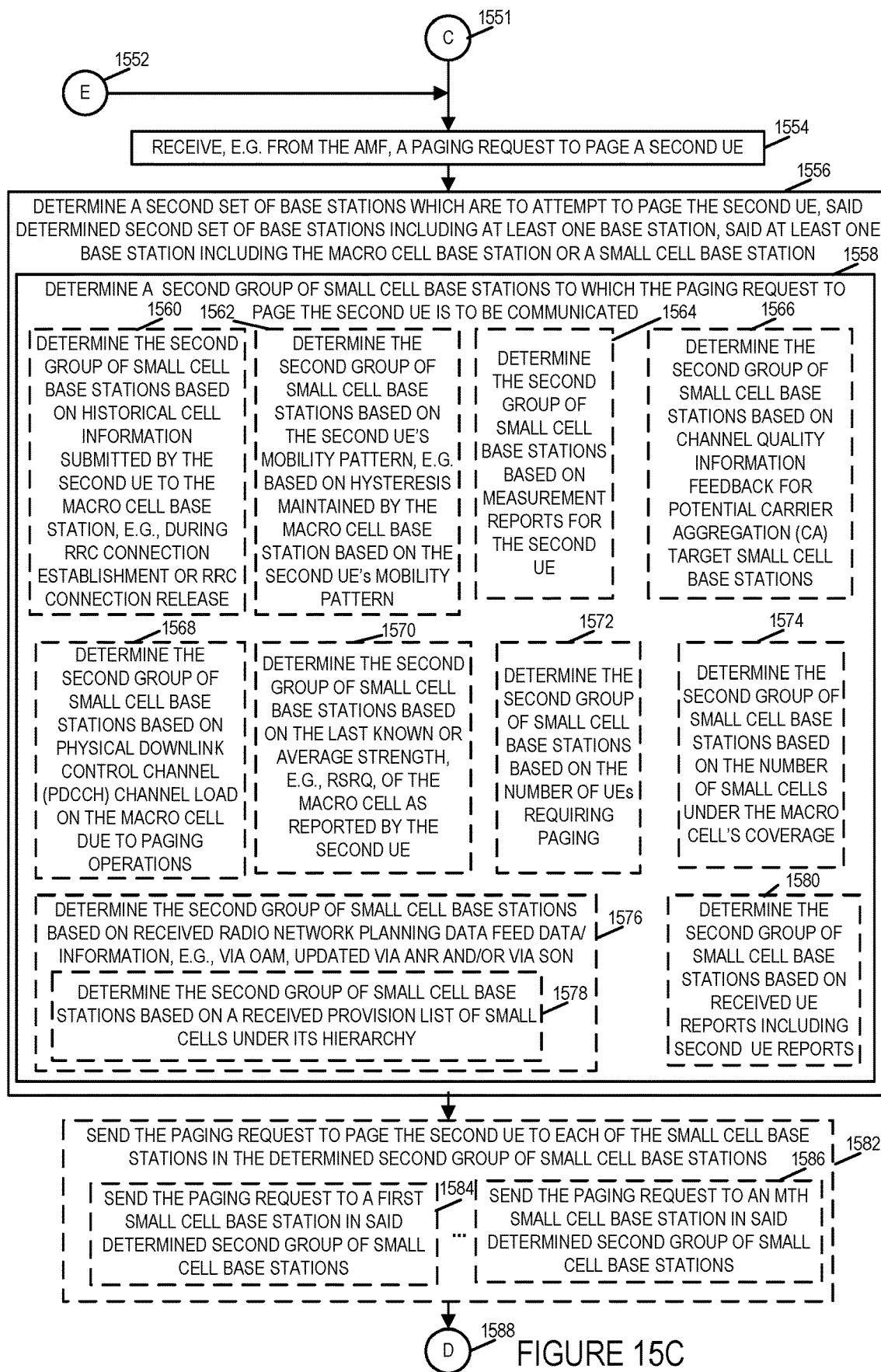
FIG. 15C is a third part of a flowchart of an exemplary method of operating a macro cell base station in accordance with an exemplary embodiment, said exemplary method including paging related operations.
Figures 15, 15A, 15B, 15C, 15D:
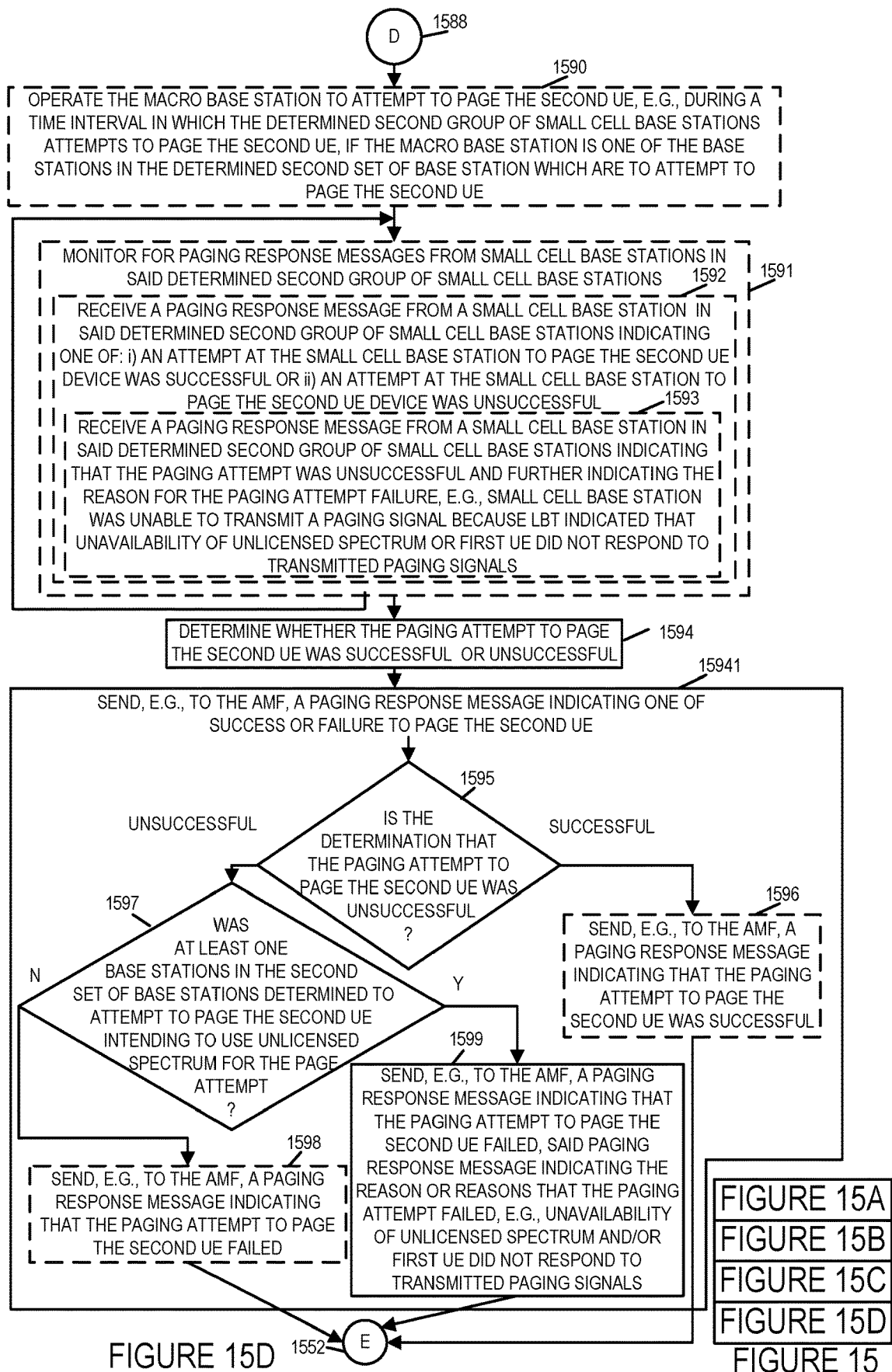
FIG. 15D is a fourth part of a flowchart of an exemplary method of operating a macro cell base station in accordance with an exemplary embodiment, said exemplary method including paging related operations.
FIG. 15, comprising the combination of FIG. 15A, FIG. 15B, FIG. 15C and FIG. 15D.

FIG. 15, comprising the combination of FIG. 15A, FIG. 15B, FIG. 15C and FIG. 15D, is a flowchart 1500 of an exemplary method of operating a macro cell base station in accordance with an exemplary embodiment. The macro cell base station is, e.g., one of the macro cell base station (macro cell base station 1 1604, macro cell base station 2 1606) of communications system 1600 of FIGS. 16-24.

Operation starts in step 1502 in which the macro cell base station is powered on and initialized. Operation proceeds from step 1502 to step 1504 and, via connecting node C 1551, to step 1554. In step 1504, the macro cell base station receives from a network node, e.g., from an access and mobility function (AMF), e.g., AMF device 1602 of system 1600, a paging request to page a first UE. The first UE is, e.g., one of the UEs (UE 1 1634, UE 2 1636, UE 3 1638, UE 4 1640, UE 5 1642, UE 6 1644) of system 1600 of FIG. 16. Operation proceeds from step 1504 to step 1506.

In step 1506 the macro cell base station determines a set of base stations which are to attempt to page the first UE, said determined set of base stations including at least one base station, said at least one base station including the macro cell base station or a small cell base station. In some embodiments, e.g., the embodiment of FIG. 16, the macro cell base station uses licensed spectrum and the small cell base station uses unlicensed spectrum. In other embodiments, the macro cell base station uses unlicensed spectrum and the small cell base stations use unlicensed spectrum, e.g., the macro cell base station uses unlicensed spectrum corresponding to a first frequency band and the small cell base stations use unlicensed spectrum corresponding to a second frequency band, said second frequency band being different than said first frequency band. In some other embodiments, the macro cell base station uses licensed spectrum corresponding to a first frequency band; some small cell base stations use licensed spectrum corresponding to a second frequency band, said second frequency band being different from said first frequency band; and some small cell base stations use unlicensed spectrum.

Step 1506 includes step 1508, in which the macro cell base station determines a group of small cell base stations to which the paging request to page the first UE is to be communicated. Step 1508 includes one or more or all of: steps 1510, 1512, 1514, 1516, 1518, 1520, 1522, 1524, 1526 or 1530. In step 1510 the macro cell base station determines the group of small cell base stations based on historical cell information submitted by the first UE to the macro cell base station, e.g., during RRC connection establishment or during RRC connection release. In step 1512 the macro cell base station determines the group of small cell base stations based on the first UE's mobility pattern, e.g., based on hysteresis information maintained by the macro cell base station based on the first UE's mobility pattern. In step 1514 the macro cell base station determines the group of small cell base stations based on measurement reports for the first UE, e.g., historical signal measurement reports communicated by the first UE. In step 1516 the macro cell base station determines the group of small cell base stations based on channel quality information feedback for potential carrier aggregation (CA) target small cell base stations, e.g., communicated by the first UE in measurement reports. In step 1518 the macro cell base station determines the group of small cell base stations based on physical downlink control channel (PDDCH) channel load on the macro cell due to paging operations. In step 1520 the macro cell base station determines the group of small cell base stations based on the last known or average strength, e.g., reference signal received quality (RSRQ) of the macro cell as reported by the first UE. In step 1522 the macro cell base station determines the group of small cell base stations based on the number of UEs requiring paging, e.g., at that instant of time. In step 1524 the macro cell base station determines the group of small cell base stations based on the number of small cells under (i.e. with varying degrees of overlap) the macro cell's coverage area. In step 1526 the macro cell base station determines the group of small cell base stations based on received radio network planning data feed data/information, e.g. via Operations, Administration and Maintenance (OAM), updated via Automatic Neighbor Relations (ANR) and/or via Self-Organizing Networks (SON). In some embodiments, step 1526 includes step 1528 in which the macro cell base station determines the group of small cell base stations based on a received provision list of small cells under its hierarchy. In step 1530 the macro cell base station determines the group of small cell base stations based on received UE reports including first UE reports. Operation proceeds from step 1506 to step 1532, if the determined group of small cell base stations includes at least one small cell base station; otherwise step 1532 is bypassed.

In step 1532 the macro cell base station sends the paging request to page the first UE to each of the small cell base stations in the determined group of small cell base stations. Step 1532 includes step 1534 and may, and sometimes does, include additions steps, e.g. step 1536, e.g., depending upon the number of small cell base stations in the determined group of small cell base stations. In step 1534 the macro cell base station sends a paging request to page the first UE to a first small cell base station in said determined group of small cell base stations. In step 1536 the macro cell base station sends a paging request to page the first UE to an Nth small cell base station in said determined group of small cell base stations. Operation proceeds from step 1532, via connecting node A 1538 to 1540, if the macro cell base station is one of the base stations in the determined set of base stations which are to attempt to page the first UE; otherwise, step 1540 is bypassed.

In step 1540 the macro cell base station attempts to page the first UE, e.g. during a time interval in which the determined group of small cell base stations attempts to page the first UE. Operation proceeds from step 1540 to step 1541, if the determined group of small cell base station includes at least one small cell base station; otherwise, step 1541 is bypassed.

In step 1541 the macro cell base station monitors for paging response messages from small cell base stations in said determined group of small cell base stations. Step 1541 is performed on an ongoing basis, e.g., for a predetermined time interval. Step 1541 may, and sometimes does include one or more iterations of step 1542. In step 1542 the macro cell base station receives a paging response message from a small cell base station in said determined group of small cell base stations, said received paging response message indicating one of: i) an attempt at the small cell base station to page the first UE device was successful or ii) an attempt at the small cell base station to page the first UE device was unsuccessful. Step 1552 may, and sometimes does includes step 1543.

In step 1543 the macro cell base station receives a response from a small cell base station indicating that the paging attempt was unsuccessful and further indicating the reason for the paging attempt failure, e.g., i) the small cell base station was unable to transmit a paging signal to page the first UE because listen-before-talk (LBT) indicated the unavailability of unlicensed spectrum or ii) the first UE did not respond to the transmitted paging signals. Operation proceeds from step 1541 to step 1544.

In step 1544 the macro cell base station determines whether the paging attempt to page the first UE was successful or unsuccessful. Operation proceeds from step 1544 to step 15441.

In step 15441 the macro cell base station sends to the network node, e.g., to an AMF, a paging response message indicating one of success or failure to page the first UE. Step 15441 includes steps 1545, 1546, 1547, 1548, and 1549.

In step 1545 if the determination is that the paging attempt to page the first UE was successful, then operation proceeds from step 1545 to step 1546; however, if the determination is that the paging attempt to page the first UE was unsuccessful then operation proceeds from step 1545 to step 1547.

In step 1546, the macro cell base station sends, e.g., to the AMF, a paging response message indicating that the paging attempt to page the first UE was successful. In some embodiments, step 1546 is bypassed.

Returning to step 1547, in step 1547 the macro cell base station determines if at least one of the base stations in the set of base stations determined to attempt to page the first UE intended to use unlicensed spectrum for the paging attempt. If the determination is that none of the base stations in the set of base stations determined to attempt to page the first UE intended to use unlicensed spectrum for the paging attempt, then operation proceeds from step 1547 to step 1548 in which the macro cell base station sends, e.g. to the AMF, a paging response message indicating that the attempt to page the first UE failed. In some embodiments, the paging response message of step 1548 indicates that the paging attempt failed because the first UE did not respond to transmitted paging signals.

If the determination is that at least one of the base stations in the set of base stations determined to attempt to page the first UE intended to use unlicensed spectrum for the paging attempt, then operation proceeds from step 1547 to step 1549 in which the macro cell base station sends, e.g. to the AMF, a paging response message indicating that the attempt to page the first UE failed, said paging response message indicating the reason or reason(s) that the paging attempt failed, e.g., unavailability of unlicensed spectrum and/or the first UE did not respond to transmitted paging signals. Operation proceeds from step 1546, step 1548 or step 1549, via connecting node B 1550, to step 1504, in which the macro cell base station receives another paging request to page the first UE. Operation proceeds from step 1504 to step 1506. During different iterations of steps 1506 the macro cell base station may, and sometime does, determine a different set of base stations and a different group of small cell base stations which are to attempt to page the first UE, e.g. depending upon current conditions.

Returning to step 1554, in step 1504, the macro cell base station receives from a network node, e.g., from the access and mobility function (AMF), e.g., AMF device 1602 of system 1600, a paging request to page a second UE. The second UE is, e.g. one of the UEs (UE 1 1634, UE 2 1636, UE 3 1638, UE 4 1640, UE 5 1642, UE 6 1644) of system 1600, and is a different UE than the first UE. Operation proceeds from step 1554 to step 1556.

In step 1556 the macro cell base station determines a second set of base stations which are to attempt to page the second UE, said determined second set of base stations including at least one base station, said at least one base station including the macro cell base station or a small cell base station.

Step 1556 includes step 1558, in which the macro cell base station determines a second group of small cell base stations to which the paging request to page the second UE is to be communicated. Step 1558 includes one or more or all of: steps 1560, 1562, 1564, 1566, 1568, 1570, 1572, 1574, 1576 or 1580. In step 1560 the macro cell base station determines the second group of small cell base stations based on historical cell information submitted by the second UE to the macro cell base station, e.g., during RRC connection establishment or during RRC connection release. In step 1562 the macro cell base station determines the second group of small cell base stations based on the second UE's mobility pattern, e.g., based on hysteresis information maintained by the macro cell base station based on the second UE's mobility pattern. In step 1564 the macro cell base station determines the second group of small cell base stations based on measurement reports for the second UE. In step 1566 the macro cell base station determines the second group of small cell base stations based on channel quality information feedback for potential carrier aggregation (CA) target small cell base stations. In step 1568 the macro cell base station determines the second group of small cell base stations based on physical downlink control channel (PDCH) channel load on the macro cell due to paging operations. In step 1570 the macro cell base station determines the second group of small cell base stations based on the last known or average strength, e.g., reference signal received quality (RSRQ) of the macro cell as reported by the second UE. In step 1572 the macro cell base station determines the second group of small cell base stations based on the number of UEs requiring paging. In step 1574 the macro cell base station determines the second group of small cell base stations based on the number of small cells under the macro cell's coverage area. In step 1576 the macro cell base station determines the second group of small cell base stations based on received radio network planning data feed data/information, e.g. via Operations, Administration and Maintenance (OAM), updated via Automatic Neighbor Relations (ANR) and/or via Self-Organizing Networks (SON). In some embodiments, step 1576 includes step 1578 in which the macro cell base station determines the second group of small cell base stations based on a received provision list of small cells under its hierarchy. In step 1580 the macro cell base station determines the second group of small cell base stations based on received UE reports including second UE reports. Operation proceeds from step 1556 to step 1582, if the determined second group of small cell base stations includes at least one small cell base station; otherwise step 1582 is bypassed.

In step 1582 the macro cell base station sends the paging request to page the second UE to each of the small cell base stations in the determined second group of small cell base stations. Step 1582 includes step 1584 and may, and sometimes does, include additions steps, e.g. step 1586, e.g., depending upon the number of small cell base stations in the determined second group of small cell base stations. In step 1584 the macro cell base station sends a paging request to page the second UE to a first small cell base station in said determined second group of small cell base stations. In step 1586 the macro cell base station sends a paging request to page the second UE to an Mth small cell base station in said determined second group of small cell base stations. Operation proceeds from step 1582, via connecting node D 1588 to step 1590, if the macro cell base station is one of the base stations in the determined second set of base stations which are to attempt to page the second UE; otherwise, step 1590 is bypassed.

In step 1590 the macro cell base station attempts to page the second UE, e.g. during a time interval in which the determined second group of small cell base stations attempts to page the second UE. Operation proceeds from step 1590 to step 1591, if the determined second group of small cell base station includes at least one small cell base station; otherwise, step 1591 is bypassed.

In step 1591 the macro cell base station monitors for paging response messages from small cell base stations in said determined second group of small cell base stations. Step 1591 is performed on an ongoing basis, e.g., for a predetermined time interval. Step 1591 may, and sometimes does include one or more iterations of step 1592. In step 1592 the macro cell base station receives a paging response message from a small cell base station in said determined second group of small cell base stations indicating one of: i) an attempt at the small cell base station to page the second UE device was successful or ii) an attempt at the small cell base station to page the second UE device was unsuccessful. Step 1592 may, and sometimes does includes step 1593.

In step 1593 the macro cell base station receives a response from a small cell base station in said determined second group of small cell base stations indicating that the paging attempt was unsuccessful and further indicating the reason for the paging attempt failure, e.g., i) the small cell base station was unable to transmit a paging signal to page the second UE because listen-before-talk (LBT) indicated the unavailability of unlicensed spectrum or ii) the second UE did not respond to transmitted paging signals. Operation proceeds from step 1591 to step 1594.

In step 1594 the macro cell base station determines whether the paging attempt to page the second UE was successful or unsuccessful from the perspective of the macro base station. Operation proceeds from step 1594 to step 15941.

In step 15941 the macro cell base station sends to a network node, e.g., to an AIVIF, a paging response message indicating one of success or failure to page the second UE. Step 15941 includes steps 1595, 1596, 1597, 1598, and 1599.

In step 1595 if the determination is that the paging attempt to page the second UE was successful, then operation proceeds from step 1595 to step 1596; however, if the determination is that the paging attempt to page the second UE was unsuccessful then operation proceeds from step 1595 to step 1597.

In step 1596, the macro cell base station sends, e.g., to the AMF, a paging response message indicating that the paging attempt to page the second UE was successful. In some embodiments, step 1596 is bypassed.

Returning to step 1597, in step 1597 the macro cell base station determines if at least one of the base stations in the second set of base stations determined to attempt to page the second UE intended to use unlicensed spectrum for the paging attempt. If the determination is that none of the base stations in the second set of base stations determined to attempt to page the second UE intended to use unlicensed spectrum for the paging attempt, then operation proceeds from step 1597 to step 1598 in which the macro cell base station sends, e.g. to the AMF, a paging response message indicating that the attempt to page the second UE failed. In some embodiments, the paging response message of step 1598 indicates that the paging attempt failed because the second UE did not respond to transmitted paging signals.

If the determination is that at least one of the base stations in the second set of base stations determined to attempt to page the second UE intended to use unlicensed spectrum for the paging attempt, then operation proceeds from step 1597 to step 1599 in which the macro cell base station sends, e.g. to the AMF, a paging response message indicating that the attempt to page the second UE failed, said paging response message indicating the reason or reason(s) that the paging attempt failed, e.g., unavailability of unlicensed spectrum and/or the second UE did not respond to transmitted paging signals. Operation proceeds from step 1596, step 1598 or step 1599, via connecting node E 1552, to step 1554, in which the macro cell base station receives another paging request to page the second UE. Operation proceeds from step 1554 to step 1556. During different iterations of steps 1556 the macro cell base station may, and sometimes does, determine a different second set of base stations and a different second group of small cell base stations which are to attempt to page the second UE, e.g. depending upon current conditions.

The flowchart 1500 of FIG. 15 has described exemplary steps for paging related operated for paging a first UE (see FIG. 15A and FIG. 15B) and exemplary steps for paging related operations for paging a second UE (See FIG. 15C and FIG. 15D), where the first UE and the second UE are different devices in the communications system. It should be appreciated, that the macro cell base station can, and sometimes does, page additional UEs, e.g., a third UE, a fourth UE, etc., and the steps of FIG. 15A/FIG. 15B or FIG. 15C/FIG. 15D are adapted and repeated for each additional UE being paged.

In some embodiments, the exemplary method of flowchart 1500 of FIG. 15 is implemented by communications devices in communications system 1600 of FIG. 15; the macro cell base station, e.g., macro cell BS 1 1604, uses licensed spectrum; and the small cell base stations, e.g., small cell base station 1 1608, use unlicensed spectrum.

In some embodiments, a small cell base station, e.g., small cell base station 1 1608, is within a coverage area, e.g., coverage area 1605, of the macro cell base station, e.g., macro cell BS 1 1604, and fills in a dead zone in the macro cell base station coverage area. In some embodiments, a small cell base station, e.g., small cell base station 3 1612 has a coverage area, e.g., coverage area 1613 which partially overlaps the macro cell base station coverage area, e.g., 1605 and the coverage area, e.g., coverage area 1607, of another (macro cell) base station, e.g., macro cell base station 2 1606, said small cell base station, e.g., small cell base station 3 1612, being at a location corresponding to a boundary area between macro cell base stations, e.g., macro cell BS 1 1604 and macro cell BS 2 1606.

Figure 30:
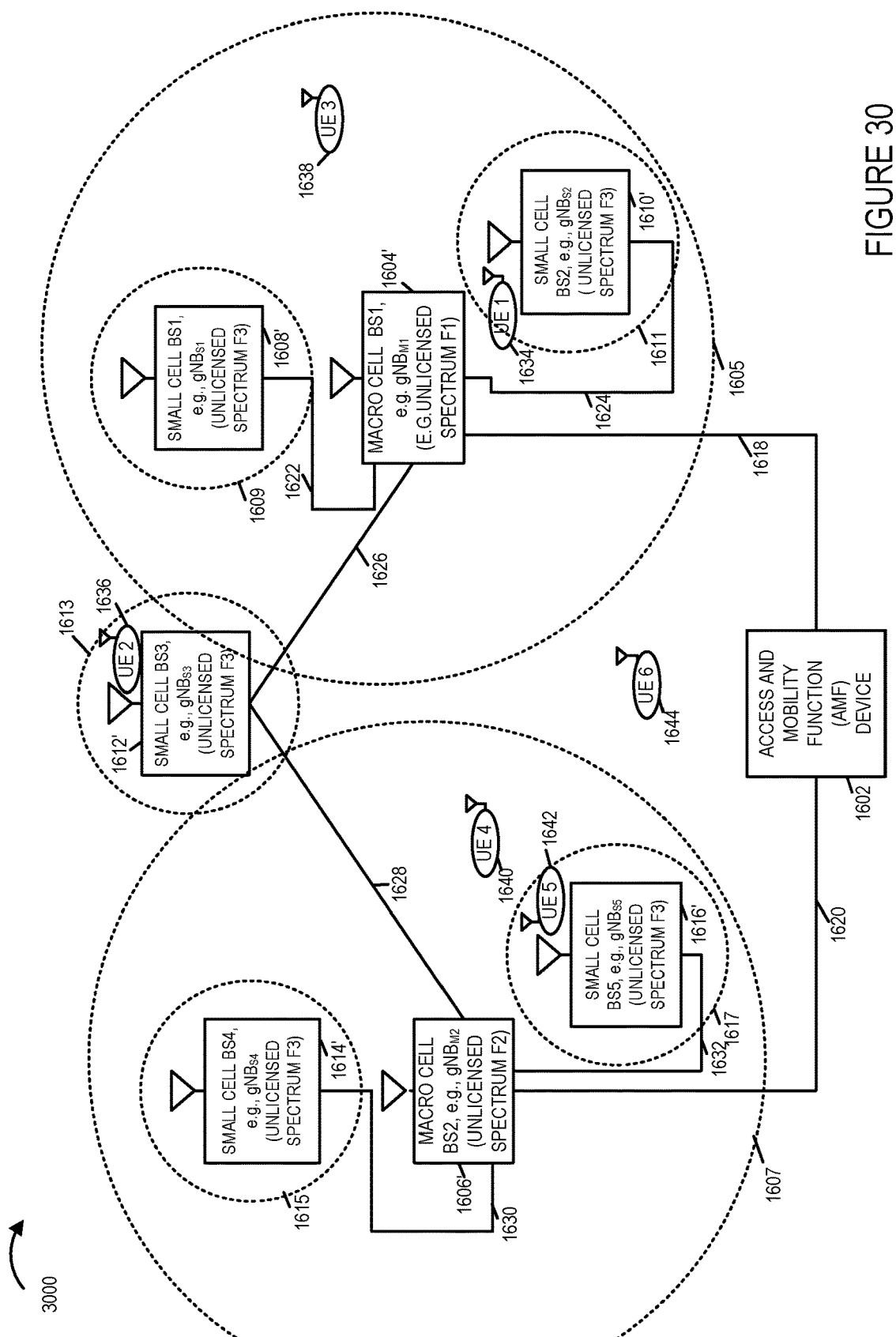
FIG. 30 is a drawing of an exemplary communications system in which both the macro cell base stations and small cell base stations use unlicensed spectrum, in accordance with an exemplary embodiment.

In some embodiments, the exemplary method of flowchart 1500 of FIG. 15 is implemented by communications devices in communications system 3000 of FIG. 30; the macro cell base station uses unlicensed spectrum, e.g., macro cell BS 1 1604' uses unlicensed spectrum F1; and the small cell base stations use unlicensed spectrum, e.g., small cell base station 1 1608' uses unlicensed spectrum F3, where F1 is different from F1. In some such embodiments, a small cell base station, e.g., small cell base station 1 1608', is within a coverage area, e.g., coverage area 1605, of the macro cell base station, e.g., macro cell BS 1 1604', and fills in a dead zone in the macro cell base station coverage area.

In some embodiments, said the determining of step 1506 is based on at least two of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

In some embodiments, the determining of step 1506 is based on at least three of: i) historical cell information (1510); ii) first UE mobility pattern information (1512); iii) signal measurement reports communicated by the first UE to the first base station (1514); iv) channel quality information feedback (1516) communicated by the first UE to the first base station or another network device (1518), v) physical downlink control channel load on a physical downlink control channel (PDCCH) at the first base station, vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

Figure 32:
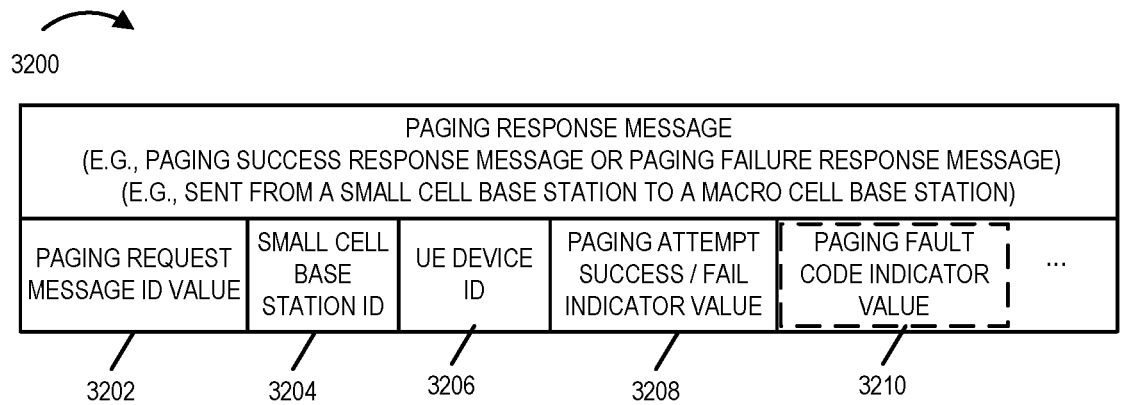
FIG. 32 is a drawing of an exemplary paging response message in accordance with some exemplary embodiments, e.g., some embodiments, in which both paging success and paging failure response messages are generated and transmitted.

In some embodiments, the exemplary method includes communicating, e.g., between a small cell base station and a macro cell base station, paging success response messages and paging failure response messages, e.g. the exemplary method uses a paging response message format such as shown in exemplary paging response message 3200 of FIG. 32, which includes a paging attempt success/fail indicator value field 3208 and, in the case of failure, further includes a paging fault code indicator value field 3210.

Figure 33:
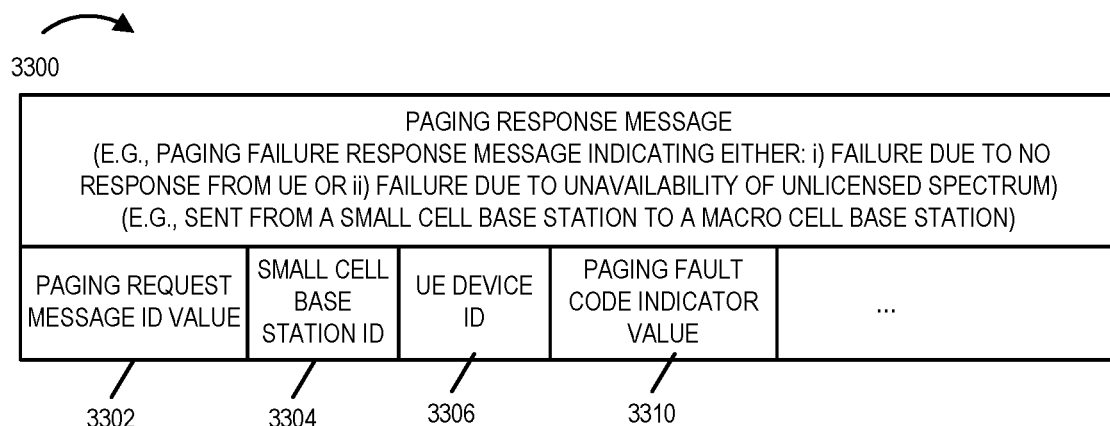
FIG. 33 is a drawing of another exemplary paging response message in accordance with some exemplary embodiments, e.g., some embodiments, in which paging failure response messages are generated and transmitted.
Figure 34:
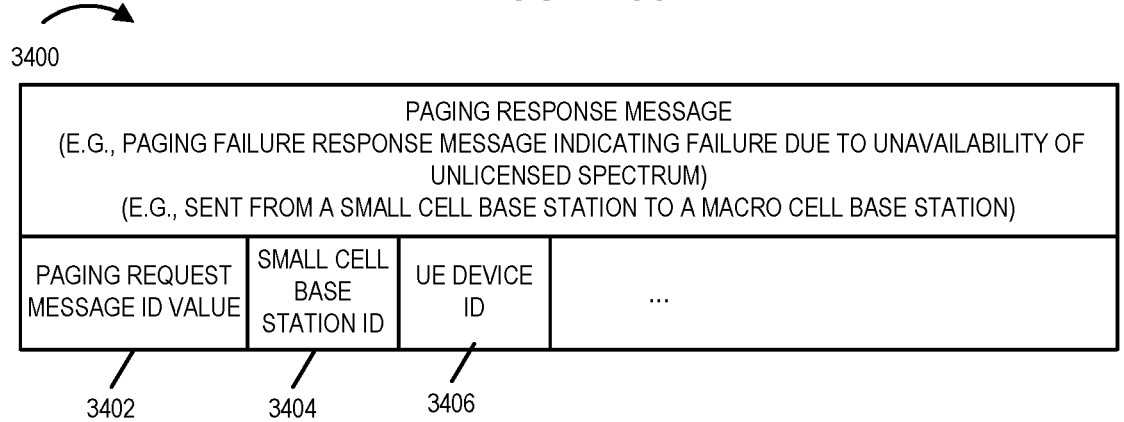
FIG. 34 is a drawing of another exemplary paging response message in accordance with some exemplary embodiments, e.g., some embodiments, in which paging failure response messages are generated and transmitted, in response to a determination of unavailability of unlicensed spectrum.

In some embodiments, the exemplary method includes communicating paging failure response messages but does not include communicating paging success response messages, e.g., the exemplary method uses a paging response message format such as shown in exemplary paging response message 3300 FIG. 33 or exemplary paging response message 3400 of FIG. 34. In the example of FIG. 33 the paging failure response message 3300 includes a paging fault code indicator value field 3310, which communicates which one of a plurality of different types of faults occurred to result in paging failure, e.g., i) UE did not respond to a paging signal transmitted by the small cell base station or ii) unlicensed spectrum was currently unavailable (LBT failed to clear) so the small cell base station did not transmit a paging signal.

In an embodiment implementing the exemplary paging response message 3400 of FIG. 34, the paging failure response message 3400 is sent by the small cell base station to the macro cell base station if the paging attempt at the small cell base station to page the UE failed due to unavailability of unlicensed spectrum (LBT failed to clear), but the small cell base station does not send a paging failure response message to the macro cell base station when the paging failure is due to no response from the UE.

In some embodiments, the paging response message received by the macro cell base station from a small cell base station may, and sometimes does, indicates a paging failure and further indicates the reason for the paging attempt failure (see step 1543). In some such embodiments, the paging response message includes information (e.g., a failure cause code—see exemplary paging response messages 3200, 3300 of FIG. 32, 33, respectively) indicating the reason for the paging attempt failure which indicates one of: i) unavailability of the unlicensed spectrum (LBT fails to clear) resulting in no paging signal transmitted by the first small cell base station or ii) no response received from the first UE device in response to a transmitted paging signal.

In some embodiments, the paging response message received by the macro cell base station from the first small cell base station may, and sometimes does, indicates a paging failure and indicates (explicitly (e.g., via a fail code included in the message—see exemplary message 3200 of FIG. 32 and exemplary message 3300 of FIG. 33) or implicitly (e.g., via transmission of a paging response message—see exemplary message 3400 of FIG. 34) the reason for the paging attempt failure is unavailability of the unlicensed spectrum (LBT fails to clear) resulting in no paging signal being transmitted by the first small cell base station.

In various embodiments, the steps of FIGS. 15A and 15B may be, and sometimes are, performed multiple times. In one example, during different iterations of the steps of FIG. 15A and FIG. 15B, the macro cell base station selects different sets of base station which are to attempt to page the first UE. For example, during a second iteration the selected set of base stations which are to attempt to page the UE includes at least one new base station which was not selected in the first iteration.

In various embodiments, the section, by a macro cell base station, of a set of base stations which are to attempt to page a particular UE is UE specific. For example, the macro cell base station selects a first set of base stations which are to page a first UE and a second set of base stations which are to page a second UE, and the first and second sets may be, and sometimes are different, e.g. even though the first and second UEs may be located in the same approximate location within the macro cell and are to be paged at the same approximate time.

Figure 16:
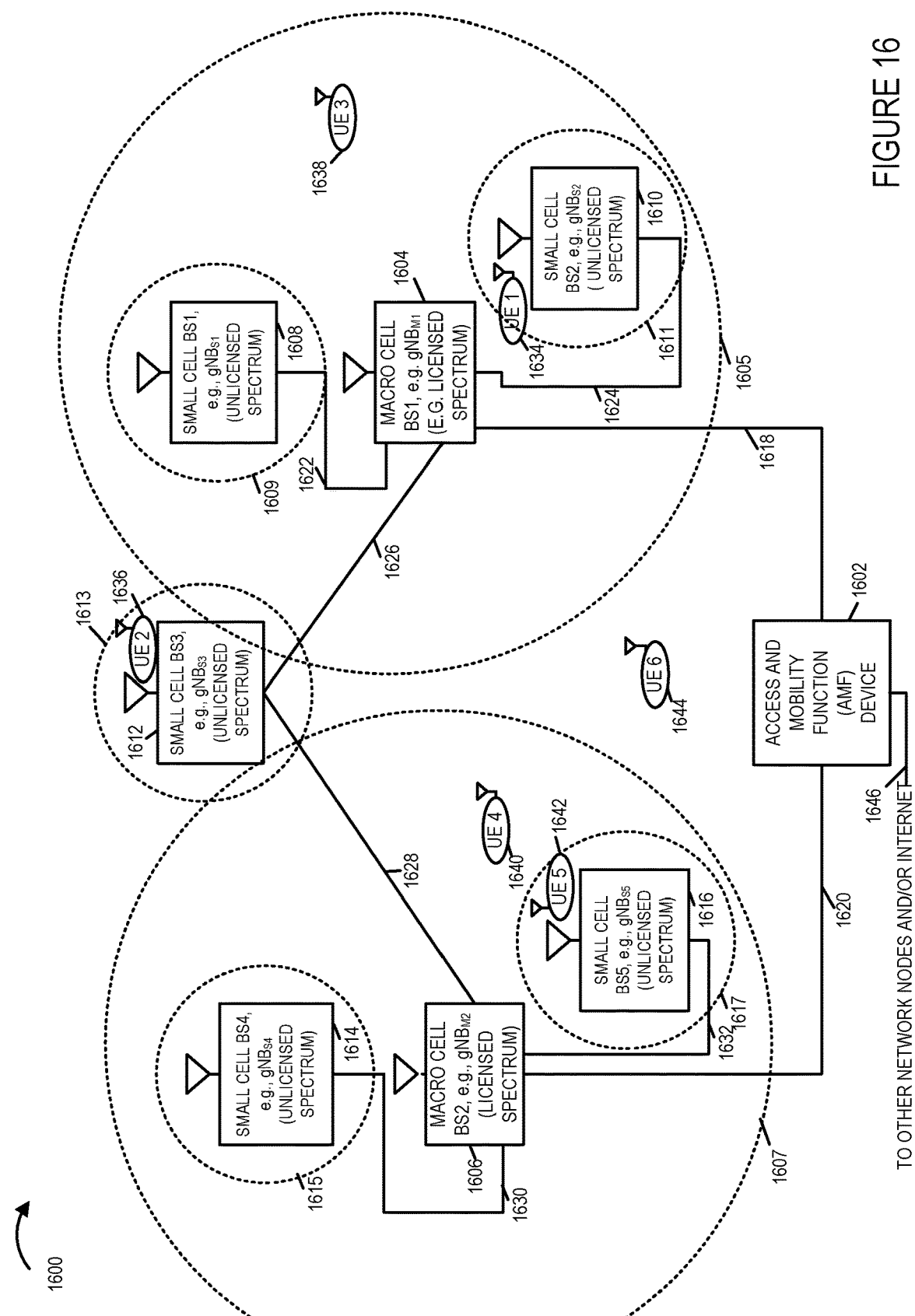
FIG. 16 is a drawing of an exemplary communications system in accordance with an exemplary embodiment.
Figure 17:
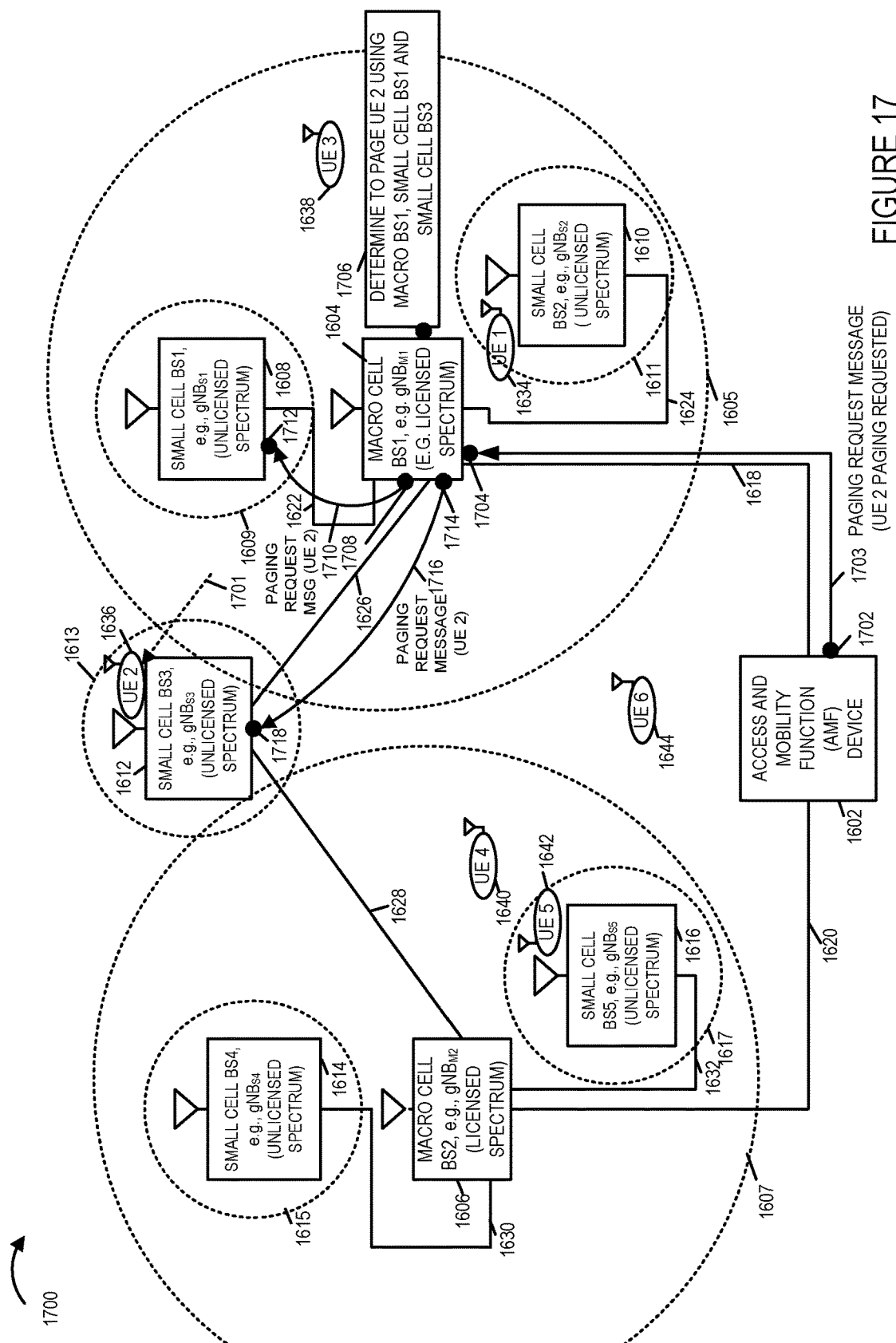
FIG. 17 is a drawing which illustrates exemplary signaling and exemplary steps performed in the system of FIG. 16 including an exemplary macro cell base station receiving a paging request to page a UE, determining a set of base stations including a group of small cell base stations which are to attempt to page the UE, and sending a paging request to each of the small cell base stations in the group, in accordance with an exemplary embodiment.

FIG. 16 is a drawing of an exemplary communications system 1600 in accordance with an exemplary embodiment. Exemplary communications system 1600 includes an access and mobility function (AMF) device 1602, which is a network node, a plurality of macro cell base stations (macro cell base station 1 (BS1) 1604, e.g., gNBM1 using licensed spectrum, macro cell base station 2 (BS2) 1606, e.g., gNBM2 using licensed spectrum, and a plurality of small cell base stations (small cell base station 1 (BS1) 1608, e.g., gNBS1 using unlicensed spectrum, small cell base station 2 (BS2) 1610, e.g., gNBS2 using unlicensed spectrum, small cell base station 3 (BS3) 1612, e.g., gNBS3 using unlicensed spectrum, small cell base station 4 (BS4) 1614, e.g., gNBS4 using unlicensed spectrum, small cell base station 5 (BS5) 1616, e.g., gNBS5 using unlicensed spectrum) coupled together as shown in FIG. 16. AMF device 1602 is coupled to macro cell BS 1 1604 via communications link 1618. AMF device 1602 is coupled to macro cell BS 2 1606 via communications link 1620. Macro base station 1 1604 is coupled to small cell base stations (small cell base station 1 1608, small cell base station 2 1610, small cell base station 3 1612) via communications links (1622, 1624, 1626), respectively. Macro base station 2 1606 is coupled to small cell base stations (small cell base station 3 1612, small cell base station 4 1614, small cell base station 5 1616) via communications links (1628, 1630, 1632), respectively. AMF device 1602 is coupled to other network nodes and/or the Internet via communications link 1646.

Macro cell base station 1 1604 has a wireless coverage area represented by dashed line circle 1605. Macro cell base station 2 1606 has a wireless coverage area represented by dashed line circle 1607. Each of the small cell base stations (small cell base station 1 1608, small cell base station 2 1610, small cell base station 3 1612, small cell base station 4 1614, small cell base station 5 1616), has a corresponding wireless coverage area represented by dashed line circles (1609, 1611, 1613, 1615, 1617), respectively.

Small cell base station 1 1608 and small cell base station 2 1610 are located inside the wireless coverage area 1605 corresponding to macro cell base station 1 1604. In some embodiments, the small cell base stations (1608, 1610) are intentionally located to provide wireless coverage for dead zones within the macro base station wireless coverage area 1605.

Small cell base station 4 1614 and small cell base station 5 1616 are located inside the wireless coverage area 1607 corresponding to macro cell base station 2 1606. In some embodiments, the small cell base stations (1614, 1616) are intentionally located to provide wireless coverage for dead zones within the macro base station wireless coverage area 1607.

Small cell base station 3 1612 has a wireless coverage area 1613, which partially overlaps the wireless coverage area (1605, 1607). Thus small cell base station 3 1612 is intentionally located to provide wireless coverage in a gap region between the coverage provided by the two macro base stations (1604, 1606).

The exemplary communications system 1600 further includes a plurality of user equipment (UE) devices (UE 1 1634, UE 2 1636, UE 3 1638, UE 4 1640, UE 5 1642, UE 6 1644) which may move throughout the communications system 1600 and communicate via different base stations at different times.

Exemplary communications system 1600 supports novel paging methods and apparatus in accordance with various exemplary embodiments. The communications system of FIG. 16 supports the exemplary methods of flowchart 1500 of FIG. 15 and flowchart 2500 of FIG. 25.

FIGS. 17-24 are used to illustrate exemplary steps and exemplary signaling, which may be performed with regard to system 1600 of FIG. 16 in accordance with various exemplary embodiments. Drawing 1700 of FIG. 17 will now be described. In drawing 1700 of FIG. 17, in step 1702 the AMF device 1602 generates and sends paging request message 1703 to macro cell base station 1 1604. Paging request message 1703 communicates a request that UE 2 1636 be paged. In step 1704, macro cell BS 1 1604 receives paging request message 1703 and recovers the communicated information. UE2 1636 has previously moved to its current location, from its previous known location as indicated by arrow 1701.

In step 1706 macro cell BS 1 1604 determines to page UE 2 1636 using macro BS 1 1604, small cell base station 1 1608 and small cell base station 3 1612. Thus the determined set of base stations to be used to page UE 2 1636 is the set of {macro BS 1 1604, small cell BS 1 1608, small cell BS 3 1612}, and the determined group of small cell base stations to be used to page UE 2 1636 is the group of: small cell BS 1 1608 and small cell BS 3 1612.

In step 1708 macro cell BS 1 1604 generates and sends paging request message 1710 to small cell BS1 1608, requesting that UE 2 1636 be paged. In step 1712 small cell BS 1 1608 receives paging request message 1710 and recovers the communicated information.

In step 1714 macro cell BS 1 1604 generates and sends paging request message 1716 to small cell BS3 1612, requesting that UE 2 1636 be paged. In step 1718 small cell BS 3 1612 receives paging request message 1716 and recovers the communicated information.

Drawing 1800 of FIG. 18 will now be described. In drawing 1800 of FIG. 18, in step 1804 small cell base station 1 1608, which uses unlicensed spectrum and which has been requested to page UE2 1636, performs a listen-before-talk operation, which determines that the unlicensed spectrum is currently unavailable; therefore, small cell BS 1 1608 is unable to transmit the requested paging signal. In step 1806 small cell base station 3 1612, which uses unlicensed spectrum and which has been requested to page UE2 1636, performs a listen-before-talk operation, which determines that the unlicensed spectrum is currently unavailable; therefore, small cell BS 3 1612 is unable to transmit the requested paging signal. In step 1808 macro cell base station 1 1604, which uses licensed spectrum, transmits a paging signal directed to UE2 1636. In step 1810 macro cell base station 1 1604 monitors for a response signal, e.g. a RRC connection establishment signal, from UE 2 1636 in response to the transmitted paging signal, but does not receive a reply since UE 2 1636 is currently outside coverage area 1605.

Drawing 1900 of FIG. 19 will now be described. In drawing 1900 of FIG. 19, in step 1902 small cell base station 3 1612 generates and sends paging response message 1904 to macro cell base station 1 1604. Paging response message 1904 includes information indicating that the attempt to page UE 2 was a failure and that small cell base station 3 1612 did not transmit a paging message to page UE 2 because the spectrum was unavailable. In step 1906 macro cell BS 1 1604 receives paging response message 1904 and recovers the communicated information. In step 1908 small cell base station 1 1608 generates and sends paging response message 1910 to macro cell base station 1 1604. Paging response message 1910 includes information indicating that the attempt to page UE 2 was a failure and that small cell base station 1 1608 did not transmit a paging message to page UE 2 because the spectrum was unavailable. In step 1912 macro cell BS 1 604 receives paging response message 1910 and recovers the communicated information.

In step 1914 macro cell BS 1 1604 generates and sends paging response message 1916 to AMF device 1602. Paging response message 1916 includes information indicating that the UE 2 paging attempt was a failure and that the paging message was not sent in unlicensed spectrum because the unlicensed spectrum was unavailable, e.g. in each of the small cells in which paging was attempted. In some embodiments, the paging response message may, and sometime does, includes failure type information on a per base station basis, e.g., a per small cell base station basis.

Figure 18:
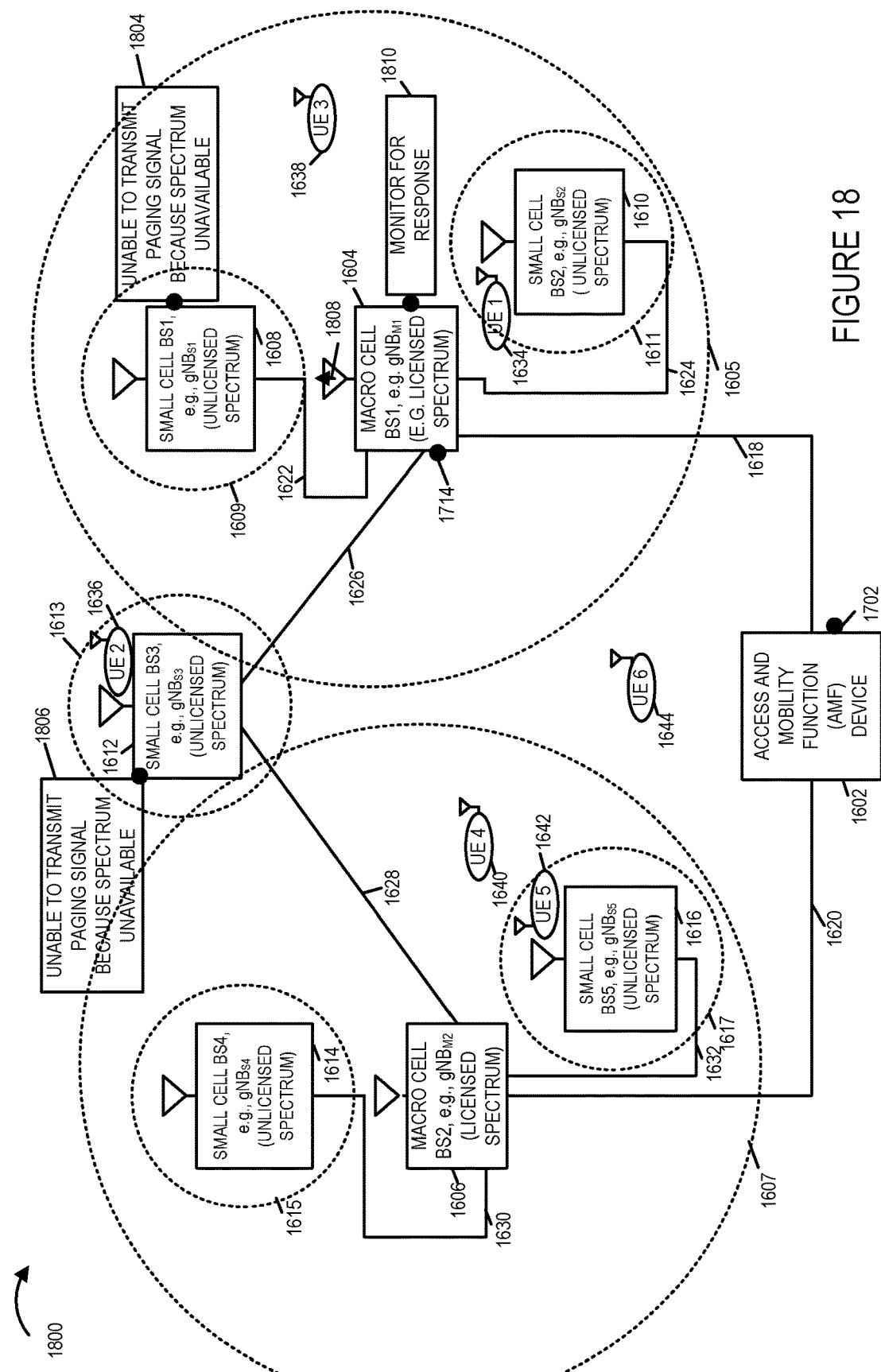
FIG. 18, which is a continuation of FIG. 17, illustrates an example in which the macro base station is able to transmit a paging signal to page the UE; however, the small cell base stations are unable to transmit a paging signal because the unlicensed spectrum used by the small cell base stations is unavailable.
Figure 19:
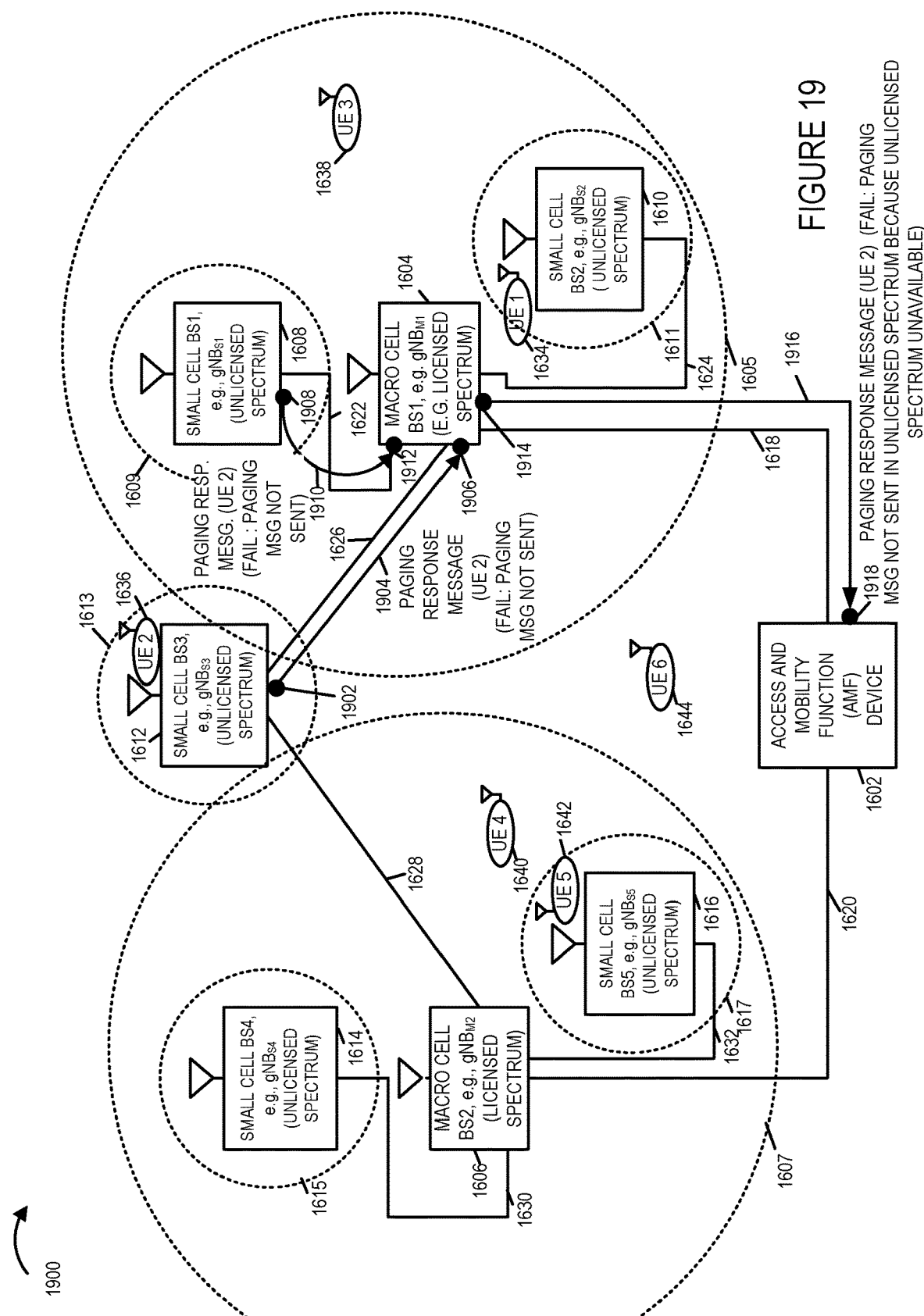
FIG. 19, which is a continuation of FIG. 18, illustrates exemplary paging response messages between the small cell base stations and the macro cell base station, and between the macro cell base station and the access and mobility function device, which indicate that the paging attempt was unsuccessful and that intended paging messages were not transmitted due to unavailability of unlicensed spectrum.
Figure 20:
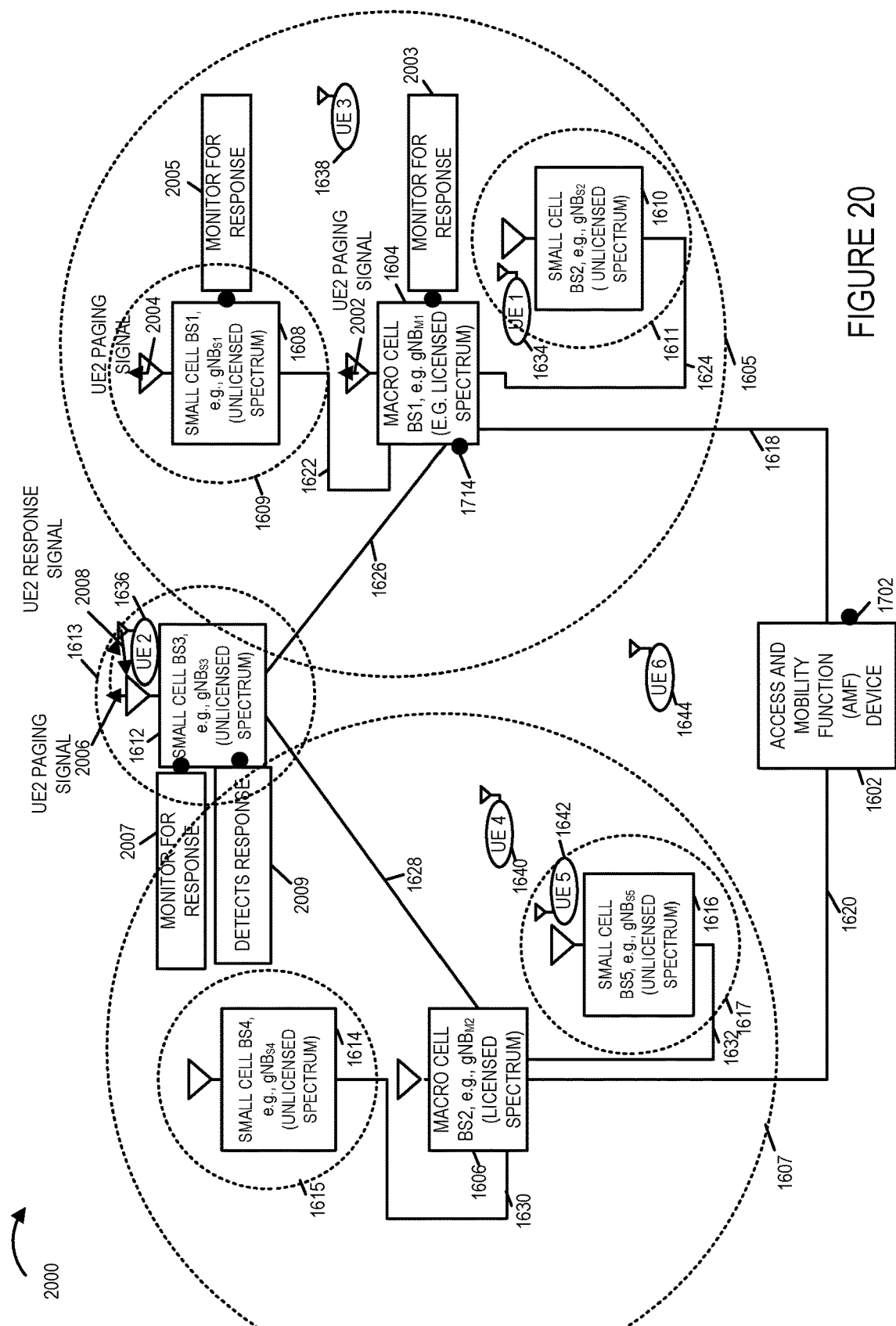
FIG. 20, which is a continuation of FIG. 17, illustrates an alternative example in which the macro base station and the small cell base stations are able to transmit a paging signal to page the UE; and one of the small cell base stations detects a paging response from the UE being paged.
Figure 21:
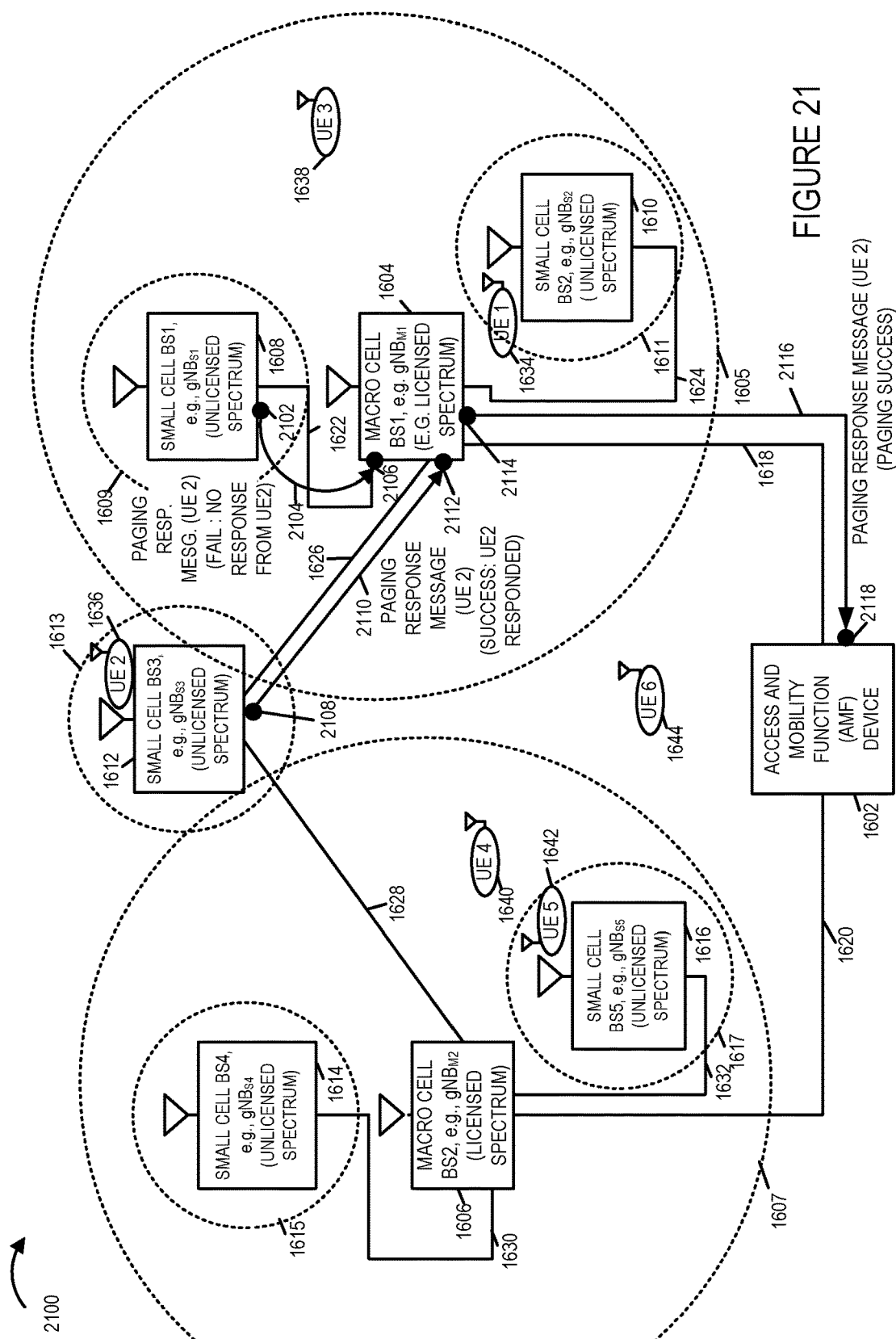
FIG. 21, which is a continuation of FIG. 20, illustrates a paging failure response message from a first small cell base station to the macro cell base station, a paging success response message from a second small cell base station to the macro cell base station, and a paging success response message from the macro base station to the AMF in accordance with an exemplary embodiment.

FIGS. 20 and 21 provide an exemplary alternative scenario, e.g., a paging attempt success scenario, to the example of FIGS. 18 and 19. FIG. 20 may be considered a continuation from FIG. 17. Drawing 2000 of FIG. 20 will now be described. In drawing 2000 of FIG. 20, in step 2002 macro cell base station 1 1604, which uses licensed spectrum, transmits a paging signal directed to UE2 1636. In step 2003 macro cell base station 1 1604 monitors for a response signal, e.g., a RRC connection establishment signal, from UE 2 1636 in response to the transmitted paging signal, but does not receive a reply since UE 2 1636 is currently outside coverage area 1605. In step 2004 small cell base station 1 1608, which uses unlicensed spectrum and which has been requested to page UE2 1636, performs a listen-before-talk operation, which determines that the unlicensed spectrum is currently available; therefore, small cell BS 1 1608 transmits the requested UE 2 paging signal. In step 2005 small cell BS 1 1608 monitors for a response signal, e.g., a RRC connection establishment signal, from UE 2 1636 in response to the transmitted paging signal, but does not receive a reply since UE 2 1636 is currently outside coverage area 1609. In step 2006 small cell base station 3 1612, which uses unlicensed spectrum and which has been requested to page UE2 1636, performs a listen-before-talk operation, which determines that the unlicensed spectrum is currently available; therefore, small cell BS 3 1612 transmit the requested paging signal. In step 2008 UE 2 receives the paging signal and, in response generates and sends a response signal, e.g., a RRC connection establishment signal, to small cell base station 3 1612. Small cell base station 3 1612, which has been monitoring for a response to its transmitted paging signal in step 2007, detects the response signal, e.g., the RRC connection establishment signal, from UE 2 1636, as indicated in step 2009.

Drawing 2100 of FIG. 21 will now be described. In drawing 2100 of FIG. 21, in step 2102 small cell base station 1 1608 generates and sends paging response message 2104 to macro cell base station 1 1604. Paging response message 2104 includes information indicating that the attempt to page UE 2 was a failure and that small cell base station 1 1608 transmitted a paging message to page UE 2 but did not receive a response from UE 2. In step 2106 macro cell BS 1 1604 receives paging response message 2104 and recovers the communicated information. In step 2108 small cell base station 3 1612 generates and sends paging response message 2110 to macro cell base station 1 1604. Paging response message 2110 includes information indicating that the attempt to page UE 2 was a success. In step 2112 macro cell BS 1 1604 receives paging response message 2110 and recovers the communicated information.

In step 2114 macro cell BS 1 1604 generates and sends paging response message 2116 to AMF device 1602, e.g., based on the combined paging attempt results of the paging attempted by the selected set of base stations. Paging response message 2116 includes information indicating that the UE 2 page attempt was a success.

Figure 22:
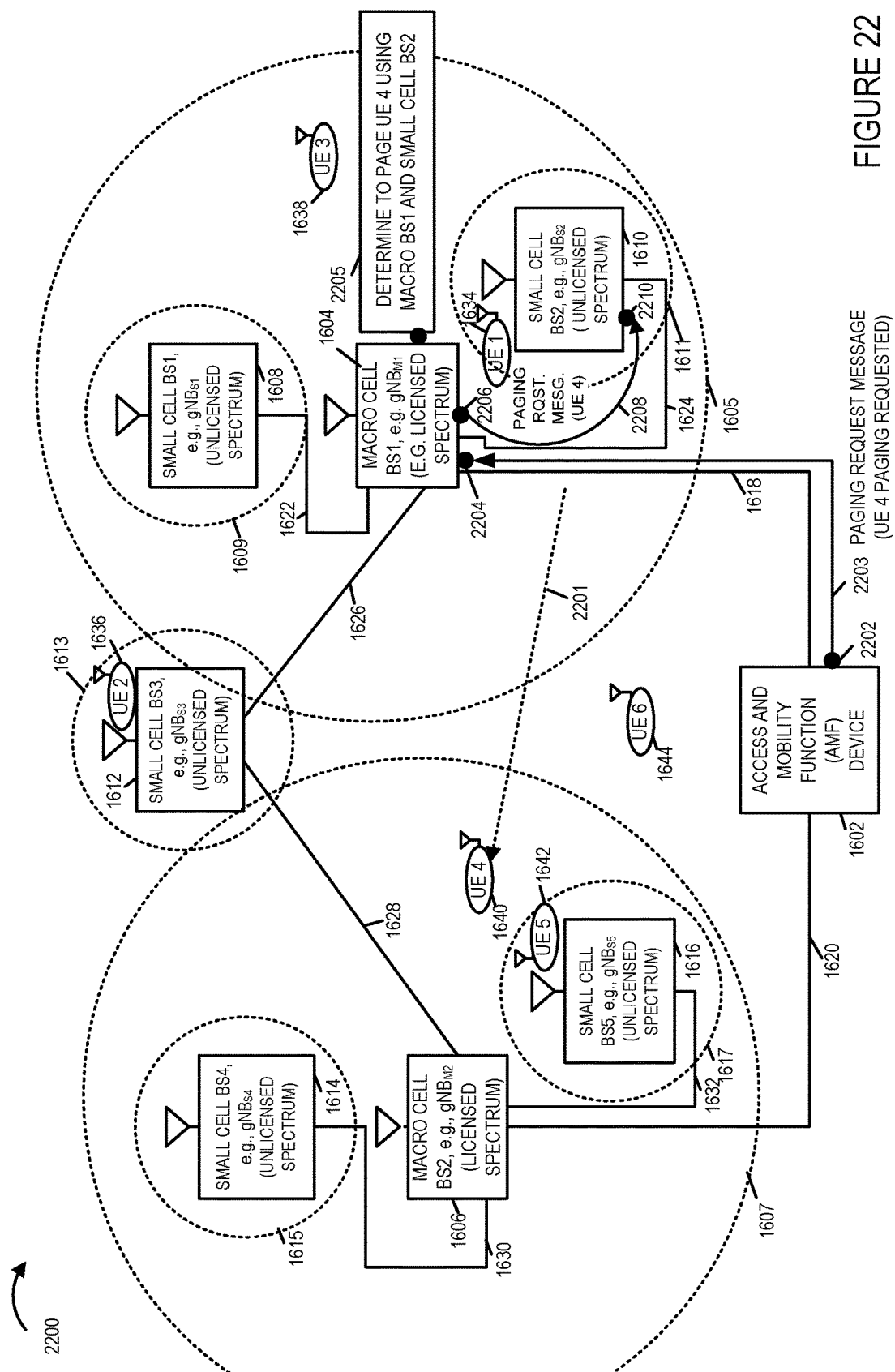
FIG. 22 is a drawing which illustrates exemplary signaling and exemplary steps performed in the system of FIG. 16 including an exemplary macro cell base station receiving a paging request to page another UE, determining a set of base stations including a group of small cell base stations which are to attempt to page the another UE, and sending a paging request to each of the small cell base stations in the group, in accordance with an exemplary embodiment.
Figure 23:
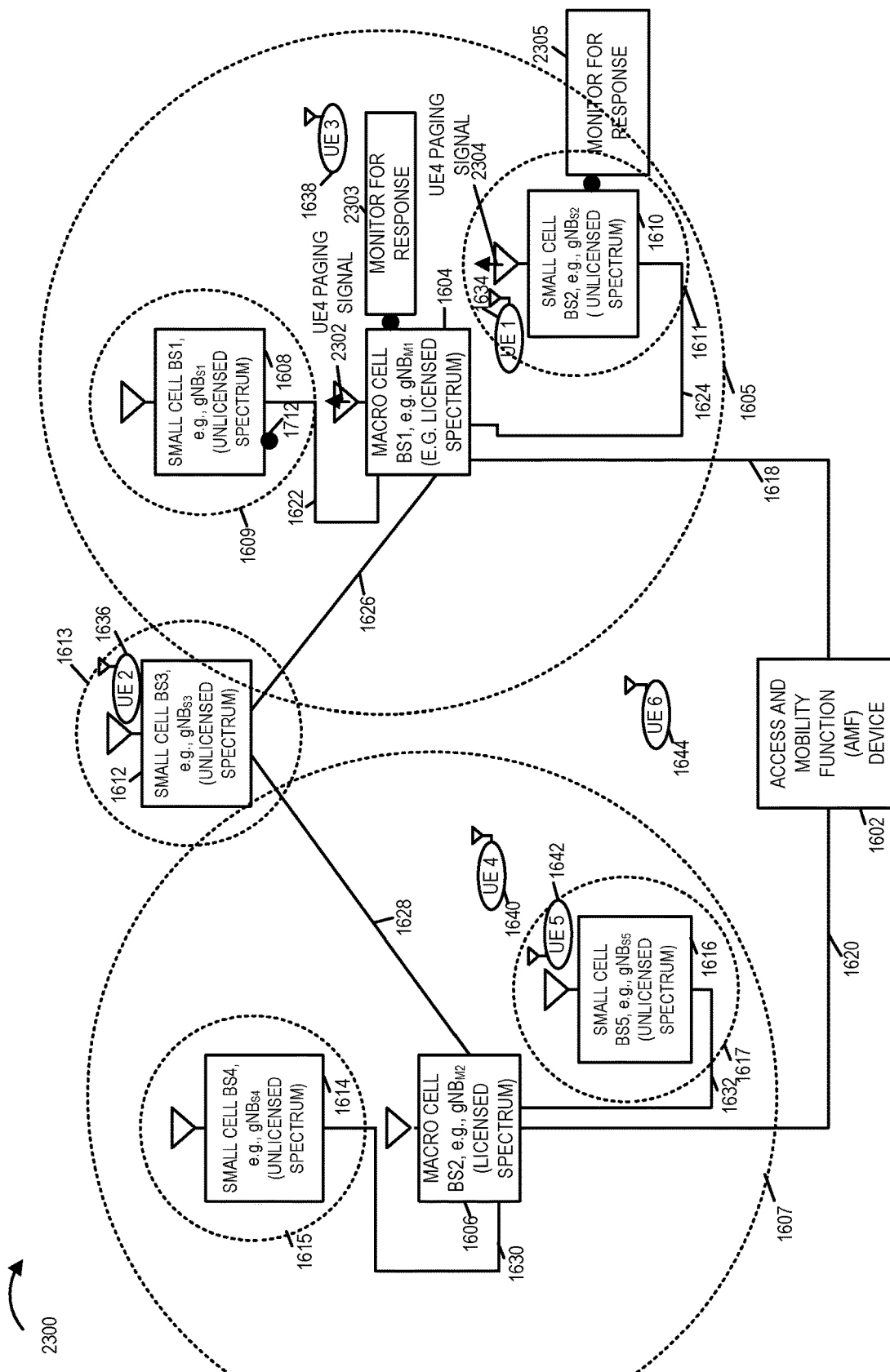
FIG. 23, which is a continuation of FIG. 22, illustrates an example in which the macro base station and the small cell base station in the determined group are able to transmit a paging signal to page the UE; however, the UE does not respond to the paging signals, since the UE is not in the coverage areas into which the paging signals were transmitted.
Figure 24:
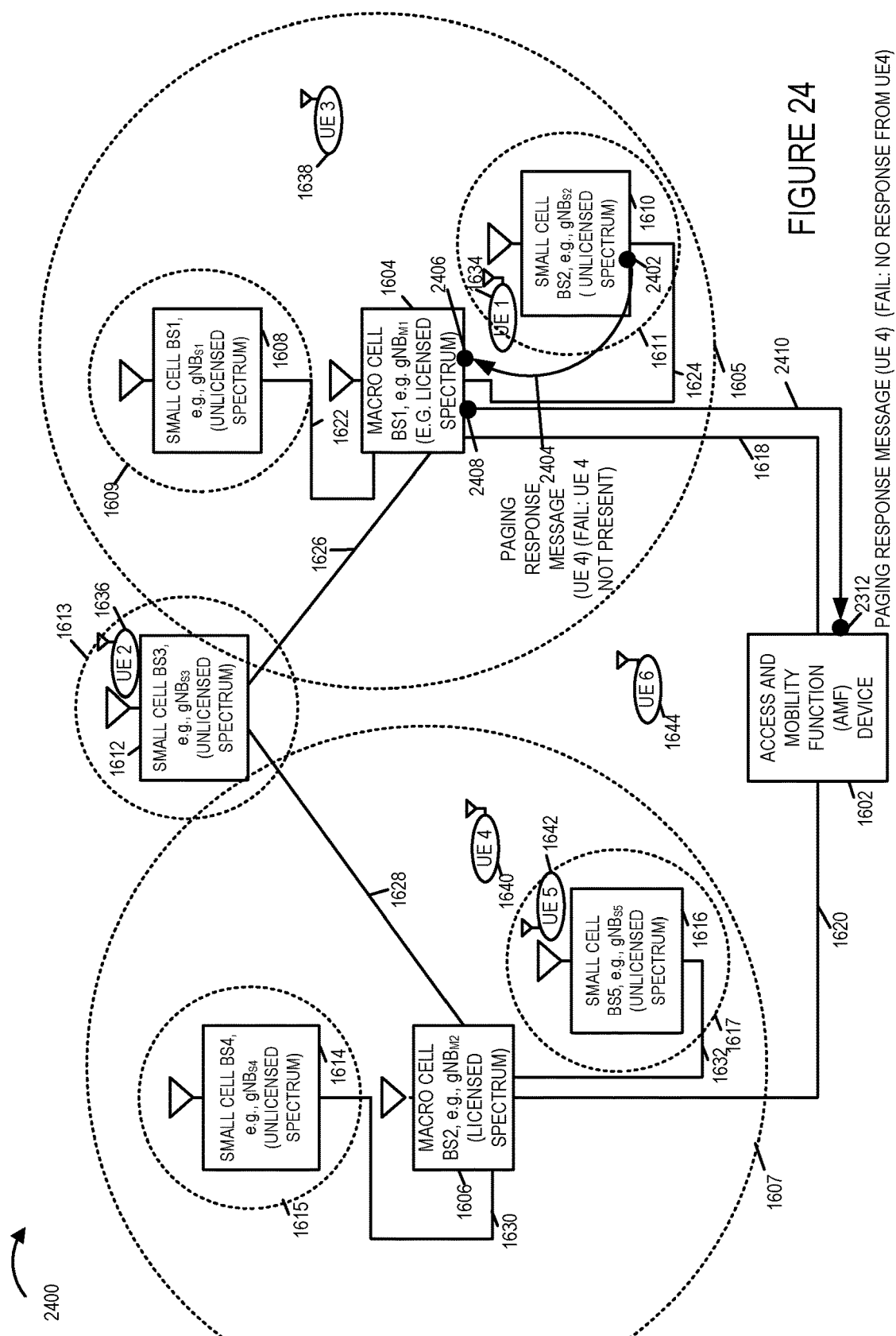
FIG. 24, which is a continuation of FIG. 23, illustrates a paging failure response message from the small cell base station to the macro cell base station, and a paging failure response message from the macro base station to the AMF, said paging failure response message communicating that the paging attempt failure was due to no response from the UE, in accordance with an exemplary embodiment.

FIGS. 22-24 illustrate another example of paging related steps and signaling in accordance with an exemplary embodiment. Drawing 2200 of FIG. 22 will now be described. In drawing 2200 of FIG. 22, in step 2202 the AMF device 1602 generates and sends paging request message 2203 to macro cell base station 1 1604. Paging request message 2203 conveys information indicating that paging of UE 4 1640 is requested. In step 2204 macro cell BS 1 1504 receives the paging request message 2203 and recovers the communicated information. Dotted line arrow 2201 indicates the motion of UE 4, e.g., from the last known position fix to its current location. Macro cell BS 1 1604 determines to page UE 4 using macro BS 1 1604 and using small cell base station 2 1610, which is close to the last known position fix for UE 4 1640. Thus macro cell base stations determines that the set of base stations, e.g. under its control, which are to attempt paging of UE 4 1640 is {macro cell BS 1 1604 and small cell BS 2 1610}, and the group of small cells, e.g., under its hierarchy, which are to attempt paging of UE 4 is a group of 1 small cell BS, which is small cell BS 2 1610. In step 2206 macro cell BS 1 1604 generates and sends paging request message 2208 to small cell BS 2 1610 requesting that UE 4 1640 be paged. In step 2210 small cell BS 2 1610 receives the paging request message 2208 and recovers the communicated information.

Drawing 2300 of FIG. 23 will now be described. In drawing 2300 of FIG. 23, in step 2302 macro cell BS 1 1604 generates and transmits UE 4 paging signals and in step 2303 macro cell BS 1 1604 monitors for a response signal, e.g., a RRC connection establishment signal, from UE 4; however, UE 4 1640 is currently outside coverage area 1605; therefore, macro cell BS 1 1604 does not receive a response signal from UE 4 1640. In step 2305, small cell BS 2 1610 performs a listen-before-talk operation, determines that the unlicensed spectrum is available, and transmits UE 4 paging signals. In step 2305 small cell BS 2 1610 monitors for a response signal, e.g., a RRC connection establishment signal, from UE 4; however, UE 4 1640 is currently outside coverage area 1611; therefore, small cell BS 2 1610 does not receive a response signal from UE 4 1640.

Drawing 2400 of FIG. 24 will now be described. In drawing 2400 of FIG. 24, in step 2402 small cell base station 2 1610 generates and sends paging response message 2404 to macro cell base station 1 1604. Paging response message 2404 includes information indicating that the attempt to page UE 4 was a failure and that small cell base station 2 1610 transmitted a paging message to page UE 4 but did not receive a response from UE 4. In step 2406 macro cell BS 1 1604 receives paging response message 2404 and recovers the communicated information. In step 2408 macro cell BS 1 1604 generates and sends paging response message 2410 to AMF device 1602. Paging response message 2410 includes information indicating that the UE 4 page attempt was a failure and that paging signals were transmitted by each of the selected base stations but that no paging response was received from UE 4. In step 2312 the access and mobility function device 1602 receives paging response message 2410 and recovers the communicated information. The AMF device uses the communicated information in determining a paging escalation strategy. For example, since the macro cell BS 1 1604 controlled paging was unsuccessful and paging signals were transmitted in each of the selected small cell base station's under macro cell BS 1's control, the AMF 1602 may, and sometimes does, decide to send a paging request to page UE 4 1642 to macro cell BS 2 1606.

Figure 25A:
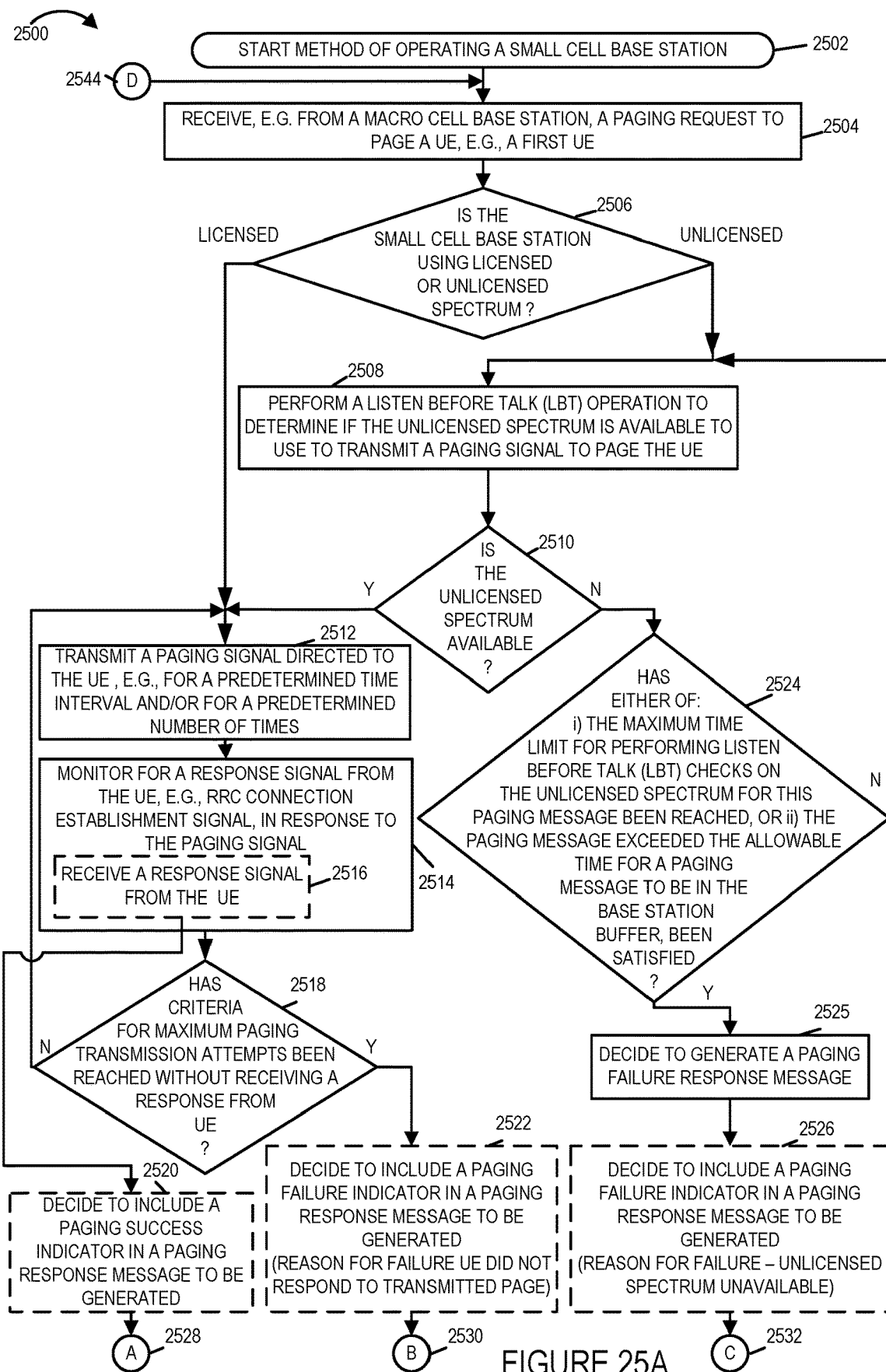
FIG. 25 is a flowchart of an exemplary method of operating a small cell base station, in accordance with an exemplary embodiment, said exemplary method including paging related operations.
Figures 25, 25A, 25B:
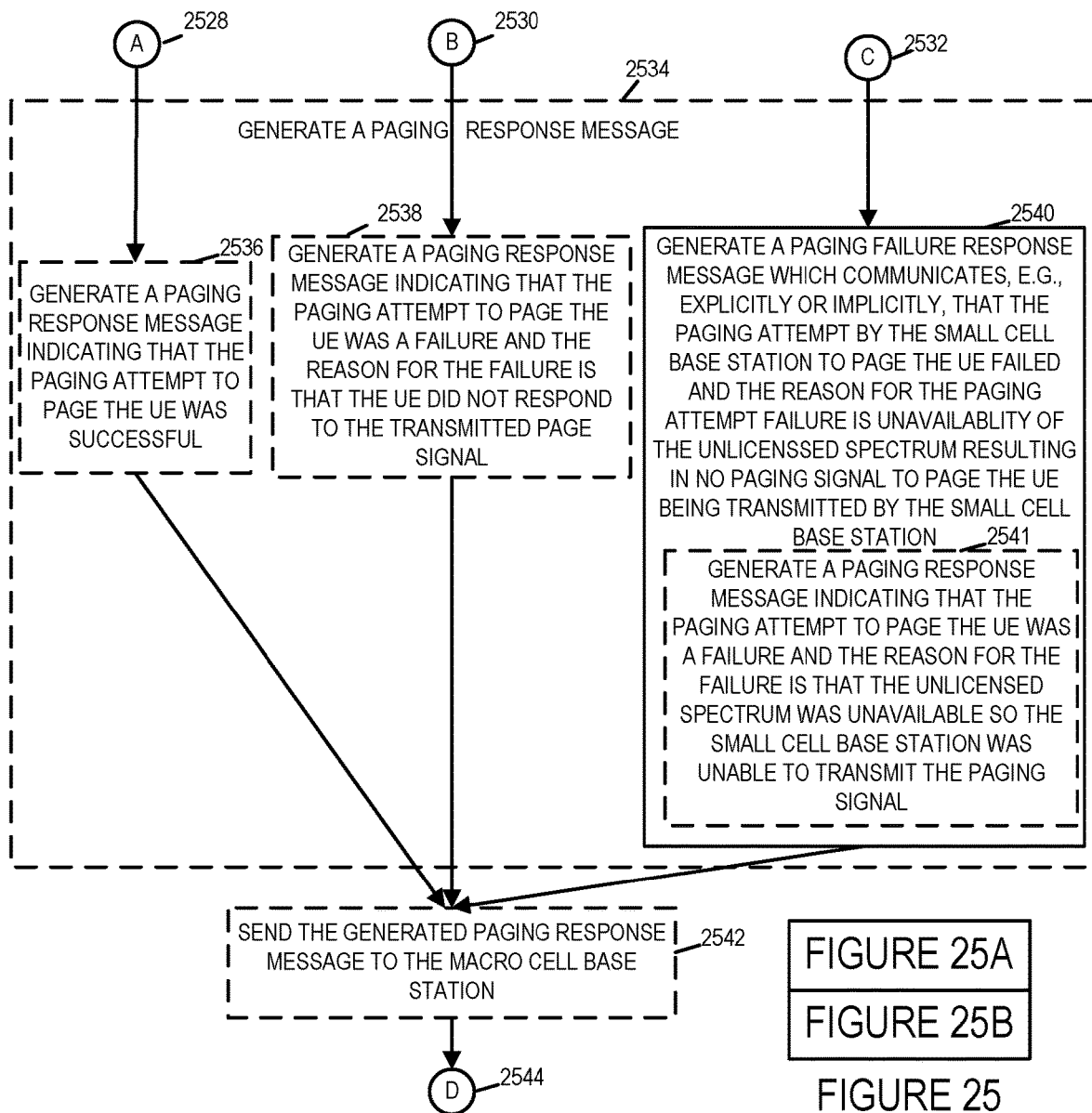

FIG. 25 is a flowchart 2500 of an exemplary method of operating a small cell base station in accordance with an exemplary embodiment. The small cell base station implementing the method of flowchart 2500 is, e.g., one of the small cell base stations (small cell base station 1 1608, small cell base station 2 1610, small cell base station 3 1612, small cell base station 4 1614, small cell base station 5 1616) of system 1600 of FIGS. 16-24, or one of the small cell base stations (small cell base station 1 1608', small cell base station 2 1610', small cell base station 3' 1612', small cell base station 4 1614', small cell base station 5 1616') of system 3000 of FIG. 30, or one of the small cell base stations (small cell base station 1 1608", small cell base station 2 1610", small cell base station 3 1612", small cell base station 4 1614", small cell base station 5 1616") of system 3100 of FIG. 31.

Operation of the exemplary method starts in step 2502, in which the small cell base station is powered on and initialized. Operation proceeds from step 2502 to step 2504. In step 2504 the small cell base station receives, e.g., from a macro cell base station, a paging request to page a UE, e.g., a first UE. Operation proceeds from step 2504 to step 2506.

In step 2506, if the small cell base station is using unlicensed spectrum, then operation proceeds from step 2506 to step 2508. However, if the small cell base station is using licensed spectrum, then operation proceeds from step 2506 to step 2512.

Returning to step 2508, in step 2508 the small cell base station performs a listen-before-talk (LBT) operation to determine if the unlicensed spectrum is available to use to transmit a paging signal to page the UE. Operation proceeds from step 2508 to step 2510.

In step 2510, if the determination of step 2508 is that the unlicensed spectrum is currently available to be used by the small cell base station then, operation proceeds from step 2510 to step 2512. However, if the determination of step 2508 is that the unlicensed spectrum is currently unavailable to be used by the small cell base station, then operation proceeds from step 2510 to step 2524.

Returning to step 2512, in step 2512 the small cell base station transmits a paging signal directed to the UE, e.g., for a predetermined time interval and/or for a predetermined number of times, to page the UE. Operation proceeds from step 2512 to step 2514.

In step 2514 the small cell base station monitors for a response signal from the UE, e.g. a RRC connection establishment signal, in response to the transmitted paging signal. Step 2514 may, and sometimes does, include step 2516, in which the small cell base station receives a response signal, e.g., a RRC connection establishment signal, from the UE in response to the transmitted paging signal of step 2512. Operation proceeds from step 2516 to step 2520. In step 2520 the small cell base station decides to include a paging success indicator in a paging response message to be generated. Operation proceeds from step 2520, via connecting node A 2528 to step 2536 of step 2534.

Returning to step 2514, operation proceeds from step 2514 to step 2518. In step 2518 the small cell base station determines if a criteria for maximum paging transmission attempts has been reached without receiving a response from the UE. If the determination of step 2518 is that the criteria for maximum paging attempts has not been reached then operation proceeds from step 2518 to step 2512, in which the small cell base station continues to transmit a paging signal to page the UE. However, if the determination of step 2518 is that the criteria for maximum paging attempts has been reached, then operation proceeds from step 2518 to step 2522. In step 2522 the small cell base station decides to include a paging failure indicator in a paging response message to be generated, wherein the paging failure indicator indicates that reason for the paging failure is that the UE did not respond to the paging signals transmitted by the small cell base station. Operation proceeds from step 2522, via connecting node B 2530, to step 2538 of step 2534.

Returning to step 2524, in step 2524, the small cell base station determines if either of: i) the maximum time limit for performing listen before talk (LBT) checks on the unlicensed spectrum for this paging message has been reached, or ii) the paging message exceeded the allowable time for a paging message to be in the base station buffer, has been satisfied. If the determination of step 2524 is that neither of test conditions: i) the maximum time limit for performing listen before talk (LBT) checks on the unlicensed spectrum for this paging message has been reached, or ii) the paging message exceeded the allowable time for a paging message to be in the base station buffer, has been satisfied, then operation proceeds from step 2524 to the input of step 2508, for another LBT operation. However, if the determination of step 2524 is that either of test conditions: i) the maximum time limit for performing listen before talk (LBT) checks on the unlicensed spectrum for this paging message has been reached, or ii) the paging message exceeded the allowable time for a paging message to be in the base station buffer, has been satisfied, then operation proceeds from step 2524 to step 2525 in which the small cell base station decides to transmit a paging failure response message. Operation proceeds from step 2525 to step 2526.

In step 2526 the small cell base station decides to include a paging failure indicator in a paging response message, e.g., a paging failure response message, to be generated, and the indicator indicates that the reason for failure is that the unlicensed spectrum was unavailable so the small cell base station was unable to transmit paging signals to page the UE. Operation proceeds from step 2526, via connecting node C 2532, to step 2540 of step 2534.

In step 2534, the small cell base station generates a paging response message, said paging response message indicating one of: i) an attempt at the small cell base station to page the UE was successful or ii) an attempt at the small cell base station to page the UE was unsuccessful. Step 2534 includes alternative steps 2536, 2538 and 2540. In step 2536 the small cell base station generates a paging response message indicating that the paging attempt to page the UE was successful. In step 2538 the small cell base station generates a paging response message indicating that the paging attempt to page the UE was a failure and the reason for the failure is that the UE did not respond to the transmitted paging signals. In step 2540 the small cell base station generates a paging failure response message which communicates, e.g., explicitly or implicitly, that the paging attempt by the small cell base station to page the UE failed and the reason for the paging attempt failure is unavailability of the unlicensed spectrum resulting in no paging signal being transmitted by the small cell base station. In some embodiments, step 2540 includes step 2541 in which the small cell base station generates a paging response message indicating that the paging attempt to page the UE was a failure and the reason for the failure is that the unlicensed spectrum was unavailable so the small cell base station was unable to transmit the paging signal.

Operation proceeds from step 2534 to step 2542 in which the small cell base station sends the generated paging response message to the macro cell base station, e.g., the small cell base stations transmits the generated paging response message, with the generated paging response message being communicated along a backhaul communications path and directed to the macro cell base station as the intended destination of the message. Operation proceeds from step 2542, via connecting node D 2544 to step 2504, in which the small cell base station receives another request to page a UE. The requested UE may be the same UE as previously requested or a different UE.

In some exemplary embodiments, the small cell base station does not transmit a paging response message to the macro base station indicating paging success, and steps 2520 and 2536 are not performed. For example, in some embodiments, the UE's response to paging signal transmitted from the small cell base station, which was detected by the UE, is to establish RRC connection with small cell the base station corresponding to the received paging signal, and then the UE starts NAS interaction, e.g., with an AMF, to transition to CONNECTED state. So, the small cell base station, macro cell base station, and AMF will know that the paging attempt to page the UE was successful.

In some embodiments, a small cell base station transmits a paging response message which is a paging failure response message and the message includes a failure cause code which identifies the failure are being one of: i) paging failure due to no response from the UE being paged or ii) paging failure due to unavailability of unlicensed spectrum.

In some exemplary embodiments, the small cell base station only transmits a paging response message to the macro cell base station, when the small cell base station is using unlicensed spectrum, and the unlicensed spectrum is not available, such that the small cell base station cannot transmit paging signals to page the UE. In some such embodiments, the paging response message is a paging failure response message which implicitly indicates by its presence that the paging attempt by the small cell base station to page the UE failed due to unavailable of the unlicensed spectrum. In some such embodiments, steps 2522 and 2538 are not performed.

Figure 26:
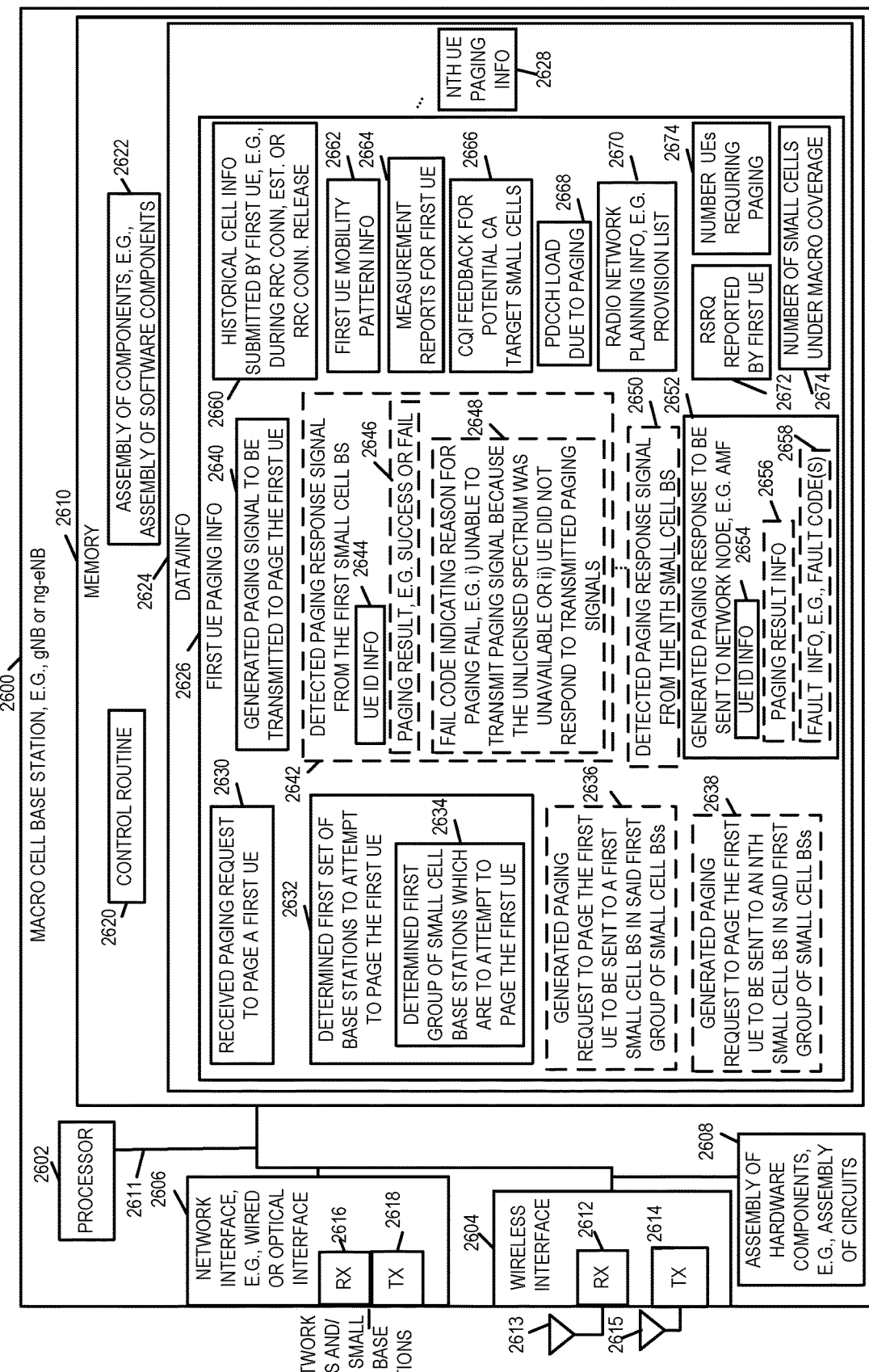
FIG. 26 is a drawing of an exemplary macro cell base station in accordance with an exemplary embodiment.

FIG. 26 is a drawing of an exemplary macro cell base station 2600, e.g., a gNB or ng-eNB, in accordance with an exemplary embodiment. Exemplary macro cell base station 2600 is, e.g., one of the macro cell base stations (1604, 1606) of system 1600 of FIGS. 16-24, one of the macro cell base stations (1604', 1604') of system 3000 of FIG. 30, one of the macro cell base stations (1604", 1604") of system 3100 of FIG. 31, and/or a macro cell base station implementing a method in accordance with flowchart 1500 of FIG. 15.

Exemplary macro cell base station 2600 includes a processor 2602, e.g., a CPU, a wireless interface 2604, a network interface 2606, e.g., a wired or optical interface, an assembly of hardware components 2608, e.g., an assembly of circuits, and memory 2610 coupled together via bus 2611 over which the various elements may interchange data and information.

Wireless interface 2604 includes a wireless receiver 2612 coupled to receive antenna 2613, via which the macro cell base station 2600 may receive wireless signals, e.g., a response signal from a UE being paged. Wireless interface 2604 includes a wireless transmitter 2614 coupled to transmit antenna 2615, via which the macro cell base station 2600 may transmit wireless signals, e.g., a paging signal to page a UE.

Network interface 2606 includes a receiver 2612 via which the macro cell base station 2600 may receive signals, e.g., signals from network nodes and/or small cell base stations. Exemplary signals received via receiver 2616 include a paging request from a network node, e.g., AMF device, to page a UE, and a paging response from a small cell base station. Network interface 2606 further includes a transmitter 2618 via which the macro cell base station 2600 may transmit signals, e.g., send signals to network nodes and/or to small cell base stations. Exemplary signals transmitted via transmitter 2618 include a paging response signal to a network node, e.g., an AMF, and a paging request signal to a small cell base station.

Memory 2610 includes a control routine 2620, an assembly of components 2622, e.g., an assembly of software components, and data/information 2624. Data/information 2624 includes paging related information corresponding to one or more UEs (first UE paging information 2626, . . . , Nth UE paging information 2628). First UE paging information 2626 includes a received paging request to page a first UE, and a determined first set of base stations to attempt to page the first UE 2632. The determined first set of base stations to attempt to page the first UE 2632 includes a determined first group of small cell base stations which are to attempt to page the first UE 2632. First UE paging information 2626 may, and sometimes does, include a generated paging request to page the first UE to be sent to a first small cell base station in said first group of small cell base stations 2636. First UE paging information 2626 may, and sometimes does include a generated paging request to page the first UE to be sent to an Nth small cell base station in said first group of small cell base stations 2638.

First UE paging information 2626 further includes a generated paging signal 2640 to be transmitted by transmitter 2614 to page the first UE. First UE paging information 2626 may, and sometimes does, include a detected paging response signal from the first small cell base station in said first group of small cell base stations 2642. Detected paging response signal from the first small cell base station 2642 includes UE identification information 2644, and paging result information 2644, e.g., indicating success or fail. In some embodiments, detected paging response signal from the first small cell base station 2642 may, and sometimes does, include a fail code 2648 indicating the reason for the paging failure, e.g., i) the first small cell base station was unable to transmit the paging signal because the unlicensed spectrum was unavailable or ii) the UE did not respond to the paging signal transmitted by the first small cell base station. First UE paging information 2626 may, and sometimes does, include a detected paging response signal from the Nth small cell base station in said first group of small cell base stations 2650.

First UE paging information 2626 further includes a generated paging response 2652 to be sent to the network node, e.g., to the AMF, in response to the received paging request 2630. Generated paging response 2652 includes UE ID information 2654 and paging result information 2656, e.g., indicating paging success or paging failure. Generated paging response 2652 may, and sometimes does, include fault information 2658, e.g., a fault code or codes identifying the reason or reasons for the paging failure, e.g., unlicensed spectrum was unavailable or the UE did not respond to transmitted paging signals.

First UE paging information 2626 further includes historical cell information submitted by the first UE, e.g., during RRC connection establishment and/or during RRC_Connection release 2660, first UE mobility pattern information 2662, measurement reports for the first UE 2664, channel quality information (CQI) feedback for potential carrier aggregation (CA) target small cells 2666, physical downlink control channel (PDCCH) loading due to paging 2668, radio network planning information 2670, e.g., including a provision list identifying small cell base station under the hierarchy of the macro cell base station 2600, received signal received quality (RSRQ) reported by the first UE 2672, e.g., with regard to reference signal transmitted from macro cell base station 2600, a number of UE requiring paging 2674, and a number of small cells under the macro coverage 2674 of the macro cell base station 2600.

Figure 27:
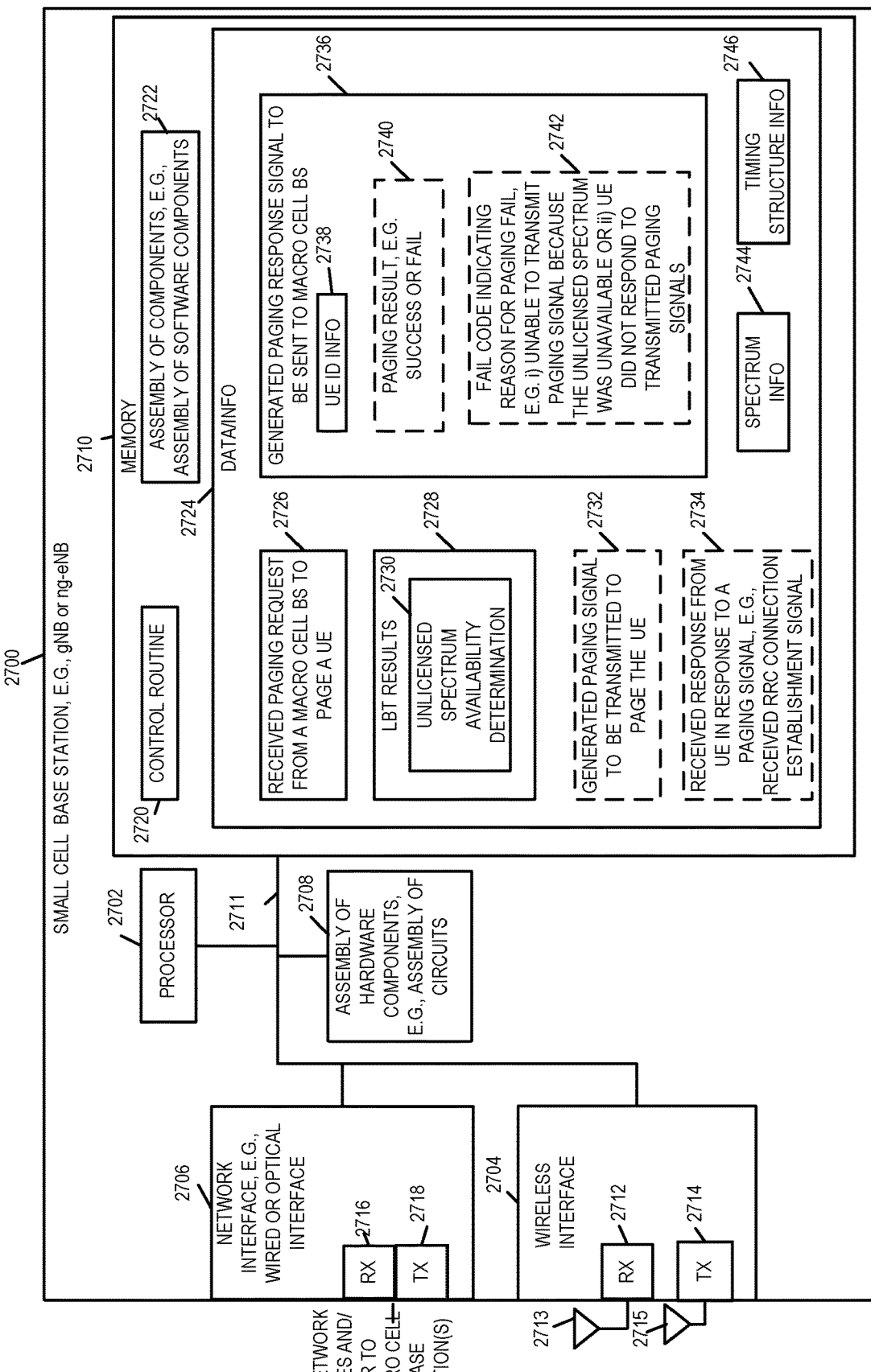
FIG. 27 is a drawing of an exemplary small cell base station in accordance with an exemplary embodiment.

FIG. 27 is a drawing of an exemplary small cell base station 2700, e.g., a gNB or ng-eNB, in accordance with an exemplary embodiment. Exemplary small cell base station 2700 is, e.g., one of the small cell base stations (1608, 1610, 1612, 1614, 1616) of system 1600 of FIGS. 16-24, one of the small cell base stations (1608', 1610', 1612', 1614', 1616') of system 3000 of FIG. 30 or one of the small cell base stations (1608', 1610'', 1612'', 1614'', 1616'') of system 3100 of FIGS. 31 and/or a small cell base station implementing a method in accordance with flowchart 2500 of FIG. 25.

Exemplary small cell base station 2700 includes a processor 2702, e.g., a CPU, a wireless interface 2704, a network interface 2706, e.g., a wired or optical interface, an assembly of hardware components 2708, e.g., an assembly of circuits, and memory 2710 coupled together via bus 2711 over which the various elements may interchange data and information.

Wireless interface 2704 includes a wireless receiver 2712 coupled to receive antenna 2713, via which the small cell base station 2700 may receive wireless signals, e.g., a paging response from a UE being paged. Wireless interface 2704 includes a wireless transmitter 2714 coupled to transmit antenna 2715, via which the small cell base station 2700 may transmit wireless signals, e.g., a paging signal to page a UE.

Network interface 2706 includes a receiver 2712 via which the small cell base station 2700 may receive signals, e.g., signals from network nodes and/or from macro cell base stations. Exemplary signals received via receiver 2716 include a paging request from a macro cell base station to page a UE. Network interface 2606 further includes a transmitter 2718 via which the small cell base station 2700 may transmit signals, e.g., signals to network nodes and/or to macro cell base stations. Exemplary signals transmitted via transmitter 2718 include a paging response signal to a macro cell base station.

Memory 2710 includes a control routine 2720, an assembly of components 2722, e.g., an assembly of software components, and data/information 2724. Data/information 2724 includes a received paging request from a macro cell base station to page a UE 2726, listen-before-talk results 2728 including an unlicensed spectrum availability determination 2730. In some embodiments, data information 2724 includes one or both of: a generated paging signal 2732 to be transmitted, via wireless transmitter 2714, to page the UE, and a received paging response from the UE 2734.

Data/information 2724 further includes a generated paging response signal 2736 to be sent to the macro cell BS in response to the received paging request 2726. Generated paging response signal 2736 includes UE ID information 2738 and paging result 2740, e.g., information indicating paging success or paging failure. Generated paging response signal 2736 may, and sometimes does, include a fail code or codes 2742, indicating the reason for the paging failure, e.g., i) unable to transmit the paging signal because the unlicensed spectrum was unavailable or ii) the UE did not respond to transmitted paging signals.

Data/information 2724 further includes spectrum information 2744, e.g., information identifying the unlicensed spectrum being used by the small cell base station or information identifying the licensed spectrum, e.g. particular licensed spectrum band or sub-band being used by the small cell base station. In some embodiments, in which the small cell base station uses licensed spectrum, the small cell base station uses a different frequency band or different frequency sub-band than is used by the macro cell base station. Data/information 2724 further includes timing structure information 2746. In some embodiments, the timing structure information 2746 includes information indicating when paging signals are to be transmitted.

Figure 28A:
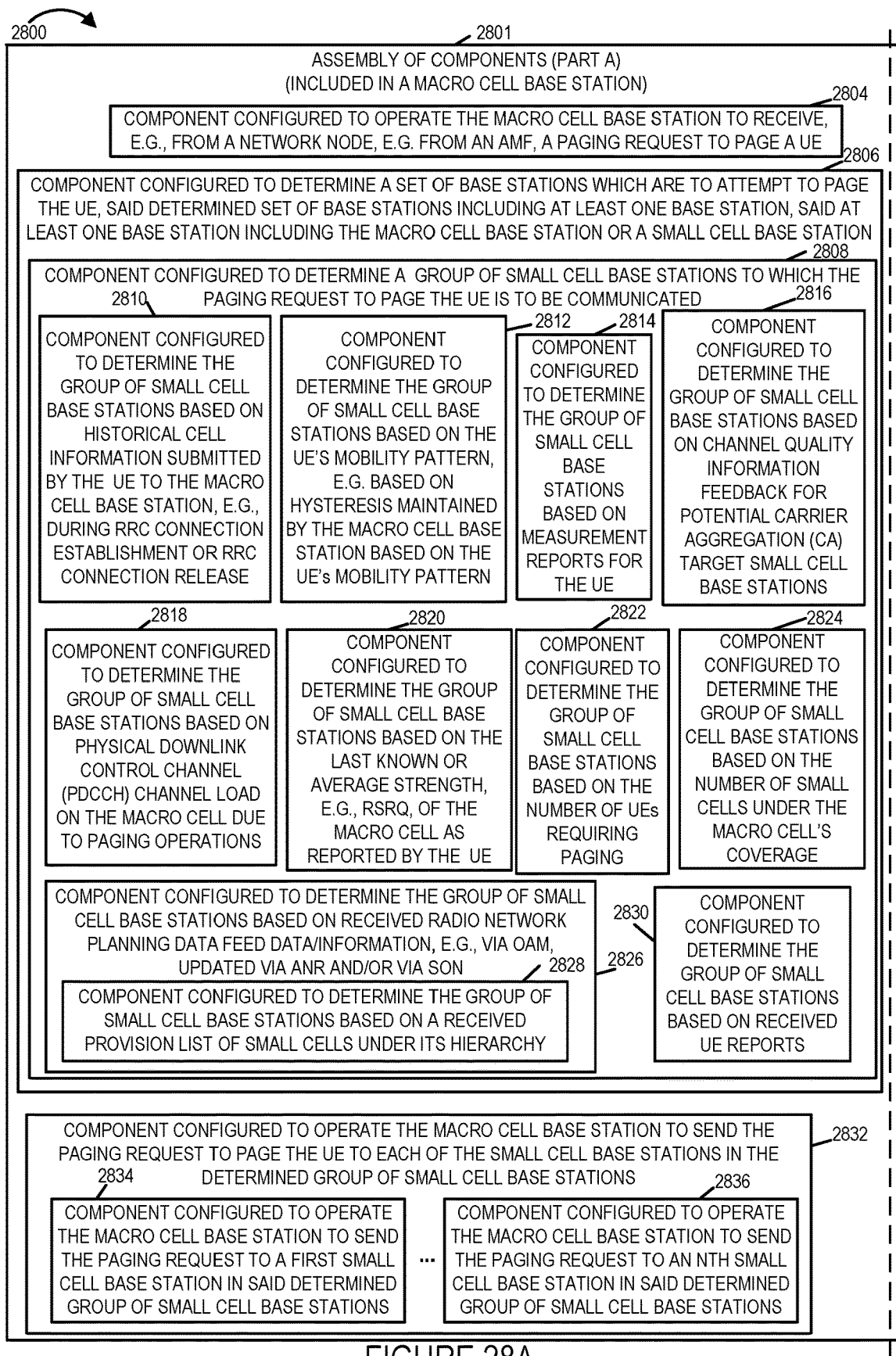
FIG. 28A is a first part of a drawing of an exemplary assembly of components which may be included in a macro cell base station in accordance with an exemplary embodiment.

FIG. 28, comprising the combination of FIG. 28A and FIG. 28B, is a drawing of an exemplary assembly of components 2800, comprising the combination of Part A 2801 and Part B 2803, which may be included in a macro base station in accordance with an exemplary embodiment. For example, assembly of components 2800 is included in any of the macro cell base stations (1604, 1606) of FIG. 16-24, in any of the macro cell base stations (1604', 1606') of FIG. 30, in any of the macro cell base stations (1604", 1606") of FIG. 31 and/or in a macro cell base station implementing the method of flowchart 1500 of FIG. 15 and/or in macro cell base station 2600 of FIG. 26.

The components in the assembly of components 2800 can, and in some embodiments are, implemented fully in hardware within the processor 2602, e.g., as individual circuits. The components in the assembly of components 2800 can, and in some embodiments are, implemented fully in hardware within the assembly of components 2608, e.g., as individual circuits corresponding to the different components. In other embodiments some of the components are implemented, e.g., as circuits, within the processor 2602 with other components being implemented, e.g., as circuits within assembly of components 2608, external to and coupled to the processor 2602. As should be appreciated the level of integration of components on the processor and/or with some components being external to the processor may be one of design choice. Alternatively, rather than being implemented as circuits, all or some of the components may be implemented in software and stored in the memory 2610 of the macro cell base station 2600, e.g., a gNB or ng-eNB, with the components controlling operation of the base station to implement the functions corresponding to the components when the components are executed by a processor, e.g., processor 2602. In some such embodiments, the assembly of components 2800 is included in the memory 2610 as assembly of components 2622. In still other embodiments, various components in assembly of components 2800 are implemented as a combination of hardware and software, e.g., with another circuit external to the processor 2602 providing input to the processor 2602 which then under software control operates to perform a portion of a component's function. While processor 2602 is shown in the FIG. 26 embodiment as a single processor, e.g., computer, it should be appreciated that the processor 2602 may be implemented as one or more processors, e.g., computers.

When implemented in software the components include code, which when executed by the processor 2602, configure the processor 2602 to implement the function corresponding to the component. In embodiments where the assembly of components 2800 is stored in the memory 2610, the memory 2610 is a computer program product comprising a computer readable medium comprising code, e.g., individual code for each component, for causing at least one computer, e.g., processor 2602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 28 control and/or configure the macro cell base station 2600, or elements therein such as the processor 2602, to perform the functions of corresponding steps illustrated and/or described in the method of one or more of the flowcharts, signaling diagrams and/or described with respect to any of the Figures. Thus the assembly of components 2800 includes various components that perform functions of corresponding one or more described and/or illustrated steps of an exemplary method, e.g., steps of the method of flowchart 1500 of FIG. 15 and/or described or shown with respect to any of the other figures.

Assembly of components 2800 includes a component 2804 configured to operate the macro cell base station to receive, e.g., from an AMF, a paging request to page a UE, and a component 2806 configured to determine a set of base stations what are to attempt to page the UE, said determined set of base stations including at least one base station, said at least one base station including the macro cell base station or a small cell base station. Component 2806 includes a component 2808 configured to determine a group of small cell base stations to which the paging request to page the UE is to communicated. Component 2808 includes one or more or all of: a component 2810 configured to determine the group of small cell base stations base on historical cell information submitted by the UE to the macro cell base station, e.g., during RRC connection establishment and/or during RRC connection release, a component 2812 configured to determine the group of small cell base stations based on the UE's mobility pattern, e.g., based on hysteresis information maintained by the macro cell base station based on the UE's mobility pattern, a component 2814 configured to determine the group of small cell base stations based on measurement reports for the UE, e.g., measurement reports received directly from the UE and/or measurement reports received indirectly from the UE, e.g., via a small cell base station, a component 2816 configured to determine the group of small cell base stations based on channel quality information feedback for potential carrier aggregation (CA) target base stations, a component 2818 configured to determine the group of small cell base stations based on physical downlink control channel (PDDCH) channel load on the macro cell due to paging operations, a component 2820 configured to determine the group of small cell base stations based on the last known or average strength, e.g., RSRQ, of the macro cell base station as reported by the UE, a component 2822 configured to determine the group of small cell base stations based on the number of UEs requiring paging, e.g., at a current instant of time, a component 2824 configured to determine the group of small cell base station based on the number of small cells under the macro cell's coverage, a component 2826 configured to determine the group of small cell base stations based on received radio network planning data feed data/information, e.g., via OAM, updated via ANR and/or via SON, and a component 2830 configured to determine the group of small cell base stations based on received UE reports, e.g., received UE reports from the particular UE which is to be paged and, in some embodiments, UE reports from other UEs. Component 2826 includes a component 2828 configured to determine the group of small cell base stations based on a received provision list of small cells under its hierarchy.

Assembly of components 2800 further includes a component 2832 configured to operate the macro cell base station to send the paging request to page the UE to each of the small cell base stations in the determined group of small cell base stations. Component 2832 includes a component 2834 configured to operate the macro cell base station to send the paging request to a first small cell base station in said determined group of small cell base stations and a component 2836 configured to operate the macro cell base station to send the paging request to an Nth small cell base station in said determined group of small cell base stations.

Assembly of components 2800 further includes a component 2840 configured to operate the macro cell base station to attempt to page the UE, e.g., during a time interval in which the determined group of small cell base stations attempts to page the UE, if the macro cell base station is one of the base stations in the determined set of base stations which are to attempt to page the UE, and a component 2841 configured to operate the macro cell base station to monitor for paging response messages from small cell base stations in said determined group of small cell base stations. Component 2841 includes a component 2842 configured to operate the macro cell base station to receive a paging response message from a small cell base station indicating one of: i) an attempt at the small cell base station to page the UE was successful or ii) an attempt at the small cell base station to page the UE was unsuccessful. Component 2842 includes a component 2843 configured to operate the macro cell base station to receive a paging response message from a small cell base station indicating that the paging attempt was unsuccessful and further indicating the reason for the paging attempt failure, e.g. the small cell base station was unable to transmit a paging signal because the listen before talk (LBT) operation indicated the unavailability of unlicensed spectrum or because the UE did not respond to transmitted paging signals.

Assembly of components 2800 further includes a component 2844 configured to operate the macro cell base station to determine whether the paging attempt to page the first UE was successful or unsuccessful, e.g., based on combined results including, e.g. paging response messages from small cell base stations in the determined group of small cell base stations and/or a received response signal, e.g. a received RRC connection establishment signal, from the UE in response to a page transmitted by the macro cell base station, a component 28441 configured to generate a paging response message indicating one or paging success or paging failure to page the UE, and a component 28442 configured to operate the macro cell base station to send the network node, e.g., the AMF, a paging response message indicating one of success or failure to page the UE. Assembly of components 28442 includes a component 2845 configured to control operation as a function of the determination if the paging attempt was successful, a component 2846 configured to operate the macro cell base station to send, to the network node, e.g., to the AMF, a paging response message indicating that the paging attempt to page the UE was successful, a component 2847 configured to determine if at least one of the base stations in the set of base stations determined to attempt to page the UE intended to use unlicensed spectrum for the paging attempt and to control operation as a function of the determination, a component 2848 configured to operate the macro cell base station to send, e.g., to the network node, e.g. to the AMF, a paging response message indicating that the paging attempt to page the UE failed, and a component 2849 configured to operate the macro base station to send, e.g., to the network node, e.g., to an AMF, a paging response message indicating that the paging attempt to page the UE failed, said paging response message indicating the reason or reasons that the paging attempt failed, e.g., unavailability of unlicensed spectrum and/or UE did not respond to transmitted paging signals. The components in assembly of components 2800 may be used to perform the method steps of FIG. 15A and FIG. 15B as well as the method steps of FIG. 15C and FIG. 15D.

Figure 29A:
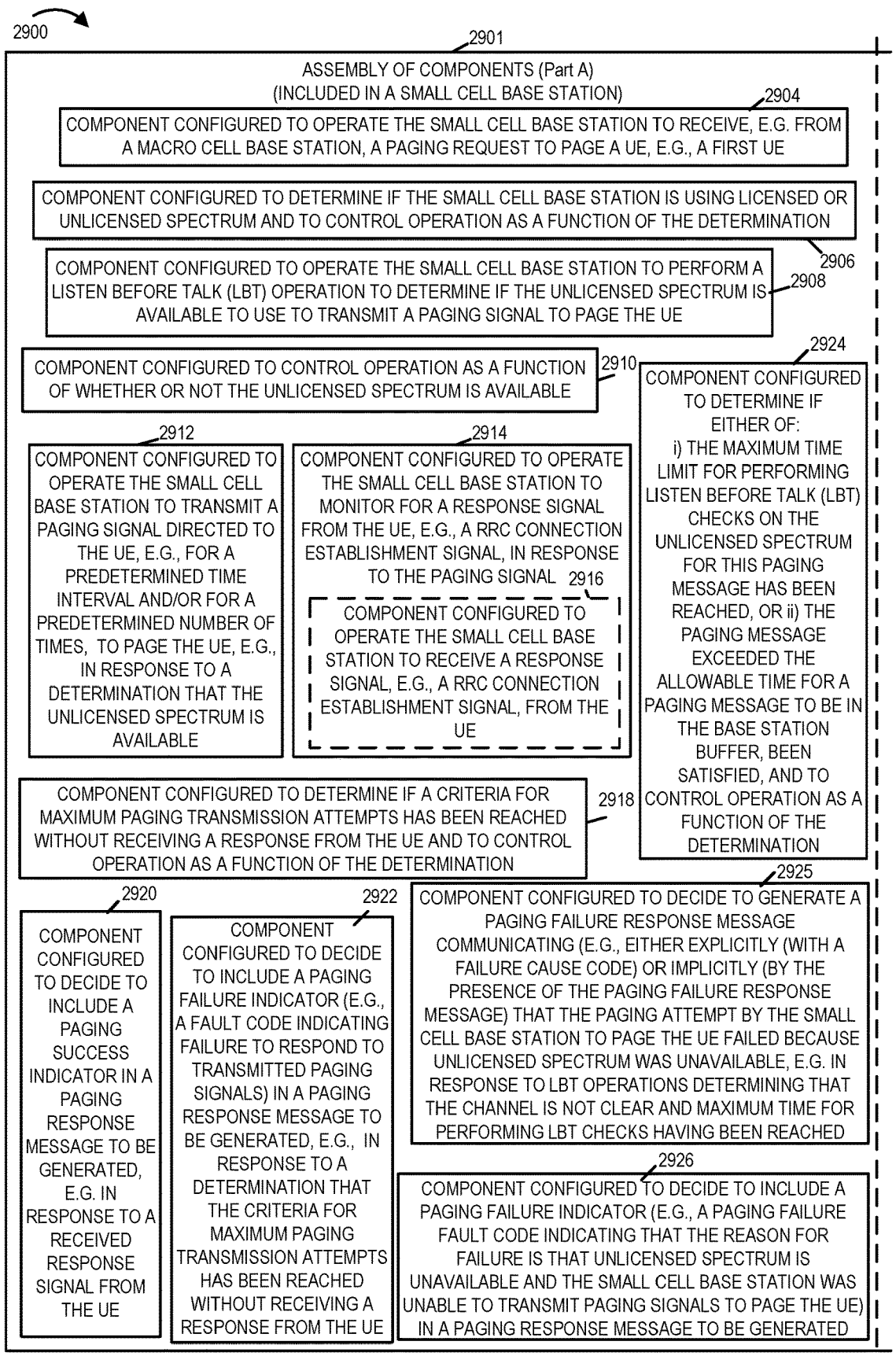
FIG. 29A is a first part of a drawing of an exemplary assembly of components which may be included in a small cell base station in accordance with an exemplary embodiment.
Figures 29, 29B:
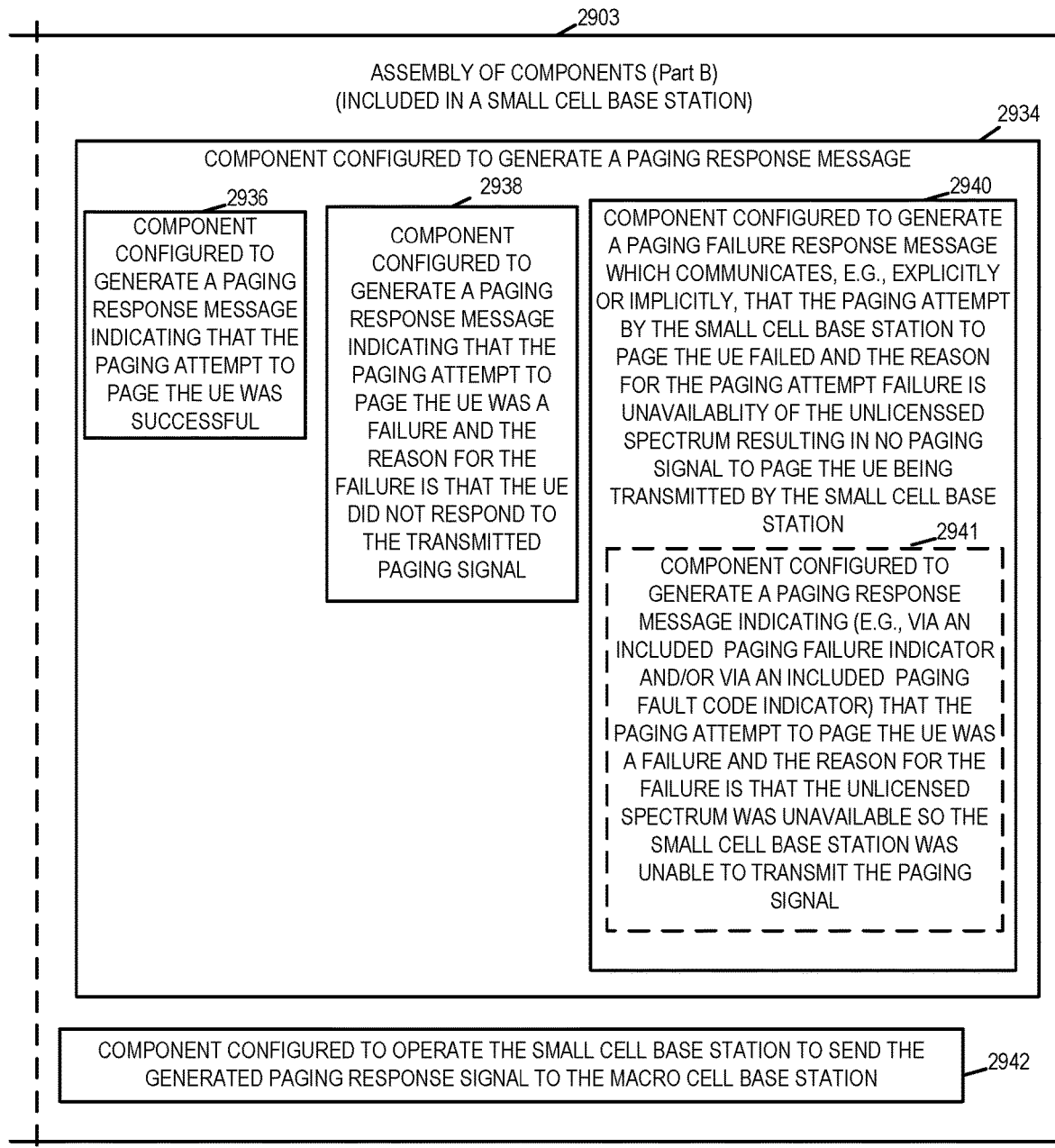
FIG. 29B is a second part of a drawing of an exemplary assembly of components which may be included in a small cell base station in accordance with an exemplary embodiment.
FIG. 29 comprises the combination of FIG. 29A and FIG. 29B.

FIG. 29, comprising the combination of FIG. 29A and FIG. 29B, is a drawing of an exemplary assembly of components 2900, comprising Part A 2901 and Part B 2903, which may be included in a small cell base station in accordance with an exemplary embodiment. For example, assembly of components 2900 is included in any of the small cell base stations (1608, 1610, 1612, 1614, 1616) of FIG. 16-24, in any of the small cell base stations (1608', 1610', 1612', 1614', 1616') of FIG. 30, in any of the small cell base stations (1608", 1610", 1612", 1614", 1616") of FIG. 31 and/or in a small cell base station implementing the method of flowchart 2500 of FIG. 25 and/or in small cell base station 2700 of FIG. 27.

The components in the assembly of components 2900 can, and in some embodiments are, implemented fully in hardware within the processor 2702, e.g., as individual circuits. The components in the assembly of components 2900 can, and in some embodiments are, implemented fully in hardware within the assembly of components 2708, e.g., as individual circuits corresponding to the different components. In other embodiments some of the components are implemented, e.g., as circuits, within the processor 2702 with other components being implemented, e.g., as circuits within assembly of components 2708, external to and coupled to the processor 2702. As should be appreciated the level of integration of components on the processor and/or with some components being external to the processor may be one of design choice. Alternatively, rather than being implemented as circuits, all or some of the components may be implemented in software and stored in the memory 2710 of the small cell base station 2700, e.g., a gNB or ng-eNB, with the components controlling operation of the base station to implement the functions corresponding to the components when the components are executed by a processor, e.g., processor 2702. In some such embodiments, the assembly of components 2900 is included in the memory 2710 as assembly of components 2722. In still other embodiments, various components in assembly of components 2900 are implemented as a combination of hardware and software, e.g., with another circuit external to the processor 2702 providing input to the processor 2702 which then under software control operates to perform a portion of a component's function. While processor 2702 is shown in the FIG. 27 embodiment as a single processor, e.g., computer, it should be appreciated that the processor 2702 may be implemented as one or more processors, e.g., computers.

When implemented in software the components include code, which when executed by the processor 2702, configure the processor 2702 to implement the function corresponding to the component. In embodiments where the assembly of components 2900 is stored in the memory 2710, the memory 2710 is a computer program product comprising a computer readable medium comprising code, e.g., individual code for each component, for causing at least one computer, e.g., processor 2702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 29 control and/or configure the small cell base station 2700, or elements therein such as the processor 2702, to perform the functions of corresponding steps illustrated and/or described in the method of one or more of the flowcharts, signaling diagrams and/or described with respect to any of the Figures. Thus the assembly of components 2900 includes various components that perform functions of corresponding one or more described and/or illustrated steps of an exemplary method, e.g., steps of the method of flowchart 2500 of FIG. 25 and/or described or shown with respect to any of the other figures.

Assembly of components 2900 includes a component 2904 configured to operate the small cell base station to receive, e.g., from a macro cell base station, a paging request to page a UE, e.g., a first UE, a component 2906 configured to determine if the small cell base station is using licensed or unlicensed spectrum and to control operation as a function of the determination, a component 2908 configured to operate the small cell base station to perform a Listen-Before-Talk (LBT) operation to determine if the unlicensed spectrum is available to use to transmit a paging signal to page the UE, a component 2910 configured to control operation as a function of whether or not the unlicensed spectrum is available, a component 2912 configured to operate the small cell base station to transmit a paging signal directed to the UE, e.g., for a predetermined time interval and/or for a predetermined number of times, to page the UE, e.g., in response to a determination that the unlicensed spectrum is available, and a component 2914 configured to operate the small cell base station to monitor for a response signal from the UE, e.g., a RRC connection establishment signal, in response to the paging signal which was transmitted by the small cell base station. Component 2914 includes a component 2916 configured to operate the small cell base station to receive a response signal, e.g., a RRC connection establishment signal, from the UE.

Assembly of components 2900 further includes a component 2916 configured to determine if a criteria for maximum paging transmission attempts has been reached without receiving a response from the UE and to control operation as a function of the determination, and a component 2924 configured to determine if either of: i) the maximum time limit for performing listen before talk (LBT) checks on unlicensed spectrum for this paging message, e.g., prior to paging using unlicensed spectrum in accordance with the timing structure, has been reached, or ii) the paging message exceeded the allowable time for a paging message to be in the base station buffer, has been satisfied and to control operation as a function of the determination.

Assembly of components 2900 further includes a component 2920 configured to decide to include a paging success indicator in a paging response message to be generated, e.g., in response to a received response signal, e.g. a RRC connection establishment signal, from the UE, a component 2922 configured to decide to include a paging failure indicator, e.g., a fault code indicator indicating failure to respond to transmitted paging signals, in a paging response message to be generated, e.g., in response to a determination that the criteria for maximum paging transmission attempts has been reached without receiving a response from the UE, a component 2925 configured to decide to generate a paging failure response message communicating, e.g., either explicitly (with a failure cause code) or implicitly (by the presence of the paging failure response message) that the paging attempt by the small cell base station to page the UE failed because unlicensed spectrum was unavailable, e.g., in response to the LBT operations determining that the channel is not clear and the maximum time for performing LBT having been reached, a component 2596 configured to decide to include a paging failure indicator, e.g., a paging failure fault code indicating that the reason for the failure is that unlicensed spectrum is unavailable and the small cell base station was unable to transmit paging signals to page the UE, in a paging response message to be generated, and a component 2934 configured to generate a paging response message, said paging response message indicating one of: i) an attempt by the small cell base station to page the UE was successful or ii) an attempt by the small cell base station to page the UE was unsuccessful. Component 2934 includes a component 2936 configured to generate a paging response message indicating the paging attempt to page the UE was successful, a component 2938 configured to generate a paging response signal indicating that the paging attempt to page the UE was a failure and the reason for the failure is that the UE did not respond to the paging signals transmitted by the small cell base station, and a component 2940 configured to generate a paging failure response message which communicates, e.g., explicitly or implicitly, that the paging attempt by the small cell base station to page the UE failed and the reason for the paging attempt failure is unavailable of unlicensed spectrum resulting in no paging signs to page the UE being transmitted by the small cell base station. In some embodiments, component 2940 includes component 2941 configured to generate a paging response signal indicating, e.g., via an included paging failure indicator and/or via an included paging fault code indicator, that the paging attempt to page the UE was a failure and the reason for the failure is that unlicensed spectrum was unavailable so the small cell base station was unable to transmit the paging signal. Assembly of components 2900 further includes a component 2942 configured to operate the small cell base station to send the generated paging response signal to the macro cell base station.

FIG. 30 is a drawing of an exemplary communications system 3000 in which both the macro cell base stations and small cell base stations use unlicensed spectrum, in accordance with an exemplary embodiment. Exemplary communications system 3000 is the similar to exemplary communications system 1600 of FIG. 16; however, the macro base stations (macro cell base station 1 1604', macro cell base station 2 1606') of exemplary system 3000 of FIG. 30 use unlicensed spectrum corresponding to frequency bands (F1, F2), respectively, replacing the macro base stations (macro cell base station 1 1604, macro cell base station 2 1604) of system 1600 of FIG. 16 which use licensed spectrum. In addition, the small cell base stations (small cell base station 1 1608', small cell base station 2 1610', small cell base station 3 1612', small cell base station 4 1614', small cell base station 5 1616') of exemplary system 3000 of FIG. 30, which use unlicensed spectrum corresponding to frequency band F3, replace the small cell base stations (small cell base station 1 1608, small cell base station 2 1610, small cell base station 3 1612, small cell base station 4 1614, small cell base station 3 1616) of exemplary system 1600 of FIG. 16.

Thus in exemplary system 3000, a macro cell base station (1604', 1606') which intends to transmit, via its wireless transmitter, a paging signal to page a UE, also performs a listen-before-talk operation to determine if the unlicensed spectrum that it would use, is currently available; and the macro cell base station may, and sometimes does, report that it was unsuccessful in its attempt to page a UE because it was unable to transmit a paging signal due to the unavailability of unlicensed spectrum. In the exemplary system 3000 of FIG. 30, base stations corresponding to overlapping coverage areas have been assigned to use different frequency bands of unlicensed spectrum.

In some embodiments, the small cell base stations (small cell BS 1 1608', small cell base station 2 1610') correspond to dead zones in the coverage area 1605 of macro cell base station 1 1604'. In some embodiments, the small cell base stations (small cell BS 1 1608', small cell base station 2 1610') are used to provide an alternative carrier in the coverage area 1605 of macro cell base station 1 1604'. In some embodiments, the small cell base stations (small cell BS 4 1614', small cell base station 5 1616') correspond to dead zones in the coverage area 1607 of macro cell base station 2 1606'. In some embodiments, the small cell base stations (small cell BS 4 1614', small cell base station 5 1616') are used to provide an alternative carrier in the coverage area 1607 of macro cell base station 2 1606'.

The macro base stations (1604', 1606') may be, and sometimes are, implemented in accordance with exemplary macro cell base stations 2600 of FIG. 26. The base stations (1604', 1606') may, and sometimes do, implement steps of a method in accordance in accordance with flowchart 1500 of FIG. 15.

The small base stations (1608', 1610', 1612', 1614', 1616') may be, and sometimes are, implemented in accordance with exemplary small cell base stations 2700 of FIG. 27. The small cell base stations (1608', 1610', 1612', 1614', 1616') may, and sometimes do, implement steps of a method in accordance in accordance with flowchart 2500 of FIG. 25.

Figure 31:
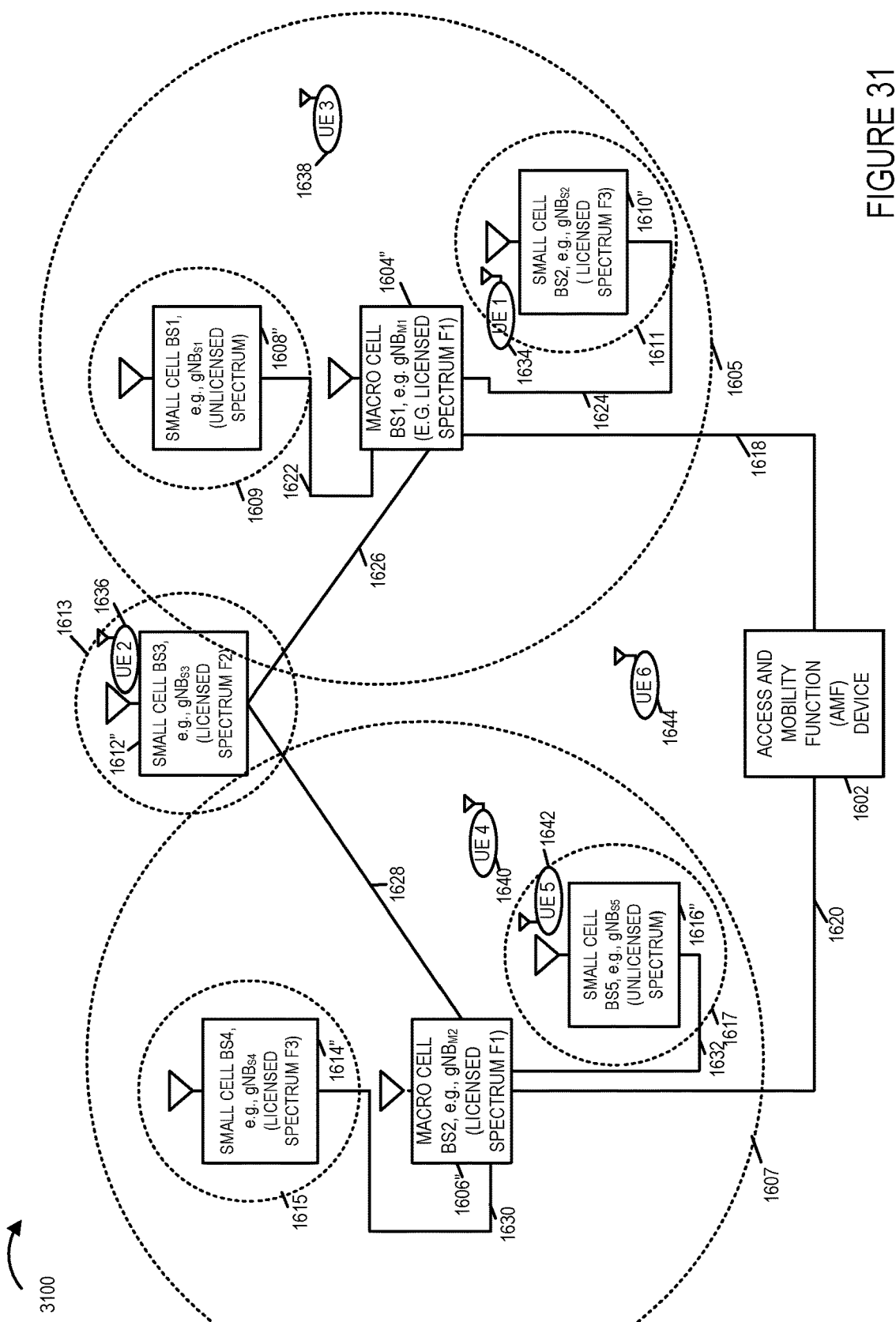
FIG. 31 is a drawing of an exemplary communications system in which the macro cell base stations use licensed spectrum, some of the small cell base stations use unlicensed spectrum and some of the small cell base stations use licensed spectrum, in accordance with an exemplary embodiment.

FIG. 31 is a drawing of an exemplary communications system 3100 in which the macro cell base stations (macro cell base station 1 1604", macro cell base station 2 1606") use licensed spectrum, some of the small cell base stations (small cell base station 1 1608", small cell base station 5 1616") use unlicensed spectrum, and some of the small cell base stations (small cell base station 2 1610", small cell base station 3 1612", small cell base station 4 1614") use licensed spectrum, in accordance with an exemplary embodiment. Exemplary communications system 3100 is the similar to exemplary communications system 1600 of FIG. 16; however, the macro base stations (macro cell base station 1 1604", macro cell base station 2 1606") of exemplary system 3100 of FIG. 31 use unlicensed spectrum corresponding to frequency band (F1), replacing the macro base stations (macro cell base station 1 1604, macro cell base station 2 1604) of system 1600 of FIG. 16 which use licensed spectrum.

In addition, the small cell base stations (small cell base station 1 1608" which uses unlicensed spectrum, small cell base station 2 1610" which uses licensed spectrum corresponding to frequency band F3, small cell base station 3 1612" which uses licensed spectrum corresponding to frequency band F2, small cell base station 4 1614" which uses licensed spectrum corresponding to frequency band F3, small cell base station 5 1616" which uses unlicensed spectrum) of exemplary system 3100 of FIG. 31, replace the small cell base stations (small cell base station 1 1608, small cell base station 2 1610, small cell base station 3 1612, small cell base station 4 1614, small cell base station 5 1616) of exemplary system 1600 of FIG. 16.

The small base stations (1608", 1610", 1612", 1614", 1616") may be, and sometimes are, implemented in accordance with exemplary small cell base stations 2700 of FIG. 27. The small cell base stations (1608", 1610", '1612", 1614", 1616''') may, and sometimes do, implement a steps of a method in accordance in accordance with flowchart 2500 of FIG. 25.

In some embodiments, the small cell base stations (small cell BS 1 1608", small cell base station 2 1610") correspond to dead zones in the coverage area 1605 of macro cell base station 1 1604". In some embodiments, the small cell base stations (small cell BS 1 1608", small cell base station 2 1610") are used to provide an alternative carrier in the coverage area 1605 of macro cell base station 1 1604". In some embodiments, the small cell base stations (small cell BS 4 1614", small cell base station 5 1616") correspond to dead zones in the coverage area 1607 of macro cell base station 2 1606". In some embodiments, the small cell base stations (small cell BS 4 1614", small cell base station 5 1616") are used to provide an alternative carrier in the coverage area 1607 of macro cell base station 2 1606".

The macro cell base stations (1604", 1606") may be, and sometimes are, implemented in accordance with exemplary macro cell base stations 2600 of FIG. 26. The base stations (1604", 1606") may, and sometimes do, implement steps of a method in accordance in accordance with flowchart 1500 of FIG. 15.

The small base stations (1608', 1616') may be, and sometimes are, implemented in accordance with exemplary small cell base station 2700 of FIG. 27. The small cell base stations (1608", 1616") may, and sometimes do, implement steps of a method in accordance in accordance with flowchart 2500 of FIG. 25.

FIG. 32 is a drawing of an exemplary paging response message 3200 in accordance with some exemplary embodiments, e.g., some embodiments, in which both paging success and paging failure response messages are generated and transmitted. Exemplary paging response message 3200 is, e.g., a paging response message which communicates a paging success response message or a paging failure response message. Exemplary paging response message 3200 is, e.g., generated and sent from a small cell base station to a macro cell base station, e.g., in response to a paging request message received by the small cell base station which was previously sent by the macro cell base station. Exemplary paging request message 3200 includes a paging request message ID value 3202, identifying the previously received paging request message which is being responded to, a small cell base station ID 3204 identifying the small cell base station which generated the paging response message, a UE device ID 3206 identifying the UE which was requested to be paged, a paging attempt success/fail indicator value 3208, e.g., 1 bit identifying whether the paging attempt to page the UE was a success (e.g., value=1) or whether the paging attempt to page the UE was a failure (e.g., value=0). If the paging response message 3200 is communicating a paging failure response then, paging response message 3200 further includes a paging fault code indicator value 3210, e.g., 1 bit identifying whether the paging attempt failure was due to the UE not responding to transmitted paging signals from the UE (e.g., fault code bit=0) or the paging attempt failure was due to unavailability of unlicensed spectrum (as determined by LBT operation(s)) resulting in the small cell base station not transmitting paging signal to page the UE (e.g., fault code bit=1).

FIG. 33 is a drawing of another exemplary paging response message 3300 in accordance with some exemplary embodiments, e.g., some embodiments, in which paging failure response messages are generated and transmitted. Exemplary paging response message 3300 is, e.g., a paging response message which communicates a paging failure response message indicating either: i) the failure was due to no response from the UE or ii) the failure was due to unavailability of unlicensed spectrum. Exemplary paging response message 3300 is, e.g., generated and sent from a small cell base station to a macro cell base station, e.g., in response to a paging request message received by the small cell base station which was previously sent by the macro cell base station. Exemplary paging request message 3300 includes a paging request message ID value 3302, identifying the previously received paging request message which is being responded to, a small cell base station ID 3304 identifying the small cell base station which generated the paging response message, a UE device ID 3306 identifying the UE which was requested to be paged, and a paging fault code indicator value 3310, e.g., 1 bit identifying whether the paging attempt failure was due to the UE not responding to transmitted paging signals from the UE (e.g., fault code bit=0) or the paging attempt failure was due to unavailability of unlicensed spectrum (as determined by LBT operation(s)) resulting in the small cell base station not transmitting paging signals to page the UE (e.g., fault code bit=1).

FIG. 34 is a drawing of another exemplary paging response message 3400 in accordance with some exemplary embodiments, e.g., some embodiments, in which paging failure response messages are generated and transmitted, in response to a determination of unavailability of unlicensed spectrum. Exemplary paging response message 3400 is, e.g., a paging response message which communicates a paging failure response message implicitly indicating failure due to unavailability of unlicensed spectrum. Exemplary paging response message 3400 is, e.g., generated and sent from a small cell base station to a macro cell base station, e.g., in response to a paging request message received by the small cell base station which was previously sent by the macro cell base station. Exemplary paging request message 3400 includes a paging request message ID value 3402, identifying the previously received paging request message which is being responded to, a small cell base station ID 3404 identifying the small cell base station which generated the paging response message, and a UE device ID 3406 identifying the UE which was requested to be paged. In some embodiments, implementing paging response message 3400, the small cell base station does not send a paging success response message to the macro cell base station in response to paging success and does not send a paging failure response message to the macro cell base station in response to paging failure due to the UE not responding to transmitted paging signals.

Various aspects and/or features of some embodiments are described below. Some embodiments, are directed to a 3GPP NR and/or 3GPP NR-U nodes. In some such embodiments, there are macro cell base stations and there are secondary node base stations. In such embodiments, macro cell base stations and small cell base stations are expected to communicate with each other using Xn signaling as defined in TS 38.420 and related specifications.

Exemplary NR-U operation, in some embodiments, is described below. In some embodiments, an AMF node instructs a base station node operating in parts or only on unlicensed spectrum to perform a paging operation for a given UE. In some embodiments, the selected base station node will attempt to (re-) transmit the paging message N number of times and/or during a T duration. If the Paging message wasn't sent due to LBT not clearing for unlicensed carriers, involved base station will generate and send a novel N2-AP:PAGING_U RESPONSE msg to the AMF indicating appropriate cause code (e.g. Message not sent due to non-availability of unlicensed channels.)

Exemplary NR-U operation, in some embodiments, is described below. In some embodiments, if a macro cell base stations is allowed to instruct a small cell base station to page in addition to itself, then it does so. Therefore, macro cell base station and any selected small cell base stations (by macro cell base station) will start paging the identified UE(s). This could include paging operations over licensed and/or unlicensed carriers. In some embodiments, each selected small cell base station node will attempt to re-transmit the page message N number of times and/or during a T duration. If the Paging message wasn't sent due to LBT not clearing for unlicensed carriers, involved small cell base stations will send a novel Xn-AP:PAGING U RESPONSE message to MN over Xn. Once the macro cell base station has received the Xn-AP:PAGING_U RESPONSE msg(s) from some or all of the selected small cell base stations, macro cell base station decides to send, generates and sends a N2-AP:PAGING_U RESPONSE msg to AMF indicating appropriate cause code (Message not sent due to non-availability of unlicensed channels.)

The criteria for how macro cell base station selects small cell base stations to instruct to page is depends on the particular embodiment. Step 1508 of flowchart 1500 of FIG. 15 describes exemplary selection including a plurality of different types of information and/or factors, e.g., historical cell information, UE mobility pattern information, measurement reports, channel quality feedback information for potential carrier aggregation (CA) targets, PDDCH channel load on macro cell due to paging, reported signal strength of macro cell base station signal, number of UEs requiring paging, number of small cell base stations under, e.g., with potentially varying amounts of overlap, a macro cell base station's coverage area, radio network planning data, UE reports, etc., upon which the selection may be, and sometimes is, based. In various embodiments, at different times, and/or for different UEs, different sets of one or more of the plurality of different types of information and/or factors described above are used to make the selection of the set of base stations which are to attempt a page. In some embodiments, the selection can be, and sometimes is, based on: a) an indicator communicated from the network node, e.g., AMF, to the macro cell base station, as to whether paging via small cell base stations is allowed and b) radio network planning data.

In some embodiments, unlicensed spectrum cells are used to fill licensed carrier coverage gaps. In an exemplary embodiment, there are two macro cell base stations (macro cell base station 1 (G1) using licensed frequency FR1 and macro cell base station 2 (G2) using licensed frequency FR2) and 3 small cell base stations (small cell base station 1 (S1), small cell base station 2 (S2), small cell base station 3 (S3). Small cells operating in unlicensed carriers are deployed to fill coverage holes left by macro nodes (gNB/ng-eNB). This is expected to be common for "indoor hotspot" type coverage where outdoor signal suffers high attenuation, and is therefore augmented by deploying small cells at strategic locations to offset the outdoor to indoor (O2I) penetration loss. This approach applies also to cases of when central unit-distributed unit (CU-DU) and/or central unit—control plane/user plane (CU-CP/UP) split is employed.

Continuing with the exemplary scenario, macro cell 1's (G1's) coverage area fully covers small cell 1's (S1's) and small cell 2's (S2's) coverage area, and partially covers small cell 3's (S3's) coverage area. Macro cell 2's coverage is non-overlapping with macro cell 1's coverage. Macro cell 2's coverage area partially covers small cell 3's coverage area. In some embodiments, there are other macro and small cell nodes with full or partial coverage overlaps.

With respect to outdoor-to-indoor signal penetration, consider that:

For 3.5 GHz, O2I penetration loss for concrete blocks is around 20-23 dB, poured concrete (w/o hollow cavities) is around 40-45 db, and a complete signal attenuation for modern-day low-E glass (e.g. the kind mandated for state of Colorado).

For 28 GHz, O2I penetration loss is around 25-28 dB for high-E glass, and complete signal attenuation for concrete (hollow or otherwise), and modern-day low-E glass.

Given the penetration loss range, depending on the building type (e.g. double-walled residential, high-E glass, low-E glass, concrete etc) and frequency used, for a subscriber who is situated indoors, the outdoor signal (from the macro node G1) is unlikely to penetrate indoor. In such scenarios, UE may be out of coverage of macro node (G1 and G2) but in coverage of (either outdoor or indoor) small cells (S3 gNB). If the UE underwent RRC_CONNECTED4RRC_IDLE/INACTIVE transition in the small cell (as the best cell for this UE), then subsequent pages can be routed via last known NGCI (which will point to this small cell). However, if UE underwent RRC_CONNECTED4RRC_IDLE/INACTIVE transition under the macro cell, and subsequently moved indoors under the small cell coverage, initial paging via macro node (G1) will fail. At this point, a paging area escalation will occur wherein multiple macro nodes in TATA_list (spanning G1, G2 etc) will be paged. This may not include small cell(s) or if it does then the number of small cell(s) which get included could be rather large. For example, for every Macro cell in lower FR1 range, there's likely to be a minimum of 3-10 small cells. In some embodiments, a given small cell could be under the coverage area of no more than 2-3 macro cells. Depending on the multiple factors, the number of cells under a Tracking area (TA) can range from 500-6000 spanning 30-300+ base stations. This causes an increased PDCCH load with a possible net effect of being unable to reach subscriber anyways. Thus the addition of many small cell base stations may be expected to cause problems with regard to PDCCH load.

In accordance with a novel feature of some embodiments, such scenarios and potential problems are tackled by letting NG-RANs (macro cell base stations which are gNBs or ng-eNBs) decide when and how to include the small cells (under a macro cell area) for paging operations. In some embodiments, the notion of "Cell grouping for a given UE when in IDLE/INACTIVE mode" is used. Via implementation specific means e.g. normal radio network planning data fed via OAM, ANR, SON etc. an operator can, and sometimes does, provision in Macro nodes (macro cell base stations) with a list of possible small cell nodes (small cell base stations) under its hierarchy. The small cells would generally be expected to either fall under or augment the macro node's coverage area. In some embodiments, the macro nodes (macro cell base stations) are considered and referred to as master nodes and the small cell base stations are referred to as secondary nodes.

In some embodiments, For RRC_IDLE mode or RRC_INACTIVE UEs, the "Cell grouping for a given UE when in IDLE/INACTIVE mode" list can be, and sometimes is, taken from either the provisioned/learned associations or from the last known cell(s) from which the UEs last underwent the transition.

In some embodiments, depending on multiple factors such as PDCCH channel loading due to paging etc, when paged by core node CN (e.g., AMF), a macro node could, and sometimes does, request such (fixed association) neighbor secondary nodes (which could operate in unlicensed spectrum) to also page the UE. The secondary nodes are, e.g., small cell base stations using unlicensed spectrum.

Correspondingly, in some embodiments, a mechanism in NG-RAN (macro base stations) is also implemented to allow NG-RAN to control whether and when NG-AP:PAGING message is sent over macro cells only or small cells only or simultaneously in both.

In some embodiments, "Cell grouping for a given UE while in IDLE/INACTIVE mode" is intended to apply on a per-UE basis. In some embodiments, for the same UE, the cell grouping can be changed (by macro cell) at any RRC_IDLE or RRC_INACTIVE transition from RRC_CONNECTED mode. In some embodiments, the "Cell grouping for a given UE while in IDLE/INACTIVE mode" is intended to apply to a group of UEs under the same small cell coverage under the same macro cell coverage.

In some embodiments, the master cell (macro cell base station) can, and sometimes does, generate the required cell grouping for a given UE (e.g., Cell grouping for a given UE while in IDLE/INACTIVE mode) using implementation means including but not limited to normal radio network planning data fed via OAM, updated via ANR and/or SON.

In some embodiments, the macro cell can, and sometimes does, generate the required cell grouping for a given UE (e.g., Cell grouping for a given UE while in IDLE/INACTIVE mode) from either the historical cell information submitted by UE to master cell during RRC_Connection Establishment or RRC_Connection Release or from hysteresis maintained by master cell based on UE's mobility patterns.

In addition, in some embodiments, if both the network and UE support enhancements related to LTE euCA feature (3GPP Rel-14 and Rel-15), then the macro cell will have both the measurement reports along with CQI feedback for potential CA target SCells, and that information can be, and sometimes is, used to determine the cell grouping for a given UE.

Various described features and/or aspects of the current invention including, e.g. macro cell base station/small cell base station paging interactions, and cell grouping for a given UE with regard to paging, are applicable in licensed spectrum only embodiments, a embodiment including a mix of licensed and unlicensed spectrum, or unlicensed spectrum only embodiments.

In some embodiments, the macro cell base station can, and does, determine whether, when and which small cells to include for the additional paging operations based on a number of criteria, including, but not limited to, one or more or all of:

PDCCH channel load on macro cell due to paging operations,

Last known or average strength (e.g. RSRQ) of macro cell as reported by the UE (indicative of how strong or weak of a signal the UE is experiencing from the macro cell), Number of UEs requiring paging, Number of small cells under the macro cell's coverage.

Information at macro node's disposal, or

Information UE reports.

In some embodiments, a Radio Resource Control (RRC) command is used by a base station to release the RRC connection between the base station and a specific UE.

The RRC Release message is used to command the release of an RRC connection or the suspension of the RRC connection.

In some exemplary embodiments, a novel RRC Release message, includes one or more of the following:

A new IE termed as "PagingPriorityListNR" referring to NR "Cell grouping for a given UE while in IDLE/INACTIVE mode" for which the UE monitors paging information in addition to serving cell from where it received this IE. The list of grouped cells is an ordered list in descending priority. In addition, a new (information element) IE termed as "cellsPerDRXToMonitor" to indicate the subset of such an ordered list of cells the UE is expected to monitor for paging in its DRX ON duration is included in the RRC Release message.

A new IE termed as "PagingPriorityListEUTRA" referring to EUTRA "Cell grouping for a given UE while in IDLE/INACTIVE mode" for which the UE monitors paging information in addition to serving cell from where it received this IE.

Type-2 PDCCH search space information for each grouped cell in which the UE monitors paging messages, i.e., it looks for DCI Formats scrambled with P-RNTI. If a UE is not provided higher layer parameter paging Search-Space for Type2-PDCCH common search space set, the Type2-PDCCH common search space set is assumed to be the same as the Type0-PDCCH common search space set. Further considerations of the PDCCH search space monitoring are as follows. Monitoring paging on multiple cells can be an energy-intensive procedure for the UE, especially due to the impact on UE DRX if it has to keep waking up to monitor different paging occasions (POs) on different cells. In order to improve UE energy efficiency, the following solutions are implemented in some but not necessarily all embodiments:

Assuming the UE DRX cycle is synchronized across some or all of the grouped cells, in each DRX ON duration the UE monitors paging on one or more pre-determined cells, as opposed to all cells. Therefore, over multiple ON durations the UE will cycle through all the cells. The pre-determined ordering is indicated in the RRC Release message via "cellsPerDRXToMonitor" IE.

To reduce PDCCH monitoring and blind detection impacts, the paging occasions on multiple cells for a given UE may be grouped in time such that the UE does not need to monitor more than X consecutive slots at a time in order to scan POs on all the configured group cells. Furthermore, the POs may, and sometimes do have sufficient gaps in time (for e.g., somewhere in the range of two-four OFDM symbols) in order to allow the UE sufficient time to switch bandwidth parts (BWPs) when cycling from one cell to the next.

In some but not necessarily all embodiments, the novel RRC Release message includes:

A maximum number of grouped secondary cells which UE monitors for paging information.

A maximum duration for which UE monitors paging information in grouped secondary cells. Upon expiration of this duration, the UE stops monitoring for paging information in grouped secondary cells.

In some embodiments, for a list of carriers, e.g. a list of carriers denoted by PagingPriorityListNR IEs and PagingPriorityListEUTRA IEs received by the UE in RRCRelease message, the UE listens for paging information, in accordance with its IDLE mode DRX values, for said carriers.

In the following sets of embodiments the number of an embodiment refers to the numbered embodiment in the same set.

Second Numbered List of Exemplary Method Embodiments

Method Embodiment 1 A communications method, the method comprising: receiving (1504), at a first base station, a paging request to page a first UE device; determining (1506), at the first base station, a first set of base stations which are to attempt to page the first UE device, said first set of base stations including a small cell base station; sending (1532), from the first base station, a paging request message to the small cell base station in said first set of base stations, said paging request message requesting paging of the first UE device; and receiving (1542), at the first base station, a paging response message from the small cell base station, said paging response message indicating one of: i) an attempt at the small cell base station to page the first UE device was successful or ii) an attempt at the small cell base station to page the first UE device was unsuccessful.

Method Embodiment 2 The communications method of Method Embodiment 1, wherein the first base station is a macro base station; and wherein said small cell base station is a first small cell base station having a coverage area smaller than the coverage area of said macro base station.

Method Embodiment 3 The method of Method Embodiment 2, wherein the first base station uses licensed spectrum; and wherein the first small cell base station uses unlicensed spectrum.

Method Embodiment 4 The method of Method Embodiment 3, wherein the first small cell base station is within the coverage area of the first base station and fills in a dead zone in the first base station coverage area.

Method Embodiment 5 The method of Method Embodiment 2, wherein the first base station and said first small cell base station both use unlicensed spectrum but the first base station and the first small cell base station use different frequency bands.

Method Embodiment 6 The method of Method Embodiment 2, wherein the first small cell base station is within the coverage area of the first base station and fills in a dead zone in the first base station coverage area.

Method Embodiment 7 The method of Method Embodiment 2, wherein the first small cell base station has a coverage area which partially overlaps the first (macro) base station coverage area and the coverage area of another (macro cell) base station, said first small cell base station being at a location corresponding to a boundary area between macro cell base stations.

Method Embodiment 8 The method of Method Embodiment 2, wherein determining (1506), at the first base station, the first set of base stations which are to attempt to page the first UE device includes determining the first set of base stations based on one or more of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) or ix) received UE reports (1530).

Method Embodiment 9 The method of Method Embodiment 8, wherein said determining the first set is based on at least two of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

Method Embodiment 10 The method of Method Embodiment 9, wherein said determining the first set of base stations is based on at least three of: i) historical cell information (1510); ii) first UE mobility pattern information (1512); iii) signal measurement reports communicated by the first UE to the first base station (1514); iv) channel quality information feedback (1516) communicated by the first UE to the first base station or another network device (1518), v) physical downlink control channel load on a physical downlink control channel (PDCCH) at the first base station, vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

Method Embodiment 11 The method of Method Embodiment 2, wherein the paging response message from the first small cell base station indicates a paging failure (1543) and wherein the paging response message from the first small cell base station further indicates the reason for the paging attempt failure.

Method Embodiment 12 The method of Method Embodiment 11, wherein the paging response message includes information (e.g., a failure cause code) indicating the reason for the paging attempt failure which indicates one of: i) unavailability of the unlicensed spectrum (LBT fails to clear) resulting in no paging signal transmitted by the first small cell base station or ii) no response received from the first UE device in response to a transmitted paging signal.

Method Embodiment 13 The method of Method Embodiment 2, wherein the paging response message from the first small cell base station indicates a paging failure (1543) and indicates (explicitly (e.g., via a fail code included in the message) or implicitly (e.g., via transmission of the paging response message) the reason for the paging attempt failure is unavailability of the unlicensed spectrum (LBT fails to clear) resulting in no paging signal being transmitted by the first small cell base station.

Method Embodiment 14 The method of Method Embodiment 2, wherein said paging request to page a first UE device received at the first base station is received from a network device (e.g., Access and mobility management Function (AMF)); and wherein the method further comprises: sending (15441), from the first base station, a paging results message (e.g., paging response message) to the network device (e.g., the AMF), said paging results message indicating one of success or failure to page the first UE.

Method Embodiment 15 The communications method of Method Embodiment 1 further comprising: receiving (1504), at a first base station, an additional paging request to page the first UE device; determining (1506), at the first base station, an additional set of base stations which are to attempt to page the first UE device, said additional set of base stations including an additional small cell base station which is not included in said first set of base stations (at second time at least one different small cell is selected); sending (1532), from the first base station, a paging request message to the additional small cell base station in said second set of base stations, said paging request message to the additional small cell requesting paging of the first UE device; and receiving (1542), at the first base station, a paging response message from the additional small cell base station, said paging response message indicating one of: i) an attempt at the additional small cell base station to page the first UE device was successful or ii) an attempt at the additional small cell base station to page the first UE device was unsuccessful.

Method Embodiment 16 The method of Method Embodiment 1, further comprising: receiving (1554), at a first base station, a second paging request, said second paging request being a request to page a second UE device; determining (1556), at the first base station, a second set of base stations which are to attempt to page the second UE device, said second set of base stations including a second small cell base station, said second small cell base station not being in said first set of base stations (second set of base stations is different by at least one small cell base station with the sets of base stations being selected on a per UE basis using information corresponding to the particular UE, e.g., with the selection process thus being different for at least some different UEs because of the difference in information corresponding to the individual UEs which is used to selected the set of base stations to attempt a page); sending (1582), from the first base station, a paging request message to the second small cell base station in said second set of base stations, said paging request message requesting paging of the second UE device; and receiving (1592), at the first base station, a paging response message from the second small cell base station, said paging response message one of: i) an attempt at the second small cell base station to page the second UE device was successful or ii) an attempt at the small cell base station to page the second UE device was unsuccessful.

Method Embodiment 17 The method of Method Embodiment 16, wherein determining (1556), at the first base station, the second set of base stations which are to attempt to page the second UE device includes determining the second set of base stations based on one or more of: i) historical cell information (1560) corresponding to the second UE; ii) second UE mobility pattern information (1562); iii) signal measurement reports (1564) communicated by the second UE to the first base station; iv) channel quality information feedback (1566) communicated by the second UE to the first base station or another network device, v) physical downlink control channel (PDDCH) load on a physical downlink control channel at the first base station (1568), vi) a received signal strength (1570) (e.g., last known or average received signal strength) of a signal (e.g., RSRQ signal) transmitted by the first base station as reported to the first base station to by the second UE, vii) the number (1572) of UEs requiring paging, vii) the number (1574) of small cells under a coverage area of the first base station, viii) radio network planning data (1576) or ix) received UE reports (1580).

Method Embodiment 18 The method of Method Embodiment 2, further comprising: receiving (2504), at the first small cell base station, the said paging request message, sent by the macro base station, requesting paging of the first UE device; and performing (2508), at the first small cell base station, in response to said received paging request message, a listen before talk (LBT) operation to determine if unlicensed spectrum is available to use to transmit a paging signal to the first UE device.

Method Embodiment 19 The method of Method Embodiment 18, further comprising: generating (2534), at the first small cell base station, said paging response message indicating one of: i) an attempt at the first small cell base station to page the first UE device was successful or ii) an attempt at the first small cell base station to page the first UE device was unsuccessful; and transmitting (2542), at the first small cell base station, the generated paging response message to the macro base station.

Method Embodiment 20 The method of Method Embodiment 19, wherein said listen before talk operation determines that the unlicensed spectrum is available; and wherein the method further comprises: transmitting (2512), at the first small cell base station, a paging signal from the first small cell base station directed to the first UE device; monitoring (2514), at the first small cell base station, for a response to the paging signal transmitted from the first small cell base station; and deciding (2520), at the first small cell base station, when said the monitoring detected a response (e.g., a RRC connection establishing signal in response to the transmitted paging signal), to include a paging success indication in the paging response message when generating the paging response message; and deciding (2522), at the first small cell base station, when said the monitoring failed to detect a response, to include a paging failure indication in the paging response message when generating the paging response message.

Method Embodiment 21 The method of Method Embodiment 19, wherein said listen before talk operation determines that the unlicensed spectrum is available; and wherein the method further comprises: transmitting (2512), at the first small cell base station, a paging signal from the first small cell base station directed to the first UE device; monitoring (2514), at the first small cell base station, for a response to the paging signal transmitted from the first small cell base station; and deciding (2522), at the first small cell base station, when said the monitoring failed to detect a paging response, to include a paging failure indication in the paging response message when generating the paging response message.

Method Embodiment 22 The method of Method Embodiment 21, wherein the paging response message indicates that the reason for the paging failure was no response received from the first UE device in response to a transmitted paging signal.

Method Embodiment 23 The method of Method Embodiment 19, wherein said listen before talk operation determines that the unlicensed spectrum is unavailable; and wherein the method further comprises: operating (2524) the first small cell base station to determine if either of: i) the maximum time limit for performing listen before talk (LBT) checks on the unlicensed spectrum for this paging message has been reached, or ii) the paging message exceeded the allowable time for a paging message to be in the base station buffer, has been satisfied; and wherein said step of generating (2534), at the first small cell base station, said paging response message includes: including (2541) in the paging response message an indication that the paging attempt to page the UE was a failure and that the reason for the failure was that unlicensed spectrum was unavailable, at the first small cell base station, for transmission of a paging signal to the first UE.

Method Embodiment 24 The method of Method Embodiment 19, wherein said listen before talk operation determines that the unlicensed spectrum is unavailable; and wherein the method further comprises: operating (2524) the first small cell base station to determine if either of: i) the maximum time limit for performing listen before talk (LBT) checks on the unlicensed spectrum for this paging message has been reached, or ii) the paging message exceeded the allowable time for a paging message to be in the base station buffer, has been satisfied; and wherein said step of generating (2534), at the first small cell base station, said paging response message includes: generating (2540) a paging failure response message which communicates (either explicitly, e.g., via a failure code, or implicitly, e.g., via the presence of the failure response message) that the paging attempt by the first small cell base station to page the first UE failed and the reason for the paging attempt failure is unavailability of the unlicensed spectrum (LBT fails to clear) resulting in no paging signal to page the first UE being transmitted by the first small cell base station.

Second Numbered List of Exemplary System Embodiments

System Embodiment 1 A communications system (1600 or 3000 or 3100) comprising: a first base station (1604 or 1604' or 1604" or 2600) including: a first processor (2602) configured to: operate the first base station to receive (1504) (e.g., via a network receiver (2616)) a paging request to page a first UE device (1634); determine (1506) a first set of base stations which are to attempt to page the first UE device, said first set of base stations including a small cell base station (1608 or 1610 or 1612 or 1608' or 1610' or 1612' or 1608" or 1610" or 1612"); operate the first base station to send (1532) (e.g., via a network transmitter (2618)) a paging request message to the small cell base station in said first set of base stations, said paging request message requesting paging of the first UE device; and operate the first base station to receive (1542) (e.g., via a network transmitter) a paging response message from the small cell base station, said paging response message indicating one of: i) an attempt at the small cell base station to page the first UE device was successful or ii) an attempt at the small cell base station to page the first UE device was unsuccessful.

System Embodiment 2 The communications system (1600 or 3000 or 3100) of System Embodiment 1, wherein the first base station (1604 or 1604' or 1604") is a macro base station; and wherein said small cell base station (1608 or 1610 or 1612 or 1608' or 1610' or 1612' or 1608" or 1610" or 1612") is a first small cell base station having a coverage area smaller than the coverage area of said macro base station.

System Embodiment 3 The communications system (1600 or 3100) of System Embodiment 2, wherein the first base station (1604 or 1604") uses licensed spectrum; and wherein the first small cell base station (1608 or 1610 or 1612 or 1608") uses unlicensed spectrum.

System Embodiment 4 The communications system (1600 or 3100) of System Embodiment 3, wherein the first small cell base station (1608 or 1610 or 1608") is within the coverage area (1605 or 1605") of the first base station (1604 or 1604") and fills in a dead zone in the first base station coverage area.

System Embodiment 5 The communications system (3000) of System Embodiment 2, wherein the first base station (1604') and said first small cell base station (1608' or 1610' or 1612') both use unlicensed spectrum but the first base station and the first small cell base station use different frequency bands.

System Embodiment 6 The communications system (1600 or 3000 or 3100) of System Embodiment 2, wherein the first small cell base station (1608 or 1610 or 1608' or 1610' or 1608") is within the coverage area (1605 or 1605' or 1605") of the first base station (1604 or 1604' or 1604") and fills in a dead zone in the first base station coverage area (1605 or 1605' or 1605").

System Embodiment 7 The communications system (1600 or 3000 or 3100) of System Embodiment 2, wherein the first small cell base station (1612 or 1612') has a coverage area (1613 or 1613') which partially overlaps the first (macro) base station coverage area (1605 or 1605') and the coverage area (1607 or 1607') of another (macro cell) base station (1606 or 1606'), said first small cell base station being at a location corresponding to a boundary area between macro cell base stations.

System Embodiment 8 The communications system (1600 or 3000 or 3100) of System Embodiment 2, wherein said first processor (2602) is configured to: determine the first set of base stations based on one or more of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) or ix) received UE reports (1530), as part of being configured to determine (1506) the first set of base stations which are to attempt to page the first UE device.

System Embodiment 9 The communications system (1600 or 3000 or 3100) of System Embodiment 8, wherein said determining the first set is based on at least two of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

System Embodiment 10 The communications system (1600 or 3000 or 3100) of System Embodiment 9, wherein said determining the first set of base stations is based on at least three of: i) historical cell information (1510); ii) first UE mobility pattern information (1512); iii) signal measurement reports communicated by the first UE to the first base station (1514); iv) channel quality information feedback (1516) communicated by the first UE to the first base station or another network device, v) physical downlink control channel load on a physical downlink control channel (PDCCH) at the first base station (1518), vi) a received signal strength (1520) (e.g., last known or average received signal strength) of a signal (e.g., RSRQ signal) transmitted by the first base station as reported to the first base station to by the first UE, vii) number (1522) of UEs requiring paging, vii) a number (1524) of small cells under a coverage area of the first base station, viii) radio network planning data (1526) and ix) received UE reports (1530).

System Embodiment 11 The communications system (1600 or 3000 or 3100) of System Embodiment 2, wherein the paging response message from the first small cell base station indicates a paging failure (1543) and wherein the paging response message from the first small cell base station further indicates the reason for the paging attempt failure.

System Embodiment 12 The communications system of System Embodiment 11, wherein the paging response message includes information (e.g., a failure cause code) indicating the reason for the paging attempt failure which indicates one of: i) unavailability of the unlicensed spectrum (LBT fails to clear) resulting in no paging signal transmitted by the first small cell base station or ii) no response received from the first UE device in response to a transmitted paging signal.

System Embodiment 13 The communications system of System Embodiment 2, wherein the paging response message from the first small cell base station indicates a paging failure (1543) and indicates (explicitly (e.g., via a fail code included in the message) or implicitly (e.g., via transmission of the paging response message) the reason for the paging attempt failure is unavailability of the unlicensed spectrum (LBT fails to clear) resulting in no paging signal being transmitted by the first small cell base station.

System Embodiment 14 The communications system (1600 or 3000 or 3100) of System Embodiment 2, wherein said paging request to page a first UE device (1634 or 1634' or 1634") received at the first base station (1604) is received from a network device (e.g., Access and mobility management Function (AMF))(1602); and wherein said first processor (2602) is further configured to: operate the first base station (1604) to send (15441) (e.g., via the network transmitter (2618)) a paging results message (e.g., paging response message) to the network device (e.g., the AMF), said paging results message indicating one of success or failure to page the first UE.

System Embodiment 15 The communications system (1600) of System Embodiment 1, wherein said first processor (2602) is further configured to: operate the first base station (1604) to receive (1504), (e.g., via the network interface) an additional paging request to page the first UE device (1634); determine (1506) an additional set of base stations which are to attempt to page the first UE device, said additional set of base stations including an additional small cell base station (1608) which is not included in said first set of base stations (at second time at least one different small cell is selected); operate the first base station (1604 or 1604' or 1604") to send (1532) (e.g., via the network transmitter (2618)) a paging request message to the additional small cell base station (1608) in said second set of base stations, said paging request message to the additional small cell requesting paging of the first UE device; and operate the first base station (1604 or 1604' or 1604") to receive (1542) (e.g., via the network receiver (2616)) a paging response message from the additional small cell base station (1608), said paging response message indicating one of: i) an attempt at the additional small cell base station to page the first UE device was successful or ii) an attempt at the additional small cell base station to page the first UE device was unsuccessful.

System Embodiment 16 The communications system (1600 or 3000 or 3100) of System Embodiment 1, wherein said first processor (2602) is further configured to: operate the first base station (1604 or 1604' or 1604") to receive (1554) a second paging request, said second paging request being a request to page a second UE device (1636); determine (1556) a second set of base stations which are to attempt to page the second UE device, said second set of base stations including a second small cell base station, said second small cell base station not being in said first set of base stations (second set of base stations is different by at least one small cell base station with the sets of base stations being selected on a per UE basis using information corresponding to the particular UE, e.g., with the selection process thus being different for at least some different UEs because of the difference in information corresponding to the individual UEs which is used to selected the set of base stations to attempt a page); operate the first base station (1604 or 1604' or 1604") to send (1582) (e.g., via network transmitter (2618)) a paging request message to the second small cell base station in said second set of base stations, said paging request message requesting paging of the second UE device (1636); and operate the first base station (1604) to receive (1592) (via the network receiver (2616)) a paging response message from the second small cell base station, said paging response message indicating one of: i) an attempt at the second small cell base station to page the second UE device was successful or ii) an attempt at the small cell base station to page the second UE device was unsuccessful.

System Embodiment 17 The communications system (1600) of System Embodiment 16, wherein said first processor (1602) is configured to: determine the second set of base stations based on one or more of: i) historical cell information (1560) corresponding to the second UE; ii) second UE mobility pattern information (1562); iii) signal measurement reports (1564) communicated by the second UE to the first base station; iv) channel quality information feedback (1566) communicated by the second UE to the first base station or another network device (1568), v) physical downlink control channel (PDDCH) load on a physical downlink control channel at the first base station, vi) a received signal strength (1570) (e.g., last known or average received signal strength) of a signal (e.g., RSRQ signal) transmitted by the first base station as reported to the first base station to by the second UE, vii) the number (1572) of UEs requiring paging, vii) the number (1574) of small cells under a coverage area of the first base station, viii) radio network planning data (1576) or ix) received UE reports (1580), as part of being configured to determine (1556) the second set of base stations which are to attempt to page the second UE device.

System Embodiment 18 The communications system (1600) of System Embodiment 2, further comprising: said first small cell base station (1608), said first small cell base station (1608) including: a second processor (2702) configured to: operate the first small cell base station (1608) to receive (2504) (e.g., via receiver 2716) the said paging request message, sent by the macro cell base station (1604), requesting paging of the first UE device (1634); and perform (2508), in response to said received paging request message, a listen before talk (LBT) operation to determine if unlicensed spectrum is available to use to transmit a paging signal to the first UE device (1634).

System Embodiment 19 The communications system (1600) of System Embodiment 18, wherein said second processor (2702) is further configured to: generate (2534) said paging response message indicating one of: i) an attempt at the first small cell base station (1608) to page the first UE device (1634) was successful or ii) an attempt at the first small cell base station (1608) to page the first UE device (1634) was unsuccessful; and operate the first small cell base station (1608) to transmit (2542) (e.g. via transmitter (2718)) the generated paging response message to the macro cell base station (1604).

System Embodiment 20 The communications system (1600) of System Embodiment 19, wherein said listen before talk operation determines that the unlicensed spectrum is available; and wherein the second processor (2702) is further configured to: operate the first small cell base station (2512) to transmit (2510) (e.g., via wireless transmitter (2714)) a paging signal from the first small cell base station (1608) directed to the first UE device (1634); operate the first small cell base station (1608) to monitor (2514) for a response to the paging signal transmitted form the first small cell base station (1608); and decide (2520), when said the monitoring detected a response (e.g., a RRC connection establishing signal in response to the transmitted paging signal), to include a paging success indication in the paging response message when generating the paging response message; and decide (2522), when said the monitoring failed to detect a response, to include a paging failure indication in the paging response message when generating the paging response message.

System Embodiment 21 The communications system (1600) of System Embodiment 19, wherein said listen before talk operation determines that the unlicensed spectrum is available; and wherein said second processor is further configured to: operate (2512) the first small cell base station (1608) to transmit (e.g., via wireless transmitter 2714) a paging signal from the first small cell base station directed to the first UE device (1634); operate the first small cell base station (1604) to monitor (2514) for a response to the paging signal transmitted from the first small cell base station; and decide (2522), when said the monitoring failed to detect a paging response, to include a paging failure indication in the paging response message when generating the paging response message.

System Embodiment 22 The communications system (1600) of System Embodiment 21, wherein the paging response message indicates that the reason for the paging failure was no response received from the first UE device in response to a transmitted paging signal.

System Embodiment 23 The communications system (1600) of System Embodiment 19, wherein said listen before talk operation determines that the unlicensed spectrum is unavailable; and wherein the second processor (2702) is further configured to: operate (2524) the first small cell base station (1608) to determine if either of: i) the maximum time limit for performing listen before talk (LBT) checks on the unlicensed spectrum for this paging message has been reached, or ii) the paging message exceeded the allowable time for a paging message to be in the base station buffer, has been satisfied; and; and wherein said second processor (2702) is configured to: include (2541) in the paging response message an indication that the paging attempt to page the UE (1634) was a failure and that the reason for the failure was that unlicensed spectrum was unavailable, at the first small cell base station (1608), for transmission of a paging signal to the first UE (1634), as part of being configured to generate (2534), at the first small cell base station (1608), said paging response message.

System Embodiment 24 The communications system (1600) of System Embodiment 19, wherein said listen before talk operation determines that the unlicensed spectrum is unavailable; and wherein said second processor (2702) is further configured to: operate (2524) the first small cell base station (1608) to determine if either of: i) the maximum time limit for performing listen before talk (LBT)

checks on the unlicensed spectrum for this paging message has been reached, or ii) the paging message exceeded the allowable time for a paging message to be in the base station buffer, has been satisfied; and generate (2540) a paging failure response message which communicates (either explicitly, e.g., via a failure code, or implicitly, e.g., via the presence of the failure response message) that the paging attempt by the first small cell base station (1608) to page the first UE (1634) failed and the reason for the paging attempt failure is unavailability of the unlicensed spectrum (LBT fails to clear) resulting in no paging signal to page the first UE (1634) being transmitted by the first small cell base station (1608), as part of being configured to generate (2534), at the first small cell base station (1608), said paging response message.

Second Numbered List of Exemplary Computer Readable Medium Embodiments

Computer Readable Medium Embodiment 1 A non-transitory computer readable medium (2610) including computer executable instructions which when executed by a processor (2602) control a first base station (2600 or 1604) to perform the steps of: receiving (1504), at the first base station, a paging request to page a first UE device; determining (1506), at the first base station, a first set of base stations which are to attempt to page the first UE device, said first set of base stations including a small cell base station; sending (1532), from the first base station, a paging request message to the small cell base station in said first set of base stations, said paging request message requesting paging of the first UE device; and receiving (1542), at the first base station, a paging response message from the small cell base station, said paging response message indicating one of: i) an attempt at the small cell base station to page the first UE device was successful or ii) an attempt at the small cell base station to page the first UE device was unsuccessful.

Computer Readable Medium Embodiment 2 A non-transitory computer readable medium (2710) including computer executable instructions which when executed by a processor (2702) control a first small cell base station (2700 or 1608) to perform the steps of: receiving (2504), at the first small cell base station, the said paging request message, sent by the macro base station, requesting paging of the first UE device; and performing (2508), at the first small cell base station, in response to said received paging request message, a listen before talk (LBT) operation to determine if unlicensed spectrum is available to use to transmit a paging signal to the first UE device.

Computer Readable Medium Embodiment 3 The non-transitory computer readable medium (2710) of Computer Readable Medium Embodiment 2, further comprising computer executable instructions which when executed by said processor (2702) control said first small cell base station (2700 or 1608) to perform the steps of: generating (2534), at the first small cell base station, said paging response message indicating one of: i) an attempt at the first small cell base station to page the first UE device was successful or ii) an attempt at the first small cell base station to page the first UE device was unsuccessful; and transmitting (2542), at the first small cell base station, the generated paging response message to the macro base station.

Figure 35:
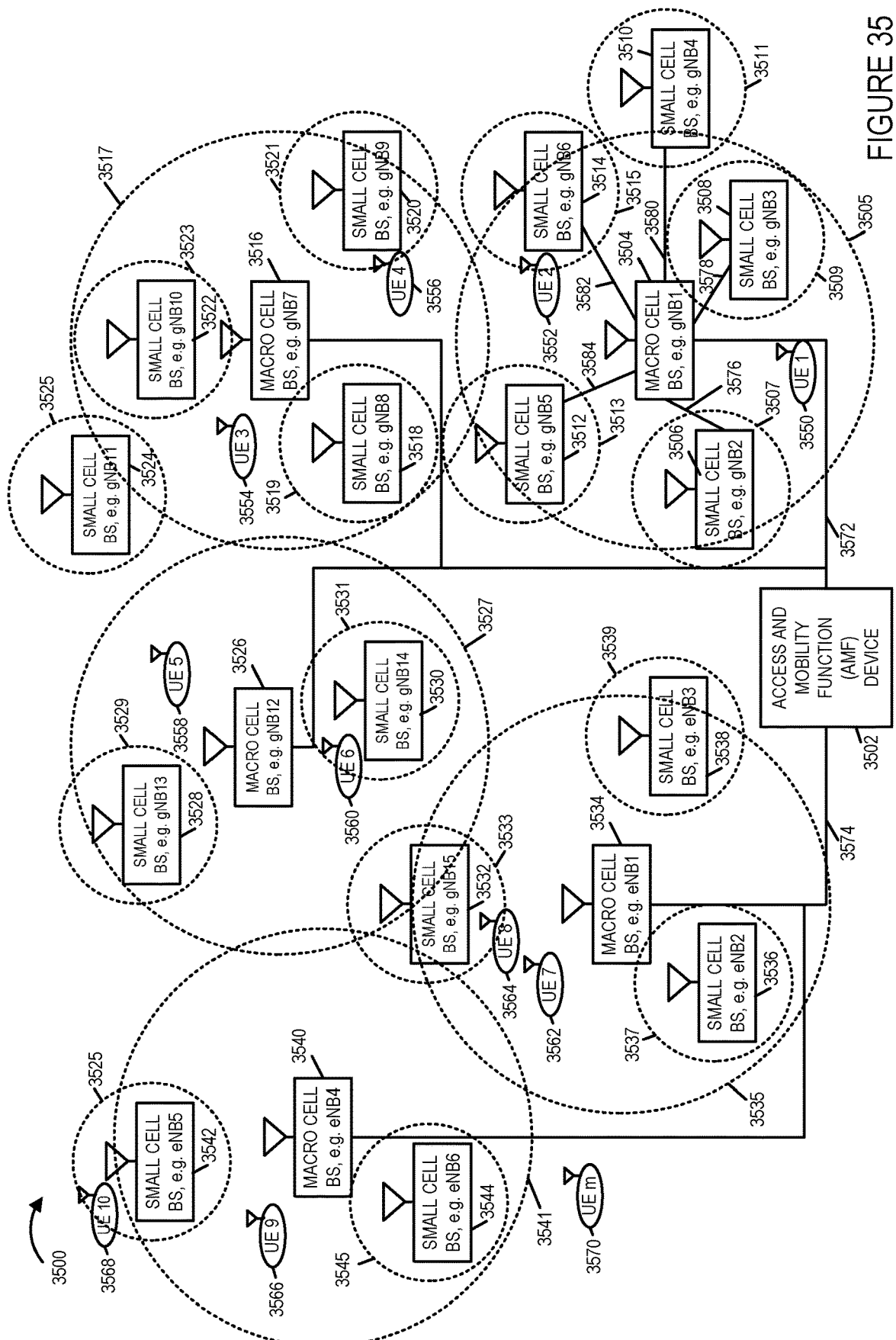
FIG. 35 is a drawing of an exemplary communications system in accordance with an exemplary embodiment.

FIG. 35 is a drawing of an exemplary communications system 3500 in accordance with an exemplary embodiment. Exemplary communications system 3500 includes an access and mobility function (AMF) device3502, a plurality of base stations (macro cell base station 3504, e.g., gNB1, small cell base station 3506, e.g., gNB2, small cell base station 3508, e.g., gNB3, small cell base station 3510, e.g., gNB4, small cell base station 3512, e.g., gNB5, small cell base station 3514, e.g., gNB6, macro cell base station 3516, e.g., gNB7, small cell base station 3528, e.g., gNB8, small cell base station 3520, e.g., gNB9, small cell base station 3522, e.g., gNB10, small cell base station 3524, e.g., gNB11, macro cell base station 3526, e.g., gNB12, small cell base station 3528, e.g., gNB13, small cell base station 3530, e.g., gNB14, small cell base station 3532, e.g., gNB15, macro cell base station 3534, e.g., eNB1, small cell base station 3536, e.g., eNB2, small cell base station 3538, e.g., eNB3, macro cell base station 3540, e.g., eNB4, small cell base station 3542, e.g., eNB5, and small cell base station 3544, e.g., eNB6. Each of the base station (3504, 3506, 3508, 3510, 3512, 3514, 3516, 3518, 3520, 3522, 3524, 3526, 3528, 3530, 3532, 3534, 3536, 3538, 3540, 3542, 3544) has a corresponding coverage area (3505, 3507, 3519, 3511, 3513, 3515, 3517, 3519, 3521, 3523, 3525, 3527, 3529, 3531, 3533, 3535, 3537, 3539, 3541, 3543, 3545), respectively. Exemplary communications system 3500 further includes a plurality of user equipment (UE) devices (UE 1 3550, UE2 3552, UE3 3554, UE4 3556, UE5 3558, UE6 3560, UE7 3562, UE8 3564, UE9 3566, UE10 3568, UEm 3570, and at least some of the UEs are mobile devices. Some of the UEs in the communications system support communications with gNBs. Some of the UEs in the communications system support communications with eNBs. Some of the UEs in the communications system support communications with both gNBs and eNBs.

In various embodiments, a UE, e.g., UE1 3550, receives a novel RRC Release message from a base station, said novel RRC Release message including one or both of: i) a Paging Priority List for new radio base stations, e.g., gNBs, and ii) a Paging Priority List for EUTRA base stations, e.g., eNBs. In some embodiments, the RRC Release message further includes information indicating a time duration for monitoring for paging signals, e.g., a monitoringDuration value. In some embodiments, the RRC Release message further includes information indicating a maximum number of paging cells to be monitored, e.g. a maximumPagingCellsMonitoried value. In some embodiments the RRC release message further includes information indicating number of cells per Discontinuous Reception Cycle (DRX) to monitor, e.g. a CellsPerDRXToMonitor information value. In some, but not necessarily all, embodiments, the RRC Release message is a RRCRelease per TS 38.331.

Macro base stations (3504, 3516, 3526) are coupled to AMF device 3502 via backhaul network 3572. Macro base stations (3534, 3540) are coupled to AMF device 3502 via backhaul network 3574. Base stations with overlapping coverage areas are coupled to one another. For example, macro cell base station 3504, e.g., gNB1, is coupled to small cell base stations (3506, 3508, 3510, 3512, 3514) via communications links (3576, 3578, 3580, 3582, 3584), respectively.

Figure 36:
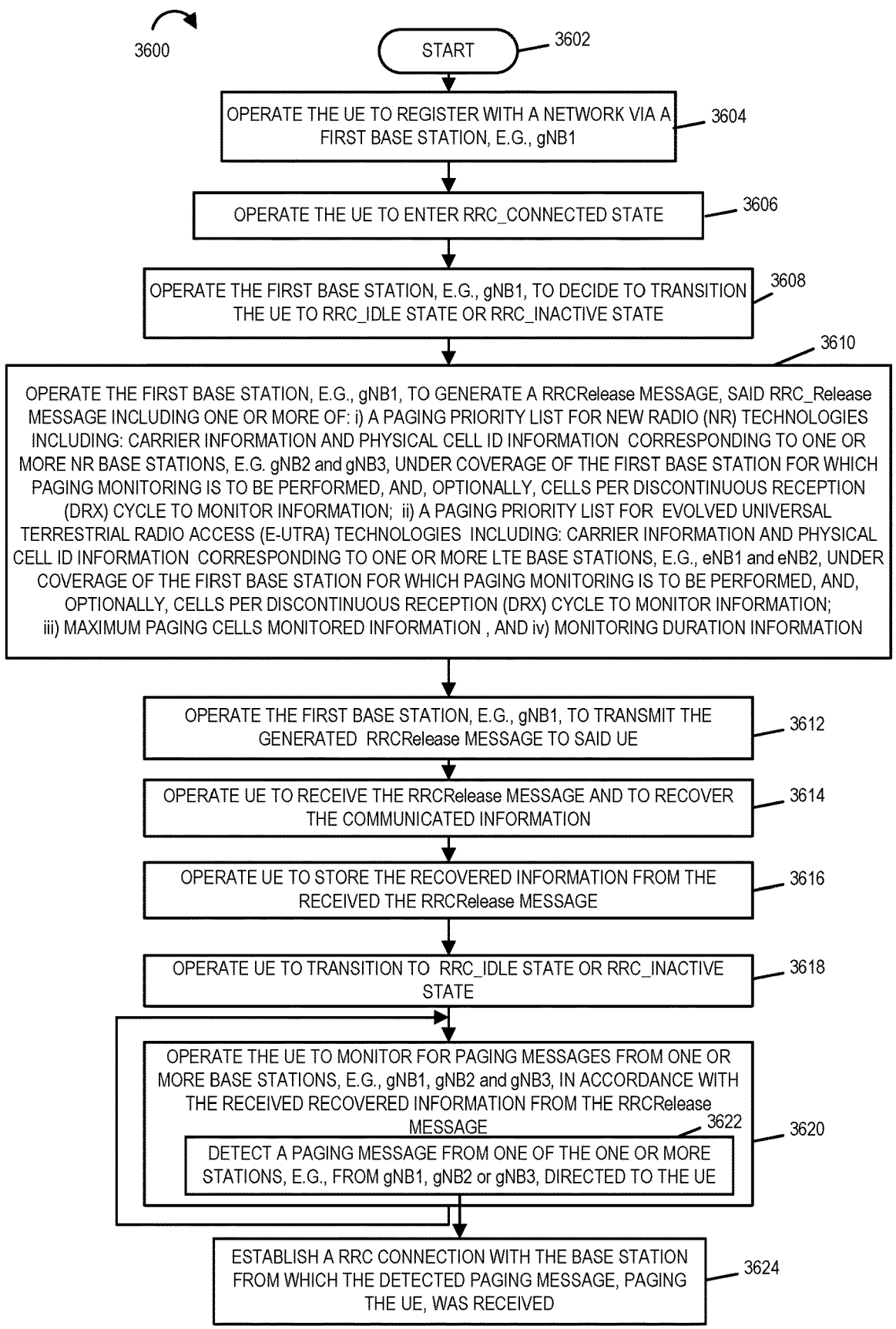
FIG. 36 is a flowchart of an exemplary method of operating a communications system, e.g., the communications system of FIG. 35, in accordance with an exemplary embodiment.

FIG. 36 is a flowchart 3600 of an exemplary method of operating a communications system, e.g., communications system 3500 of FIG. 35, in accordance with an exemplary embodiment. Operation starts in step 3602 in which the communications system is powered on and initialized. Operation proceeds from step 3602 to step 3604.

In step 3604 a use equipment (UE) registers with a network via a first base station, e.g., gNB1. Operation proceeds from step 3604 to step 3606. In step 3606 the UE enters RRC_CONNECTEDstate. Operation proceeds from step 3606 to step 3608.

In step 3608 the first base station, e.g. gNB1, decides to transition the UE to RCC IDLE state or RRC_INACTIVE state. Operation proceeds from step 3608 to step 3610.

In step 3610 the first base station, e.g. gNB1, generates a RRC Release message, said RRC Release message including one or more or all of: i) a paging priority list for New Radio (NR) technologies including: carrier information and physical cell ID information corresponding to one or more NR base stations, e.g. gNB2 and gNB3, under coverage of the first base station for which paging monitoring is to be performed, and, optionally, cells per discontinuous reception (DRX) cycle to monitor; and ii) a paging priority list for Evolved Universal Terrestrial Radio Access (E-UTRA) technologies including: carrier information and physical cell ID information corresponding to one or more LTE base stations, e.g. eNB1 and eNB2, under coverage of the first base station for which paging monitoring is to be performed, and, optionally, cells per discontinuous reception (DRX) cycle to monitor; iii) maximum paging cells monitoring information; and iv) monitoring duration information. In some, but not necessarily all, embodiments, the RRC Release message is a RRCRelease message per TS 38.331. Operation proceeds from step 3610 to step 3612.

In step 3612 the first base station, e.g., gNB1, transmits the generated RRC Release message to said UE. Operation proceeds from step 3612 to step 3614. In step 3614 the UE receives the RRC Release message and recovers the communicated information. Operation proceeds from step 3614 to step 3616. In step 3616 the UE stores the recovered information from the received RRC Release message. Operation proceeds from step 3616 to step 3618.

In step 3618 the UE transitions to RRC_IDLE state or RRC_INACTIVE station. Operation proceeds from step 3618 to step 3620. In step 3620 the UE monitors for paging messages from one or more base stations, e.g., gNB1, gNB2 and gNB3, in accordance with the received recovered information from the RRC Release message. Step 3620 is performed on an ongoing basis, e.g., repetitively. Step 3602 may, and sometimes does, include step 3622 in which the UE detected a paging message from a base station e.g., one gNB1, gNB2 or gNB3, directed to the UE. Operation proceeds from step 3622 to step 3624, in which the UE establishes a RRC connection with the base station from which the detected paging message, paging the UE, was received.

Figure 37A:
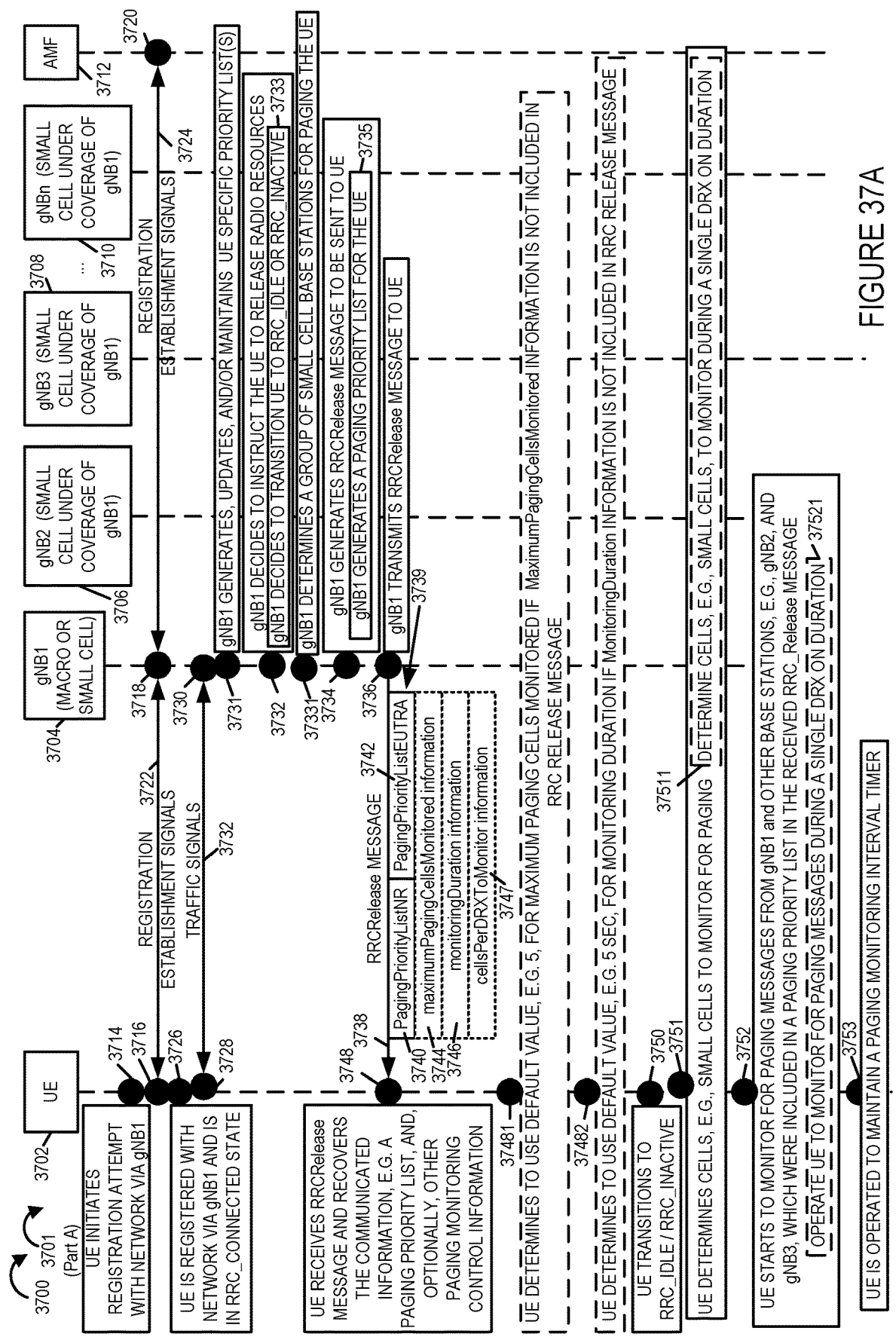
FIG. 37A is first part of an exemplary signaling diagram, illustrating an exemplary method, in accordance with an exemplary embodiment.

FIG. 37, comprising the combination of FIG. 37A and FIG. 37B, is drawing 3700, comprising Part A 3701 and Part B 3703, of a signaling diagram illustrating an exemplary method in accordance with an exemplary embodiment. FIG. 37 includes exemplary UE 3702, exemplary base stations (gNB1 3704, gNB2 3706, gNB3 3708, . . . , gNBn 3710) and exemplary Access and Mobility Management Function (AMF) device 3712. In this example, gNB1 3704 is a macro or small cell base station; gNB2 3706 is a small cell base station under coverage of gNB1; gNB3 3708 is a small cell base station under coverage of gNB1; and gNBn 3710 is a small cell base station under coverage of gNB1. FIG. 37 further illustrates exemplary signals between the nodes and exemplary steps performed by the nodes in accordance with an exemplary embodiment.

In step 3714, UE 3702 initiates a registration attempt with a network via gNB1 3704. In step 3716 UE 3712 sends and/or receives registration establishment signals 3722. In step 3718 gNB1 3704 sends and/or receives registration establishment signals 3722 and 3724. In step 3720 AMF 3712 sends and/or receives registration establishment signals 3724.

In step 3726 UE 3702 is registered with the network via gNB1 3704 and is in RRC_CONNECTED state. In step 3728 and step 3730, UE 3702 and gNB1 3704 communicate traffic signals 3732.

In step 3731 gNB1 3704 generates, updates, and/or maintains UE specific priority lists with regard to paging.

In step 3732 gNB1 3704 decides to instruct UE 3702 to release radio resources. Step 3732 includes step 3733. In step 3733 gNB1 3704 decides to transition the UE 3702 to RRC_IDLE state or RRC_INACTIVE state. In step 37331, the gNB1 3704 determines a group of small cell base stations, identified as suitable for paging the UE 3702, based on received radio network planning data and feedback data/information, e.g. via Operations, Administration and Maintenance (OAM), updated via Automatic Neighbor Relations (ANR) and/or via Self-Organizing Networks (SON), neighbour node discovery, etc.

In step 3734 gNB1 3704 generates an RRC Release message 3738 to be sent to UE 3702. Step 3734 includes step 3735 in which gnB1 3704 generates a paging priority list 3739 for the UE 3702, e.g., based on knowledge of cells which previously provided service to said first UE (3702) and/or the current location of the first UE (3702). In step 3736 gNB1 3704 transmits the RRC Release message 3738 to UE 3702. The RRC Release message 3738, generated in step 3734, includes the paging priority list 3739 including a PagingPriorityListNR 3740 (to indicate gNBs identified as suitable for paging this UE corresponding to the outcome of step 37331) and/or PagingPriorityListEUTRA 3742 (to indicate eNBs identified as suitable for paging this UE corresponding to the outcome of step 37331) and/or maximumPagingCellsMonitored information 3744 e.g. the total number of cells to monitor for paging messages, and/or monitoringDuration information 3746, e.g., a monitoring duration time over which the identified cells are monitored for paging information by the UE 3702. The paging priority list 3739 is an ordered list with its entries and sub-entries sorted in descending order of priority such that first entry in the list has the highest priority, and the last entry in the list has the lowest priority. Each paging priority list i.e. PagingPriorityListNR 3740 and PagingPriorityListEUTRA 3742 communicated in RRC ReleaseMessage 3738 includes carrier information and cell ID information for each of the selected base stations on the list (the outcome of step 37331), and optionally, cellsPerDRXToMonitor information 3747 e.g., the number of cells per DRX cycle to monitor.

For purposes of an example, consider that the RRC Release message 3738 includes a paging priority list 3739 which includes a new radio paging Priority list 3740 which identifies gNB2 3706 and gNB3 3708, as the selected small cell base stations, which UE 3702 is to monitor for paging signals from, in addition to monitoring for paging signal gNB1 3704.

In step 3748 UE 3702 receives RRC Release message 3738, recovers the communicated information and stores the recovered communicated information. The recovered communicated information includes, e.g., a paging priority list including cell ID information and carrier information for each of the selected base stations on the ordered list, and optionally one or more of all of: maximumPagingCellsMonitored information, monitoringDuration information, and cell sPerDRXToMonitor information.

In some embodiments, maximumPagingCells Monitored information is not communicated in the RRC release message, and optional step 37481 is performed, in which the UE 3702 determines to use a predetermined default value, e.g., 5, for maximum paging cells monitored, if maximumPagingCellsMonitored information is not included in the RRC release message. In some embodiments, MonitoringDuration information is not communicated in the RRC release message, and optional step 37482 is performed, in which the UE 3702 determines to use a predetermined default value, e.g., 5 seconds, for the paging monitoring duration, if MonitoringDuration information is not included in the RRC release message. Operation proceeds from step 3748, step 37481 or step 37482, to step 3750 in which the UE 3702 transitions to RRC_IDLE/RCC_INACTIVE state. Operation proceeds from step 3750 to step 3751.

In step 3751 UE 3702 determines the cells, e.g., the small cells to monitor for paging. In some embodiments, step 3751 includes step 37511 in which UE 3702 determines the cells, e.g. the small cells, to monitor for paging messages during a single DRX duration. In some such embodiments, step 37511 may, be and sometimes is repeated, for a plurality of different DRX durations during the monitoring duration. Operation proceeds from step 3751 to step 3752.

In step 3752 the UE 3702 starts to monitor for paging messages from gNB1 3704 and other base stations, e.g. gNB2 3706 and gNB3 3708, which were included in a paging priority NR list 3740 or PagingPriorityListEUTRA 3742 of the paging priority list 3739 in the received RRC Release message 3738. The maximum number of cells for which the UE 3702 monitors for paging information does not exceed maximumPagingCellsMonitored information 3744. If the number of entries in the paging priority list 3739 is greater than maximumPagingCellsMonitored information 3744 then the UE 3702 only monitors cells indicated by the first list entry until the entry corresponding to the value of maximumPagingCellsMonitored information 3744. If maximumPagingCellsMonitored information 3744 is not included, then the UE 3702 receiving RRCRelease message 3738 assumes that the total number of cells it has to monitor for paging messages is a predetermined default value, e.g., 5. The UE 3702 typically monitors for paging messages from gNB1 3704 during its DRX ON duration. In some embodiments, step 3752 includes step 37521 in which UE 3702 is operated to monitor for paging messages during a single DRX duration. In some such embodiments, step 37521 may be, and sometimes is, repeated, for a plurality of different DRX durations during the monitoring duration. The paging priority list 3739 may, and sometimes does, require UE 3702 to monitor for paging messages from more than one of the gNBs e.g. gNB2 3706, gNB3 3708 etc. Such monitoring is performed during UE's 3702 DRX ON duration. It is therefore possible that the UE 3702 may not be able to monitor for paging messages across all cells (up to cellsPerDRXToMonitor information 3747 cells) within a single DRX ON duration. In such a case and where UE DRX cycle is synchronized across some or all of the grouped cells indicated in paging priority list 3739, UE 3702 monitors one or more pre-determined cells indicated by maximum of cellsPerDRXToMonitor information 3747 within a given DRX ON duration. At the next DRX ON duration, the UE 3702 monitors remainder of one or more pre-determined cells indicated by cellsPerDRXToMonitor information 3747. The UE 3702 in each DRX ON duration repeats this until it has monitored all cells indicated by maximumPagingCellsMonitored information 3744.

In step 3753 UE 3753 is operated to maintain a paging monitoring interval timer across all the cells listed in PagingPriorityListNR 3740 and PagingPriorityListEUTRA 3742 if monitoringDuration information 3746 is included in RRCRelease message 3738. If monitoringDuration information 3746 is not included, then the UE 3702 receiving RRCRelease message 3738 assumes that the time duration for which UE 3702 is expected to monitor for paging message across identified cells in paging priority list 3738 does not exceed, a predetermined default duration value, e.g., 5 s.

In step 3754 AMF 3712 generates and sends a request message 3756 to page UE 3702 to gNB1 3704. In step 3758 UE 3702 receives the request 3756 to page the UE 3702. In step 3760 gNB1 3704 generates and sends a request 3762 to page UE 3702 to gNB2 3706, which is received by gNB2 3706 in step 3764. In step 3766 gNB1 3704 generates and sends a request 3768 to page UE 3702 to gNB3 3708, which is received by gNB3 3708 in step 3770.

Step 3755 is performed, e.g., on a recurring basis, after the UE 3702 starts monitoring for paging signals (step 3752). Step 3761 is also performed, e.g. on a recurring basis after the UE 3702 starts monitoring for paging signals. Steps 3752 and 3761 may be performed in parallel.

In step 3755 UE 3702 determines if the paging monitoring interval time has reached the maximum paging cells monitoring duration per monitoringDuration information 3746. If UE 3702 determines that the paging monitoring interval time has reached the maximum paging cells monitoring duration, then in step 3757 UE 3702 stops monitoring for paging signals from cells on said paging priority list. In some embodiments, upon doing so, the UE 3702 falls backs to its normal mode of operation for paging monitoring from gNB1 3704. Alternatively, if UE 3702 determines that the paging monitoring interval time has not reached the maximum paging cells monitoring duration, then in step 3759 UE 3702 continues monitoring for paging signals from cells on said paging priority list.

In step 3761 UE 3702 determines if the UE 3702 has monitored the maximum number of paging cells on the paging priority list to be monitored for paging signals. If UE 3702 determines has monitored the maximum number of paging cells on the paging priority list to be monitored for paging signals, then in step 3763 UE 3702 stops monitoring for paging signals from cells on said paging priority list. Alternatively, if UE 3702 determines that has not monitored the maximum number of paging cells on the paging priority list to be monitored for paging signals, then in step 3765 UE 3702 continues monitoring for paging signals from cells on said paging priority list.

In step 3772 gNB1 3704 generates and sends UE paging signal 3774, attempting to page UE 3702. In step 3776 gNB2 3706 generates and sends UE paging signal 3778, attempting to page UE 3702. In step 3780 gNB3 3708 generates and sends UE paging signal 3782, attempting to page UE 3702.

In some embodiments paging signals 3774, 3778 and 3782 are transmitted concurrently. In some embodiments, paging signals 3774, 3778 and 3782 are each transmitted repetitively, e.g., during a monitoring duration.

In this example, in step 3784, UE 3702 detects paging signal 3782 from gNB3 3708, which is a paging signal directed to UE 3702. In step 3785 UE 3702 resets the monitoring interval timer.

In step 3786, in response to the detected paging signal 3782, UE 3702 generates and sends a RRC_Connection_Establishment signal 3788 to gNB3 3708, which is received in step 3790, and gNB3 3708 generates and sends RRC connection establishment signal 3792 to AMF 3712, which is received in step 3794.

With the RRC connection having been established between UE 3702 and gNB3 3708, in steps 3796 and 3798, the UE 3702 and gNB3 3708 communicate traffic signals 3799.

Figure 38:
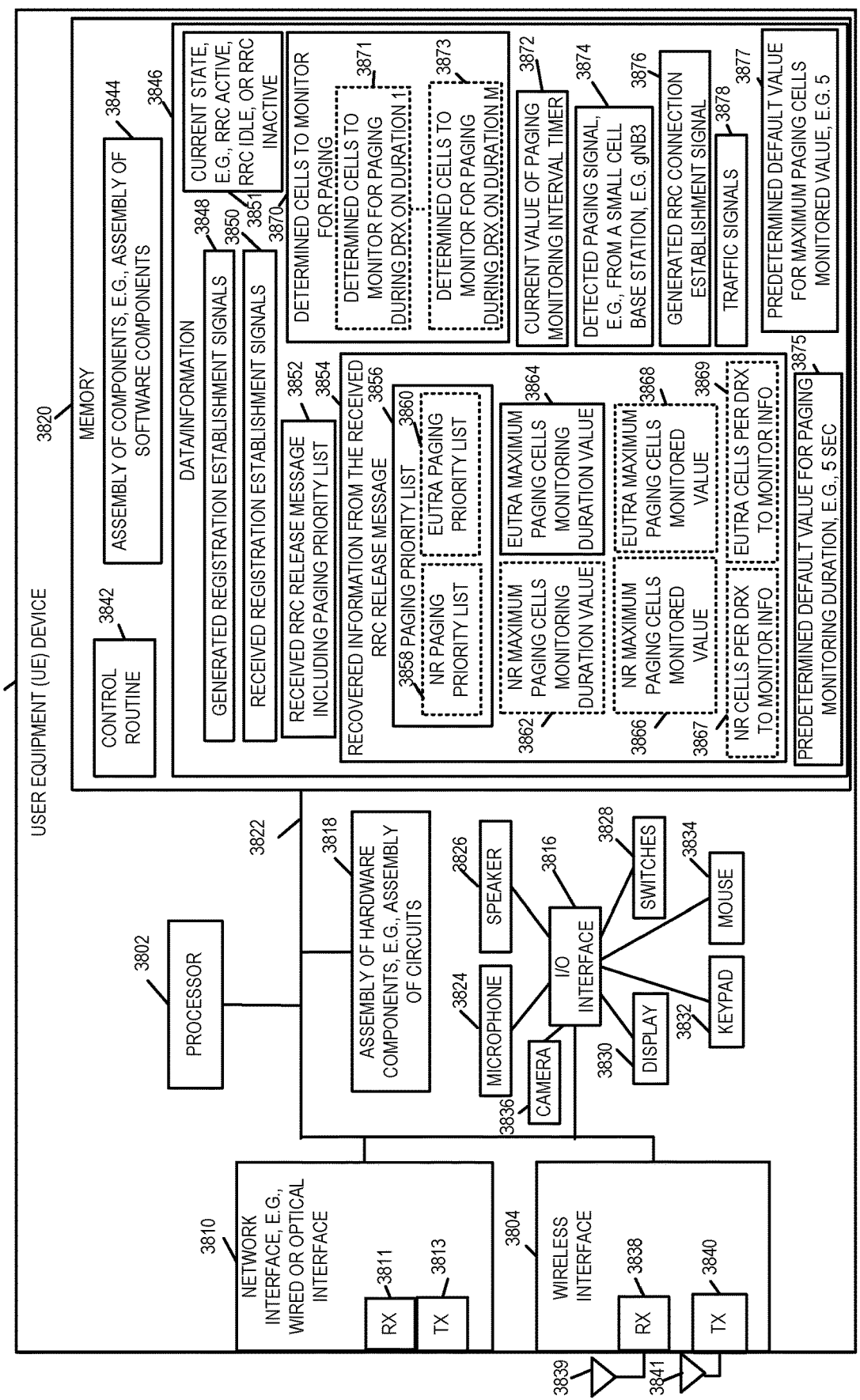
FIG. 38 is a drawing of an exemplary user equipment (UE) device in accordance with an exemplary embodiment.

FIG. 38 is a drawing of an exemplary user equipment (UE) device 3800 in accordance with an exemplary embodiment. UE 3800 is, e.g., one of the UEs (UE1 3550, UE2 3552, UE3 3554, UE4 3556, UE5 3558, UE6 3560, UE7 3562, UE8 3564, UE9 3566, UE10 3568, . . . , UEm 3570) of exemplary system 3500 of FIG. 35, a UE implementing steps of the exemplary method of flowchart 3600 of FIG. 36, and/or UE 3702 of signaling diagram 3700 of FIG. 37.

Exemplary UE device 3800 includes a processor 3802, e.g., a CPU, a wireless interface 3804, a network interface 3810, e.g., a wired or optical interface, an I/O interface 3816, an assembly of hardware components 3818, e.g., an assembly of circuits, and memory 3820 coupled together via bus 3822 over which the various elements interchange data and information. UE device 3800 further includes a microphone 2824, a speaker 2826, switches 2828, a display 2830, e.g., a touchscreen display, a keypad 3832, a mouse 2834 and a camera 3836. The various I/O devices (2824, 2826, 2828, 2830, 2832, 2834) are coupled to I/O interface 3816, via which the I/O devices may communicate with other elements within UE 3800.

Network interface 3810 includes a receiver 3811 and a transmitter 3813, via which the UE 3800 may receive and send signals to other devices, when the UE 3800 is coupled, via a wired or optical interface to a network, e.g., a backhaul network, and/or the Internet.

Wireless interface 3804 includes a wireless receiver 3838 and a wireless transmitter 3840. Wireless receiver 3838 is coupled to receive antenna 3839, via which the UE 3800 receives wireless signals, e.g., wireless signals from base station, e.g., macro cell and/or small cell base stations. Exemplary base stations include, e.g. gNBs and eNBs. Wireless transmitter 3840 is coupled to transmit antenna 3840, via which the UE 3800 transmits wireless signals, e.g., wireless signals to base stations. In some embodiments the same antenna is used for transmit and receive. In some embodiments, a plurality of antennas or antenna elements are used for transmit and/or receive. Exemplary received wireless signals, received via receiver 3838, include, e.g., registration establishment signals, a RRC Release Message, a paging message, and traffic signals. Exemplary transmitted wireless signals transmitted via transmitter 3840 include, e.g., a registration establishment signal and traffic signals.

Memory 3820 includes a control routine 3842, an assembly of components 3844, e.g., an assembly of software components, and data/information 3846. Data/information 3846 includes generated registration establishment signals 3848, received registration establishment signals 3850, a received RRC release message including a paging priority list 3852, and recovered information from the received RRC release message 3854. The recovered information from the received RRC release message 3854 includes a paging priority list 3856 including a new radio (NR) paging priority list 3858 and a EUTRA paging priority list 3860, a NR maximum paging cells monitoring duration value 3862, a EUTRA maximum paging cells monitoring duration value 3964, a NR maximum paging cells monitored value 3866, NR cells per DRX cycle to monitor information 3867, a EUTRA maximum paging cells monitored value 3868, and a EUTRA cells per DRX cycle to monitor information 3869. Data/information 3846 further includes a current state 3851 for the UE, e.g., RRC active state, RRC_IDLE state or RRC_INACTIVE state, determined cells to monitor for paging 3870, a current value of the paging monitoring interval timer 3872, a detected paging signal, e.g., from a small cell base station, e.g. gNB3, a generated RRC connection establishment signal 3876, e.g. to be sent to the base station from which the paging signal paging the UE was detected, and traffic signals 3876, a predetermined default value, e.g., 5 seconds, for paging monitoring duration 3875, e.g., to be used when MonitioringDuration information is not communicated in the received RRC release message, and a predetermined default value, e.g., 5, for maximum paging cells monitored value, e.g., to be used when maximumPagingCellsMonitored information is not communicated in the received RRC release message. In some embodiments, the determined cells to monitor for paging information 3870 includes one or more sets of determined cells to monitor for paging during different DRX on durations of the paging monitoring duration (determined cells to monitor for paging during DRX ON duration 1 3871, . . . , determined cells to monitor for paging during DRX ON duration M 3873).

Figure 39A:
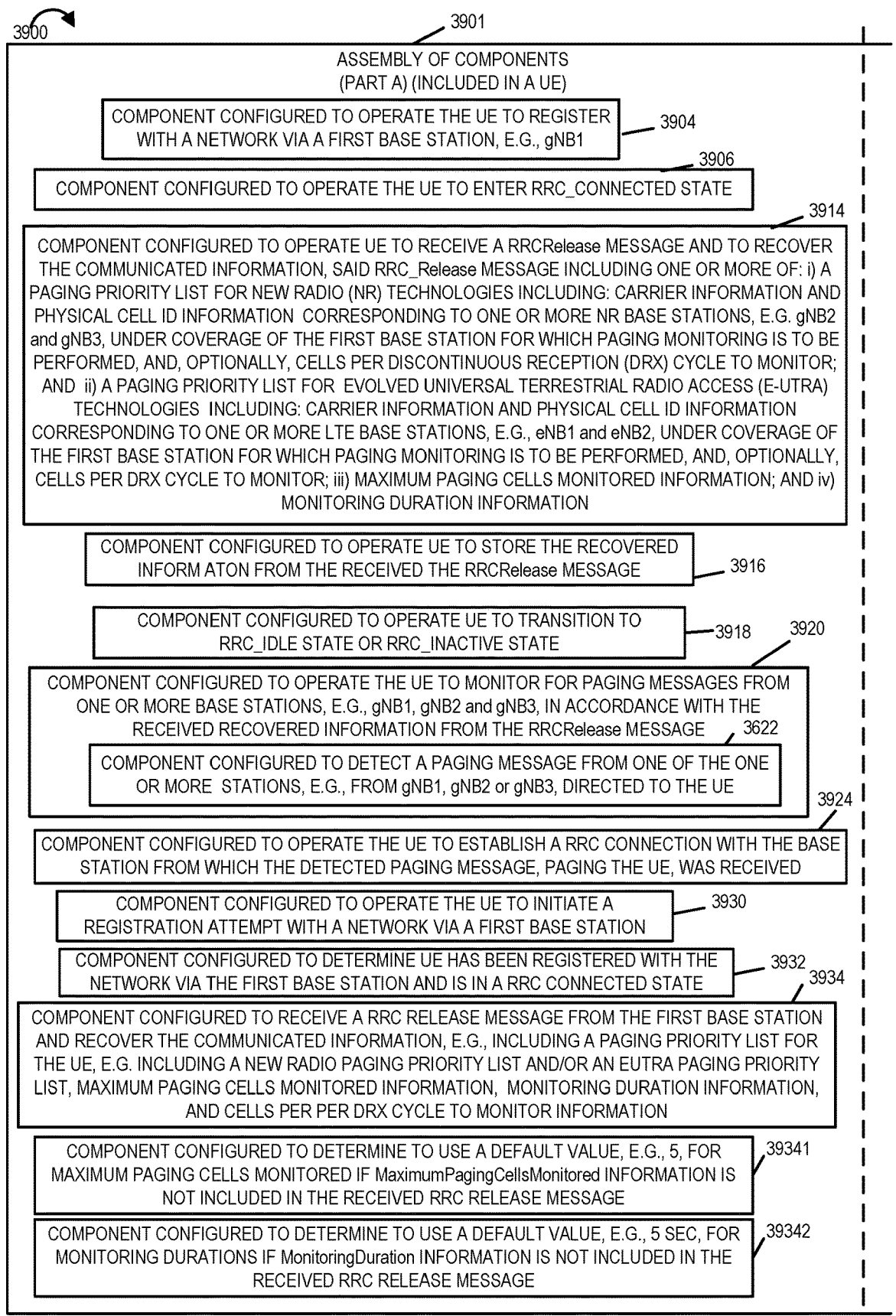
FIG. 39 is a drawing of an exemplary assembly of components, which may be included in an exemplary UE device, in accordance with an exemplary embodiment.

FIG. 39, comprising the combination of FIG. 39A and FIG. 39B, is a drawing of an exemplary assembly of components 3900, comprising Part A 3901 and part B 3903, which may be included in an exemplary UE device, in accordance with an exemplary embodiment. Exemplary assembly of components 3900 which may be included in a UE device, e.g., UE device 3800 of FIG. 38, and implement steps of an exemplary method, e.g., steps of the method of the flowchart 3600 of FIG. 36 or steps of the method of signaling diagram 3700 of FIG. 37.

Assembly of components 3900 can be, and in some embodiments is, used in UE device 3800 of FIG. 38, one of the UEs (3550, 3552, 3554, 3556, 3558, 3560, 3562, 3564, 3566, 3568, 3570) of system 3500 of FIG. 35, a UE device implementing one of more steps of flowchart 3600 of FIG. 36 and/or one UE 3702 of signaling diagram 3700 of FIG. 37. The components in the assembly of components 3900 can, and in some embodiments are, implemented fully in hardware within the processor 3802, e.g., as individual circuits. The components in the assembly of components 3900 can, and in some embodiments are, implemented fully in hardware within the assembly of components 3818, e.g., as individual circuits corresponding to the different components. In other embodiments some of the components are implemented, e.g., as circuits, within the processor 3802 with other components being implemented, e.g., as circuits within assembly of components 3818, external to and coupled to the processor 3802. As should be appreciated the level of integration of components on the processor and/or with some components being external to the processor may be one of design choice. Alternatively, rather than being implemented as circuits, all or some of the components may be implemented in software and stored in the memory 3820 of the UE device 3800 with the components controlling operation of the UE to implement the functions corresponding to the components when the components are executed by a processor, e.g., processor 3802. In some such embodiments, the assembly of components 3900 is included in the memory 3820 as assembly of components 3844. In still other embodiments, various components in assembly of components 3900 are implemented as a combination of hardware and software, e.g., with another circuit external to the processor 3802 providing input to the processor 3802 which then under software control operates to perform a portion of a component's function. While processor 3802 is shown in the FIG. 38 embodiment as a single processor, e.g., computer, it should be appreciated that the processor 3802 may be implemented as one or more processors, e.g., computers.

When implemented in software the components include code, which when executed by the processor 3802, configure the processor 3802 to implement the function corresponding to the component. In embodiments where the assembly of components 3900 is stored in the memory 3820, the memory 3820 is a computer program product comprising a computer readable medium comprising code, e.g., individual code for each component, for causing at least one computer, e.g., processor 3802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 39 control and/or configure the UE 3800, or elements therein such as the processor 3802, to perform the functions of corresponding steps illustrated and/or described in the method of one or more of the flowcharts, signaling diagrams and/or described with respect to any of the Figures. Thus the assembly of components 3900 includes various components that perform functions of corresponding one or more described and/or illustrated steps of an exemplary method, e.g., steps of the method of flowchart 3600 of FIG. 36 and/or described or shown with respect to any of the other figures.

Assembly of components 3900 includes a component 3904 configured to operate the UE to register with a network via a first base station, e.g., gNB1, and a component 3914 configured to operate the UE to receive a RRC Release message and to recover the communicated information, said RRC Release message including one or more of: i) a paging priority list for new radio (NR) technologies including: carrier information and physical cell ID information corresponding to one or more NR base stations, e.g., gNB 2 and gNB3, under coverage of the first base station for which paging monitoring is to be performed, and, optionally, cells per discontinuous reception cycle (DRX) to monitor; and ii) a paging priority list for evolved universal terrestrial radio access (E-UTRA) technologies including: carrier information and physical cell ID information corresponding to one or more LTE base stations, e.g., eNB 1 and eNB2, under coverage of the first base station for which paging monitoring is to be performed, and, optionally, cells per discontinuous reception cycle (DRX) to monitor; iii) maximum paging cells monitored information and iv) monitoring duration information.

Assembly of components 3900 further includes a component 3916 configured to operate the UE to store the recovered information from the received RRC Release message, a component 3918 configured to operate the UE to transition to RRC_IDLE state or RRC_INACTIVE state, and a component 3920 configured to operate the UE to monitor for paging messages from one or more base stations, e.g., gnB1, gNB2 and gNB3, in accordance with the received recovered information from the RRC Release message. Component 3920 includes a component 3922 configured to detect a paging message from one or more base stations, e.g., from gNB1, gNB2 or gNB3, directed to the UE. Assembly of components 3900 further includes a component 3924 configured to operate the UE to establish a RRC connection with the base station from which the detected paging message, paging the UE, was received.

Assembly of components 3900 further includes a component 3930 configured to operate the UE to initiate a registration attempt with a network via a first base station, a component 3932 configured to determine that the UE has been registered with the network via the first base station and is in a RRC CONNECTED state, a component 3934 configured to receive a RRC release message from the first base station and recover the communicated information, e.g., including a paging priority list for the UE, e.g., including a new radio (NR) paging priority list and/or a EUTRA paging priority list, maximum paging cells monitored information (e.g., and integer in the range of 1 to 5), monitoring duration information (e.g., a time value in the range of 1 to 5 seconds), cells per DRX cycle to monitor information. Assembly of components 3900 further includes a component 39341 configured to determine to use a default value, e.g. 5, for maximum paging cells monitored if maximum paging cells monitored information is not included in the received RRC Release message, and a component 39342 configured to determine to use a default value, e.g., 5 seconds, for the paging monitoring duration if MonitoringDuration information is not included in the received RRC Release message. Assembly of components 3900 further includes a component 3936 configured to transition the UE to RRC_IDLE state or RRC_INACTIVE state, and a component 3938 configured to determine cells, e.g., small cells, to monitor for paging, e.g., based on information included in the received paging priority list. Component 3938, in some embodiments, includes a component 3939 configured to determine cells, e.g., small cells, to be monitored during a single DRX ON duration. Assembly of components 3900 further includes a component 3940 configured to operate the UE to start to monitor for paging messages from the first base station, e.g. gNB1, and other base stations, e.g. gNB2 and gNB3, which were included in the paging priority list in the received RRC Release message. In some embodiments, component 3940 includes a component 3941 configured to operate the UE to monitor for paging messages during a single DRX On duration, e.g. from the determined set of cells, e.g. small cells corresponding to the particular single DRX ON duration. Assembly of components 3900 further includes a component 3942 configured to maintain a paging monitoring interval timer, a component 3944 configured to determine if the paging monitoring interval timer has reached the maximum paging cells monitoring duration, a component 3946 configured to stop monitoring for paging signals from cells on said paging priority list when it is determined that he UE paging monitoring interval timer has reached the maximum paging cells monitoring duration and a component 3948 configured to continue to monitor for paging signals from cells on said paging priority list when it is determined that the UE paging monitoring interval tier has not reached the maximum paging cells monitoring duration.

Assembly of components 3900 further includes a component 3950 configured to determine if the UE has monitored the maximum number of paging cells on the paging priority list to be monitored for paging signals, a component 3952 configured to stop monitoring for paging signals from cells on said paging priority list when it is determined that the UE has monitored the maximum number of paging cells on the paging priority list to be monitored for paging signals, and a component 3954 configured to continue monitoring for paging signals from cells on said paging priority list when it is determined that the UE has not monitored the maximum number of paging cells on the paging priority list to be monitored for paging signals, a component 3956 configured to detect a paging signal directed to the UE, e.g., from small cell base station gNB3, a component 3958 configured to reset the paging monitoring interval timer, a component 3960 configured to generate and send a RRC connection establishment signal to the base station from which the detected paging signal was received, and a component 3962 configured to operate the UE to send and/or receive traffic signals to/from the base station, from which the detected paging signal was transmitted, following establishment of an RRC connection.

Figure 40:
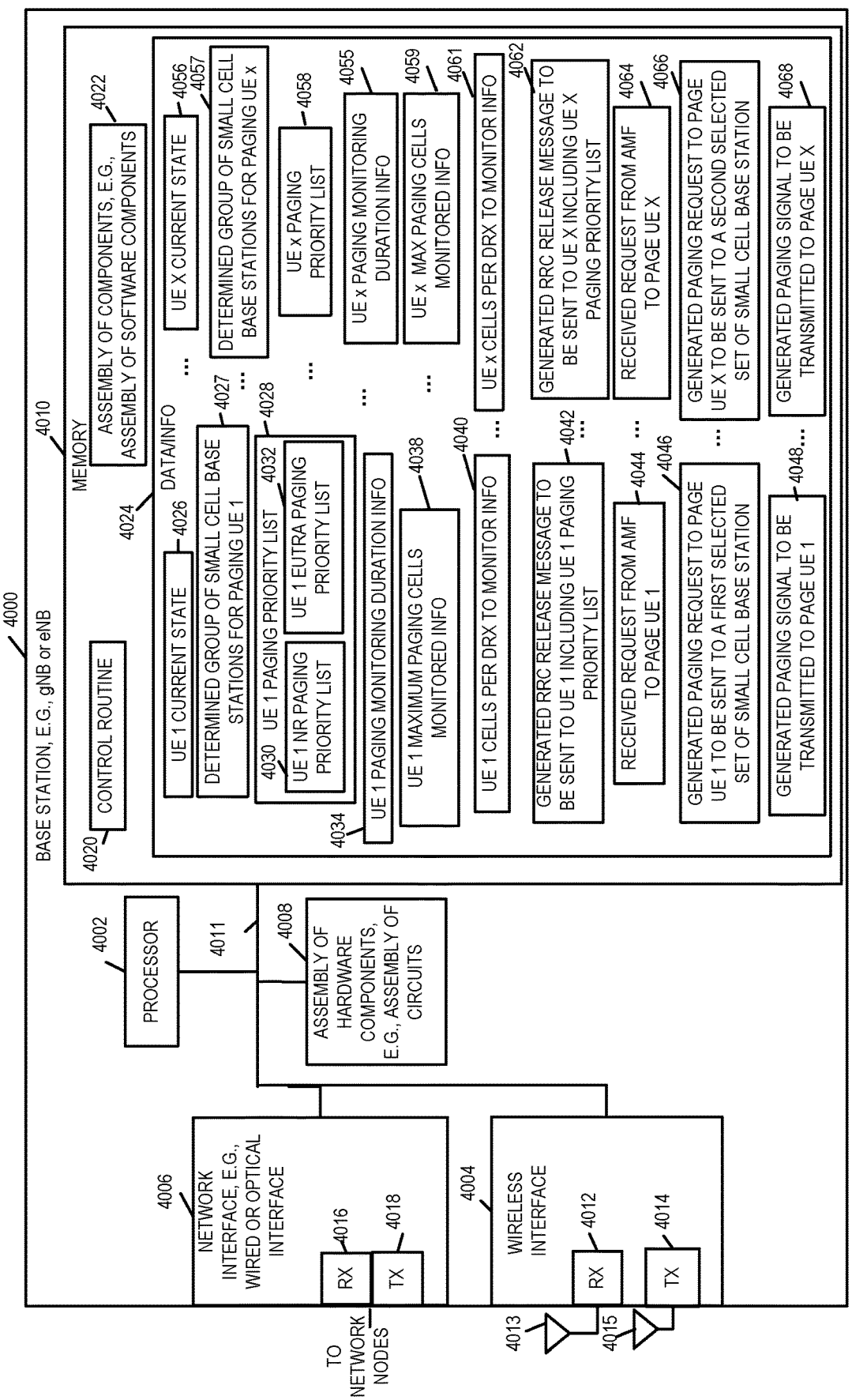
FIG. 40 is a drawing of an exemplary base station, e.g., a gNB or eNB in accordance with an exemplary embodiment.

FIG. 40 is a drawing of an exemplary base station 4000, e.g., a gNB or eNB in accordance with an exemplary embodiment. Exemplary base station 4000 includes a processor 4002, e.g., a CPU, a wireless interface 4004, a network interface 4006, e.g., a wired or optical interface, an assembly of hardware components 4008, e.g., an assembly of circuits, and memory 4010 coupled together via bus 4011 over which the various elements interchange data and information.

Network interface 4006 includes a receiver 4016 and a transmitter 4018, via which the base station 4000 may receive and send signals to other devices, e.g., other base stations, an AMF device, other network nodes, etc., a backhaul network, and/or the Internet.

Wireless interface 4004 includes a wireless receiver 4012 and a wireless transmitter 4014. Wireless receiver 4012 is coupled to receive antenna 4013, via which the base station 4000 receives wireless signals, e.g., wireless signals from UEs. Wireless transmitter 4014 is coupled to transmit antenna 4015, via which the base station 4000 transmits wireless signals, e.g., wireless signals to UEs. In some embodiments the same antenna is used for transmit and receive. In some embodiments, a plurality of antennas or antenna elements are used for transmit and/or receive. Exemplary transmitted wireless signals, transmitted via transmitter 4014, include, e.g., a registration establishment signal, a RRC Release Message, a paging message, and traffic signals. Exemplary received wireless signals, received via receiver 4012, include, e.g., a registration establishment signal and traffic signals.

Memory 4010 includes control routine 4020, assembly of components 4022, e.g., an assembly of software components, and data/information 4024. Data/information 4024 UE 1 current state 4026, a determined group of small cell base stations for paging UE 1 4027, a UE 1 paging priority list 4028 including a UE 1 NR paging priority list 4030 and/or a UE EUTRA paging priority list 4032, a UE1 paging monitoring duration information 4034, a UE 1 maximum paging cells monitored information 4038, UE 1 cells per DRX to monitor information 4040, a generated RRC release message 4042 to be sent to UE 1 including the UE1 paging priority list and optionally including paging monitoring control information including one or more or all of: monitoring duration information, maximum paging cells monitored information, and cells per DRX to monitor information, a received request from an AMF to page UE 1 4044, a generated paging request message 4046 to page UE 1 to be sent to a first selected set of small cell base stations, and a generated paging signal 4048 to be transmitted to page UE1. Data/information 4024 further includes UE x current state 4056, a determined group of small cell base stations for paging UE x 4057, a UE x paging priority list 4058 including a UEx NR paging priority list and/or a UE x EUTRA paging priority list, UEx paging monitoring duration information 4055, a UEx maximum paging cells monitored information 4059, UE x cell per DRX to monitor information 4061, a generated RRC release message 4062 to be sent to UE x including the UEx paging priority list and in some embodiments, further including paging monitoring control information, a received request from an AMF to page UE x 4064, a generated paging request message 4066 to page UE x to be sent to a first selected set of small cell base stations, and a generated paging signal 4068 to be transmitted to page UEx.

Figure 41:
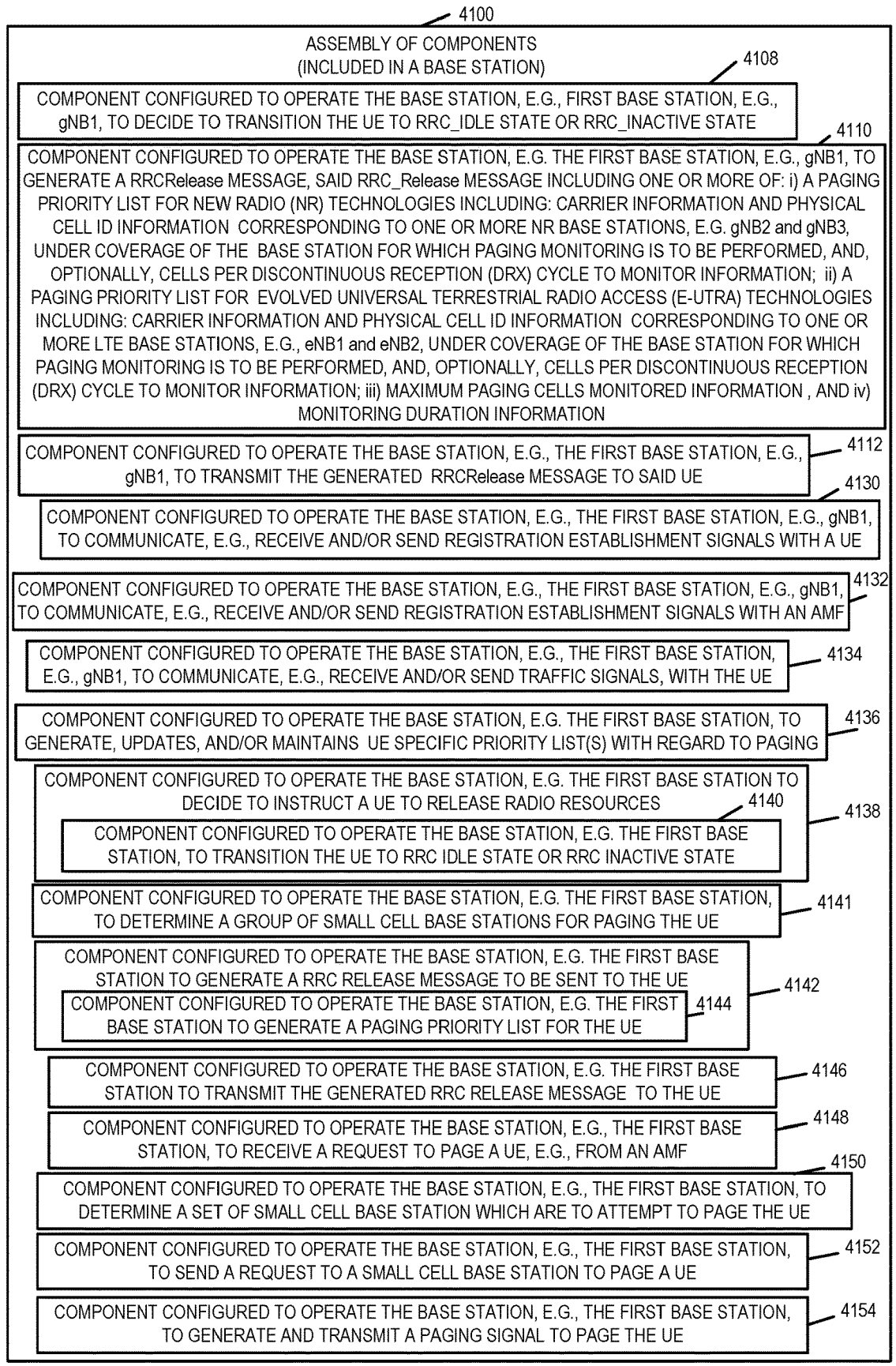
FIG. 41 is a drawing of an exemplary assembly of components, which may be included in an exemplary base station, in accordance with an exemplary embodiment.

FIG. 41 is a drawing of an exemplary assembly of components 4100, which may be included in an exemplary base station, in accordance with an exemplary embodiment. Exemplary assembly of components 4100 which may be included in a base station, e.g., base station 4000 of FIG. 40, and implement steps of an exemplary method, e.g., steps of the method of the flowchart 3600 of FIG. 36.

Assembly of components 4100 can be, and in some embodiments is, used in base station 300, one of the base stations (3504, 3506, 3508, 3510, 3512, 3514, 3516, 3518, 3520, 3522, 3524, 2526, 3528, 3530, 3532, 3534, 3536, 3538, 3540, 3542, 3544) of system 3500 of FIG. 35, a base station implementing one of more steps of flowchart 3600 of FIG. 36 and/or one of the base stations (3704, 3706, 3708, 3710) of signaling diagram 3700 of FIG. 37. The components in the assembly of components 4100 can, and in some embodiments are, implemented fully in hardware within the processor 4002, e.g., as individual circuits. The components in the assembly of components 4100 can, and in some embodiments are, implemented fully in hardware within the assembly of components 4008, e.g., as individual circuits corresponding to the different components. In other embodiments some of the components are implemented, e.g., as circuits, within the processor 4002 with other components being implemented, e.g., as circuits within assembly of components 4008, external to and coupled to the processor 4002. As should be appreciated the level of integration of components on the processor and/or with some components being external to the processor may be one of design choice. Alternatively, rather than being implemented as circuits, all or some of the components may be implemented in software and stored in the memory 4010 of the base station 4000, e.g., a gNB or eNB, with the components controlling operation of the base station to implement the functions corresponding to the components when the components are executed by a processor, e.g., processor 4002. In some such embodiments, the assembly of components 4100 is included in the memory 4010 as assembly of components 4022. In still other embodiments, various components in assembly of components 4100 are implemented as a combination of hardware and software, e.g., with another circuit external to the processor 4002 providing input to the processor 4002 which then under software control operates to perform a portion of a component's function. While processor 4002 is shown in the FIG. 40 embodiment as a single processor, e.g., computer, it should be appreciated that the processor 4002 may be implemented as one or more processors, e.g., computers.

When implemented in software the components include code, which when executed by the processor 4002, configure the processor 4002 to implement the function corresponding to the component. In embodiments where the assembly of components 4100 is stored in the memory 4010, the memory 4010 is a computer program product comprising a computer readable medium comprising code, e.g., individual code for each component, for causing at least one computer, e.g., processor 4002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 41 control and/or configure the base station 4100, or elements therein such as the processor 4002, to perform the functions of corresponding steps illustrated and/or described in the method of one or more of the flowcharts, signaling diagrams and/or described with respect to any of the Figures. Thus the assembly of components 4100 includes various components that perform functions of corresponding one or more described and/or illustrated steps of an exemplary method, e.g., steps of the method of flowchart 3600 of FIG. 36 and/or described or shown with respect to any of the other figures.

Assembly of components 4100 includes a component 4108 configured to operate the base station, e.g., first base station, e.g. gNB1, to decide to transition the UE to RRC_IDLE state or RRC_INACTIVE state, and a component 4110 configured to operate the base station, e.g., the first base station, e.g. gNB1, to generate a RRC Release message, said RRC Release message including one or more of: i) a paging priority list for new radio (NR) technologies including: carrier information and physical cell ID information corresponding to one or more NR base stations, e.g., gNB 2 and gNB3, under coverage of the first base station for which paging monitoring is to be performed, and, optionally, cells per discontinuous reception cycle (DRX) to monitor; and ii) a paging priority list for evolved universal terrestrial radio access (E-UTRA) technologies including: carrier information and physical cell ID information corresponding to one or more LTE base stations, e.g., eNB 1 and eNB2, under coverage of the first base station for which paging monitoring is to be performed, and, optionally, cells per discontinuous reception cycle (DRX) to monitor; iii) maximum paging cells monitored information; and iv) monitoring duration information. Assembly of components 4100 further includes a component 4112 configured to operate the base station, e.g., the first base station, e.g., gNB1 to transmit the generated RRC Release message to said UE.

Assembly of components 4100 further includes a component 4130 configured to operate the base station, e.g., the first base station, e.g. gNB1, to communicate, e.g. receive and/or send, registration establishment signals with a UE, a component 4132 configured to operate the base station, e.g. the first base station, e.g. gNB1, to communicate, e.g., receive and/or send, registration establishment signals with an AMF, e.g. regard the UE, a component 4134 configured to operate the base station, e.g. the first base station, e.g. gNB1, to communicate, e.g., receive and/or send, traffic signals with the UE. Assembly of components 4100 further includes a component 4136 configured to operate the base station, e.g. the first base station, e.g., gNB1, to generate, update, and/or maintain UE specific priority list(s) with regard to paging, and a component 4138 configured to operate the base station, e.g., the first base station, decide to instruct a UE to release radio resources. Component 4138 includes a component 4140 configured to operate the base station, e.g., the first base station, to transition the UE to an RRC_IDLE state or a RRC_INACTIVE state. Assembly of components 4100 further includes a component 4141 configured to operate the base station, e.g., the first base station, to determine a group of small cell base stations for paging the UE, e.g., based on received radio network planning data, and/or feedback data/information, e.g. via OAM, updated via ANR and/or via SON and/or neighbor node discovery, etc., Assembly of components 4100 further includes a component 4142 configured to operate the base station, e.g., the first base station, to generate a RRC release message to be sent to the UE. Component 4142 includes a component 4144 configured to operate the base station, e.g., the first base station, to generate a paging priority list for the UE.

Assembly of components 4100 further includes a component 4146 configured to operate the base station, e.g. the first base station, to transmit the generated RRC release message to the UE, a component 4148 configured to operate the base station, e.g. the first base station, to receive a request to page a UE, e.g., from an AMF, a component 4150 configured to operate the base station, e.g. the first base station, to determine a set of small cell base stations which are to attempt to page the UE, a component 4152 to operate the base station, e.g. the first base station, to sends a request to small cell base station to page a UE, and a component 4154 configured to operate the base station, e.g. the first base station, to generate and transmit a paging signal to page the UE.

Third Numbered List of Exemplary Method Embodiments

Method Embodiment 1 A communications method, the method comprising: making a decision (3732) at a first base station (3704) (e.g., a macro base station such as a macro cell gNB or a macro cell eNB or a small base station such as a small cell gNB or small cell eNB from which a first UE receives service), to instruct a first UE (3702) to release radio resources; generating (3734), at the first base station (3704), a first radio resource release message (3738) said first radio resource release message including a first paging priority list (3739) including a first list of base stations (3740, 3742 or combination of 3740 and 3742 when both are present) which are to be monitored for paging signals by the first UE (3702); and transmitting (3736), from the first base station (3704), the first radio resource release message (3738) to the first UE (3702).

Method Embodiment 2 The communications method of Method Embodiment 1, wherein said radio resource message (3738) includes carrier information and physical cell ID information for one or more base stations (e.g. where the base stations may be and sometimes are gNB2 and gNB3 in the case of NR base station and/or LTE BASE STATIONS in the case of EVOLVED UNIVERSAL TERRESTRIAL RADIO ACCESS (E-UTRA) TECHNOLOGIES which are to be monitored) included in said first paging priority list (3739).

Method Embodiment 3 The communications method of Method Embodiment 1, wherein said first radio resource release message (3738) further includes a number of cells per discontinuous reception (DRX) cycle to monitor (3747) when said first UE is to operate in a discontinuous reception mode of operation for monitoring for paging signals on said first paging priority list (3739).

Method Embodiment 4. The method of Method Embodiment 1, wherein making a decision (3732) at a first base station (3704) (e.g., an macro base station such as a gNB or eNB or a small base station such as a gNB or eNB from which a first UE receives service), to instruct a first UE (3702) to release radio resources includes deciding (3733) to transition the first UE from an active state of operation in which the first UE has a dedicated radio resource for communicating traffic data to an IDLE state or INACTIVE state.

Method Embodiment 5 The method of Method Embodiment 1, wherein said first paging priority list (3739) is a list of cells (e.g., small cells such as new radio (NR) small cells and/or EUTRA small cells) to be monitored by the first UE for paging messages, cells listed on said first paging priority list (3739) being in addition to a macro base station cell (3704) which said first UE (3702) monitors for pages.

Method Embodiment 6 The method of Method Embodiment 5, wherein said first paging priority list (3739) is a UE specific list, said first base station (3704) generating and/or updating (3731) UE specific paging priority list(s) and/or maintaining different paging priority lists for different UEs for inclusion in RRC release messages (e.g., based on UE past cell connection information, UE location information, UE direction of travel, etc.).

Method Embodiment 7 The method of Method Embodiment 5, wherein generating (3734) at the first base station the first radio resource release message (3738) includes generating (3735) said first paging priority list (3739) for the first UE (3702) based on knowledge of cells which previously provided service to said first UE (3702) and/or the current location of the first UE (3702).

Method Embodiment 8 The method of Method Embodiment 1, wherein said first radio resource release message (3738) is radio resource control release message (RRC) used to control the first UE (3702) with regard to use of radio resources.

Method Embodiment 9 The method of Method Embodiment 1, wherein the first radio resource message (3738) further includes information (3746) indicating a first maximum paging cells monitoring duration, said maximum paging cells monitoring duration being a time interval in which if no paging messages are received by the first UE from cells on the first paging priority list, the first UE is to stop monitoring for paging messages from cells listed on the first paging priority list.

Method Embodiment 10 The method of Method Embodiment 1, wherein the first radio resource message (3738) further includes information (3744) indicating a first maximum number of cells included in said first paging priority list to be monitored by the first UE for paging messages (e.g., in a paging monitoring interval).

Method Embodiment 11 The method of Method Embodiment 10, wherein said first paging priority list (3739) includes a first set (3740) of new radio (NR) cells to be monitored for paging messages and a first set (3742) of EUTRA cells to be monitored for paging messages.

Method Embodiment 12 The method of Method Embodiment 11, wherein said first set of NR cells (3740) to be monitored for paging messages is included in a NR paging priority list portion of said first paging priority list (3739) and said first set of EUTRA cells (3742) is included in a first EUTRA portion of said paging priority list.

Method Embodiment 13 The method of Method Embodiment 10, wherein said first UE (3702) does not monitor cells listed on said paging priority list (3739) once the maximum paging cells monitoring duration (3746) has been reached without the first UE (3702) detecting a paging message from one of the cells listed on the paging priority list (3739).

Method Embodiment 14 The method of Method Embodiment 13, further comprising: receiving (3748), at the first UE the first radio resource release message (3738) and recovering at least the first paging priority list (3739) including a first list of cells (3740, 3742 or combination of 3740 and 3742 when both are present) which are to be monitored for paging signals by the first UE (3702); and transitioning (3750) the first UE into an IDLE or INACTIVE state.

Method Embodiment 15 The method of Method Embodiment 14, further comprising: operating (3751) the UE to determine one or more cells (e.g., small cells to monitor for paging messages) from information included in said first paging priority list (3739).

Method Embodiment 16 The method of Method Embodiment 15, further comprising: operating the UE to monitor (3752) for paging messages from said one or more cells included in said first paging priority list (3739).

Method Embodiment 17 The method of Method Embodiment 16, further comprising: sending (3786) a radio resource control connection signal (3788) to the one (3708) of the base stations on said first paging priority list (3739) from which the paging message (3782) was received.

Method Embodiment 18 The method of Method Embodiment 16, further comprising: maintaining (3753) at the first UE (3702) a paging monitoring interval timer indicating the amount of time the first UE has been monitoring for paging messages from cells included in said first paging priority list (3739) without a paging message having been received.

Method Embodiment 19 The method of Method Embodiment 18, further comprising: determining (3755) at the first UE (3702) if the first UE paging interval timer has reached the first maximum paging cells monitoring duration (3746).

Method Embodiment 20 The method of Method Embodiment 19, further comprising: stopping (3757), at the first UE (3702), monitoring for paging signals from cells on said first paging priority list (3739) when it is determined that the first UE paging interval timer has reached the first maximum paging cells monitoring duration (3746); and continuing (3759), at the first UE (3702), to monitor for paging signals from cells on said first paging priority list (3739) when it is determined that the first UE paging interval timer has not reached the first maximum paging cells monitoring duration (3746).

Method Embodiment 21 The method of Method Embodiment 18, further comprising: determining (3761) at the first UE (3702) if the first UE (3702) has monitored the maximum number of paging cells on the first paging priority list to be monitored (3744) for paging signals (e.g., by monitoring each small paging cell in order of a priority on the list for a predetermined amount of time before monitoring for paging messages from the next cell on the first paging priority list).

Method Embodiment 22 The method of Method Embodiment 21, further comprising: stopping (3763), at the first UE (3702), monitoring for paging signals from cells on said first paging priority list when it is determined that the first UE has monitored the maximum number of paging cells on the first paging priority list to be monitored (3744) for paging signals; and continuing (3765), at the first UE (3702), to monitor for paging signals from cells on said first paging priority list when it is determined that the first UE has not monitored the maximum number of paging cells on the first paging priority list to be monitored (3744) for paging signals.

Third Numbered List of Exemplary System Embodiments

System Embodiment 1 A communications system (3500) comprising: a first base station (3704) (e.g., a macro base station such as a macro cell gNB or a macro cell eNB or a small base station such as a small cell gNB or small cell eNB from which a first UE receives service) including: a first processor (4002); and a first wireless transmitter (4014); and wherein said first processor (4002) is configured to: make a decision (3732) to instruct a first UE (3702) to release radio resources; generate (3734) a first radio resource release message (3738) said first radio resource release message including a first paging priority list (3739) including a first list of base stations (3740, 3742 or combination of 3740 and 3742 when both are present) which are to be monitored for paging signals by the first UE (3702); and operate said first wireless transmitter (4014) to transmit (3736), from the first base station (3704), the first radio resource release message (3738) to the first UE (3702).

System Embodiment 2 The communications system (3500) of System Embodiment 1, wherein said radio resource message (3738) includes carrier information and physical cell ID information for one or more base stations (e.g. where the base stations may be and sometimes are gNB2 and gNB3 in the case of NR base station and/or LTE BASE STATIONS in the case of EVOLVED UNIVERSAL TERRESTRIAL RADIO ACCESS (E-UTRA) TECHNOLOGIES which are to be monitored) included in said first paging priority list (3739).

System Embodiment 3 The communications system (3500) of System Embodiment 1, wherein said first radio resource release message (3738) further includes a number of cells per discontinuous reception (DRX) cycle to monitor (3747) when said first UE is to operate in a discontinuous reception mode of operation for monitoring for paging signals on said first paging priority list (3739).

System Embodiment 4 The communications system (3500) of System Embodiment 1, wherein said first processor (4002) is configured to: decide (3733) to transition the first UE (3702) from an active state of operation in which the first UE has a dedicated radio resource for communicating traffic data to an IDLE state or INACTIVE state, as part of being configured to make a decision (3732) to instruct the first UE (3702) to release radio resources.

System Embodiment 5 The communications system (3500) of System Embodiment 1, wherein said first paging priority list (3739) is a list of cells (e.g., small cells such as new radio (NR) small cells and/or EUTRA small cells) to be monitored by the first UE for paging messages, cells listed on said first paging priority list (3739) being in addition to a macro base station cell (3704) which said first UE (3702) monitors for pages.

System Embodiment 6 The communications system (3500) of System Embodiment 5, wherein said first paging priority list (3739) is a UE specific list; and wherein said first processor (4002) is further configured to operate the first base station to: generate and/or update (3731) UE specific paging priority list(s) and/or maintain different paging priority lists for different UEs for inclusion in RRC release messages (e.g., based on UE past cell connection information, UE location information, UE direction of travel, etc.).

System Embodiment 7 The communications system (3500) of System Embodiment 5, wherein asid first processor (4002) is configured to: generate (3735) said first paging priority list (3739) for the first UE (3702) based on knowledge of cells which previously provided service to said first UE (3702) and/or the current location of the first UE (3702), as part of being configured to generate (3734) at the first base station the first radio resource release message (3738).

System Embodiment 8 The communications system (3500) of System Embodiment 1, wherein said first radio resource release message (3738) is radio resource control release message (RRC) used to control the first UE (3702) with regard to use of radio resources.

System Embodiment 9 The communications system (3500) of System Embodiment 1, wherein the first radio resource message (3738) further includes information (3746) indicating a first maximum paging cells monitoring duration, said maximum paging cells monitoring duration being a time interval in which if no paging messages are received by the first UE from cells on the first paging priority list, the first UE is to stop monitoring for paging messages from cells listed on the first paging priority list.

System Embodiment 10 The communications system (3500) of System Embodiment 1, wherein the first radio resource message (3738) further includes information (3744) indicating a first maximum number of cells included in said first paging priority list to be monitored by the first UE for paging messages (e.g., in a paging monitoring interval).

System Embodiment 11 The communications system (3500) of System Embodiment 10, wherein said first paging priority list (3739) includes a first set (3740) of new radio (NR) cells to be monitored for paging messages and a first set (3742) of EUTRA cells to be monitored for paging messages.

System Embodiment 12 The communications system (3500) of System Embodiment 11, wherein said first set of NR cells (3740) to be monitored for paging messages is included in a NR paging priority list portion of said first paging priority list (3739) and said first set of EUTRA cells (3742) is included in a first EUTRA portion of said paging priority list.

System Embodiment 13 The communications system (3500) of System Embodiment 10, wherein said first UE (3702) does not monitor cells listed on said paging priority list (3739) once the maximum paging cells monitoring duration (3746) has been reached without the first UE (3702) detecting a paging message from one of the cells listed on the paging priority list (3739).

System Embodiment 14 The communications system (3500) of System Embodiment 13, further comprising: said first UE (3702) including: a second processor (3802); a wireless receiver (3838); and wherein said second processor (3802) is configured to: operate (3748) the wireless receiver (3838) to receive, at the first UE (3702) the first radio resource release message (3738) and recover at least the first paging priority list (3739) including a first list of cells (3740, 3742 or combination of 3740 and 3742 when both are present) which are to be monitored for paging signals by the first UE (3702); and transition (3750) the first UE (3702) into an IDLE or INACTIVE state.

System Embodiment 15 The communications system (3500) of System Embodiment 14, wherein said second processor (3802) is further configured to: operate (3751) the first UE (3702) to determine one or more cells (e.g., small cells to monitor for paging messages) from information included in said first paging priority list (3739).

System Embodiment 16 The communications system (3500) of System Embodiment 15, wherein said second processor (3802) is configured to: operate the first UE (3702) to monitor (3752) for paging messages from said one or more cells included in said first paging priority list (3739).

System Embodiment 17 The communications system (3500) of System Embodiment 16, wherein said first UE (3702) further includes: a second wirless transmitter (3840); and wherein said second processor (3802) is further configured to operate the second wireless transmitter (3840) to send (3786) a radio resource control connection signal (3788) to the one (3708) of the base stations on said first paging priority list (3739) from which the paging message (3782) was received.

System Embodiment 18 The communications system (3500) of System Embodiment 16, wherein said second processor (3802) is further configured to: maintain (3753) at the first UE (3702) a paging monitoring interval timer indicating the amount of time the first UE has been monitoring for paging messages from cells included in said first paging priority list (3739) without a paging message having been received.

System Embodiment 19 The communications system (3500) of System Embodiment 18, wherein said second processor (3802) is further configured to: determine (3755)

at the first UE (3702) if the first UE paging interval timer has reached the first maximum paging cells monitoring duration (3746).

System Embodiment 20 The communications system of System Embodiment 19, wherein said second processor (3802) is further configured to: operate (3757) the first UE (3702) to stop monitoring for paging signals from cells on said first paging priority list (3739) when it is determined that the first UE paging interval timer has reached the first maximum paging cells monitoring duration (3746); and operate the first UE (3702) to continue to monitor for paging signals from cells on said first paging priority list (3739) when it is determined that the first UE paging interval timer has not reached the first maximum paging cells monitoring duration (3746).

System Embodiment 21 The communications system (3500) of System Embodiment 18, wherein said second processor (3802) is further configured to: determine (3761) if the first UE (3702) has monitored the maximum number of paging cells on the first paging priority list to be monitored (3744) for paging signals (e.g., by monitoring each small paging cell in order of a priority on the list for a predetermined amount of time before monitoring for paging messages from the next cell on the first paging priority list).

System Embodiment 22 The communications system (3500) of System Embodiment 21, wherein said second processor (3802) is further configured to: operate (3763) the first UE (3702) to stop monitoring for paging signals from cells on said first paging priority list when it is determined that the first UE has monitored the maximum number of paging cells on the first paging priority list to be monitored (3744) for paging signals; and operate (3765) the first UE (3702), to continue to monitor for paging signals from cells on said first paging priority list when it is determine that the first UE has not monitored the maximum number of paging cells on the first paging priority list to be monitored (3744) for paging signals.

Third Numbered List of Exemplary Non-Transitory Computer Readable Medium Embodiments Non-Transitory Computer Readable Medium Embodiment 1 A non-transitory computer readable medium (4010) including computer executable instructions which when executed by a processor (4002), included in a first base station (4000), control the first base station (4000) to perform the steps of: making a decision (3732) at a first base station (3704) (e.g., a macro base station such as a macro cell gNB or a macro cell eNB or a small base station such as a small cell gNB or small cell eNB from which a first UE receives service), to instruct a first UE (3702) to release radio resources; generating (3734), at the first base station (3704), a first radio resource release message (3738) said first radio resource release message including a first paging priority list (3739) including a first list of base stations (3740, 3742 or combination of 3740 and 3742 when both are present) which are to be monitored for paging signals by the first UE (3702); and transmitting (3736), from the first base station (3704), the first radio resource release message (3738) to the first UE (3702).

Non-Transitory Computer Readable Medium Embodiment 2 A non-transitory computer readable medium (3820) including computer executable instructions which when executed by a processor (3802), included in a first user equipment (UE) (3800), control the first UE (3800) to perform the steps of: receiving (3748), at the first UE a first radio resource release message (3738) and recovering at least a first paging priority list (3739) including a first list of cells (3740, 3742 or combination of 3740 and 3742 when both are present) which are to be monitored for paging signals by the first UE (3702); and transitioning (3750) the first UE into an IDLE or INACTIVE state.

The techniques of various embodiments may be implemented using software, hardware and/or a combination of software and hardware. Various embodiments are directed to apparatus, e.g., user devices such as a user equipment (UE) device, base stations (macro cell base stations and small cell base stations) such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
making a decision at a first base station to instruct a first user equipment (UE) to release radio resources;
generating, at the first base station, a first radio resource release message, said first radio resource release message including a first paging priority list including a first list of base stations which are to be monitored for paging signals by the first UE and further including information indicating a first maximum number of cells included in said first paging priority list to be monitored by the first UE for paging messages; and
transmitting, from the first base station, the first radio resource release message to the first UE.

2. The method of claim 1, wherein the first radio resource release message further includes information indicating a first maximum paging cells monitoring duration, said first maximum paging cells monitoring duration being a time interval in which if no paging messages are received by the first UE from cells on the first paging priority list, the first UE is to stop monitoring for paging messages from cells listed on the first paging priority list.

3. The method of claim 1, wherein said first paging priority list includes a first set of new radio (NR) cells to be monitored for paging messages and a first set of evolved universal terrestrial radio access (EUTRA) cells to be monitored for paging messages.

4. The method of claim 1, wherein said first UE does not monitor cells listed on said first paging priority list once a first maximum paging cells monitoring duration has been reached without the first UE detecting a paging message from one of the cells listed on the first paging priority list.

5. The method of claim 4, further comprising:
receiving, at the first UE, the first radio resource release message and recovering at least the first paging priority list including a first list of cells which are to be monitored for paging signals by the first UE; and
transitioning the first UE into an IDLE or INACTIVE state.

6. The method of claim 5, further comprising:
operating the first UE to determine one or more cells from information included in said first paging priority list.

7. The method of claim 6, further comprising:
operating the first UE to monitor for paging messages from said one or more cells included in said first paging priority list.

8. The method of claim 7, further comprising:
maintaining, at the first UE, a first UE paging monitoring interval timer indicating the amount of time the first UE has been monitoring for paging messages from cells included in said first paging priority list without a paging message having been received.

9. The method of claim 8, further comprising:
determining, at the first UE, if the first UE paging monitoring interval timer has reached the first maximum paging cells monitoring duration.

10. The method of claim 9, further comprising:
stopping, at the first UE, monitoring for paging signals from cells on said first paging priority list when it is determined that the first UE paging monitoring interval timer has reached the first maximum paging cells monitoring duration; and
continuing, at the first UE, to monitor for paging signals from cells on said first paging priority list when it is determined that the first UE paging monitoring interval time has not reached the first maximum paging cells monitoring duration.

11. The method of claim 8, further comprising:
determining, at the first UE, if the first UE has monitored the maximum number of paging cells on the first paging priority list to be monitored for paging signals.

12. The method of claim 11, further comprising:
stopping, at the first UE, monitoring for paging signals from cells on said first paging priority list when it is determined that the first UE has monitored the maximum number of paging cells on the first paging priority list to be monitored for paging signals; and
continuing, at the first UE, to monitor for paging signals from cells on said first paging priority list when it is determined that the first UE has not monitored the maximum number of paging cells on the first paging priority list to be monitored for paging signals.

13. A communications system comprising:
a first base station including:
a first processor; and
a first wireless transmitter; and
wherein said first processor is configured to:
    make a decision to instruct a first user equipment (UE) to release radio resources;
    generate a first radio resource release message, said first radio resource release message including a first paging priority list including a first list of base stations which are to be monitored for paging signals by the first UE and further including information indicating a first maximum number of cells included in said first paging priority list to be monitored by the first UE for paging messages; and
    operate said first wireless transmitter to transmit, from the first base station, the first radio resource release message to the first UE.

14. The communications system of claim 13, wherein the first radio resource release message further includes information indicating a first maximum paging cells monitoring duration, said first maximum paging cells monitoring duration being a time interval in which if no paging messages are received by the first UE from cells on the first paging priority list, the first UE is to stop monitoring for paging messages from cells listed on the first paging priority list.

15. The communications system of claim 13, wherein said first paging priority list includes a first set of new radio (NR) cells to be monitored for paging messages and a first set of EUTRA cells to be monitored for paging messages.

16. The communications system of claim 13, further comprising:
said first UE including:
a second processor;
a wireless receiver; and
wherein said second processor is configured to:
    operate the wireless receiver to receive, at the first UE, the first radio resource release message and recover at least the first paging priority list including a first list of cells; and
    transition the first UE into an IDLE or INACTIVE state.

17. The communications system of claim 16, wherein said second processor is further configured to:
operate the first UE to determine one or more cells from information included in said first paging priority list; and
operate the first UE to monitor for paging messages from said one or more cells included in said first paging priority list.

18. A non-transitory computer readable medium including computer executable instructions which when executed by a processor, included in a first base station, control the first base station to perform the steps of:
making a decision, at said first base station, to instruct a first user equipment (UE) to release radio resources;
generating, at the first base station, a first radio resource release message, said first radio resource release message including a first paging priority list including a first list of base stations which are to be monitored for paging signals by the first UE UE and further including information indicating a first maximum number of cells included in said first paging priority list to be monitored by the first UE for paging messages; and
transmitting, from the first base station, the first radio resource release message to the first UE.

* * * * *